United States Patent
Kawazura et al.

(10) Patent No.: US 6,179,008 B1
(45) Date of Patent: Jan. 30, 2001

(54) THERMOPLASTIC ELASTOMER COMPOSITION, PROCESS FOR THE PREPARATION THERE OF, HOSE MADE BY USING THE COMPOSITION, AND PROCESS FOR THE PRODUCTION THEREOF

(75) Inventors: Tetsuji Kawazura; Osamu Ozawa; Yoshihiro Soeda; Katuhiro Tanaka; Takashi Satoh; Shigeru Yamauchi; Noriaki Kuroda; Shuji Takahashi; Daisuke Irii; Kazunori Ishikawa; Susumu Hatanaka, all of Hiratsuka (JP)

(73) Assignee: The Yokohama Rubber Co., Ltd., Tokyo (JP)

(*) Notice: Under 35 U.S.C. 154(b), the term of this patent shall be extended for 0 days.

(21) Appl. No.: 08/930,205
(22) PCT Filed: Feb. 7, 1997
(86) PCT No.: PCT/JP97/00329
 § 371 Date: Oct. 9, 1997
 § 102(e) Date: Oct. 9, 1997
(87) PCT Pub. No.: WO97/29153
 PCT Pub. Date: Aug. 14, 1997

(30) Foreign Application Priority Data

| Feb. 9, 1996 | (JP) | 8-23903 |
|---|---|---|
| Feb. 14, 1996 | (JP) | 8-26542 |
| Aug. 12, 1996 | (JP) | 8-212760 |
| Sep. 19, 1996 | (JP) | 8-247605 |
| Oct. 25, 1996 | (JP) | 8-284393 |
| Oct. 30, 1996 | (JP) | 8-288496 |
| Oct. 31, 1996 | (JP) | 8-290360 |
| Nov. 1, 1996 | (JP) | 8-291751 |
| Nov. 1, 1996 | (JP) | 8-292073 |
| Feb. 6, 1997 | (JP) | 9-23620 |

(51) Int. Cl.[7] .................................................. F19L 11/08
(52) U.S. Cl. .......................... 138/125; 138/126; 138/137; 138/141; 428/516
(58) Field of Search ...................................... 138/123–126, 138/137, 140, 141; 428/516, 904

(56) References Cited

U.S. PATENT DOCUMENTS

| 4,556,705 | 12/1985 | McCready | 528/289 |
|---|---|---|---|
| 4,569,973 | 2/1986 | Tyrell et al. | 525/437 |
| 5,061,572 | * 10/1991 | Hamada et al. | 428/516 |

FOREIGN PATENT DOCUMENTS

| 55-97948 | 7/1980 | (JP) . |
|---|---|---|
| 59-147184 | 8/1984 | (JP) . |
| 61-153088 | 7/1986 | (JP) . |
| 62-171582 | 7/1987 | (JP) . |
| 63-251233 | 10/1988 | (JP) . |
| 1-92251 | 4/1989 | (JP) . |
| 3-146328 | 6/1991 | (JP) . |
| 5-25347 | 2/1993 | (JP) . |
| 5-25374 | 2/1993 | (JP) . |
| 6-64102 | 3/1994 | (JP) . |
| 6-207086 | 7/1994 | (JP) . |
| 7-304902 | 11/1995 | (JP) . |

* cited by examiner

Primary Examiner—Patrick Brinson
(74) Attorney, Agent, or Firm—Finnegan, Henderson, Farabow, Garrett & Dunner, L.L.P.

(57) ABSTRACT

A thermoplastic elastomer composition which, when used for the inner tube and/or outer cover of a hose, can improve the hose flexibility at an ordinary temperature and low temperature, oil resistance, and cold resistance and can reduce the production costs since it does not require a vulcanization step and a hose having said properties using this elastomer composition for its inner tube and/or outer cover and a process and apparatus for the production thereof.

38 Claims, 7 Drawing Sheets

INTEGRAL TYPE HEATING APPARATUS
(ALSO USED AS BRAIDING DEVICE)

INTEGRAL TYPE HEATING APPARATUS
(ALSO USED AS BRAIDING DEVICE)

THERMOPLASTIC ELASTOMER COMPOSITION, PROCESS FOR THE PREPARATION THERE OF, HOSE MADE BY USING THE COMPOSITION, AND PROCESS FOR THE PRODUCTION THEREOF

TECHNICAL FIELD

The present invention relates to a thermoplastic elastomer composition and a process for producing the same and a hose using a thermoplastic elastomer composition and a process for producing the same. More specifically, it relates to a hose which includes a thermoplastic copolyester elastomer and a specific acrylic rubber and which, when these are used as the inner tube and/or outer cover of the hose, is superior in oil resistance, flexibility, cold resistance, and heat resistance and is capable of being produced, without requiring a vulcanization step, a thermoplastic elastomer composition and a hose suitable for various types of sealing agents, and processes for producing the same.

The present invention further relates to an olefin thermoplastic elastomer composition which gives a good adhesion to polyester fiber and, in particular, has a bondability capable of withstanding a stress caused by repeated deformation particularly at a high temperature of 120° C. and a laminate having this as the adhesion layer or a structural layer, in particular a hose, and to a laminate superior in bonding formed by a layer of a thermoplastic elastomer composition composed of a polyolefin thermoplastic resin in which at least partially cross-linked elastomer component is blended and by a fiber reinforcing layer between which at least one thermoplastic adhesive resin selected from the group of maleic anhydride-modified polyolefin resin, epoxy-modified polyolefin resin, and polyester resin is interposed and which are bonded into an integral unit by hot melting and to a hose using the same.

The present invention further relates to a process for producing a hose composed of at least an inner tube composed of a thermoplastic material or flexible material and an outer cover composed of a thermoplastic material and a reinforcing layer, in particular relates to a process for producing a hose improved in durability of the hose by providing between the layers a bonding layer composed of a thermoplastic material and hot melting the bonding layer so as to form the bonding layer and reinforcing layer integrally and, in the production of a hose having at least an inner tube and a reinforcing layer composed of a reinforcing yarn, a hose braider provided with a heating means capable of improving the bondability of an inner tube composed at least at the outer circumference of the inner tube and the adhesive layer between reinforcing layers of a thermoplastic resin composition or thermoplastic elastomer composition or other thermoplastic resin material (hereinafter sometimes simply referred to as a thermoplastic resin material) with the reinforcing yarn braided on the outer circumference of the inner tube and the bondability of two or more reinforcing layers composed of reinforcing yarn and to manufacture a hose having flexibility and a high durability.

BACKGROUND ART

Rubber hoses are usually composed of an inner tube, a reinforcing layer, and an outer cover with the inner tube and outer cover composed of a vulcanized rubber. Such a rubber hose requires a vulcanization step, and therefore, there is the problem that the manufacturing process becomes complicated. On the other hand, there is known a so-called thermoplastic resin tube which is simpler in the manufacturing process thereof in the point that the inner tube and outer cover are composed of a thermoplastic resin and no vulcanization step is required. However, the thermoplastic resin comprising this resin hose is generally harder compared with vulcanized rubber, and therefore, it is difficult to obtain a flexible hose. In addition, the thermoplastic resin will soften by heating and therefore, it is usually difficult at a temperature of 120° C. or more.

Therefore, attempts have been made in the past to improve the flexibility by adding, to the thermoplastic resin, amorphous polymers such as a rubber (for example, see Japanese Unexamined Patent Publication (Kokai) No. 5-25374, Japanese Unexamined Patent Publication (Kokai) No. 6-64102, and Japanese Unexamined Patent Publication (Kokai) No. 6-207086), but there is the problem that the compatibility of the thermoplastic resin with rubber is poor and, if the blending amount of the rubber is increased to improve the flexibility in an acrylic rubber (ACM)/thermoplastic copolyester elastomer thermoplastic elastomer material, where the ACM composition is EA (ethyl acrylate)=40, BA (butyl acrylate)=32, MEA (methoxyethyl acrylate)=19, GMA (glycidyl methacrylate)=9 (wt %), the elongation will fall and, as a result, the breaking energy will be reduced and, in turn, the problem will arise of the hose performance falling.

Further, to improve the flexibility of a thermoplastic resin, there is known a resin hose comprised of a polyester thermoplastic elastomer having an inner tube of polybutylene terephthalate as a hard segment and polytetramethylene glycol or polycaprolactone as a soft segment, but this polyester thermoplastic elastomer is limited in the extent to which the hardness can be reduced to obtain the necessary heat softening resistance and strength properties. It is not possible to obtain a hose having a sufficient flexibility and heat resistance like that of a vulcanized rubber.

Therefore, development of a hose having sufficient flexibility which can be produced by a simple process not requiring a vulcanization step and a hose provided with heat resistance as well enabling use for transmission of pressure or transport of liquids at a high temperature has been desired. In response to this, there has been proposed a hose having an inner tube and an outer cover comprising a thermoplastic elastomer composed of a thermoplastic resin in which a vulcanized rubber (see Japanese Unexamined Patent Publication (Kokai) No. 6-64102) is dispersed.

This hose has an inner tube composed of a thermoplastic elastomer composition comprising a thermoplastic copolyester elastomer in which a vulcanized composition of at least one acrylic rubber having an acryl group and epoxy group is dispersed and has an outer cover composed of a thermoplastic elastomer composed of a thermoplastic resin in which a vulcanized rubber is dispersed. Further, the reinforcing layer is composed of a rayon fiber, polyester fiber, or hard steel wire or other organic fiber or inorganic wire such as stainless steel wire bonded with the inner tube and outer cover via an ordinary temperature-curing type urethane adhesive, etc.

By this configuration, it is possible to obtain a hose which is flexible at ordinary temperature and does not require a vulcanization step, but this hose is not necessarily satisfactory in terms of the low temperature properties, in particular, the flexibility at low temperature and cold resistance. Furthermore, the improvement in the oil resistance has been required.

Further, the high pressure resin hoses for use in construction machinery etc. should preferably be improved in abrasion resistance, heat softening resistance, flexibility, etc. In particular, there has been a strong need for the improvement in the abrasion resistance, resistance to heat softening resistance, flexibility, weather resistance, etc. of the outer cover of the hose. Furthermore, regarding the abrasion resistance, there is vibration and rocking in the environments where hoses are used, and therefore, the surface of the outer cover of the hose often rubs against adjacent metal members etc. and is abraded. In the past, an ether based polyurethane or other thermoplastic resin having abrasion resistance was used for the outer cover of such a hose, but this was insufficient for long term use. Therefore, studies have been made how to improve the problem by the polymer structure, but there have been the defects of impairment of the flexibility. In this way, up until now, there has not been a thermoplastic elastomer composition which is superior in abrasion resistance, heat softening resistance, flexibility, etc. and can be suitably used for the outer cover of a hose.

In the past, in the bonding of an olefin thermoplastic elastomer composition and polyester fiber, no technique for stably bonding them, in particular, no olefin thermoplastic elastomer composition having a high temperature resistant bondability capable of withstanding, stress due to repeated deformation at a high temperature such as 120° C. was known. This was because an olefin thermoplastic elastomer composition is a nonpolar substance and has a low surface energy, while a polyester fiber has polarity. Therefore, in general the bondability between the composition and the fiber is poor. In particular, it is not possible to maintain the strength of the bond at a high temperature.

To solve this problem, for example, a formulation using a so-called primer and adhesive system/adhesive resin has been proposed, but there is still not known an adhesive formulation or an olefin thermoplastic elastomer composition giving a bond of a strength capable of withstanding the repeated deformation at a high temperature such as 120° C. In particular, in a hose, a dynamically vulcanized olefin thermoplastic elastomer composition has suitable properties as the outer cover material comprising the hose and a polyester fiber has suitable properties as a reinforcing fiber layer material comprising the hose, but there is not yet known an adhesive formulation for bonding the composition and the fiber, in particular, an adhesive formulation of a strength capable of withstanding the stress of repeated deformation at the environment of use of high pressure flexible hoses, that is, a high temperature such as 120° C. No hose combining these materials is therefore known.

Accordingly, there has been a desire for an olefin thermoplastic elastomer composition having bondability with a polyester fiber and capable of withstanding the stress of repeated deformation at a high temperature such as 120° C. and a laminate using the above thermoplastic elastomer composition and a polyester fiber.

There is known a hose comprising an inner tube, reinforcing layer, and outer cover laminated in that order. In this hose, the inner tube and outer cover are composed of a vulcanized rubber or urethane, polyester, or nylon, or other plastics and the reinforcing layer is composed of nylon, polyester, rayon, vinylon, or aromatic polyamide fiber or other fiber braided or wrapped in a spiral. Between these layers, bonding is performed using a rubber cement or urethane adhesive etc.

However, the so-called "rubber hose" using rubber in the outer cover requires a vulcanization step, and therefore, the manufacturing process becomes complicated. Further, a so-called resin hose using just a thermoplastic resin for the inner tube and outer cover is hard and poor in flexibility and, when bent, has the problem of formation of kinks. As one proposal for solving this problem, there has been proposed a hose using a thermoplastic elastomer composition comprising a polyolefin based thermoplastic resin, polyvinyl chloride based thermoplastic resin, polyamide based thermoplastic resin, polyester based thermoplastic resin, or other thermoplastic resin in which an at least partially cross-linked vulcanized rubber phase, is dispersed (for example, see Japanese Unexamined Patent Publication (Kokai) No. 6-64102).

Among these thermoplastic elastomer compositions, a thermoplastic elastomer composition composed of a polyolefin thermoplastic resin and an at least partially cross-linked elastomer component blended therein, is high in flexibility and suitable as a material for the inner tube and outer cover of the hose. However, there has not yet been developed an adhesive exhibiting excellent bondability to both a fiber reinforcing layer composed of a polyester, nylon, rayon, or other fiber and a thermoplastic elastomer composition composed of a polyolefin thermoplastic resin and an at least partially cross-linked elastomer component blended therein.

For example, as methods for improving the adhesiveness of the main component of the thermoplastic elastomer composition, that is, the polyolefin thermoplastic resin, there are known corona discharge, UV irradiation, flame treatment, strong acid treatment, and other surface activation methods. With these methods, however, not only is it difficult to secure the level of bonding required for hoses and other durable products composed of a thermoplastic elastomer composition, but also the process of application to a manufacturing line of a hose is extremely complicated and very high in cost, and therefore, is not practical.

Further, elastomer compositions are used as various sealing agents, rubber hoses, and other industrial products and also for other rubber products. In particular, epoxy group-containing acrylate copolymer rubbers containing (meth) acrylic acid esters etc. are elastomer compositions known to be superior in oil resistance and aging resistance and, when cross-linked, cold resistance or strength properties as well. There is the problem, however, that a sufficient elongation and compression set resistance cannot be obtained with a conventional cross-linking agent (polyfunctional carboxylic acid).

On the other hand, in recent years, thermoplastic elastomer compositions provided with both the advantages of a rubber and thermoplastic resin have been developed using the dynamic vulcanization (dynamic cross-linking) of rubber, but when selecting an acrylate copolymer as the rubber component, in particular when using an epoxy group as the cross-linking site of the acrylate copolymer so as to obtain an elastomer composition not including an amine component, since an amine component would promote the deterioration of the polyester, there is the problem that a sufficient elongation and compression set resistance cannot be obtained. For example Japanese Unexamined Patent Publication (Kokai) No. 1-92251 discloses a rubber composition composed of an ethylene copolymer rubber and acrylic rubber offering a balance of cold resistance, oil resistance, resistance to aging by heat, and strength properties. Further, Japanese Unexamined Patent Publication (Kokai) No. 5-25347 discloses a high stress resistant thermoplastic elastomer composition composed of a thermoplastic copolyester or copolyamide elastomer and epoxy-containing (meth)acrylate copolymer rubber which is flexible and gives a superior heat resistance and compression set resistance.

Further, Y. Tsukahara et al, International Rubber Conference Full Texts, p. 74 (1995) and Japanese Unexamined Patent Publication (Kokai) No. 7-304902 disclose a natural rubber composition as an environmentally friendly elastomer material composed of epoxylated natural rubber and terminal carboxylated polycaprolactone which is excellent in fluidity and is superior in the elastic modulus of the rubber, elongation, and oil resistance.

As explained above, these various elastomer compositions and thermoplastic elastomer compositions have superior performance, but have the problem that a practically sufficient elongation and compression set resistance cannot be obtained.

The present inventors previously proposed a hose having at least an inner tube, reinforcing layer, and outer cover, where the inner tube is a thermoplastic elastomer composition having a structure of a matrix of a thermoplastic copolyester elastomer and vulcanized rubber particles of an acrylic rubber having an acryl group and epoxy group dispersed therein and containing 30 to 90% by weight of the thermoplastic copolyester elastomer component and 70 to 10% by weight of the vulcanized rubber component of the acrylic rubber, the reinforcing layer is composed of a polyester fiber etc., the outer cover is a thermoplastic elastomer having a structure of a matrix of a thermoplastic copolyester elastomer and vulcanized rubber particles of an acrylic rubber having an acryl group and epoxy group dispersed therein and containing 30 to 90% by weight of the thermoplastic copolyester elastomer component and 70 to 10% by weight of the vulcanized rubber of the acrylic rubber component, and an adhesive is disposed at least between the reinforcing layer and the outer cover (Japanese Patent Application No. 8-23903). That is, they proposed a hose wherein, by selection of the material of the inner tube and outer cover of the hose, it was possible to improve the hose flexibility at ordinary temperature and low temperature, oil resistance, and cold resistance and further reduce the production costs by making it possible to produce it, without requiring a vulcanization step.

In this hose, however, a urethane ordinary temperature-curing type adhesive etc. are used as the bonding layer. Since the adhesive was a reactive type, heat curing occurred due to the heat during use, and therefore, the bonding layer became hard and in turn the filaments of the fibers of the reinforcing layer broke causing the reinforcing layer to break and the durability to fall. Even if using a polyester type hot melt adhesive resin in place of this, the adhesive resin detracts from the thermoplasticity and is poor in heat softening resistance, and therefore, a hose which is satisfactory in durability (high temperature impact pressure test: 120° C., 27.5 MPa) cannot be obtained.

In the past, hoses composed of an inner tube, reinforcing layer, and outer cover with an inner tube and outer cover made out of a thermoplastic resin composition, thermoplastic elastomer composition, or other thermoplastic material have been capable of reducing production costs since they do not require a vulcanization step. These hoses have, therefore, come into wide use. In these conventional hoses, the bonding between the inner tube and the reinforcing layer and the bonding between reinforcing layers have been performed using moisture curing type urethane adhesives and other ordinary temperature-curing type adhesives or using copolyester resin or olefin resin or other hot melt type adhesive resins and heating after the formation of the inner tube, reinforcing layer, and outer cover so as to melt the adhesive resin and cause bonding. Further, hoses which use a high rigidity thermoplastic resin for at least one of the inner tube and outer cover, whereby do not require bonding of the inner tube and reinforcing layer or bonding between the reinforcing layers are being used.

However, with a hose using an ordinary temperature-curing type adhesive, since the adhesive is a reactive type, it cures with heat during use. The bonding layer becomes hard and, when the hose is subjected to repeated bending or pressure changes, the hardening of the bonding layer causes the fibers of the reinforcing layer to break and causes a problem in the durability of the hose. Further, if a hot melt type adhesive resin is used, due to the limitations in the order of formation of the layers, with ordinary processes of production, there is no bond between the bonding layer and the layer above it, and therefore it is necessary to heat the bonding layer to cause it to bond with the layer above it. Since this means heating from the outside of the hose after the formation of the outer cover until the adhesive resin melts, an excessive amount of heat is given to the hose. This causes dimensional changes in the hose or uneven tension to the fibers of the reinforcing layer, whereby the uniformity of the hose is impaired and sufficient durability is made impossible. Further, in recent years, there have been strong demands for making hoses more flexible for the purpose of hose attachment, but a hose using a low rigidity (or flexible) thermoplastic material for the inner tube and not having the layers bonded to each other has problems in terms of its durability, and therefore, large problems in use. Further, in the case of an ordinary temperature-curing type adhesive, an organic solvent is used, and therefore, there are problems in terms of the environment. In the case of a hot melt type adhesive, there are problems in the productivity due to the heat treatment step after the formation of the outer cover.

In the past, further, a high pressure hose has, for example, been composed of an inner tube having a thermoplastic resin material for at least the outer circumference of the inner tube, at least one reinforcing layer composed of reinforcing yarn braided around the outer circumference of the inner tube, and an outer cover covering the surface of the same. In such a hose, however, the bondability between the inner tube having a thermoplastic resin material for at least the outer circumference of the inner tube and the reinforcing yarn braided around the outer circumference of the inner tube and the bondability between two or more reinforcing layers has a major influence on the flexibility and durability of the hose. If the bondability is poor, the inner tube and the reinforcing yarn will separate or the reinforcing layers will separate—adversely influencing the performance of the hose. In the past, the reinforcing yarn was braided around the outer circumference of the inner tube composed of the thermoplastic resin material or, further, when there were two or more reinforcing layers, a solvent based adhesive was used, the reinforcing yarn braided around the outer circumference of the inner tube, and the reinforcing layers bonded. There were also cases of use of means other than solvent type adhesives such as the use of infrared rays, far infrared rays, near infrared rays, ultrasonic waves, high frequency heating, electrical induction heating, etc. to heat an inner tube composed of a thermoplastic resin material or an adhesive resin layer composed of a thermoplastic resin material arranged between two or more reinforcing layers after the formation of the hose by an oven or other heating apparatus from the outer surface of the outer cover so as to bond the inner tube and the reinforcing yarn or the reinforcing layers. When a solvent type adhesive is used, however, there tend to be problems in safety and health or problems of pollution due to the evaporation of the solvent, one or two days are required for the aging for achieving a practical strength, and it was difficult to improve the productivity. Further, in the case of the latter method of using a heating apparatus, the component parts have been subjected to aggravated dimensional changes, aging, etc. and therefore, the effect on the quality has been high (heating of just the surface of the target object has been impossible), there have been limitations as to the installation space, the equipment has been high in price and large in size, and there have been other problems. Therefore, it is clear that there have been many problems in the method of bonding the above conventional inner tube and the reinforcing yarn or the bonding between reinforcing layers.

DISCLOSURE OF INVENTION

Accordingly, an object of the present invention is to provide a thermoplastic elastomer composition which, when used for the inner tube and/or outer cover of a hose, enables the improvement of the hose flexibility at an ordinary temperature and low temperature, oil resistance, and cold resistance and enables reduction of the production costs since no vulcanization step is required and a hose using this composition for the inner tube and/or outer cover and having the above properties.

Another object of the present invention is to provide a thermoplastic elastomer composition having a stable mixability and high elongation at break and a hose using the same.

A further object of the present invention is to provide a thermoplastic elastomer composition which has a larger elongation and smaller compression set compared with a conventional elastomer composition or thermoplastic elastomer composition and simultaneously achieves a flexibility and breakage resistance enabling use for the inner tube or outer cover of a high pressure hose such as an oil pressure hose.

A further object of the present invention is to provide a thermoplastic elastomer composition which reduces the abrasion coefficient of the hose outer cover, gives a superior abrasion resistance of the hose surface, is superior in heat softening resistance, flexibility, etc. and is suitable for use as a high pressure plastic hose, a process for producing the thermoplastic elastomer composition, and a hose using the same as the outer cover.

A further object of the present invention is to provide an olefin thermoplastic elastomer composition which has excellent bondability with a polyester fiber and is superior in the heat resistance, a laminate of the same, and a hose using the same.

A further object of the present invention is to provide a process for producing a hose which is superior in durability, is flexible, is low in production costs, and is environmentally problem free and to provide a braider for a hose which enables reliable bonding of the inner tube and reinforcing yarn or reinforcing layers, without the use of a solvent type adhesive or high cost facilities, enables efficient production, and enables improvement of the productivity of a hose with flexibility and a high durability.

In accordance with the first aspect of the present invention, there are provided a thermoplastic elastomer composition comprising (i) 30 to 90% by weight of at least one thermoplastic copolyester elastomer and (ii) 10 to 70% by weight of a rubber component comprising at least one acrylic rubber having an acryl group and an epoxy group, provided that the total weight of the components (i) and (ii) are 100% by weight and a hose using the same as an inner tube and/or outer cover.

In accordance with the first aspect of the present invention, there is also provided a thermoplastic elastomer composition comprising a matrix of at least one thermoplastic copolyester elastomer and vulcanizing rubber particles of at least one acrylic rubber having an acryl group and an epoxy group dispersed in the matrix wherein the viscosity $\eta_1$ and volume fraction $\phi_1$ at the processing temperature (or mixing temperature) of melt mixing of the thermoplastic copolyester elastomer and the viscosity $\eta_2$ and volume fraction $\phi_2$ at the time of melt mixing of the acrylic rubber in the unvulcanized state in the absence of a vulcanization agent at the range of a temperature of 180 to 350° C. and a shear rate of 1000 to 8000 s$^{-1}$ satisfy the following formulas.

$0.25 \leq \phi_1 \leq 0.90$ $0.10 \leq \phi_2 \leq 0.75$ $\phi_1 + \phi_2 \leq 1.0$ $\eta_2/\eta_1 < 4.0$ $(\eta_1/\eta_2)(\phi_2/\phi_1) < 1.0$ and a hose using the same for the inner tube and/or outer cover.

In accordance with the second aspect of the present invention, there is provided a thermoplastic elastomer composition comprising at least one acrylic rubber having an acryl group and an epoxy group and a polycaprolactone having a carboxyl group at the end thereof in an amount of 5 to 30 parts by weight based upon 100 parts by weight of the copolymer rubber (phr).

In accordance with the second aspect of the present invention, there is also provided a thermoplastic elastomer composition comprising (i) 30 to 90% by weight of a thermoplastic resin component composed of at least one thermoplastic copolyester elastomer, (ii) 10 to 70% by weight of a rubber component comprised of at least one acrylic rubber having at least one type of acrylic group and epoxy group, and (iii) 5 to 30 parts by weight, based upon 100 parts by weight of the rubber component, of a polycaprolactone having a carboxyl group at the end thereof as a cross-linking agent wherein the rubber component forms a dispersed phase and the thermoplastic resin component forms a continuous phase.

In accordance with the third aspect of the present invention, there is provided a thermoplastic elastomer composition comprising a thermoplastic elastomer composition composed of at least (i) a polyester thermoplastic resin and (ii) a vulcanized rubber composition of an acrylic rubber having an acryl group and an epoxy group dispersed therein wherein (iii) an epoxy-modified olefin polymer having of the following formula (I):

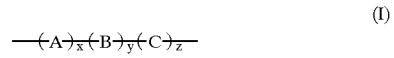
(I)

wherein, A represents an acrylate unit, B represents an epoxy group unit, and C represents an olefin unit, x, y, and z are the molar percentages in the epoxy-modified olefin polymer, provided that x+y+z is 1, the acrylate unit A(x), epoxy group unit B(y), and olefin unit C(z) being essential components and the epoxy group unit B being contained in a molar percentage y of 0.005 to 0.200, and the component (i) being 90 to 30 parts by weight and the component (iii) being 1 to 25 parts by weight when the total weight of the components (i) and (ii) is 100 parts by weight.

In accordance with the third aspect of the present invention, there is also provided a hose having at least an inner tube, reinforcing layer, and outer cover wherein the above thermoplastic elastomer composition is used for at least one of the inner tube and outer cover.

In accordance with the fourth aspect of the present invention, there is provided a thermoplastic elastomer composition superior in abrasion resistance comprising (i) a rubber composition of (A) at least one silicone selected from the group consisting of organosiloxanes and their modified forms, (B) a copolyester thermoplastic resin, (C) an acrylic rubber, and (D) a vulcanizing agent for the rubber composition, wherein vulcanized rubber particles of the rubber composition are finely dispersed in the thermoplastic resin.

In accordance with the fourth aspect of the present invention, there is also provided a process for producing a thermoplastic elastomer composition comprising the steps of, in the production of the thermoplastic elastomer composition;

blending the thermoplastic resin (B), the rubber composition (C), and the vulcanization agent (D) to produce a thermoplastic elastomer composition composed of all the components other than the silicone; then blending the silicone (A) therewith.

In accordance with the fourth aspect of the present invention, there is also provided a hose comprising at least an inner tube, reinforcing layer, and outer cover, wherein the thermoplastic elastomer composition is used for the outer cover.

In accordance with the fifth aspect of the present invention, there is provided a thermoplastic elastomer composition superior in bondability with an olefin thermoplastic resin, a polyester thermoplastic resin, and a polyester fiber containing the following components A, B, and C:

Component A: an olefin thermoplastic elastomer composition composed of an olefin thermoplastic resin (a), as a matrix, wherein particles of a vulcanized ethylene-propylene-diene copolymer (EPDM) rubber composition (b) is finely dispersed therein and containing 85 to 20% by weight of the olefin thermoplastic resin and 15 to 80% by weight of the vulcanized EPDM rubber composition Component B: a polyester copolymer resin Component C: an epoxy group-containing thermoplastic resin in a ratio of 90 to 50 parts by weight of the component A, 10 to 50 parts by weight of the component B, and 1 to 10 parts by weight of the component C, based upon 100 parts by weight of the total amount of the components A and B.

In the above thermoplastic elastomer composition, the epoxy group-containing thermoplastic resin preferably contains at least 60 to 95% by weight of a component from an ethylene monomer and 0.5 to 15% by weight of a component from glycidyl methacrylate.

In accordance with the fifth aspect of the present invention, there is also provided a laminate comprising at least the thermoplastic elastomer composition of the present invention and a polyester fiber bonded by melt bonding, in which laminate, the melt bonding of the thermoplastic elastomer composition of the present invention and the polyester fiber may also melt bonded through a polyester copolymer resin.

In accordance with the fifth aspect of the present invention, there are also provided a hose comprising at least an outer cover adjacent to a polyester fiber reinforcing layer wherein at least the innermost layer of the outer cover is formed from a thermoplastic elastomer composition of the present invention, a hose comprising at least a polyester fiber reinforcing layer bonded through a bonding layer to an outer cover wherein the bonding layer is a polyester copolymer resin and at least the innermost layer of the outer cover is formed from a thermoplastic elastomer composition of the present invention, and a hose comprising at least a polyester fiber reinforcing layer bonded through a bonding layer to an outer cover wherein the bonding layer is formed from a thermoplastic elastomer composition of the present invention and at least the innermost layer of the outer cover is formed from a thermoplastic elastomer composition composed of an olefin thermoplastic resin as a matrix and a vulcanized EPDM rubber composition as a domain.

In accordance with the sixth aspect of the present invention, there is provided a laminate superior in bonding formed by a layer of a thermoplastic elastomer composition composed of a polyolefin thermoplastic resin, in which an at least partially cross-linked elastomer component and a fiber reinforcing layer, between which at least one thermoplastic adhesive resin selected from the group consisting of a maleic anhydride-modified polyolefin resin, epoxy-modified polyolefin resin, and polyester resin is interposed, which are bonded together by hot melting, to a hose using the same.

In accordance with the seventh aspect of the present invention, there is provided a hose comprising at least an inner tube, reinforcing layer, and outer cover wherein the inner tube is a thermoplastic elastomer composition having a structure of, as a matrix, a thermoplastic copolyester elastomer in which is dispersed vulcanized rubber particles of an acrylic rubber having an acryl group and an epoxy group and containing 30 to 90% by weight of the thermoplastic copolyester elastomer component and 70 to 10% by weight of the vulcanized rubber component, of the acrylic rubber the reinforcing layer is composed of a polyester fiber, the outer cover is formed from a thermoplastic elastomer comprising, as a matrix, a thermoplastic copolyester elastomer in which vulcanized rubber particles of an acrylic rubber having an acryl group and an epoxy group is dispersed and containing 30 to 90% by weight of the thermoplastic copolyester elastomer component and 70 to 10% by weight of the vulcanized rubber component of acrylic rubber and a bonding layer is disposed between at least the reinforcing layer and outer cover, wherein the bonding layer is formed from a thermoplastic resin composition containing at least 50% by weight of a thermoplastic polyester copolymer resin where the dicarboxylic acid constituting the polyester is an aromatic dicarboxylic acid and the Young's modulus at 120° C. is at least 3.0 MPa.

In accordance with the preferred embodiments of the seventh aspect of the present invention, there are also provided a hose wherein the thermoplastic polyester based copolymer resin in the bonding layer has a melt viscosity, at a temperature of 230° C. and a shear rate of 50 to 200 s$^{-1}$, of not more than 1000 Pa·s and a hose wherein the thermoplastic polyester copolymer resin of the bonding layer is a thermoplastic block copolyester elastomer composed of recurring units of a polyester and polyether or recurring units of a polyester and polyimide ether and containing at least 40 mol % of recurring units of the polyester.

In accordance with the eighth aspect of the present invention, there is provided a process for producing a hose comprising an inner tube and outer cover composed of a thermoplastic material and one or more braided or spiral structure reinforcing layers composed of a fiber formed between the same, comprising the steps of forming the outer cover, heating the outer surface of the inner tube by a heating means to at least the softening temperature of the thermoplastic material to convert the outer surface of the inner tube to a molten state, whereby the bond between the inner tube and reinforcing layer is strengthened.

In accordance with the ninth aspect of the present invention, there is provided a braider for the manufacture of a hose comprising at least an inner tube and a reinforcing layer composed of a reinforcing yarn wherein at least the outer circumference of the inner tube is composed of a thermoplastic resin material, which braids a reinforcing yarn on the outer circumference of the inner tube, wherein a braiding die of the braider is provided with a heating means for continuously heating the surface layer of the inner tube in the step immediately before braiding the reinforcing yarn over the inner tube.

In accordance with the second embodiment of the ninth aspect of the present invention, there is provided a braider for the manufacture of a hose comprising at least an inner tube and at least two reinforcing layers composed of a reinforcing yarn and having an adhesive resin layer composed of a thermoplastic resin material between the reinforcing layers, which braids a reinforcing yarn on the outer circumference of the inner tube, wherein a braiding die of the braider is provided with a heating means for continuously heating the surface layer of the adhesive resin layer in the step immediately before the braiding of the reinforcing yarn over the adhesive resin layer.

BRIEF DESCRIPTION OF THE DRAWINGS

The present invention will be explained in further detail below with reference to the drawings.

BEST MODE FOR CARRYING OUT THE INVENTION

Figure 1:
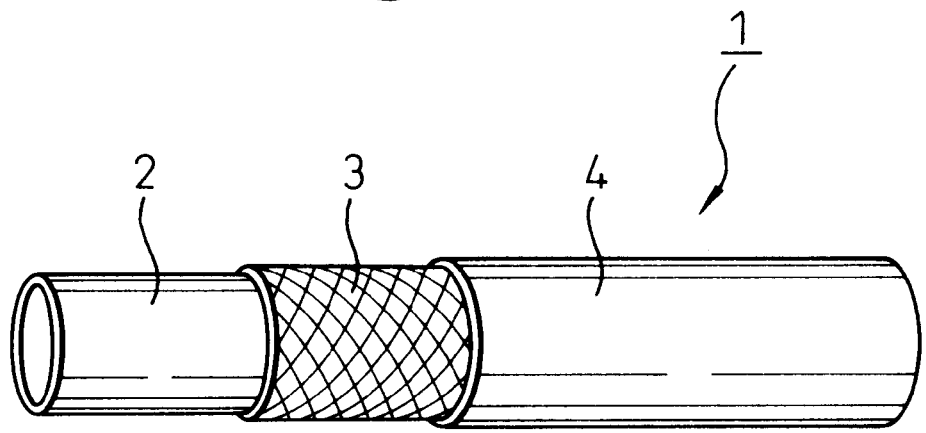
FIG. 1 is a schematic view of the structure of the layer of the hose according to the present invention.

The thermoplastic elastomer composition constituting the-inner tube and outer cover of the hose according to the first embodiment of the present invention means one which comprises a blend of a sufficient amount of a thermoplastic copolyester elastomer to give thermoplasticity to the hose and a sufficient amount of an at least partially vulcanized acrylic rubber to give rubbery elasticity wherein the thermoplastic copolyester elastomer component at least partially forms a continuous phase (matrix phase) in which the at least partially vulcanized acrylic rubber is present in the rubber component as a discontinuous phase (dispersed phase). A thermoplastic resin may further be dispersed in the discontinuous phase (rubber phase) to form a so-called "salami" structure.

The thermoplastic copolyester elastomer, which is the first component of the thermoplastic elastomer composition according to the present invention, is known as a multiple block copolymer having a polyester and a polyether as main recurring units. In the present invention, such known thermoplastic copolyester elastomers are used. As typical examples of such thermoplastic copolyester elastomers, for example, the following may be mentioned.

The thermoplastic copolyester elastomers usable in the present invention are a random and multiple block copolyester composed of recurring units of a polyester and polyether, recurring units of a polyester, (poly)lactone, and polyether, or recurring units of a polyester and polyimide ether and include a copolyether ester elastomer, (poly) lactone-modified copolyether ester elastomer, and copolyether imide ester elastomer.

A suitable thermoplastic copolyether ester elastomer and (poly)lactone-modified copolyether ester elastomer is produced by the conventionally employed esterification/condensation polymerization method from (i) at least one diol, (ii) at least one dicarboxylic acid, (iii) at least one long chain ether glycol and, if necessary, (iv) at least one lactone or polylactone.

The diol (i) usable in the production of the copolyether ester elastomers and their (poly)lactone-modified forms include saturated and unsaturated aliphatic and alicyclic dihydroxy compounds and aromatic dihydroxy compounds. These diols preferably have low molecular weights, that is, molecular weights of approximately 300 or less. As specific examples of the aliphatic and alicyclic diols, ethylene glycol, propanediol, butanediol, pentanediol, 2-methylpropanediol, 2,2-dimethylpropanediol, hexanediol, decanediol, 2-octylundecanediol, 1,2-, 1,3-, and 1,4-dihydroxycyclohexane, 1,2-, 1,3-, and 1,4-cyclohexanedimethanol, butynediol, hexenediol, and other diols having 2 to 15 carbon atoms may be mentioned. Particularly preferable diols are 1,4-butanediol and a mixture of 1,4-butanediol and hexanediol or butynediol. As specific examples of the aromatic diol, resorcinol, hydroquinone, 1,5-dihydroxynaphthalene, 4,4'-dihydroxydiphenyl, bis(p-hydroxyphenyl)methane, 2,2-bis (p-hydroxyphenyl)propane, and other diols having 6 to 19 carbon atoms may be mentioned.

Particularly suitable diols are saturated aliphatic diols having 2 to 8 carbon atoms, mixtures of such saturated aliphatic diols, and mixtures of such saturated aliphatic diols with unsaturated diols. When using two or more types of diols, at least approximately 60 mol %, in particular at least 80 mol %, based on the total amount of the diols, is preferably composed of the same diol. The most preferred diol mixture is composed over half by 1,4-butanediol.

The dicarboxylic acid (ii) preferably usable for the production of the copolyether ester elastomers and their (poly) lactone-modified forms includes aliphatic, alicyclic, and/or aromatic dicarboxylic acids. These dicarboxylic acids are preferably those having a low molecular weight, that is, a molecular weight of approximately 350 or less, but those having a high molecular weight, in particular, dimer acids, can also be used.

Typical examples of the aliphatic and alicyclic dicarboxylic acids are sebacic acid, 1,2-cyclohexane dicarboxylic acid, 1,3-cyclohexane dicarboxylic acid, 1,4-cyclohexane dicarboxylic acid, adipic acid, glutaric acid, succinic acid, oxalic acid, azelaic acid, diethyl malonic acid, allyl malonic acid, 4-cyclohexene-1,2-dicarboxylic acid, 2-ethyl suberic acid, tetramethyl succinic acid, cyclopentane dicarboxylic acid, decahydro-1,5-naphthalene dicarboxylic acid, 4,4'-bicyclohexyl dicarboxylic acid, decahydro-2,6-naphthalene dicarboxylic acid, 4,4-methylenebis(cyclohexane-dicarboxylic acid), 3,4-furan dicarboxylic acid, 1,1-cyclobutane dicarboxylic acid, and their dimer acids. Among these, cyclohexane dicarboxylic acid, sebacic acid, glutaric acid, and adipic acid are preferable.

Typical examples of the aromatic dicarboxylic acids, are terephthalic acid, phthalic acid, isophthalic acid, bis-benzoic acid, for example bis(p-carboxyphenyl) methane, oxybis (benzoic acid), ethylene-1,2-bis(p-oxybenzoic acid), and other substituted dicarboxyl compounds having two benzene nucleii, 1,5-naphthalene dicarboxylic acid, 2,6-naphthalene dicarboxylic acid, 2,7-naphthalene dicarboxylic acid, phenanthrene dicarboxylic acid, anthracene dicarboxylic acid, 4,4'-sulfonyl dibenzoic acid, and their halo and $C_1$ to $C_{12}$ alkyl, alkoxy, and aryl substituent derivatives are included. Note that in so far as the object of the present invention is not impaired, other aromatic dicarboxylic acids in addition to these aromatic dicarboxylic acids, for example, p-(β-hydroxyethoxy) benzoic acid and other hydroxyl acids may be used together.

Among the dicarboxylic acids which may be used for the production of the thermoplastic copolyether ester elastomers and their (poly)lactone-modified forms, an aromatic dicarboxylic acid, a mixture of two or more types of aromatic dicarboxylic acids, and a mixture of an aromatic dicarboxylic acid and an aliphatic and/or alicyclic dicarboxylic acid are preferable. An aromatic dicarboxylic acid alone is particularly preferable. Among these aromatic dicarboxylic acids, an aromatic dicarboxylic acid having 8 to 16 carbon atoms, in particular, a benzene dicarboxylic acid such as phthalic acid, terephthalic acid, and isophthalic acid and their dimethyl esters are suitable. Dimethyl terephthalate is best. When using a mixture of dicarboxylic acids or their esters, at least approximately 60 mol %, in particular at least approximately 80 mol %, of the total amount of the dicarboxylic acid is preferably the same dicarboxylic acid. In particular, those in which dimethyl terephthalate comprises at least approximately 60 mol % of the dicarboxylic acid mixture are preferred.

The long chain ether glycol (iii) used for the production of the thermoplastic copolyether ester elastomers and their (poly)lactone-modified forms is preferably a poly (oxyalkylene) glycol and copoly(oxyalkylene) glycol having a molecular weight of approximately 400 to approximately 12,000. A suitable poly(oxyalkylene) unit has a molecular weight of approximately 900 to approximately 4,000 and is derived from a long chain ether glycol having a ratio of carbon to oxygen, except at its side chain, of approximately 1.8 to approximately 4.3.

As typical examples of a suitable poly(oxyalkylene) glycol, poly(ethylene ether)glycol, poly(propylene ether) glycol, poly(tetramethylene ether)glycol, ethyleneoxide terminated poly(propylene ether)glycol, a random or block copolymer of ethylene oxide and propylene oxide including a mostly poly(ethyleneether) chain structure copoly (propylene ether-ethylene ether)glycol, and a random or block copolymer of tetrahydrofuran and a small amount of, for example, a second monomer such as ethylene oxide, propylene oxide, or methyltetrahydrofuran (used in a ratio so that the ratio of carbon to oxygen does not exceed approximately 4.3) may be mentioned. A polyformal glycol produced by a reaction of formaldehyde with for example 1,4-butanediol, 1,5-pentanediol, or another diol is also useful. Particularly preferable poly(oxyalkylene)glycols are poly(propylene ether)glycol, poly(tetramethylene ether) glycol, and a mostly poly(ethylene ether) chain structure copoly(propylene ether-ethylene ether)glycol.

If necessary, one or more types of lactones or polylactones (iv) may be blended in these copolyether esters. This type of polylactone-modified copolyether ester elastomer is disclosed in the specification of U.S. Pat. No. 4,569,973.

As a suitable lactone (iv) used in the present invention, ε-caprolactone is particularly preferable, but a substituted lactone substituted with a methyl group or ethyl group or lower alkyl group at the α, β, γ, δ, or ε position may also be used. Further, as the block unit of the copolyether ester used in the present invention, a homopolymer or a copolymer of a monomer and another copolymerizable monomer and polylactone including a hydroxy terminated polylactone can be used.

In general, a suitable copolyether ester elastomer and its (poly)lactone-modified form is one in which the amount of the long chain ether glycol component (iii) or (poly)lactone-modified form or the total amount of the (iii) long chain ether glycol component and (iv) lactone component in the copolyether ester is approximately 5 to approximately 80% by weight. A more preferable composition is one in which the amount of the (iii) long chain ether glycol component or the total amount of the (iii) component and (iv) lactone component is approximately 10 to approximately 50% by weight.

As the copolyether ester elastomer and its (poly)lactone-modified form, a copolyether ester elastomer in which the dicarboxylic acid component is terephthalic acid, the diol component is 1,4-butanediol, and the long chain ether glycol is poly(tetramethylene ether)glycol may be suitably mentioned.

The polyether imide ester elastomer used in the present invention may be produced from one or more types of diols, one or more types of dicarboxylic acids, and one or more types of high molecular weight polyoxyalkylenediimide diacids. The production of the polyether imide ester elastomer is described in U.S. Pat. No. 4,556,705.

The polyether imide ester elastomer usable in the present invention may be produced by a method commonly used for the production of a polyester, for example a technique of esterification and condensation polymerization, to produce a random or block copolymer. Therefore, a polyether imide ester can be characterized as a reaction product of a diol and acid.

A preferable polyether imide ester elastomer used in the present invention may be produced from (i) one or more types of $C_2$ to $C_{15}$ aliphatic or alicyclic diols, (ii) one or more types of aliphatic, alicyclic, or aromatic dicarboxylic acids or their ester derivatives, and (iii) one or more types of polyoxyalkylenediimide diacids. The amount of the polyoxyalkylenediimide diacid used is in general governed by the desired properties of the polyether imide ester. In general, the weight ratio of the dicarboxylic acid (ii) to the polyoxyalkylenediimide diacid (iii) is approximately 0.25 to approximately 2.0, preferably approximately 0.4 to approximately 1.4.

The diol (i) usable in the production of the polyether imide ester includes saturated and unsaturated aliphatic and alicyclic dihydroxy compounds and aromatic dihydroxy compounds. These diols preferably have low molecular weights, that is, molecular weights of approximately 250 or less.

Particularly preferable diols are saturated aliphatic diols, their mixtures, and mixtures of one or more types of saturated aliphatic diols with one or more types of unsaturated aliphatic diols provided that the diols each has 2 to 8 carbon atoms. When using two or more types of diols, at least approximately 60 mol %, more preferably at least 80 mol %, of the total amount of the diols is preferably the same diol. A particularly preferable diol is one comprising 1,4-butanediol as a main component. The most preferable diol is 1,4-butanediol alone.

The dicarboxylic acid (ii) usable for the production of the above polyether imide ester is selected from aliphatic and aromatic dicarboxylic acids and their ester derivatives. A preferable dicarboxylic acid is one having a molecular weight of lower than approximately 300 or one with 4 to 18 carbon atoms. However, a higher molecular weight dicarboxylic acid, in particular a dimer acid, also can be used.

Among the aliphatic, alicyclic, and aromatic dicarboxylic acids usable in the production of the polyether imide ester, an aromatic dicarboxylic acid, a mixture of two or more types of aromatic dicarboxylic acids, and a mixture of an aromatic dicarboxylic acid and an aliphatic and/or alicyclic dicarboxylic acid are preferable. An aromatic dicarboxylic acid alone is particularly preferable. Among these aromatic dicarboxylic acids, an aromatic dicarboxylic acid having 8 to 16 carbon atoms, in particular, a benzene dicarboxylic acid such as phthalic acid, terephthalic acid, and isophthalic acid and their dimethyl esters are suitable. Dimethyl terephthalate is best.

The polyoxyalkylenediimide diacid (iii) usable for the production of the above polyether imide ester is a high molecular weight diacid having an average molecular weight larger than approximately 700, preferably larger than approximately 900. The diacid is produced by imidization of one or more types of tricarboxylic acid compounds including two adjacent carboxyl groups or acid anhydride groups and further a separate carboxyl group (this separate carboxyl group must not be esterizable and preferably is not imidizable) by a high molecular weight polyoxyalkylenediamine.

The acrylic rubber usable as the rubber component in the thermoplastic elastomer composition of the present invention is a cross-linkable rubber having an acryl group and epoxy group as a main chain or side chain in its molecule. For example, a copolymer rubber including an epoxy group-containing acrylate and/or methacrylate as copolymerization components may be mentioned. The epoxy group-containing (meth)acrylate copolymer or the epoxy group-containing (meth)acrylate copolymer rubber used in the present invention is a multiple component copolymer rubber comprised by copolymerization of a (1) (meth)acrylic acid alkylester and/or (meth)acrylic acid alkoxy substituted alkylester, (2) epoxy group-containing monomer, and, in accordance with need, (3) other ethylenic unsaturated monomers able to copolymerize with (1) and (2).

The (meth)acrylic acid alkylester (1) used for the production of an epoxy group-containing (meth)acrylate copolymer rubber has the following formula:

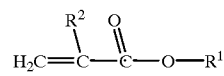

wherein, $R^1$ is a $C_1$ to $C_{18}$ alkyl group, and $R^2$ is hydrogen or a methyl group.

As specific examples of this (meth)acrylic acid alkylester, methyl (meth)acrylate, ethyl (meth)acrylate, n-propyl (meth)acrylate, n-butyl (meth)acrylate, isobutyl (meth)acrylate, n-pentyl (meth)acrylate, isoamyl (meth)acrylate, n-hexyl (meth)acrylate, 2-methylpentyl (meth)acrylate, n-octyl (meth)acrylate, 2-ethylhexyl (meth)acrylate, n-decyl (meth)acrylate, n-dodecyl (meth)acrylate, n-octadecyl (meth)acrylate, etc. may be mentioned. Among these, ethyl (meth)acrylate, n-propyl (meth)acrylate, n-butyl (meth)acrylate, n-pentyl (meth)acrylate, n-hexyl (meth)acrylate, 2-ethylhexyl (meth)acrylate, and n-octyl (meth)acrylate are preferable.

Further, the (meth)acrylic acid alkoxy substituted alkylester (1) has the following formula:

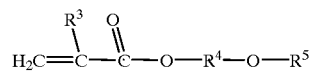

wherein, $R^3$ indicates hydrogen or a methyl group, $R^4$ indicates an alkylene group of 1 to 18 carbon atoms, and $R^5$ indicates an alky group having 1 to 18 carbon atoms. As specific examples of the (meth)acrylic acid alkyl ester, 2-methoxyethyl (meth)acrylate, 2-ethoxyethyl (meth)acrylate, 2-(n-propoxy)ethyl (meth)acrylate, 2-(n-butoxy)ethyl (meth)acrylate, 3-methoxypropyl (meth)acrylate, 3-ethoxypropyl (meth)acrylate, 2-(n-propoxy)propyl (meth)acrylate, and 2-(n-butoxy)propyl (meth)acrylate may be mentioned.

As the epoxy group-containing monomer used for the production of the epoxy group-containing (meth)acrylate copolymer rubber, allyl glycidylether, glycidyl methacrylate, glycidyl acrylate, and the compounds shown below may may be mentioned. In the following formulas, $R^6$ in the formulas indicate hydrogen or a methyl group.

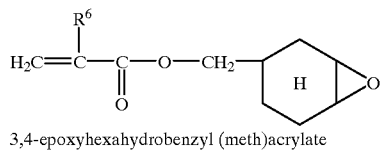
3,4-epoxyhexahydrobenzyl (meth)acrylate

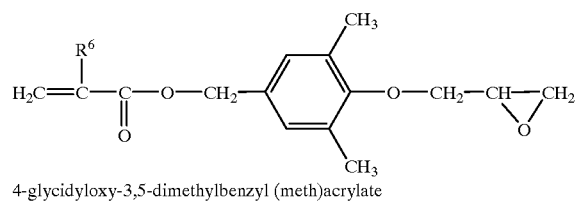
4-glycidyloxy-3,5-dimethylbenzyl (meth)acrylate

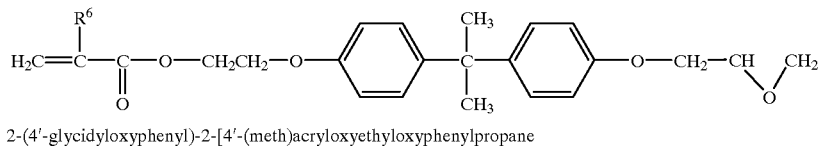
2-(4'-glycidyloxyphenyl)-2-[4'-(meth)acryloxyethyloxyphenylpropane

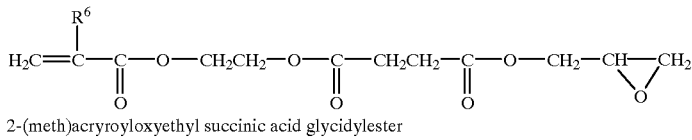
2-(meth)acryoyloxyethyl succinic acid glycidylester

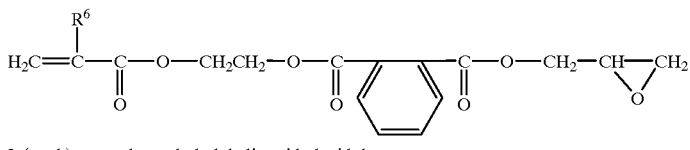
2-(meth)acryoyloxyethyl phthalic acid glycidylester

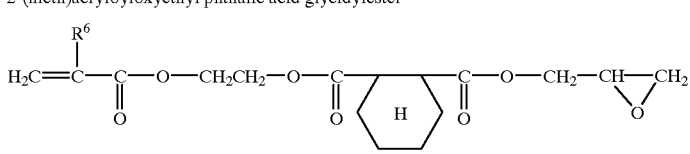
2-(meth)acryoyloxyethyl hexahydrophthalic acid glycidylester

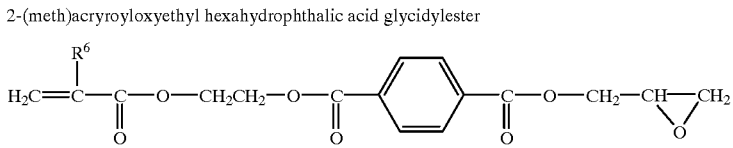
2-(meth)acryoyloxyethyl terephthalic acid glycidylester

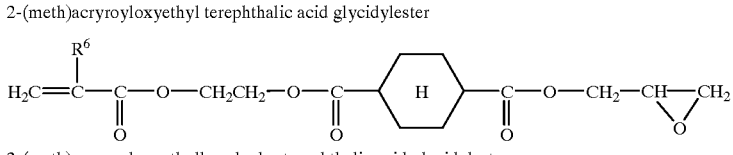
2-(meth)acryoyloxyethylhexahydro terephthalic acid glycidylester

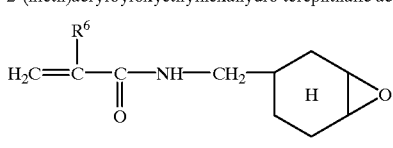
3,4-epoxyhexahydrobenzyl(meth)acrylamide

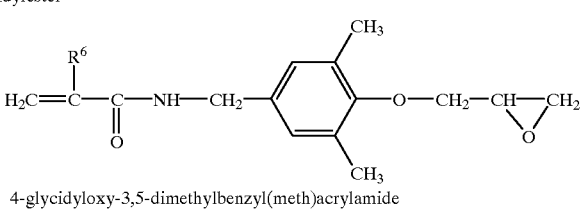
4-glycidyloxy-3,5-dimethylbenzyl(meth)acrylamide

As the monomer which may be optionally copolymerized with the (meth)acrylic acid alkylester or (meth)acrylic acid alkoxy substituted alkylester (1) and epoxy group-containing monomer, 2-cyanoethyl (meth)acrylate, 3-cyanopropyl (meth)acrylate, 4-cyanobutyl (meth)acrylate, and other cyano substituted alkyl (meth)acrylates, diethylaminoethyl (meth)acrylate and other amino substituted alkyl (meth)acrylates, 1,1,1-trifluoroethyl (meth)acrylate and other fluorine-containing based (meth)acrylates, hydroxyethyl (meth)acrylate and other hydroxyl group substituted alkyl (meth)acrylates, methylvinylketone and other alkylvinylketones, vinylethyl ether, allylmethyl ether, or other vinyl or ally ethers, styrene, α-methylstyrene, chlorostyrene, vinyltoluene, or other vinyl aromatic compounds, acrylonitrile, methacrylonitrile, and other vinylnitriles, acrylamide, methacrylamide, N-methylolacrylamide, and other vinylamides and ethylene, propylene, vinyl acetate, or the like may be mentioned. The acrylic rubber used in the present invention is preferably an acrylic rubber comprised of an acrylic acid and a $C_3$ to $C_{18}$ alkylester as an alkyl component, for example, includes butyl acrylate, propyl acrylate, dodecyl acrylate, or hexadecyl acrylate in an amount of at least 25% by weight, more preferably 30 to 60% by weight.

As the specific configuration of the rubber having the acryl group and epoxy group (i.e., acrylic rubber), from the perspective of the heat resistance, a copolymer rubber comprising ethyl acrylate alone as the alkyl (meth)acrylate or alkoxy-alkyl (meth)acrylate (1) and glycidyl methacrylate as the epoxy group-containing monomer and, from the perspective of the cold resistance, a copolymer rubber comprised of ethyl acrylate, butyl acrylate and methoxyethyl acrylate as the alkyl (meth)acrylate or alkoxy-alkyl (meth) acrylate (1) and glycidyl methacrylate as the epoxy group-containing monomer may be suitably mentioned. Further, the types and amounts of the alkyl (meth)acrylate or alkoxy-alkyl (meth)acrylate (1) may be selected for a balance of the heat resistance andcold resistance. Further, the epoxy group-containing monomer component is usually contained in an amount of 1 to 20% by weight, preferably, 1.5 to 15% by weight, more preferably, 2 to 10% by weight since the epoxy group is used in the cross-linking reaction in the cross-linking of the copolymer rubber, but is suitably used in the vulcanization reaction performed dynamically during the mixing mentioned later.

The thermoplastic elastomer composition according to the first embodiment of the present invention comprises a blend of the component (i), that is, thermoplastic copolyester elastomer, and the component (ii), that is, the acrylic rubber, in a ratio of the component (i) to the component (ii) of 30 to 90% by weight: 70 to 10% by weight (total 100% by weight), preferably a ratio of the component (i) and component (ii) of 30 to 80% by weight: 70 to 20% by weight. If the amount of the component (i) blended in is too large, the flexibility is impaired, while if too small, the mechanical strength is lowered and the rubber phase becomes the matrix phase and the fluidity during extrusion etc. is impaired.

The thermoplastic elastomer composition according to the first embodiment of the present invention preferable contains as a third component a cross-linking agent compound having at least two of at least one of a carboxyl group and carboxylic anhydride group in its molecule as a carboxyl group. As typical examples of such a cross-linking agent compound, for example, the following compounds may be mentioned.

The cross-linking agent of the present invention is not particularly limited so long as it contains at least two carboxyl groups and/or at least one carboxylic anhydride group in its molecule. Preferably, an aliphatic, alicyclic, and aromatic polycarboxylic acid, its (partial)carboxylic acid anhydride, and (partial)esterified forms of these compounds and their (poly)alkylene glycols may be used. As the cross-linking agent, one having a molecular weight of not more than 5,000 is preferable.

As specific examples of the aliphatic polycarboxylic acid, succinic acid, glutaric acid, pimelic acid, azelaic acid, sebacic acid, dodecane dicarboxylic acid, octadecane dicarboxylic acid, dodecenyl succinic acid, and butane tetracarboxylic acid may be mentioned. As specific examples of the alicyclic polycarboxylic acid, cyclopentane dicarboxylic acid, cyclopentane tricarboxylic acid, cyclopentane tetracarboxylic acid, cyclohexane dicarboxylic acid, cyclohexane tricarboxylic acid, methylcyclohexane dicarboxylic acid, tetrahydrophthalic acid, endomethylene tetrahydrophthalic acid, and methylenedomethylene tetrahydrophthalic acid may be mentioned. As specific examples of the aromatic polycarboxylic acid, phthalic acid, isophthalic acid, terephthalic acid, trimellitic acid, trimesic acid, and pyromellitic acid may be mentioned. As specific examples of the (partial) carboxylic acid anhydride, (partial)carboxylic acid anhydrides of these polycarboxylic acids may be mentioned.

The preferable amount of blending of the cross-linking agent compound is 0.5 to 20 parts by weight, more preferably 1 to 15 parts by weight, based upon 100 parts by weight of the acrylic rubber component. By blending in this cross-linking agent compound, the acrylic rubber dispersed phase is cross-linked, the mechanical strength is improved, and the compression set resistance is enhanced.

The components of the thermoplastic elastomer composition used in the first embodiment of the present invention are, as mentioned above, the thermoplastic copolyester elastomer and acrylic rubber. This thermoplastic copolyester elastomer composition has at least part of the rubber component constituting it cross-linked. The thermoplastic copolyester elastomer composition may be produced by using a Banbury mixer, Brabender mixer or other type of mixer/extruder (twin-screw mixer/extruder) etc., holding a melt of for example the thermoplastic copolyester elastomer and the acrylic rubber in these devices, adding a vulcanization agent (cross-linking agent) while mixing and finely dispersing the rubber phase, and mixing at a temperature promoting the cross-linking until the rubber phase is completely cross-linked.

That is, the thermoplastic elastomer composition produced in this way is a thermoplastic elastomer composition produced by dynamic vulcanization (Dynamic Cure or Dynamic Vulcanization) in which the vulcanization of the rubber is promoted, while mixing the thermoplastic resin and rubber composition, that is, the vulcanization (curing, crosslinking) of the rubber is dynamically promoted. By using such a process of production, the resultant thermoplastic elastomer composition becomes one wherein comprised of a thermoplastic resin phase at least partially forming a continuous phase in which a vulcanized rubber phase at least partially forming a discontinuous phase is finely dispersed, and therefore the thermoplastic elastomer composition exhibits similar behavior to vulcanized (cured, crosslinked) rubber. Further, since at least the continuous phase is a thermoplastic resin phase, processing like with a thermoplastic resin is possible at the time of shaping process such as extruding or injection molding etc.

Such a thermoplastic elastomer composition has at least part of the thermoplastic resin as the continuous phase and at least part of the rubber composition as the discontinuous phase whereinthe particle size of the vulcanized rubber composition of the discontinuous phase is preferably not more than 50 $\mu$m, more preferably 10 to 1 $\mu$m.

Note that the mixing conditions, the type and amount of the vulcanization agent used, the vulcanization conditions (temperature etc.), etc. may be suitably determined depending upon the formulation of the rubber composition to be added and the amount of the rubber composition blended and are not particularly limited.

The process of production of such a thermoplastic elastomer composition according to the present invention will now be explained.

The thermoplastic elastomer composition of the present invention is produced by, first, adding the resin and rubber composition, mixing them using twin screw mixer/extruder up to a molten state, then adding a vulcanization agent, while mixing so as to dynamically cause the rubber phase to vulcanize.

Further, the composition of the present invention may, if necessary, have added to it a reinforcing agent, softening agent, antioxidant, or other compounding agent. The compounding agents may be added to the rubber component during the above mixing, but the compounding agents other than the vulcanization agent may be premixed before twin screw mixing and further may be added during the above mixing.

The mixer used in the production of the thermoplastic elastomer composition of the present invention is not particularly limited, but a screw extruder, kneader, Banbury mixer, twin-screw mixer/extruder, etc. may be mentioned. Among these, considering the mixing of the resin component and rubber component and the dynamic vulcanization of the rubber component, use of a twin-screw mixer/extruder is preferable. Further, two or more types of mixers may be used for successive mixing.

As the melt mixing conditions, the mixing temperature is for example 180 to 350° C., in particular, 180 to 300° C. is preferable, but the temperature is not particularly limited so long as it is at least the temperature at which the thermoplastic copolyester elastomer component melts. The shear rate at the time of mixing is 1000 to 8000 sec$^{-1}$, in particular, 1000 to 5000 sec$^{-1}$ is preferable.

The residence time of the melt mixing in a mixer as a whole is 30 sec. to 10 min. The residence time (heating time) after adding the vulcanization agent is preferably 15 sec. to 5 min. The shear rate is calculated by taking the product obtained by multiplication of the number of rotations of the screw around the circle drawn by the front ends of the screw for 1 sec. and dividing by the distance between the front ends. That is, the shear rate is a value obtained by dividing the speed of the front ends by the distance between the front ends.

Here, the residence time at the portion for performing the dynamic vulcanization is calculated by multiplying the filling rate with the total volume of the portion for performing the dynamic vulcanization and dividing this by the volume rate of flow.

Note that, when producing a thermoplastic elastomer composition by this process of production, the relationship between the viscosity and volume fraction of the thermoplastic elastomer and the acrylic rubber composition used at the time of the melt mixing is correlative. The relationship of the following formula is preferable at the time of ordinary mixing at a range of temperature of 180° C. to 350° C. and a shear rate of 1000 to 8000 s$^{-1}$:

$0.25 \leq \phi_1 \leq 0.90$, preferably $0.30 \leq \phi_1 \leq 0.80$ $0.10 \leq \phi_2 \leq 0.75$, preferably $0.20 \leq \phi_2 \leq 0.70$ $\phi_1 + \phi_2 \leq 1.0$, preferably $=1.0$ $\eta_2/\eta_1 < 4.0$, preferably $<3.7$ $(\eta_1/\eta_2)(\phi_2/\phi_1) < 1.0$.

Where, $\eta_1$: Viscosity of thermoplastic copolyester elastomer at time of melt mixing $\eta_2$: Viscosity of acrylic rubber composition at time of melt mixing $\phi_1$: Volume fraction of thermoplastic copolyester elastomer $\phi_2$: Volume fraction of acrylic rubber composition Here, the viscosity at the time of melt mixing means the melt viscosity of the component at any temperature or shear rate at the time of melt mixing. The melt viscosity of the polymer material is dependent on the temperature, shear rate (s$^{-1}$), and shear stress, and therefore, the stress and shear rate of the polymer material at any temperature at the molten state able to flow through a capillary tube, in particular, the temperature region at the time of mixing, are measured and the melt viscosity 1 calculated by the following formula:

$\eta = \sigma \gamma$ wherein $\sigma$: shear stress, $\gamma$: shear rate.

Note that the melt viscosity was measured using a capillary rheometer (Capillograph 1C) made by Toyo Seiki.

By mixing in the range of the above formula, the mixing process control is stabilized, the rubber ratio is controlled, a high rubber ratio can preferably be achieved, and a thermoplastic elastomer composition which is flexible and has a high elongation at break can be obtained.

The hose according to the present invention can be produced by the general method of using known extrusion to extrude the thermoplastic elastomer to produce the inner tube of the hose of the present invention, coating the outer surface of the same, in accordance with need, with an adhesive or extruding an adhesive thermoplastic resin of adhesive over the same, wrapping on this a reinforcing fiber or reinforcing steel wire or brass plated, bronze plated steel wire and so on in a braided or spiral form, further, if necessary, coating an adhesive or extruding an adhesive thermoplastic resin over the same, then again extruding the thermoplastic elastomer to form an outer cover. At that time, at least one of the inner tube and/or outer cover is made using a thermoplastic elastomer composition comprising the thermoplastic copolyester elastomer in which vulcanized acrylic rubber is dispersed.

In the production of the hose of the present invention, when using a suitable adhesive as a bonding layer between the inner tube and the reinforcing layer comprised of the fiber or steel wire and so on, or between the reinforcing layer and the outer cover, use may be made of a urethane based adhesive generally used as an adhesive for hoses in the past. Further, when using an adhesive thermoplastic resin, a polyester based copolymer resin etc. may be used. In all cases, the thickness of the bonding layer is not particularly limited, but preferably is 10 to 500 $\mu$m.

Next, as the reinforcing layer of the hose of the present invention, it is possible to use any used for hoses in the past, such as nylon fiber, vinylon fiber, rayon fiber, polyester fiber, aromatic polyamide fiber, and other organic fibers and nylon fiber or hard steel wire, brass plated steel wire, bronze plated steel wire, zinc plated steel wire, and other metal reinforcing layers, but polyester fiber is more preferably used in view of its economy, flexibility, strength, and modulus.

The hose of the present invention, as explained above, comprises an inner tube, reinforcing layer, and outer cover which uses the thermoplastic elastomer composition of the present invention for at least one of the inner tube and outer cover. If necessary, it may further contain a bonding layer between the reinforcing layers.

According to the second embodiment of the present invention, there is obtained an elastomer composition improved in elongation and compression set resistance by blending into at least one acrylic rubber having an acryl group and epoxy group a polycaprolactone having a carboxyl group at its terminal (hereinafter sometimes simply referred to as a "terminal carboxyl modified polycaprolactone") in an amount of 5 to 30 parts by weight, preferably 5 to 25 parts by weight, based upon 100 parts by weight of the acrylic rubber.

According to the second embodiment of the present invention, there is obtained a thermoplastic elastomer composition improved in elongation and compression set resistance comprising (i) at least one copolyester elastomer (thermoplastic resin component), (ii) at least one acrylic rubber having at least one type of an acrylic group and epoxy group (rubber component), and (iii) specific terminal carboxyl modified polycaprolactone (i.e., cross-linking agent) wherein the rubber component forms a dispersed phase and the thermoplastic resin component forms the continuous phase.

The at least one acrylic rubber having an acrylic group and epoxy group used as the rubber component in the second embodiment of the present invention was explained earlier.

The polycaprolactone having a carboxylic group at the end thereof used as the cross-linking agent in the second embodiment of the present invention can be obtained by the reaction between the terminal hydroxyl group of polycaprolactone, polymerized using a polyhydric alcohol (that is, bivalent or higher alcohol), for example ethylene glycol, propylene glycol, 1,4-butanediol, glycerin, trimethylolpropane, pentaerythritol, etc. or any mixtures of two or more of the same as initiators, and an acid anhydride (for example, maleic anhydride, phthalic anhydride, succinic anhydride, trimellitic anhydride, itaconic anhydride, dodecenyl succinic anhydride, methyltetrahydro phthalic anhydride, methylhexahydro phthalic anhydride, methyl end-methylene tetrahydro phthalic anhydride, hexahydro phthalic anhydride, tetrahydro phthalic anhydride, trialkyltetrahydro phthalic anhydride, methylcyclohexene dicarboxylic anhydride, pyromellitic anhydride, benzophenonetetracarboxylic anhydride, ethylene glycol bistrimellitate, HET anhydride, tetrabromo phthalic anhydride, etc. or any mixtures thereof).

Further, for example as described in the above-mentioned Japanese Unexamined Patent Publication (Kokai) No. 7-304902 or International Rubber Conference Full Texts, for example, a caprolactone polymer having a hydroxyl group at its terminal, preferably a caprolactone polymer having an average molecular weight of 500 to 200,000 (for example "Placcel 220", "Placcel 240", etc. commercially available from Daicel Chemical Industries) can be used.

The terminal carboxylic modified polycaprolactone usable in the second embodiment of the present invention is blended in an amount of 5 to 30 parts by weight, preferably 5 to 25 parts by weight, based upon 100 parts by weight of at least one acrylic rubber having an acrylic group and epoxy group. If the amount blended is too small, the compression set becomes large and the tensile strength falls, while if conversely too large, the elongation falls.

The thermoplastic elastomer composition in the second embodiment of the present invention means one which comprises the acrylic rubber containing the terminal carboxyl modified polycaprolactone in which is blended a sufficient amount of a thermoplastic copolyester elastomer to give thermoplasticity wherein the thermoplastic copolyester elastomer component at least partially forms a continuous phase (i.e., matrix phase) in which the the rubber component is present as a discontinuous phase (i.e., dispersed phase). A thermoplastic resin may be dispersed in the discontinuous phase (i.e., rubber phase) to form a so-called "salami" structure.

The thermoplastic copolyester elastomer serving as the thermoplastic resin component of the thermoplastic elastomer composition according to the second embodiment of the present invention is known as a multiple block component copolymer having a polyester and a polyether as main recurring units. In the present invention, such known thermoplastic copolyester elastomers are used. As typical examples of such thermoplastic copolyester elastomers, for example, the following may be mentioned.

The thermoplastic copolyester elastomer usable in the present invention is a random and multiple block component copolyester comprised of recurring units of a polyester and polyether, recurring units of a polyester, (poly)lactone, and polyether, or recurring units of a polyester and polyimide ether and include a copolyether ester elastomer, (poly) lactone-modified copolyether ester elastomer, and copolyether imide ester elastomer.

A suitable thermoplastic copolyether ester elastomer and (poly)lactone-modified copolyether ester elastomer is produced by the conventionally employed esterification/ condensation polymerization method from (i) at least one diol, (ii) at least one dicarboxylic acid, (iii) at least one long chain ether glycol and, if necessary, (iv) at least one lactone or polylactone.

The diol (i) usable in the production of the copolyether ester elastomers and their (poly)lactone-modified forms includes saturated and unsaturated aliphatic and alicyclic dihydroxy compounds and aromatic dihydroxy compounds. These diols preferably have low molecular weights, that is, molecular weights of approximately 300 or less. As specific examples of the aliphatic and alicyclic diols, ethylene glycol, propanediol, butanediol, pentanediol, 2-methylpropanediol, 2,2-dimethylpropanediol, hexanediol, decanediol, 2-octylundecanediol, 1,2-, 1,3-, and 1,4-dihydroxycyclohexane, 1,2-, 1,3-, and 1,4-cyclohexanedimethanol, butynediol, hexenediol, and other diols having 2 to 15 carbon atoms may be mentioned. Particularly preferable diols are 1,4-butanediol and a mixture of 1,4-butanediol and hexanediol or butynediol. As specific examples of the aromatic diol, resorcinol, hydroquinone, 1,5-dihydroxynaphthalene, 4,4'-dihydroxydiphenyl, bis(p-hydroxyphenyl)methane, 2,2-bis (p-hydroxyphenyl)propane, and other diols having 6 to 19 carbon atoms may be mentioned.

Particularly suitable diols are saturated aliphatic diols having 2 to 8 carbon atoms, mixtures of such saturated aliphatic diols, and mixtures of such saturated aliphatic diols with unsaturated diols. When using two or more types of diols, at least approximately 60 mol %, in particular at least 80 mol %, based on the total amount of the diols, is preferably comprised of the same diol. The most preferred diol mixture comprises over half by 1,4-butanediol.

The dicarboxylic acid (ii) preferably used for the production of the copolyether ester elastomers and its (poly) lactone-modified forms includes aliphatic, alicyclic, and/or aromatic dicarboxylic acids. These dicarboxylic acids are preferably those having a low molecular weight, that is, a molecular weight of less than approximately 350, but those having a high molecular weight, in particular, dimer acids, can also be used.

As typical examples of the aliphatic and alicyclic dicarboxylic acid, sebacic acid, 1,2-cyclohexane dicarboxylic acid, 1,3-cyclohexane dicarboxylic acid, 1,4-cyclohexane dicarboxylic acid, adipic acid, glutaric acid, succinic acid, oxalic acid, azelaic acid, diethyl malonic acid, allyl malonic acid, 4-cyclohexene-1,2-dicarboxylic acid, 2-ethyl suberic acid, tetramethyl succinic acid, cyclopentane dicarboxylic acid, decahydro-1,5-naphthalene dicarboxylic acid, 4,4'-bicyclohexyl dicarboxylic acid, decahydro-2,6-naphthalene dicarboxylic acid, 4,4-methylenebis(cyclohexane dicarboxylic acid), 3,4-furan dicarboxylic acid, 1,1-cyclobutane dicarboxylic acid, and their dimer acids may be mentioned. Among these, cyclohexanedicarboxylic acid, sebacic acid, glutaric acid, and adipic acid are preferable.

As typical examples of the aromatic dicarboxylic acid, terephthalic acid, phthalic acid, isophthalic acid, bis-benzoic acid, for example, bis(p-carboxyphenyl)methane, oxybis (benzoic acid), ethylene-1,2-bis(p-oxybenzoic acid), and other substituted dicarboxyl compounds having two benzene nucleii, 1,5-naphthalene dicarboxylic acid, 2,6-naphthalene dicarboxylic acid, 2,7-naphthalene dicarboxylic acid, phenanthrene dicarboxylic acid, anthracene dicarboxylic acid, 4,4'-sulfonyl dibenzoic acid, and their halo and $C_1$ to $C_{12}$ alkyl, alkoxy, and aryl substituent derivatives are included. Note that in so far as the object of the present invention is not impaired, other aromatic dicarboxylic acids in addition to these aromatic dicarboxylic acids, for example, p-(β-hydroxyethoxy)benzoic acid and other hydroxyl acids may be used together.

Among the dicarboxylic acids which may be used for the production of the thermoplastic copolyether ester elastomers and their (poly)lactone-modified forms, an aromatic dicarboxylic acid, a mixture of two or more types of aromatic dicarboxylic acids, and a mixture of an aromatic dicarboxylic acid and an aliphatic and/or alicyclic dicarboxylic acid are preferable. An aromatic dicarboxylic acid alone is particularly preferable. Among these aromatic dicarboxylic acids, an aromatic dicarboxylic acid having 8 to 16 carbon atoms, in particular, a benzene dicarboxylic acid such as phthalic acid, terephthalic acid, and isophthalic acid and their dimethyl esters are suitable. Dimethyl terephthalate is best. When using a mixture of dicarboxylic acids or their esters, at least approximately 60 mol %, in particular at least approximately 80 mol %, of the total amount of the dicarboxylic acid is preferably the same dicarboxylic acid. In particular, one in which dimethyl terephthalate comprises at least approximately 60 mol % of the dicarboxylic acid mixture is preferred.

The long chain ether glycol (iii) used for the production of the thermoplastic copolyether ester elastomers and their (poly)lactone-modified form is preferably a poly(oxyalkylene) glycol and copoly(oxyalkylene) glycol having a molecular weight of approximately 400 to approximately 12,000. A suitable poly(oxyalkylene) unit has a molecular weight of approximately 900 to approximately 4,000 and is derived from a long chain ether glycol having a ratio of carbon to oxygen, except at its side chain, of approximately 1.8 to approximately 4.3.

As typical examples of a suitable poly(oxyalkylene) glycol, poly(ethylene ether) glycol, poly(propylene ether) glycol, poly(tetramethylene ether) glycol, ethylene oxide terminated poly(propylene ether) glycol, a random or block copolymer of ethylene oxide and propylene oxide including a mostly poly(ethylene ether) chain structure copoly(propylene ether-ethylene ether) glycol, and a random or block copolymer of tetrahydrofuran and a small amount of, for example, a second monomer such as ethylene oxide, propylene oxide or methyltetrahydrofuran (used in a ratio so that the ratio of oxygen to carbon does not exceed approximately 4.3) may be mentioned. A polyformal glycol produced by a reaction of formaldehyde with for example 1,4-butanediol, 1,5-pentanediol, or another diol is also useful. Particularly preferable poly(oxyalkylene) glycols are poly(propylene ether)glycol, poly(tetramethyleneether) glycol, and a mostly polyethylene ether) chain structure copoly(propylene ether-ethylene ether) glycol.

If necessary, one or more types of lactones or polylactones (iv) may be blended in these copolyether esters. This type of polylactone-modified copolyether ester elastomer is disclosed in the specification of U.S. Pat. No. 4,569,973.

As a suitable lactone (iv) usable in the present invention, ε-caprolactone is particularly preferable, but a substituted lactone substituted with a methyl group or ethyl group or lower alkyl group at the α, β, γ, δ, or ε position may also be used. Further, as the block unit of the copolyether ester used in the present invention, a homopolymer or a copolymer of a monomer and another copolymerizable monomer and polylactone including a hydroxy terminated polylactone can be used.

In general, a suitable copolyether ester elastomer and its (poly)lactone-modified form is one in which the amount of the (iii) long chain ether glycol component or (poly)lactone-modified form or the total amount of the (iii) long chain ether glycol component and (iv) lactone component in the copolyether ester is approximately 5 to approximately 80% by weight. A more preferable composition is one in which the amount of the (iii) long chain ether glycol component or the total amount of the (iii) component and (iv) lactone component is approximately 10 to approximately 50% by weight.

The polyether imide ester elastomer usable in the present invention may be produced from one or more types of diols, one or more types of dicarboxylic acidsm and one or more types of high molecular weight polyoxyalkylenediimide diacids. The production of the polyether imide ester elastomer is described in the specification of U.S. Pat. No. 4,556,705.

The polyether imide ester elastomer usable in the present invention may be produced by a method commonly used for the production of a polyester, for example a technique of esterification and condensation polymerization, to produce a random or block copolymer. Therefore, a polyether imide ester can be characterized as a reaction product of a diol and acid.

The preferable polyether imide ester elastomer used in the present invention can be produced from (i) one or more types of $C_2$ to $C_{15}$ aliphatic or alicyclic diols, (ii) one or more types of aliphatic, alicyclic, or aromatic dicarboxylic acids or their ester derivatives, and (iii) one or more types of polyoxyalkylenediimide diacids. The amount of the polyoxyalkylenediimide diacid used generally depends upon the desired properties of the obtained polyether imide ester. In general, the weight ratio of the dicarboxylic acid (ii) to the polyoxyalkylenediimide diacid (iii) is approximately 0.25 to approximately 2.0, preferably approximately 0.4 to approximately 1.4.

The diol (i) usable in the production of the polyether imide ester includes saturated and unsaturated aliphatic and alicyclic dihydroxy compounds and aromatic dihydroxy compounds. These diols preferably have low molecular weights, that is, molecular weights of approximately 250 or less.

Particularly preferable diols are saturated aliphatic diols, their mixtures, and mixtures of one or more types of saturated aliphatic diols with one or more types of unsaturated aliphatic diols, provided that the diols each has 2 to 8 carbon atoms. When using two or more types of diols, at least approximately 60 mol %, more preferably at least 80 mol %, of the total amount of the diols is preferably the same diol. A particularly preferable diol is one comprising 1,4-butanediol as a main component. The most preferable diol is 1,4-butanediol alone.

The dicarboxylic acid (ii) usable for the production of the above polyether imide ester is selected from aliphatic and aromatic dicarboxylic acids and their ester derivatives. A preferable dicarboxylic acid is one having a molecular weight of lower than approximately 300 or one with 4 to 18 carbon atoms. However, a higher molecular weight dicarboxylic acid, in particular a dimer acid, also can be used.

Among the aliphatic, alicyclic, and aromatic dicarboxylic acids usable in the production of the polyether imide ester, an aromatic dicarboxylic acid, a mixture of two or more types of aromatic dicarboxylic acids, and a mixture of an aromatic dicarboxylic acid and an aliphatic and/or alicyclic dicarboxylic acid are preferable. An aromatic dicarboxylic acid alone is particularly preferable. Among these aromatic dicarboxylic acids, an aromatic dicarboxylic acid having 8 to 16 carbon atoms, in particular, a benzene dicarboxylic acid such as phthalic acid, terephthalic acid, and isophthalic acid and their dimethyl esters are suitable. Dimethyl terephthalate is best.

The polyoxyalkylenediimide diacid (iii) usable for the production of the above polyether imide ester is a high molecular weight diacid having an average molecular weight larger than approximately 700, preferably larger than approximately 900. The diacid is produced by imidization of one or more types of tricarboxylic acid compounds including two adjoining carboxyl groups or acid anhydride groups and further a separate carboxyl group (this separate carboxyl group must not be esterizable and preferably is not imidizable) by a high molecular weight polyoxyalkylenediamine.

The thermoplastic elastomer composition according to the second embodiment of the present invention comprises a blend of the component (i), that is, the thermoplastic copolyester elastomer, and the component (ii), that is, at least one acrylic rubber component having an acrylic group and epoxy group, in a ratio of the component (i) to component (ii) of 30 to 90% by weight: 70 to 10% by weight (total 100% by weight), preferably a ratio of the component (i) to component (ii) of 30 to 70% by weight: 70 to 30% by weight and further comprises the component (iii), that is, the terminal carboxyl modified polycaprolactone, in an amount of 5 to 30 parts by weight, preferably 5 to 25 parts by weight, with respect to 100 parts by weight of the component (ii) rubber. If the amount of the component (i) blended is too large, the flexibility is impaired (Young's modulus increases), while conversely if too small, the thermoplasticity is impaired, so the melt shapability deteriorates.

The elastomer composition and thermoplastic elastomer composition according to the second embodiment of the present invention may have blended into them a filler, various types of general rubber compounding additives, plasticizers, etc. to an extent not impairing the desired physical properties.

The first component of the thermoplastic elastomer composition according to the third embodiment of the present invention, that is, the polyester based thermoplastic resin (a), is a thermoplastic copolyester elastomer. The thermoplastic copolyester elastomer is known as a multiple block component copolymer having a polyester and a polyether as main recurring units. In the present invention, such known thermoplastic copolyester elastomers are used. As typical examples of such thermoplastic copolyester elastomers, for example, the following may be mentioned.

The thermoplastic copolyester elastomer used in the present invention is a random and multiple block component copolyester comprised of recurring units of a polyester and polyether, recurring units of a polyester, (poly)lactone, and polyether, or recurring units of a polyester and polyimide ether and include a copolyether ester elastomer, (poly) lactone-modified copolyether ester elastomer, and copolyether imide ester elastomer.

A suitable thermoplastic copolyether ester elastomer and (poly)lactone-modified copolyether ester elastomer is produced by the conventionally employed esterification/condensation polymerization method from (i) at least one diol, (ii) at least one dicarboxylic acid, (iii) at least one long chain ether glycol, and, if necessary, (iv) at least one type of lactone or polylactone.

The diol (i) usable in the production of the copolyether ester elastomers and their (poly)lactone-modified forms include saturated and unsaturated aliphatic and alicyclic dihydroxy compounds and aromatic dihydroxy compounds. These diols preferably have low molecular weights, that is, molecular weights of approximately 300 or less. As specific examples of the aliphatic and alicyclic diols, ethylene glycol, propanediol, butanediol, pentanediol, 2-methylpropanediol, 2,2-dimethylpropanediol, hexanediol, decanediol, 2-octylundecanediol, 1,2-, 1,3-, and 1,4-dihydroxycyclohexane, 1,2-, 1,3-, and 1,4-cyclohexanedimethanol, butynediol, hexenediol, and other diols having 2 to 15 carbon atoms may be mentioned. Particularly preferable diols are 1,4-butanediol and a mixture of 1,4-butanediol and hexanediol or butynediol. As specific examples of the aromatic diol, resorcinol, hydroquinone, 1,5-dihydroxynaphthalene, 4,4'-dihydroxydiphenyl, bis(p-hydroxyphenyl)methane, 2,2-bis (p-hydroxyphenyl)propane, and other diols having 6 to 19 carbon atoms may be mentioned.

Particularly suitable diols are saturated aliphatic diols having 2 to 8 carbon atoms, mixtures of such saturated aliphatic diols, and mixtures of such saturated aliphatic diols with unsaturated diols. When using two or more types of diols, at least approximately 60 mol %, in particular at least 80 mol %, based on the total amount of the diols, is preferably comprised of the same diol. The most preferred diol mixture is comprised over half by 1,4-butanediol.

The dicarboxylic acid (ii) preferably used for the production of the copolyether ester elastomers and their (poly) lactone-modified forms includes aliphatic, alicyclic, and/or aromatic dicarboxylic acids. These dicarboxylic acids are preferably ones with a low molecular weight, that is, a molecular weight of less than approximately 350, but those having a high molecular weight, in particular, dimer acids, can also be used.

As typical examples of the aliphatic and alicyclic dicarboxylic acid, sebacic acid, 1,2-cyclohexane dicarboxylic acid, 1,3-cyclohexane dicarboxylic acid, 1,4-cyclohexane dicarboxylic acid, adipic acid, glutaric acid, succinic acid, oxalic acid, azelaic acid, diethyl malonic acid, allyl malonic acid, 4-cyclohexene-1,2-dicarboxylic acid, 2-ethylsuberic acid, tetramethyl succinic acid, cyclopentanedicarboxylic acid, decahydro-1,5-naphthalene dicarboxylic acid, 4,4'-bicyclohexyl dicarboxylic acid, decahydro-2,6-naphthalene dicarboxylic acid, 4,4-methylenebis(cyclohexane dicarboxylic acid), 3,4-furan dicarboxylic acid, 1,1-cyclobutane dicarboxylic acid, and their dimer acids may be mentioned. Among these, cyclohexane dicarboxylic acid, sebacic acid, glutaric acid, and adipic acid are preferable.

As typical examples of the aromatic dicarboxylic acid, terephthalic acid, phthalic acid, isophthalic acid, bis-benzoic acid, for example bis(p-carboxyphenyl)methane, oxybis (benzoic acid), ethylene-1,2-bis(p-oxybenzoic acid), and other substituted dicarboxyl compounds having two benzene nucleii, 1,5-naphthalene dicarboxylic acid, 2,6-naphthalene dicarboxylic acid, 2,7-naphthalene dicarboxylic acid, phenanthrene dicarboxylic acid, anthracene dicarboxylic acid, 4,4'-sulfonyldibenzoic acid, and their halo and Cl to $C_{12}$ alkyl, alkoxy, and aryl substituent derivatives are included. Note that in so far as the object of the present invention is not impaired, other aromatic dicarboxylic acids in addition to these aromatic dicarboxylic acids, for example, p-(β-hydroxyethoxy)benzoic acid and other hydroxyl acids may be used together.

Among the dicarboxylic acids which may be used for the production of the thermoplastic copolyether ester elastomers and their (poly)lactone-modified forms, an aromatic dicarboxylic acid, a mixture of two or more types of aromatic dicarboxylic acids, and a mixture of an aromatic dicarboxylic acid and an aliphatic and/or alicyclic dicarboxylic acid are preferable. An aromatic dicarboxylic acid alone is particularly preferable. Among these aromatic dicarboxylic acids, an aromatic dicarboxylic acid having 8 to 16 carbon atoms, in particular, a benzene dicarboxylic acid such as phthalic acid, terephthalic acid, and isophthalic acid and their dimethyl esters are suitable. Dimethyl terephthalate is best. When using a mixture of dicarboxylic acids or their esters, at least approximately 60 mol %, in particular at least approximately 80 mol %, of the total amount of the dicarboxylic acid is preferably the same dicarboxylic acid. In particular, one in which dimethyl terephthalate comprises at least approximately 60 mol % of the dicarboxylic acid mixture is preferred.

The long chain ether glycol (iii) usable for the production of the thermoplastic copolyether ester elastomers and their (poly)lactone-modified forms is preferably a poly(oxyalkylene) glycol and copoly(oxyalkylene) glycol having a molecular weight of approximately 400 to approximately 12,000. A suitable poly(oxyalkylene) unit has a molecular weight of approximately 900 to approximately 4,000 and is derived from a long chain ether glycol having a ratio of oxygen to carbon, except at its side chain, of approximately 1.8 to approximately 4.3.

As typical examples of a suitable poly(oxyalkylene) glycol, poly(ethylene ether) glycol, poly(propylene ether) glycol, poly(tetramethylene ether) glycol, ethylene oxide terminated poly(propylene ether) glycol, a random or block copolymer of ethylene oxide and propylene oxide including a mostly poly(ethylene ether) chain structure copoly(propylene ether-ethylene ether) glycol, and a random or block copolymer of tetrahydrofuran and a small amount of, for example, a second monomer such as ethylene oxide, propylene oxide, or methyltetrahydrofuran (used in a ratio so that the ratio of oxygen to carbon does not exceed approximately 4.3) may be mentioned. A polyformal glycol produced by a reaction of formaldehyde with for example 1,4-butanediol, 1,5-pentanediol, or another diol is also useful. Particularly preferable poly(oxyalkylene) glycols are poly(propylene ether) glycol, poly(tetramethylene ether) glycol, and a mostly polyethylene ether) chain structure copoly(propylene ether-ethylene ether) glycol.

If necessary, one or more types of lactones or polylactones (iv) may be blended in these copolyether esters. This type of polylactone-modified copolyether ester elastomer is disclosed in the specification of U.S. Pat. No. 4,569,973.

As a suitable lactone (iv) usable in the present invention, ε-caprolactone is particularly preferable, but a substituted lactone substituted with a methyl group or ethyl group or lower alkyl group at the α, β, γ, δ, or ε position may also be used. Further, as the block unit of the copolyether ester used in the present invention, a homopolymer or a copolymer of a monomer and another copolymerizable monomer and polylactone including a hydroxy terminated polylactone can be used.

In general, a suitable copolyether ester elastomer and its (poly)lactone-modified form is one in which the amount of the (iii) long chain ether glycol component or (poly)lactone-modified form or the total amount of the (iii) long chain ether glycol component and (iv) lactone component in the copolyether ester is approximately 5 to approximately 80% by weight. A more preferable composition is one in which the amount of the (iii) long chain ether glycol component or the total amount of the (iii) component and (iv) lactone component is approximately 10 to approximately 50% by weight.

As the copolyether ester elastomer and its (poly)lactone-modified form, a copolyether ester elastomer in which the dicarboxylic acid component is terephthalic acid, the diol component is 1,4-butanediol, and the long chain ether glycol is poly(tetramethylene ether) glycol may be suitably mentioned.

The polyether imide ester elastomer usable in the present invention may be produced from one or more types of diols, one or more types of dicarboxylic acids and one or more types of high molecular weight polyoxyalkylenediimide diacids. The production of the polyether imide ester elastomer is described in the specification of U.S. Pat. No. 4,556,705.

The polyether imide ester elastomer usable in the present invention may be produced by a method commonly used for the production of a polyester, for example a technique of esterification and condensation polymerization, to produce a random or block copolymer. Therefore, a polyether imide ester can be characterized as a reaction product of a diol and acid.

A preferable polyether imide ester elastomer usable in the present invention may be produced from (i) one or more $C_2$ to $C_{15}$ aliphatic or alicyclic diols, (ii) one or more aliphatic, alicyclic, or aromatic dicarboxylic acids or their ester derivatives, and (iii) one or more polyoxyalkylenediimide diacids. The amount of the polyoxyalkylenediimide diacid used is in general governed by the desired properties of the polyether imide ester. In general, the weight ratio of the dicarboxylic acid (ii) to the polyoxyalkylenediimide diacid (iii) is approximately 0.25 to approximately 2.0, preferably approximately 0.4 to approximately 1.4.

The diol (i) usable in the production of the polyether imide ester includes saturated and unsaturated aliphatic and alicyclic dihydroxy compounds and aromatic dihydroxy compounds. These diols preferably have low molecular weights, that is, molecular weights of approximately 250 or less.

Particularly preferable diols are saturated aliphatic diols, their mixtures, and mixtures of one or more types of saturated aliphatic diols with one or more types of unsaturated aliphatic diols (however, the diols each having 2 to 8 carbon atoms). When using two or more types of diols, at least approximately 60 mol %, more preferably at least 80 mol %, of the total amount of the diols is preferably the same diol. A particularly preferable diol is one comprising 1,4-butanediol as a main component. The most preferable diol is 1,4-butanediol alone.

The dicarboxylic acid (ii) usable for the production of the above polyether imide ester is selected from aliphatic and aromatic dicarboxylic acids and their ester derivatives. A preferable dicarboxylic acid is one having a molecular weight of lower than approximately 300 or one with 4 to 18 carbon atoms. However, a higher molecular weight dicarboxylic acid, in particular a dimer acid, also can be used.

Among the aliphatic, alicyclic, and aromatic dicarboxylic acids usable in the production of the polyether imide ester, an aromatic dicarboxylic acid, a mixture of two or more types of aromatic dicarboxylic acids, and a mixture of an aromatic dicarboxylic acid and an aliphatic and/or alicyclic dicarboxylic acid are preferable. An aromatic dicarboxylic acid alone is particularly preferable. Among these aromatic dicarboxylic acids, an aromatic dicarboxylic acid having 8 to 16 carbon atoms, in particular, a benzene dicarboxylic acid such as phthalic acid, terephthalic acid, and isophthalic acid and their dimethyl esters are suitable. Dimethyl terephthalate is best.

The polyoxyalkylenediimide diacid (iii) usable for the production of the above polyether imide ester is a high molecular weight diacid having an average molecular weight larger than approximately 700, preferably larger than approximately 900. The diacid is produced by imidization of one or more types of tricarboxylic acid compounds including two adjoining carboxyl groups or acid anhydride groups and further a separate carboxyl group (this separate carboxyl group must not be esterizable and preferably is not imidizable) by a high molecular weight polyoxyalkylenediamine.

The polyester based thermoplastic resin (a) blended into the composition of the present invention is included in an amount of 90 to 30 parts by weight with respect to 100 parts by weight of the sum of the polyester based thermoplastic resin (a) and the vulcanized rubber composition (b) of the rubber containing the acryl group and epoxy group. If the amount of the component (a) blended is too large, the flexibility is impaired, while conversely if too small, the rubber phase becomes the matrix phase and the fluidity at the time of extrusion etc. is impaired.

The rubber (b) usable as the rubber component of the thermoplastic elastomer composition of the present invention is a cross-linkable rubber having an acryl group and epoxy group as the main chain or side chain in its molecule. For example, a copolymer rubber containing an epoxy group-containing acrylate and/or methacrylate as copolymerization components (acrylic rubber: ACM) may be mentioned. The epoxy group-containing (meth)acrylate copolymer rubber used in the present invention is a multiple component copolymer rubber composed of (1) an alkyl (meth)acrylate copolymer rubber and/or alkoxy-alkyl (meth) acrylate copolymer rubber, (2) an epoxy group-containing monomer, and, in accordance with need, (3) another ethylenic unsaturated monomer which can be copolymerized with (1) and (2).

The alkyl (meth)acrylate (1) usable for the production of the epoxy group-containing (meth)acrylate copolymer rubber was explained earlier.

Further, a polycaprolactone having a carboxyl group at its terminal may be blended in an amount of 5 to 30 parts by weight, based upon 100 parts by weight of the rubber.

The polycaprolactone having a carboxyl group at its terminal used as the cross-linking agent can be obtained by the reaction between the terminal hydroxyl group of polycaprolactone, polymerized using a polyhydric alcohol (that is, bivalent or more alcohol), for example ethylene glycol, propylene glycol, 1,4-butanediol, glycerin, trimethylolpropane, pentaerythritol, etc. or any mixtures of two or more of the same as initiators, and an acid anhydride (for example, maleic anhydride, phthalic anhydride, succinic anhydride, trimellitic anhydride, itaconic anhydride, dodecenyl succinic anhydride, methyltetrahydro phthalic anhydride, methylhexahydro phthalic anhydride, methyl end-methylene tetrahydrophthalic anhydride, hexahydro phthalic anhydride, tetrahydro phthalic anhydride, trialkyltetrahydro phthalic anhydride, methylcyclohexene dicarboxylic anhydride, pyromelitic anhydride, benzophenone tetracarboxylic anhydride, ethylene glycol bistrimellitate, HET anhydride tetrabromo phthalic anhydride, etc. or any mixtures of the same).

Further, for example as described in the above-mentioned Japanese Unexamined Patent Publication (Kokai) No. 7-304902 or International Rubber Conference Full Texts, for example, a caprolactone polymer having a hydroxyl group at its terminal, preferably a caprolactone polymer having an average molecular weight of 500 to 200,000 (for example "Placcel 220", "Placcel 240", etc. commercially available from Daicel Chemical Industries) can be used.

The terminal carboxyl modified polycaprolactone usable in the first and second embodiments of the present invention is blended in an amount of 5 to 30 parts by weight, preferably 5 to 25 parts by weight, based upon 100 parts by weight of at least one acrylic rubber having an acryl group and epoxy group. If the amount blended is too small, the compression set becomes large and the tensile strength falls, while if conversely too large, the elongation falls.

The thermoplastic elastomer composition of the present invention has added to it an epoxy-modified olefin based polymer (c). The resin is comprised of an acrylate unit A(x), an epoxy group unit B(y), and an olefin unit C(z). The function of the resin (c) as a compatibilizer is believed to derive from the action of the individual components. That is, the resin (c) has an acrylate unit, and therefore, has a suitable degree of compatibility with both of the polyester based thermoplastic resin (hereinafter referred to as the thermoplastic copolyester elastomer) (a) and the rubber composition of the rubber (cross-linkable rubber having an acryl group and epoxy group) (b). Further, the resin (c) has an epoxy group unit B(y), so exhibits reactivity with the carboxyl group of the terminals of the thermoplastic copolyester elastomer (a) and cross-linkability with the rubber composition of the rubber (cross-linkable rubber having an acryl group and epoxy group) (b). Further, since it has an olefin unit, it has a suitable degree of compatibility with the soft segment of the thermoplastic copolyester elastomer (a), that is, the polytetramethylene glycol (PTMG) etc. and gives a suitable melt viscosity, so exhibits a superior dispersibility under melt mixing. Therefore, when the resin (c) is present at the interface of the thermoplastic copolyester elastomer (a) and rubber (cross-linkable rubber containing an acrylic group and epoxy group) at the time of melt mixing, one molecule dissolves in the two phases, reacts with the polymers of the two phases, or forms an interlinked state, and functions as a compatibilizer.

As the alkyl acrylate unit, at least one monomer component selected from the group consisting of an alkyl acrylate of the following formula (2) where $R^7$ is an alkyl group (formula (3)) and an alkoxy-alkyl acrylate where $R^7$ is an alkoxy-alkyl group (formula (4)) is contained. $R^8$ in the alkyl acrylate is an alkyl group with at least one carbon atom, preferably a $C_1$ to $C_2$ alkyl group. $R^9$ in the alkoxy-alkylacrylate is an alkyl group with at least one carbon atom, preferably a $C_1$ to $C_2$ alkyl group. $R^1$ is an alkyl group with at least one carbon atom, preferably a $C_1$ to $C_2$ alkyl group. As the acrylate unit, at least one compound selected from these alkyl acrylates and alkoxy-alkyl acrylates is included, but it is preferably methyl acrylate.

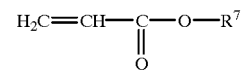

(2)

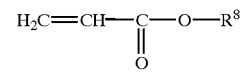

(3)

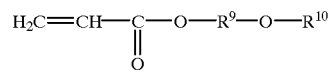

(4)

The epoxy group unit B(y) may be a polymerizble monomer component containing at least one epoxy group in its molecule. Specifically, glycidyl methacrylate, glycidyl acrylate, allyl glycidyl ether, etc. may be mentioned. Preferably, it is glycidyl methacrylate. As the epoxy group unit B(y), one or more compounds of the above epoxy group-containing monomers may be included.

As the olefin unit, an alkene monomer component, specifically, ethylene, propylene, butylene, pentylene, etc. may be mentioned, but ethylene etc. is preferable. As the olefin unit, one or more compounds of the above alkenes may be included.

The epoxy-modified olefin based polymer (c) added to the composition of the third embodiment of the present invention has the following structure:

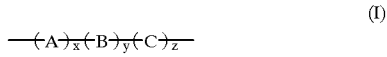
(I)

Where, A indicates an acrylate unit, B indicates an epoxy group unit, and C indicates an olefin unit, x, y, and z indicate the molar percents in the (c) epoxy-modified olefin based polymer, and x+y+z=1.

The resin (c) is preferably

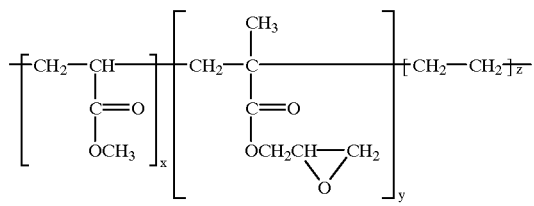

The ratio of composition of the resin (c) is one in a range where the effects of the essential components explained above are effectively exhibited. So long as $0.005 \leq y \leq 0.200$ and x+y+z=1, the ratio of x, y, and z is not particularly limited, but $0.100 \leq x \leq 0.200$ $0.600 \leq z \leq 0.950$ is preferable.

Further, $0.120 \leq x \leq 0.160$ $0.010 \leq y \leq 0.150$ $0.700 \leq z \leq 0.900$ is more preferable.

That is, the acrylate unit A(x) has to be contained in an amount sufficient to impart compatibility to the component (a) and component (b). In terms of molar percent, at least 0.100 is preferable. Further, if over 0.200, the end result is that the amounts of the other units undesirably become smaller. The epoxy group unit B(y) is a reactive component with the component (a) and component (b). In terms of molar percent, at least 0.005 is preferable, but if the amount of this unit becomes too large, for example, over 0.200, the reactivity becomes too great and in addition to the desired compatibilizing reaction, self cross-linking due to heat becomes excessive, undispersed masses of the resin (c) occur, and a deterioration of the physical properties is caused—which has an undesirable effect. The olefin unit C(z) has to be contained in an amount sufficient to contribute to the compatibility to the component (a) and the reduction of the melt viscosity. In terms of molar percent, at least 0.600 is preferable, but if over 0.950, the amount of the unit becomes too large and the end result is that the amounts of the other units become too small, so this is not preferred.

The amount of the resin (c) blended need inherently only be an amount sufficient to cover the interface of the component (a) and component (b). Further, from the presumed mechanism of action of the resin (c) as a compatibilizer, the amount blended should be able to be determined based on the concentration of the epoxy group unit B(y) in the system. In practice, however, the resin (c) does not concentrate at just the interface and disperses in both phases of the component (a) and component (b), so it is necessary to blend in a certain excess.

Therefore, the amount of blending of the resin (c) is suitably defined by the amount of blending when making the total weight of the component (a) and the component (b) 100 parts by weight. According to this, the amount of blending of the resin (c) is 1 to 25 parts by weight, preferably 2 to 15 parts by weight. The reason is that addition of this range of a compatibilizer imparts a suitable compatibility to the polyester thermoplastic resin (a) and the vulcanized rubber composition of the rubber having the acryl group and epoxy group (b).

The epoxy-modified olefin polymer in the composition works as a compatibilizer, imparts bondability to the particles of the rubber having the acryl group and epoxy group dispersed in the thermoplastic copolyester elastomer and the thermoplastic copolyester elastomer interface, improves both the properties of the elongation and tear, and thereby enables the production of a thermoplastic elastomer composition superior in physical properties of tear and having a high breakage resistance. Further, by using the composition, it is possible to produce a hose with a satisfactory impulse durability.

In general, the thermoplastic elastomer composition of the present invention may be produced by using a Banbury mixer, Brabender mixer kneader, or other mixer/extruder (i.e., twin-screw mixer/extruder) etc., mixing a melt of the resin and rubber composition together with a compatibilizer in these devices, adding a vulcanization agent of the rubber while mixing and finely dispersing the rubber composition in the thermoplastic phase, and mixing at a temperature promoting the cross-linking until the rubber is completely vulcanized (cured, crosslinked).

That is, the thermoplastic elastomer composition produced in this way is a thermoplastic elastomer composition produced by dynamic vulcanization (Dynamic Cure or Dynamic Cross-linking) in which the vulcanization of the rubber is promoted while mixing the thermoplastic resin and rubber composition, that is, the vulcanization of the rubber is dynamically promoted. By using such a process of production, the resultant thermoplastic elastomer composition becomes one comprised of a thermoplastic resin phase at least partially forming a continuous phase in which a vulcanized rubber phase at least partially forming a discontinuous phase is finely dispersed, so the thermoplastic elastomer composition exhibits similar behavior to vulcanized rubber. Further, since at least the continuous phase is a thermoplastic resin phase, processing like with a thermoplastic resin is possible at the time of shaping such as press molding, extruding, calendering and injection molding.

Such a thermoplastic elastomer composition is one in which at least part of the thermoplastic resin constitutes a continuous phase and at least part of the rubber composition constitutes a discontinuous phase. The particle size of the discontinuous phase, that is, the vulcanized rubber composition, is preferably not more than 50 μm, more preferably 1 to 10 μm.

Note that the mixing conditions, the type and amount of the vulcanization agent used, the vulcanization conditions (temperature etc.), etc. may be suitably determined depending upon the formulation of the rubber composition to be added and the amount of the rubber composition blended and are not particularly limited.

The process of production of such a thermoplastic elastomer composition of the present invention will now be explained.

The thermoplastic elastomer composition of the present invention may be produced by (1) first adding the resin, rubber composition, and compatibilizer and melt mixing while imparting compatibility, then adding the vulcanization agents while mixing to dynamically vulcanize the rubber, (2) first melt mixing the resin and rubber composition then adding the vulcanization agent and compatibilizer while mixing to impart compatibility while dynamically vulcanizing the rubber, or (3) first adding the resin, rubber composition, and part of the compatibilizer to be added and melt mixing while imparting compatibility, then adding the vulcanizing agent and the remaining compatibilizer while mixing to impart compatibility while dynamically vulcanizing the rubber.

Further, the composition of the present invention may have added to it, if necessary, a reinforcing agent, softening agent, antioxidant, or other compounding agent. The compounding agents may be added to the rubber component during the above mixing, but it is better to premix the compounding agents other than the vulcanization agent before the above mixing. The compounding agents for the resin component may also be premixed before the above mixing and further they may be added during the above mixing.

The mixer used for the production of the thermoplastic elastomer composition of the present invention is not particularly limited, but a screw extruder, kneader, Banbury mixer, twin-screw mixer/extruder, etc. may be mentioned. Among these, considering the mixing of the resin component and rubber component and the dynamic vulcanization of the rubber component, use of a twin-screw mixer/extruder is preferable. Further, two or more types of different mixers may be used for successive mixing.

As the melt mixing conditions, the mixing temperature is for example 180 to 350° C., in particular, 180 to 300° C. is preferable, but the temperature is not particularly limited so long as it is at least the temperature at which the thermoplastic copolyester elastomer component melts. The shear rate at the time of mixing is 1000 to 8000 sec$^{-1}$, in particular, 1000 to 5000 sec$^{-1}$ is preferable.

The residence time of the melt mixing as a whole is 30 sec. to 10 min. The residence time (heating time) after adding the vulcanization agent is preferably 15 sec. to 5 min.

Note that, when producing a thermoplastic elastomer composition by this process of production, the relationship between the viscosity and volume fraction of the thermoplastic copolyester elastomer (a) and the rubber composition (b) used at the time of the melt mixing is correlative. The relationship of the following formula is preferable at the time of ordinary mixing in a range of temperature of 180° C. to 350° C. and a shear rate of 1000 to 8000 s$^{-1}$:

$$\eta_2/\eta_1 < 4.0$$

$$(\eta_1/\eta_2)(\phi_2/\phi_1) < 1.0.$$

Where, $\eta_1$: Viscosity of thermoplastic copolyester elastomer (a) at time of melt mixing $\eta_2$: Viscosity of rubber composition (b) at time of melt mixing $\phi_1$: Volume fraction of thermoplastic copolyester elastomer (a)

$\phi_2$: Volume fraction of rubber composition (b)

Here, the viscosity at the time of melt mixing means the melt viscosity of the component at any temperature or shear rate at the time of melt mixing. The melt viscosity of the polymer material is dependent on the temperature, shear rate (s$^{-1}$), and shear stress, and therefore, the stress and shear rate of the polymer material at any temperature at the molten state able to flow through a capillary tube, in particular, the temperature region at the time of mixing, are measured and the melt viscosity q calculated by the following formula:

$$\eta = \sigma\gamma$$

where, $\sigma$: shear stress, $\gamma$: shear rate

Note that the melt viscosity was measured using a capillary rheometer (Capillograph IC) made by Toyo Seiki.

By mixing in the range of the above formula, the kneadability is stabilized, the rubber ratio is controlled, a high rubber ratio can preferably be achieved, and a thermoplastic elastomer composition which is flexible and has a high elongation at break can be obtained.

The thermoplastic elastomer composition of the present invention obtained is improved in the compatibility of the rubber component and resin component by the addition of the compatibilizer and as a result has less of a reduction of the elongation at break, which had been a problem in the conventional acrylic rubber/polyester based thermoplastic elastomer composition, so can give a composition superior in the breakage resistance. Due to this, it is possible to obtain a composition satisfactory in the oil resistance, heat resistance, and breakage resistance required for a high pressure hose. By using this composition, production of a hose satisfactory in the hose impulse durability becomes possible. This composition is not limited to use for just hoses and can be used for various materials where oil resistance, heat resistance, and breakage resistance are demanded.

Specific examples will now be given of the above three processes of production to give a more detailed explanation. Note that these examples do not particularly limit the processes of production.

The first process mixes the thermoplastic copolyester elastomer (a), rubber composition (b), and compatibilizer (c) by a twin-screw mixer/extruder etc. in the molten state while imparting compatibility and adds the vulcanizing agent while mixing to dynamically vulcanize the rubber composition.

When this process is performed using a twin-screw mixer/extruder, this is provided with inlets for simultaneously or separating charging at least the thermoplastic copolyester elastomer, rubber composition, and compatibilizer and an inlet for charging the vulcanization agents and with a mixing use screw portion for the vulcanization and mixing of the thermoplastic copolyester elastomer, rubber composition, and compatibilizer and a mixing using screw portion for the dynamic vulcanization after charging the vulcanizing agents between the inlets for the thermoplastic copolyester elastomer, rubber composition, and compatibilizer and the inlet for the vulcanizing agents.

The temperature of the portion performing the heating and mixing and the dynamic vulcanization is preferably 180 to 300° C.

The screw configuration, volume rate of flow, and the like are preferably adjusted so that the residence time at the portion performing the dynamic vulcanization is becomes 15 to 300 sec.

The screw speed is preferably adjusted so that the shear rate becomes 1000 to 8000 sec$^{-1}$.

Here, the residence time at the portion for performing the dynamic vulcanization is calculated by multiplying the filling rate with the total volume of the portion for performing the dynamic vulcanization and dividing this by the volume rate of flow.

The shear rate is calculated by taking the product obtained by multiplication of the number of rotations of the screw around the circle drawn by the front ends of the screw for 1 sec. and dividing by the distance between the front ends. That is, the shear rate is a value obtained by dividing the speed of the front ends by the distance between the front ends.

In the thus configurated twin-screw mixer/extruder, first the thermoplastic copolyester elastomer for forming the continuous phase is pelletized and charged from the resin component inlet, then the compatibilizer is pelletized and charged from the compatibilizer inlet. They are then heated, melted, and mixed together. Next, the unvulcanized rubber composition in which is blended all of the components other than the vulcanizing agents are pelletized and charged from the rubber component inlet. The mixture is mixed to disperse this finely in the thermoplastic resin phase forming the continuous phase.

Here, the compatibilizer may be charged after the rubber component or may be charged at the same time as the thermoplastic copolyester elastomer or the rubber composition.

After the rubber composition is dispersed in the thermoplastic copolyester elastomer, the vulcanizing agents (cross-linking agent, vulcanization accelerator, vulcanization aid, or other additive required for the cross-linking reaction) is charged from the vulcanizing agent inlet in the state with the two mixed and the rubber component (rubber composition) is dynamically vulcanized while mixing.

Further, if necessary, an antioxidant or other compounding agents may be charged and mixed at the same time as or separately from the resin component, rubber component, and vulcanizing agents.

The composition is held in the twin-screw mixer/extruder until the dynamic vulcanization is completed and is discharged and cooled rapidly after the dynamic vulcanization ends so as to obtain the thermoplastic elastomer composition of the present invention.

By performing the dynamic vulcanization in this way, a state where the rubber composition is sufficiently dispersed in the thermoplastic copolyester elastomer is obtained. Further, since the rubber composition is vulcanized, this state of dispersion will not change even after the mixing and can be held stably. Further, since the mixing time is short, there is little degradation of the thermoplastic copolyester elastomer or rubber composition.

Accordingly, the resultant thermoplastic elastomer composition will not change in structure even when shaped by heating, so can be shaped using an ordinary resin extruder or injection molding machine etc. The shaped article therefore has rubber elasticity even without applying any particular vulcanization step.

The second process mixes the thermoplastic copolyester elastomer and rubber composition by a twin-screw mixer/extruder etc. in the molten state, adds the vulcanizing agent while mixing to dynamically vulcanize the rubber composition, and further adds a compatibilizer during the mixing.

The third process mixes the thermoplastic copolyester elastomer, rubber composition, and a partial amount of the compatibilizer to be added in a twin-screw mixer/extruder etc. in a molten state, adds the vulcanizing agent and the remaining compatibilizer while mixing, and mixes while dynamically vulcanizing the rubber composition so as to further enhance the compatibility.

In the second and third processes, the compatibilizer may be charged simultaneously with or separately from the thermoplastic copolyester elastomer or rubber composition.

The second and third processes can give the desired thermoplastic elastomer composition by a process of a twin-screw mixer/extruder the same as the first process except for the difference in timing of the addition of the compatibilizer.

As explained above, the compatibilizer may be mixed in at the time of addition of the rubber composition and thermoplastic copolyester elastomer, may be mixed in at the time of addition of the vulcanizing agents, and may be added divided into two times, that is, the time of addition of the rubber composition and thermoplastic copolyester elastomer and the time of addition of the vulcanizing agent. Preferably it is added by the above first process.

Therefore, the thermoplastic elastomer composition of the present invention is improved in the compatibility at the interface between the thermoplastic copolyester elastomer and rubber composition since a compatibilizer is added and vulcanization is performed while mixing until the rubber composition finely disperses as a discontinuous phase in the continuous phase of the thermoplastic copolyester elastomer.

That is, the present invention gives a composition which is improved in the elongation at break of the resultant composition, has an enhanced breakage resistance, and has physical properties excellent for a high pressure hose by further blending into the thermoplastic elastomer composition comprised of a rubber composition and thermoplastic copolyester elastomer a compatibilizer comprised of an acrylate unit A(x), epoxy group unit B(y), and olefin unit C(z). By using this composition, it becomes possible to produce a hose satisfactory in impulse durability.

The second embodiment of the present invention relates to a hose comprising the thermoplastic elastomer composition according to the present invention.

The hose of the present invention has the structure shown in FIG. 1. The hose 1 is composed of an inner tube 2, reinforcing layer 3, and outer cover 4. At least one of the inner tube 2 and outer cover 4 is formed from the thermoplastic elastomer composition according to the present invention. So long as it is in the range where the properties of the hose of the present invention are not impaired, a composition other than the thermoplastic elastomer composition of the present invention may also be used for one of the inner tube and outer cover. By using the thermoplastic elastomer composition of the present invention in this way for one of the inner tube or outer cover, a hose having the desired performance can be obtained, but the thermoplastic elastomer composition of the present invention may also be used for both of the inner tube and outer cover. When using the thermoplastic elastomer composition of the present invention for one of the inner tube or outer cover, the composition constituting the other tube is not particularly limited so long as it has a flexibility and heat resistance of an extent which does not impair the properties of the hose of the present invention. Thermoplastic elastomer compositions composed of other combinations of thermoplastic resins and rubber compositions may be exemplified. In particular, a thermoplastic elastomer composition composed of an ethylene-propylene-diene copolymer rubber (EPDM) and polypropylene (PP) etc. may be preferably mentioned. A thermoplastic elastomer composition having the same configuration as the thermoplastic elastomer composition of the present invention but not containing the compatibilizer (c) and containing just (a) polyester thermoplastic resin and (b) vulcanized rubber composition of the rubber having the acryl group and epoxide group may be used as the other composition. Which of the inner tube and outer cover the thermoplastic elastomer composition of the present invention is used for is not particularly limited, but, for example, when using a combination of Santoprene (made by AES), SARLINK (made by DSM), or another EPDM/PP thermoplastic elastomer composition and the thermoplastic elastomer composition of the present invention, the thermoplastic elastomer composition of the present invention is preferably used for the inner tube. This is because if the composition of the present invention with its high elongation and breakage resistance is used for the inner tube, the breakage resistance such as higher pressure resistance of the hose becomes high.

The reinforcing layer constituting the hose of the present invention is not particularly limited, but like the reinforcing layer of a conventional hose may be a layer of a yarn produced from a vinylon fiber, rayon fiber, polyester fiber, nylon fiber, aromatic polyamide fiber, etc. or a hard steel wire etc. braided or wrapped in a spiral.

Such a hose of the present invention may be easily produced by a known process, that is, by extruding a thermoplastic elastomer composition.

Further, the hose of the present invention may be changed in the composition of the thermoplastic elastomer composition constituting the inner tube and outer cover or may use another resin at the same time in accordance with its application. Further, in accordance with need, it may have a filler, stabilizer, coloring agent, etc. blended in it.

Further, in the production of the hose of the present invention, it is possible to produce the inner tube by a known extrusion process, provide a bonding layer on its outer surface if necessary by coating an adhesive etc., braid the reinforcing fiber over the same, provide a bonding layer on it, if necessary, by coating an adhesive etc., and cover the same with an outer cover by extrusion so as to bond the layers of the hose integrally by bonding layers. For the bonding layers between the inner tube and reinforcing layer, reinforcing layer and other reinforcing layer, and reinforcing layer and outer cover, an adhesive or adhesive resin etc. may be used. When using an adhesive resin, it is possible to form the bonding layer by an ordinarily used resin extruder. As the hose adhesive used in the past, a generally used urethane based ordinary temperature-curing type adhesive etc. may be exemplified. Further, as an adhesive resin, an olefin based, polyamide based, polyester based, and polyurethane based or other thermoplastic resin or thermoplastic elastomer and their compositions may be exemplified. Note that whichever adhesive material is used as the bonding layer, the thickness of the bonding layer is preferably 10 to 500 μm.

According to the fourth embodiment of the present invention, the silicone used as the component (A) of the thermoplastic elastomer is an organosiloxane, preferably polydimethylsiloxane and its modified forms, preferably methyl methacrylate (MMA), ethylenevinyl acetate (EVA), polyethylene (PE), or other graft modified form.

As the organosiloxanes, alkylsiloxanes are typical. More specifically, fluoromethylpolysiloxane, dimethylsiloxane, polydimethylsiloxane, and alkylarylsiloxanes (preferably, methylstyrilesiloxane, methylstyrilepolysiloxane, methylphenylsiloxane, polymethylphenylsiloxane, etc.), and the like may be mentioned.

The amount of blending of the silicone (A) is not particularly limited, but is preferably 0.1 to 10 parts by weight, more preferably 0.5 to 10 parts by weight, based upon 100 parts by weight of the total weight of the thermoplastic copolyester elastomer (B) and rubber composition (C).

The thermoplastic copolyester elastomer used as the component (B) of the thermoplastic elastomer composition in the present invention is known as a multiple block component copolymer having a polyester and polyether as main recurring units. In the present invention, this known thermoplastic copolyester elastomer is used. As typical examples of this thermoplastic copolyester elastomer, for example, the following may be mentioned.

The thermoplastic copolyester elastomer used in the present invention is a random and multiple block component copolyester composed of recurring units of a polyester and polyether, recurring units of a polyester, (poly)lactone, and polyether, or recurring units of a polyester and polyimide ether and include a copolyether ester elastomer, (poly) lactone-modified copolyether ester elastomer, and copolyether imide ester elastomer.

A suitable thermoplastic copolyether ester elastomer and (poly)lactone-modified copolyether ester elastomer may be produced by the conventionally employed esterification/condensation polymerization method from (i) at least one diol, (ii) at least one dicarboxylic acid, (iii) at least one long chain ether glycol, and, in accordance with need, (iv) at least one lactone or polylactone.

The diol (i) usable in the production of the copolyether ester elastomers and their (poly)lactone-modified forms includes saturated and unsaturated aliphatic and alicyclic dihydroxy compounds and aromatic dihydroxy compounds. These diols preferably have low molecular weights, that is, molecular weights of approximately 300 or less. As specific examples of the aliphatic and alicyclic diols, ethylene glycol, propanediol, butanediol, pentanediol, 2-methylpropanediol, 2,2-dimethylpropanediol, hexanediol, decanediol, 2-octylundecanediol, 1,2-, 1,3-, and 1,4-dihydroxycyclohexane, 1,2-, 1,3-, and 1,4-cyclohexanedimethanol, butynediol, hexenediol, and other diols having 2 to 15 carbon atoms may be mentioned. Particularly preferable diols are 1,4-butanediol and a mixture of 1,4-butanediol and hexanediol or butynediol. As specific examples of the aromatic diol, resorcinol, hydroquinone, 1,5-dihydroxynaphthalene, 4,4'-dihydroxydiphenyl, bis(p-hydroxyphenyl)methane, 2,2-bis (p-hydroxyphenyl)propane, and other diols having 6 to 19 carbon atoms may be mentioned.

Particularly suitable diols are saturated aliphatic diols having 2 to 8 carbon atoms, mixtures of such saturated aliphatic diols, and mixtures of such saturated aliphatic diols with unsaturated diols. When using two or more types of diols, at least approximately 60 mol %, in particular at least 80 mol %, based on the total amount of the diols, is preferably comprised of the same diol. The most preferred diol mixture is comprised over half by 1,4-butanediol.

The dicarboxylic acid (ii) preferably used for the production of the copolyether ester elastomers and their (poly) lactone-modified forms includes aliphatic, alicyclic, and/or aromatic dicarboxylic acids. These dicarboxylic acids are preferably ones having a low molecular weight, that is, a molecular weight of less than approximately 350, but ones having a high molecular weight, in particular, diner acids, can also be used.

As typical examples of the aliphatic and alicyclic dicarboxylic acid, sebacic acid, 1,2-cyclohexane dicarboxylic acid, 1,3-cyclohexane dicarboxylic acid, 1,4-cyclohexane dicarboxylic acid, adipic acid, glutaric acid, succinic acid, oxalic acid, azelaic acid, diethyl malonic acid, allyl malonic acid, 4-cyclohexene-1,2-dicarboxylic acid, 2-ethyl suberic acid, tetramethyl succinic acid, cyclopentane dicarboxylic acid, decahydro-1,5-naphthalene dicarboxylic acid, 4,4'-bicyclohexyl dicarboxylic acid, decahydro-2,6-naphthalene dicarboxylic acid, 4,4-methylenebis(cyclohexane dicarboxylic acid), 3,4-furan dicarboxylic acid, 1,1-cyclobutane dicarboxylic acid, and their dimer acids may be mentioned. Among these, cyclohexane dicarboxylic acid, sebacic acid, glutaric acid, and adipic acid are preferable.

As typical examples of the aromatic dicarboxylic acid, terephthalic acid, phthalic acid, isophthalic acid, bis-benzoic acid, for example, bis(p-carboxyphenyl)methane, oxybis (benzoic acid), ethylene-1,2-bis(p-oxybenzoic acid), and other substituted dicarboxyl compounds having two benzene nucleii, 1,5-naphthalene dicarboxylic acid, 2,6-naphthalene dicarboxylic acid, 2,7-naphthalene dicarboxylic acid, phenanthrene dicarboxylic acid, anthracene dicarboxylic acid, 4,4'-sulfonyldibenzoic acid, and their halo and $C_1$ to $C_{12}$ alkyl, alkoxy, and aryl substituent derivatives are included. Note that in so far as the object of the present invention is not impaired, other aromatic dicarboxylic acids in addition to these aromatic dicarboxylic acids, for example, p-($\beta$-hydroxyethoxy)benzoic acid and other hydroxyl acids may be used together.

Among the dicarboxylic acids which may be used for the production of the copolyether ester elastomers and their (poly)lactone-modified forms, an aromatic dicarboxylic acid, a mixture of two or more types of aromatic dicarboxylic acids, and a mixture of an aromatic dicarboxylic acid and an aliphatic and/or alicyclic dicarboxylic acid are preferable. An aromatic dicarboxylic acid alone is particularly preferable. Among these aromatic dicarboxylic acids, an aromatic dicarboxylic acid having 8 to 16 carbon atoms, in particular, a benzene dicarboxylic acid such as phthalic acid, terephthalic acid, and isophthalic acid and their dimethyl esters are suitable. Dimethyl terephthalate is best. When using a mixture of dicarboxylic acids or their esters, at least approximately 60 mol %, in particular at least approximately 80 mol %, of the total amount of the dicarboxylic acid is preferably the same dicarboxylic acid. In particular, one in which dimethyl terephthalate comprises at least approximately 60 mol % of the dicarboxylic acid mixture is preferred.

The long chain ether glycol (iii) used for the production of the thermoplastic copolyether ester elastomers and their (poly)lactone-modified forms is preferably a poly(oxyalkylene) glycol and copoly(oxyalkylene) glycol having a molecular weight of approximately 400 to approximately 12,000. A suitable poly(oxyalkylene) unit has a molecular weight of approximately 900 to approximately 4,000 and is derived from a long chain ether glycol having a ratio of oxygen to carbon, except at its side chain, of approximately 1.8 to approximately 4.3.

As typical examples of a suitable poly(oxyalkylene) glycol, poly(ethylene ether) glycol, poly(propylene ether) glycol, poly(tetramethylene ether) glycol, ethylene oxide terminated poly(propylene ether) glycol, a random or block copolymer of ethylene oxide and propylene oxide including a mostly poly(ethylene ether) chain structure copoly (propylene ether-ethyleneether)glycol, and a random or block copolymer of tetrahydrofuran and a small amount of, for example, a second monomer such as ethylene oxide, propylene oxide or methyltetrahydrofuran (used in a ratio so that the ratio of oxygen to carbon does not exceed approximately 4.3) may be mentioned. A polyformal glycol produced by a reaction of formaldehyde with for example 1,4-butanediol, 1,5-pentanediol, or another diol is also useful. Particularly preferable poly(oxyalkylene) glycols are poly(propylene ether) glycol, poly(tetramethylene ether) glycol, and a mostly poly(ethylene ether) chain structure copoly(propylene ether-ethylene ether)glycol.

If necessary, one or more types of lactones or polylactones (iv) may be blended in these copolyether esters. This type of polylactone-modified copolyether ester elastomer is disclosed in the specification of U.S. Pat. No. 4,569,973.

As a suitable lactone (iv) usable in the present invention, $\epsilon$-caprolactone is particularly preferable, but a substituted lactone substituted with a methyl group or ethyl group or lower alkyl group at the $\alpha$, $\beta$, $\gamma$, $\delta$, or $\epsilon$ position may also be used. Further, as the block unit of the copolyether ester usable in the present invention, a homopolymer or a copolymer of a monomer and another copolymerizable monomer and polylactone including a hydroxy terminated polylactone can be used.

In general, a suitable copolyether ester elastomer and its (poly)lactone-modified form is one in which the amount of the (iii) long chain ether glycol component or (poly)lactone-modified form or the total amount of the (iii) long chain ether glycol component and (iv) lactone component in the copolyether ester is approximately 5 to approximately 80% by weight. A more preferable composition is one in which the amount of the (iii) long chain ether glycol component or the total amount of the (iii) component and (iv) lactone component is approximately 10 to approximately 50% by weight.

Among these copolyether ester elastomers and their (poly)lactone-modified forms, a copolyether ester elastomer having a dicarboxylic acid component of a terephthalic acid, a diol component of 1,4-butanediol, and a long chain ether glycol of poly(tetramethylene ether)glycol may be preferably mentioned.

The polyether imide ester elastomer usable in the present invention may be produced from one or more diols, one or more dicarboxylic acids and one or more high molecular weight polyoxyalkylenediimide diacids. The production of the polyether imide ester elastomer is described in the specification of U.S. Pat. No. 4,556,705.

The polyether imide ester elastomer usable in the present invention may be produced by a method commonly used for the production of a polyester, for example a technique of esterification and condensation polymerization, to produce a random or block copolymer. Therefore, a polyether imide ester can be characterized as a reaction product of a diol and acid.

The preferable polyether imide ester elastomer usable in the present invention can be produced from (i) one or more $C_2$ to $C_{15}$ aliphatic or alicyclic diols, (ii) one or more aliphatic, alicyclic, or aromatic dicarboxylic acids or their ester derivatives, and (iii) one or more polyoxyalkylenediimide diacids. The amount of the polyoxyalkylenediimide diacid used is generally governed by the desired properties of the obtained polyether imide ester. In general, the weight ratio of the dicarboxylic acid (ii) to the polyoxyalkylenediimide diacid (iii) is approximately 0.25 to approximately 2.0, preferably approximately 0.4 to approximately 1.4.

The diol (i) usable in the production of the polyether imide ester includes saturated and unsaturated aliphatic and alicyclic dihydroxy compounds and aromatic dihydroxy compounds. These diols preferably have low molecular weights, that is, molecular weights of approximately 250 or less.

Particularly preferable diols are saturated aliphatic diols, their mixtures, and mixtures of one or more types of saturated aliphatic diols with one or more unsaturated aliphatic diols provided that the diols each has 2 to 8 carbon atoms. When using two or more diols, at least approximately 60 mol %, more preferably at least 80 mol %, of the total amount of the diols is preferably the same diol. A particularly preferable diol is one comprising 1,4-butanediol as a main component. The most preferable diol is 1,4-butanediol alone.

The dicarboxylic acid (ii) used for the production of the above polyether imide ester is selected from aliphatic and aromatic dicarboxylic acids and their ester derivatives. A preferable dicarboxylic acid is one having a molecular weight of lower than approximately 300 or one having 4 to 18 carbon atoms. However, a higher molecular weight dicarboxylic acid, in particular a dimer acid, also can be used.

Among the aliphatic, alicyclic and aromatic dicarboxylic acids usable in the production of the polyether imide ester, an aromatic dicarboxylic acid, a mixture of two or more aromatic dicarboxylic acids, and a mixture of an aromatic dicarboxylic acid and an aliphatic and/or alicyclic dicarboxylic acid are preferable. An aromatic dicarboxylic acid alone is particularly preferable. Among these aromatic dicarboxylic acids, an aromatic dicarboxylic acid having 8 to 16 carbon atoms, in particular, a benzene dicarboxylic acid such as phthalic acid, terephthalic acid, and isophthalic acid and their dimethyl esters are suitable. Dimethyl terephthalate is best.

The polyoxyalkylenediimide diacid (iii) usable for the production of the above polyether imide ester is a high molecular weight diacid having an average molecular weight larger than approximately 700, preferably larger than approximately 900. The diacid is produced by imidization of one or more tricarboxylic acid compounds including two adjoining carboxyl groups or acid anhydride groups and further a separate carboxyl group (this separate carboxyl group must not be esterizable and preferably is not imidizable) by a high molecular weight polyoxyalkylenediamine.

As the rubber composition usable as the component (C) of the thermoplastic elastomer composition in the present invention, an acrylic rubber (ACM) or a rubber composition containing acrylic rubber is used. As such an acrylic rubber, the following may be mentioned. Further, it is possible to use a blended rubber containing this acrylic rubber as a main component and another rubber stock generally used for hoses in the past (for example a diene based rubber and hydrogenates (for example NR, IR, epoxyidized natural rubber, SBR, BR (high cis BR and low cis BR), NBR, hydrogenated NBR, hydrogenated SBR), an olefin based rubber (for example, an ethylenepropylene rubber (EPDM, EPM), a maleic acid modified ethylenepropylene rubber (M-EPM), IIR, an isoprene and aromatic vinyl or diene based monomer copolymer, an acrylic rubber (ACM), ionomer), a halogen containing rubber (for example, Br-IIR, Cl-IIR, a brominated an isobutylene p-methylstyrene copolymer (BrIPMS), CR, a hydrin rubber (CHR), chlorosulfonated polyethylene (CSM), chlorinated polyethylene (CM), maleic acid modified chlorinated polyethylene (M-CM)), a sulfur-containing rubber (for example polysulfide rubber), a fluororubber (for example a vinylidene fluoride based rubber, fluorine-containing vinyl ether based rubber, or fluorine containing phosphagen based rubber), a thermoplastic elastomer (for example, a styrene based elastomer, olefin based elastomer, ester based elastomer, urethane based elastomer, or polyamide based elastomer), etc. may be mentioned). However, the rubber composition is one which does not contain silicone.

As the acrylic rubber usable as the rubber composition of the thermoplastic elastomer composition of the present invention, a cross-linkable rubber having an acryl group and epoxy group as the main chain or side chain in the molecule, for example, a copolymer rubber containing an epoxy group-containing acrylate and/or methacrylate as copolymerization components may be mentioned. The epoxy group-containing (meth)acrylate copolymer rubber used as the epoxy group-containing (meth)acrylate copolymer of the present invention is a multi copolymer rubber comprised of (1) a (meth)acrylic acid alkylester and/or (meth)acrylic acid alkoxy substituted alkylester, (2) epoxy group-containing monomer, and, in accordance with need, (3) another ethylenic unsaturated monomer capable of copolymerizing with (1) and (2).

The (meth)acrylic acid alkylester (1) used for the production of the epoxy group-containing (meth)acrylate copolymer rubber capable of being used in the present invention was explained above.

The ratio of blending of the thermoplastic copolyester elastomer (B) and the rubber composition (C) used in the present invention is preferably a (B):(C) of 20 to 90:80 to 10 (weight ratio), more preferably 30 to 80:70 to 20. If the ratio of the amount blended of B is small, the mechanical strength undesirably falls and the rubber phase becomes the matrix phase and the fluidity at extrusion etc. is impaired, while conversely if large, the flexibility is undesirably impaired.

The vulcanizing agent usable as the component (D) of the thermoplastic elastomer composition in the present invention may be any vulcanizing agent which is generally for the vulcanization of an acrylic rubber or acrylic rubber-containing composition. As specific examples, it is preferable to blend a cross-linking agent compound having two or more of at least one of carboxyl groups and carboxylic acid anhydride groups in the molecule as a carboxyl group. As typical examples of the cross-linking agent compound, for example, the following may be mentioned.

The cross-linking agent of the present invention is not particularly limited so long as it is a compound containing two or more carboxyl groups and/or one or more carboxylic acid anhydride groups in the molecule. Preferably, aliphatic, alicyclic, and aromatic polycarboxylic acids, their (partial) carboxylic anhydrides, and (partial)esterified forms of these compounds and (poly)alkylene glycol are used. As a cross-linking agent, one with a molecular weight of not more than 5,000 is preferable.

As specific examples of the aliphatic polycarboxylic acid, succinic acid, glutaric acid, pimelic acid, azelaic acid, sebacic acid, dodecane dicarboxylic acid, octadecane dicarboxylic acid, dodecenyl succinic acid, and butane tetracarboxylic acid may be mentioned. As specific examples of the alicyclic polycarboxylic acid, cyclopentane dicarboxylic acid, cyclopentane tricarboxylic acid, cyclopentane tetracarboxylic acid, cyclohexane dicarboxylic acid, cyclohexane tricarboxylic acid, methylcyclohexane dicarboxylic acid, tetrahydrophthalic acid, endomethylene tetrahydrophthalic acid, and methylenedomethylene tetrahydrophthalic acid may be mentioned. As specific examples of the aromatic polycarboxylic acid, phthalic acid, isophthalic acid, terephthalic acid, trimellitic acid, trimesic acid, and pyromellitic acid may be mentioned. As specific examples of the (partial) carboxylic anhydride, (partial)carboxylic anhydrides of these polycarboxylic acids may be mentioned. The amount of the vulcanizing agent used, the vulcanization conditions, etc. may be those used in the past.

In producing the thermoplastic elastomer composition comprised of (A) at least one silicone selected from the group consisting of organosiloxanes and their modified forms, (B) a copolyester thermoplastic resin, (C) a rubber composition containing an acrylic rubber, and (D) a vulcanizing agent for the rubber composition, the compounds other than the silicone (A) are blended, then the silicone (A) is blended.

Further, the composition of the present invention may have added to it, if necessary, a reinforcing agents, softening agent, plasticizer, antioxidant, or other compounding agent. These additives may also be mixed together with the components (A), (B), and (C).

The mixer usable for the production of the thermoplastic elastomer composition of the present invention is not particularly limited, but a screw extruder, kneader, Banbury mixer, twin-screw mixer/extruder, etc. may be mentioned. Among these, considering the mixing of the resin component and rubber component and the dynamic vulcanization of the rubber component, use of a twin-screw mixer/extruder is preferable. Further, two or more types of mixers may be used for successive mixing.

As the melt mixing conditions, the mixing temperature is for example 180 to 350° C., in particular, 180 to 300° C. is preferable, but the temperature is not particularly limited so long as it is at least the temperature at which the thermoplastic copolyester elastomer component melts. The shear rate at the time of mixing is 1000 to 8000 sec$^{-1}$, in particular, 1000 to 5000 sec$^{-1}$ is preferable.

The residence time of the melt mixing as a whole is 30 sec. to 10 min. The residence time (heating time) after adding the vulcanizing agent is preferably 15 sec. to 5 min.

The shear rate is calculated by taking the product obtained by multiplication of the number of rotations of the screw around the circle drawn by the front ends of the screw for 1 sec. and dividing by the distance between the front ends. That is, the shear rate is a value obtained by dividing the speed of the front ends by the distance between the front ends. Here, the residence time at the portion for performing the dynamic vulcanization is calculated by multiplying the filling rate with the total volume of the portion for performing the dynamic vulcanization and dividing this by the volume rate of flow.

Note that, when producing a thermoplastic elastomer composition by this process of production, the relationship between the viscosity and volume fraction of the thermoplastic elastomer and the acrylic rubber composition used at the time of the melt mixing is correlative. The relationship of the following formula is preferable at the time of ordinary mixing in a range of temperature of 180° C. to 350° C. and a shear rate of 1000 to 8000 s$^{-1}$:

$$\eta_2/\eta_1 < 4.0$$

$$(\eta_1/\eta_2)(\phi_2/\phi_1) < 1.0.$$

Where, $\eta_1$: Viscosity of thermoplastic copolyester elastomer at time of melt mixing $\eta_2$: Viscosity of acrylic rubber composition at time of melt mixing $\phi_1$: Volume fraction of thermoplastic copolyester elastomer $\phi_2$: Volume fraction of acrylic rubber composition.

By mixing in the range of the above formula, the mixing process control is stabilized, the rubber ratio is controlled, a high rubber ratio can preferably be achieved, and a thermoplastic elastomer composition which is flexible and has a high elongation at break can be obtained.

The processes of blending the silicone (A) according to the present invention include:

(1) A process of production for obtaining the thermoplastic elastomer composition of the present invention comprising simultaneously adding the component (A) when mixing the components (B) and (C) by the above process using a twin-screw mixer/extruder and then adding the component (D) for dynamic vulcanization.

(2) A process of production for obtaining the thermoplastic elastomer composition of the present invention comprising mixing the components (B) and (C) by the above process using a twin-screw mixer/extruder, then adding the component (D) for dynamic vulcanization to obtain pellets of a thermoplastic elastomer composition not containing the component (A), then supplying the component (A) and the pellets of the thermoplastic elastomer composition not including the component (A) in a predetermined ratio when extruding from a single screw extruder etc. Production is possible by either process.

In particular, the second process enables efficient dispersion in the phase of the component (B) constituting the matrix phase of the thermoplastic elastomer composition and enables a higher concentration of the component (A) at the abrasion surface with respect to the amount blended of the component (A), and therefore, is a more preferable process of production.

The hose of the present invention is composed of at least an inner tube, reinforcing layer, and outer cover and uses the thermoplastic elastomer of the present invention for the outer cover. As the material of the inner tube, like those of the conventional hoses, for example, the generally used thermoplastic resins, thermoplastic elastomers, and compositions of the same may be mentioned. While not particularly limited, a polyolefin resin, polyamide resin, polyester resin, or other thermoplastic resin and their compositions, a polyolefin thermoplastic elastomer, polyamide thermoplastic elastomer, polyester thermoplastic elastomer, polyurethane thermoplastic elastomer, and other thermoplastic elastomers and their compositions, thermoplastic elastomer compositions comprising these thermoplastic resins and thermoplastic elastomers in which rubber compositions containing vulcanized rubber compositions are dispersed in a particle state, etc. may be exemplified. In particular, a thermoplastic elastomer composition not containing the component (A) of the present invention may be preferably mentioned as a material for the inner tube.

The reinforcing layer of the hose according to the present invention may use various types of fibers used for hoses in the past. Polyester fiber, which is superior in affinity with the inner and outer covers used in the present invention and is superior in terms of economy, flexibility, strength, and modulus, may particularly be selected for use.

Various types of adhesive compositions generally used for hoses in the past may be used for the bonding layer used between the layers of the inner tube and the reinforcing layer in the present invention and/or between the layers of the reinforcing layer and outer cover. Specifically, a urethane based adhesive may be used. Further, when using an adhesive thermoplastic resin, it is possible to use a polyester copolymer resin etc. Note that in either case, the thickness of the bonding layer is not particularly limited, but preferably is 10 to 500 µm.

To produce the hose of the present invention, it is possible to use the general process of first using known extrusion and, for example, a thermoplastic elastomer comprised of a thermoplastic copolyester elastomer in which a vulcanate of acrylic rubber is dispersed (thermoplastic elastomer composition comprised of the component (B), (C), and (D) of the present invention) to produce the inner tube of the hose, coat the outer surface of the same, if necessary, with an ordinary adhesive, then wrap on it a reinforcing polyester fiber in a braid or spiral, then form a bonding layer using, for example, a thermoplastic polyester based copolymer resin by extrusion, and immediately thereafter again cover this with the thermoplastic elastomer composition as an outer cover. Of course, when producing the outer cover, the bonding layer and outer cover may be formed simultaneously. Further, it is possible to extrude the bonding layer, cool the article once, then extrude the outer cover. Note that the thickness of the bonding layer is not particularly limited, but preferably is 10 to 500 µm.

A fifth embodiment of the present invention will be explained in detail below.

As the olefin thermoplastic resin (component a) usable as the matrix in the component A, an olefin alone or a copolymer of the same, that is, ethylene, propylene, 1-butene, 1-pentene, 3-methyl-butene, 1-hexene, 3-methyl-1-pentene, 4-methyl-1-pentene, 1-octene, etc. alone or a copolymer of the same or a copolymer of an olefin alone or copolymer with a thermoplastic resin may be mentioned.

In particular, a polyolefin resin is suitably used. In the case of a polyolefin resin, a polypropylene (PP) resin, among these in particular, a polypropylene resin having an isotactic, syndiotactic, or atactic stereochemical structure, a block or random or other ethylene-propylene copolymer resin containing 1 to 50% by weight ethylene component, or one having a softening temperature of at least 110° C. and a melting temperature of not more than 160° C. is suitably used.

Further, among the polyolefin based resins satisfying the above conditions, ones having an MI (melt index) of 0.5 to 40 at 230° C. and 2.16Kg load, in particular 1 to 20, is preferable.

Further, a functional group modified polyolefin resin composed of the above polyolefin resin modified by a functional group such as a maleic anhydride may be suitably mentioned.

Further, these polyolefin resins may be used alone or in combination.

Similarly, the EPDM vulcanized rubber composition (component b) used as the domain in the component A comprises partially vulcanized EPDM. As the EPDM, a terpolymer copolymer EPDM composed of ethylene and propylene or further some dicyclopentadiene, ethylidene norbornene, 1,4-hexadiene, or some other kind of diene component and further maleic acid modified EPDM composed of these EPDMs modified by maleic anhydride etc. may be suitably used.

The olefin based thermoplastic elastomer composition used as the component A in the present invention is comprised of an olefin based thermoplastic resin (component a) as a matrix and an EPDM vulcanized rubber composition (component b) dispersed as a dispersed phase (domain) wherein at least part of the component is vulcanized.

Such a configuration may be formed by, suitably, mixing in advance the thermoplastic resin constituting the component a and the rubber composition constituting the component b (basically, the component not containing the vulcanization agent) in a twin-screw mixer/extruder etc. in the molten state to cause the rubber composition to disperse in the thermoplastic resin forming the continuous phase, then, in that state (while mixing), adding a vulcanization agent so as to cause the rubber composition to dynamically vulcanize during the mixing.

The type of the vulcanizing agent, the dynamic vulcanizing conditions (temperature, time), etc. may be suitably selected depending upon the component b added and are not particularly limited.

As the vulcanizing agent, a general rubber vulcanizing agent (cross-linking agent) may be used. Specifically, as a sulfur based vulcanizing agent, powdered sulfur, precipitated sulfur, high dispersion sulfur, surface treated sulfur, insoluble sulfur, dimorpholinedisulfide, alkylphenoldisulfide, etc. may be mentioned. For example, they may be used in amounts of about 0.5 to 4 phr (parts by weight per 100 parts by weight of the rubber component (polymer)) in the component b.

Further, as an organic peroxide based vulcanizing agent, benzoylperoxide, t-butylhydroperoxide, 2,4-dichlorobenzoylperoxide, 2,5-dimethyl-2,5-di(t-butylperoxy)hexane, 2,5-dimethylhexane-2,5-di(peroxylbenzoate), etc. may be mentioned. For example, 1 to 15 phr or so may be used.

Further, as a phenolic resin based vulcanizing agent, a bromide of an alkylphenol resin or a mixed cross-linking agent system containing stannous chloride, chloroprene, or other halogen donor and an alkylphenol resin may be mentioned. For example 1 to 20 phr or so may be used.

In addition, zinc oxide (5 phr or so), magnesium oxide (4 phr or so), lyserge (10 to 20 phr or so), p-quinonedioxime, p-dibenzoylquinonedioxime, tetrachloro-p-benzoquinone, poly-p-dinitrosobenzene (2 to 10 phr or so), and methylenedianiline (0.2 to 10 phr or so) may be exemplified.

Further, if necessary, a vulcanizing accelerator may be added. As the vulcanizing accelerator, an aldehyde-ammonia based, guanidine based, thiazole based, sulfenamide based, thiuram based, dithio acid salt based, thiurea based, or other general vulcanizing accelerator may be added for example in 0.5 to 2 phr or so.

Specifically, there may be mentioned, as an aldehyde-ammonia based vulcanizing accelerator, hexamethylenetetramine etc.;

as a guanidine based vulcanizing accelerator, diphenylguanidine etc.;

as a thiazole based vulcanizing accelerator, dibenzothiazoyldisulfide (DM), 2-mercaptobenzothiazole and its Zn salt, cyclohexylamine salt, 2-(4'-morpholinodithio) benzothiazole, etc.;

as a sulfenamide based vulcanizing accelerator, cyclohexylbenzothiazolyl-sulfenamide (CBS), N-oxydiethylenebenzothiazoyl-2-sulfenamide, N-t-butyl-2-benzothiazolesulfenamide, 2-(thymolpolynyldithio)benzothiazole, etc.;

as a thiuram based vulcanizing accelerator, tetramethylthiuramdisulfide (TMTD), tetraethylthiuramdisulfide, tetramethylthiurammonosulfide (TMTM), dipentamethylenethiuramtetrasulfide, etc.;

as the dithio acid salt based vulcanizing accelerator, Zn-dimethyldithiocarbamate, Zn-diethyldithiocarbamate, Zn-di-n-butyldithiocarbamate, Zn-ethylphenyldithiocarbamate, Te-diethyldithiocarbamate, Cu-dimethyldithiocarbamate, Fe-dimethyldithiocarbamate, pipecoline pipecoryl dithiocarbamate, etc.; and as the thiurea based vulcanizing accelerator, ethylenethiurea, diethylthiurea, etc.

Further, as the vulcanizing acceleration aid, a general rubber aid may be used at the same time. For example, zinc oxide (5 phr or so), stearic acid or oleic acid and their Zn salts (2 to 4 phr or so) etc. may be used.

The olefin thermoplastic resin (component a) and vulcanized EPDM rubber composition (component b) are blended in the component A in a ratio of the component a to component b of 85 to 20% by weight: 15 to 80% by weight, preferably a ratio of the component a to component b of 80 to 20% by weight: 20 to 80% by weight. If the amount of the component a blended is too large, the flexibility is impaired, while if too small, the mechanical strength falls and the processability becomes poor.

As the polyester based copolymer resin blended as the component B in the present invention, a polyester random copolymer and a polyester multi block component copolymer comprised of main recurring units of a polyester and polyether may be mentioned.

As the polyester random copolymer, a known thermoplastic copolyester resin is used. This thermoplastic copolyester resin is produced by the conventionally employed esterification/condensation polymerization method from (i) at least one diol and (ii) at least one dicarboxylic acid.

As the polyester multi block component copolymer, a known thermoplastic copolyester elastomer is used. As typical examples of a thermoplastic copolyester elastomer, the following may be mentioned.

The thermoplastic copolyester elastomer usable in the present invention is a random and multi block component copolyester composed of recurring units of a polyester and polyether, recurring units of a polyester, (poly)lactone, and polyether, or recurring units of a polyester and polyimide ether and include a copolyether ester elastomer, (poly) lactone-modified copolyether ester elastomer, and copolyether imide ester elastomer.

A suitable thermoplastic copolyether ester elastomer and (poly)lactone-modified copolyether ester elastomer is produced by the conventionally employed esterification/condensation polymerization method from (i) at least one diol, (ii) at least one dicarboxylic acid, (iii) at least one long chain ether glycol, and, if necessary, (iv) at least one lactone or polylactone.

The diol (i) usable in the production of the copolyester resin, copolyether ester elastomers and their (poly)lactone-modified forms includes saturated and unsaturated aliphatic and alicyclic dihydroxy compounds and aromatic dihydroxy compounds. These diols preferably have low molecular weights, that is, molecular weights of approximately 300 or less. As specific examples of the aliphatic and alicyclic diols, ethylene glycol, propanediol, butanediol, pentanediol, 2-methylpropanediol, 2,2-dimethylpropanediol, hexanediol, decanediol, 2-octylundecanediol, 1,2-, 1,3-, and 1,4-dihydroxycyclohexane, 1,2-, 1,3-, and 1,4-cyclohexanedimethanol, butynediol, hexenediol, and other diols having 2 to 15 carbon atoms may be mentioned. Particularly preferable diols are 1,4-butanediol and a mixture of 1,4-butanediol and hexanediol or butynediol.

As specific examples of the aromatic diol, resorcinol, hydroquinone, 1,5-dihydroxynaphthalene, 4,4'-dihydroxydiphenyl, bis(p-hydroxyphenyl)methane, 2,2-bis (p-hydroxyphenyl)propane, and other diols having 6 to 19 carbon atoms may be mentioned.

Particularly suitable diols are saturated aliphatic diols having 2 to 8 carbon atoms, mixtures of such saturated aliphatic diols, and mixtures of such saturated aliphatic diols with unsaturated diols. When using two or more types of diols, at least approximately 60 mol %, in particular at least 80 mol %, based on the total amount of the diols, is preferably comprised of the same diol. The most preferred diol mixture is composed over half by 1,4-butanediol.

The dicarboxylic acid (ii) preferably used for the production of the copolyester resin, copolyether ester elastomers and their (poly)lactone-modified forms includes aliphatic, alicyclic, and/or aromatic dicarboxylic acids. These dicarboxylic acids are preferably those having a low molecular weight, that is, a molecular weight of less than approximately 350, but ones with a high molecular weight, in particular, dimer acids, can also be used.

As typical examples of the aliphatic and alicyclic dicarboxylic acid, sebacic acid, 1,2-cyclohexane dicarboxylic acid, 1,3-cyclohexane dicarboxylic acid, 1,4-cyclohexane dicarboxylic acid, adipic acid, glutaric acid, succinic acid, oxalic acid, azelaic acid, diethyl malonic acid, allyl malonic acid, 4-cyclohexene-1,2-dicarboxylic acid, 2-ethyl suberic acid, tetramethyl succinic acid, cyclopentane dicarboxylic acid, decahydro-1,5-naphthalene dicarboxylic acid, 4,4'-bicyclohexyl dicarboxylic acid, decahydro-2,6-naphthalene dicarboxylic acid, 4,4-methylenebis(cyclohexane dicarboxylic acid), 3,4-furan dicarboxylic acid, 1,1-cyclobutane dicarboxylic acid, and their dimer acids may be mentioned. Among these, cyclohexane dicarboxylic acid, sebacic acid, glutaric acid, and adipic acid are preferable.

As typical examples of the aromatic dicarboxylic acid, terephthalic acid, phthalic acid, isophthalic acid, bis-benzoic acid, for example bis(p-carboxyphenyl)methane, oxybis (benzoic acid), ethylene-1,2-bis(p-oxybenzoic acid), and other substituted dicarboxy compounds having two benzene nucleii, 1,5-naphthalene dicarboxylic acid, 2,6-naphthalene dicarboxylic acid, 2,7-naphthalene dicarboxylic acid, phenanthroline dicarboxylic acid, anthracene dicarboxylic acid, 4,4'-sulfonyldibenzoic acid, and halo and $C_1$ to $C_{12}$ alkyl, alkoxy, and aryl substituent derivatives are included. Note that in so far as the object of the present invention is not impaired, other aromatic dicarboxylic acids in addition to these aromatic dicarboxylic acids, for example, p-(β-hydroxyethoxy)benzoic acid and other hydroxyl acids may be used together.

Among the dicarboxylic acids which may be used for the production of the copolyester resin, copolyether ester elastomer and its (poly)lactone-modified forms, an aromatic dicarboxylic acid, a mixture of two or more types of aromatic dicarboxylic acid, and a mixture of an aromatic dicarboxylic acid and an aliphatic and/or alicyclic dicarboxylic acid are preferable. An aromatic dicarboxylic acid alone is particularly preferable. Among these aromatic dicarboxylic acids, an aromatic dicarboxylic acid having 8 to 16 carbon atoms, in particular, a benzene dicarboxylic acid such as phthalic acid, terephthalic acid, and isophthalic acid and their dimethyl esters are suitable. Dimethyl terephthalate is best. When using a mixture of dicarboxylic acids or their esters, at least approximately 60 mol %, in particular at least approximately 80 mol %, of the total amount of the dicarboxylic acid is preferably the same dicarboxylic acid. In particular, one in which dimethyl terephthalate comprises at least approximately 60 mol % of the dicarboxylic acid mixture is preferred.

The long chain ether glycol (iii) used for the production of the thermoplastic copolyether ester elastomers and their (poly)lactone-modified forms is preferably a poly (oxyalkylene)glycol and copoly(oxyalkylene)glycol having a molecular weight of approximately 400 to approximately 12,000. A suitable poly(oxyalkylene) unit has a molecular weight of approximately 900 to approximately 4,000 and is derived from a long chain ether glycol having a ratio of oxygen to carbon, except at its side chain, of approximately 1.8 to approximately 4.3.

As typical examples of a suitable poly(oxyalkylene) glycol, poly(ethylene ether) glycol, poly(propylene ether) glycol, poly(tetramethylene ether) glycol, ethylene oxide terminated poly(propylene ether)glycol, a random or block copolymer of ethylene oxide and propylene oxide including a mostly poly(ethylene ether) chain structure copoly (propylene ether-ethylene ether) glycol, and a random or block copolymer of tetrahydrofuran and a small amount of, for example, a second monomer such as ethylene oxide, propylene oxide or methyltetrahydrofuran (used in a ratio so that the ratio of oxygen to carbon does not exceed approximately 4.3) may be mentioned. A polyformal glycol produced by a reaction of formaldehyde with for example 1,4-butanediol, 1,5-pentanediol, or another diol is also useful. Particularly preferable poly(oxyalkylene) glycols are poly(propylene ether) glycol, poly(tetramethylene ether) glycol, and a mostly poly(ethylene ether) chain structure copoly(propylene ether-ethylene ether) glycol.

If necessary, one or more types of lactones or polylactones (iv) may be blended in these copolyether esters. This type of polylactone-modified copolyether ester elastomer is disclosed in the specification of U.S. Pat. No. 4,569,973.

As a suitable lactone (iv) usable in the present invention, ε-caprolactone is particularly preferable, but a substituted lactone substituted with a methyl group or ethyl group or lower alkyl group at the α, β, γ, δ, or ε position may also be used. Further, as the block unit of the copolyether ester used in the present invention, a homopolymer or a copolymer of a monomer and another copolymerizable monomer and polylactone including a hydroxy terminated polylactone can be used.

In general, a suitable copolyether ester elastomer and its (poly)lactone-modified form is one in which the amount of the (iii) long chain ether glycol component or (poly)lactone-modified form or the total amount of the (iii) long chain ether glycol component and (iv) lactone component in the copolyether ester is approximately 5 to approximately 80% by weight. A more preferable composition is one in which the amount of the (iii) long chain ether glycol component or the total amount of the (iii) component and (iv) lactone component is approximately 10 to approximately 50% by weight.

Among these copolyether ester elastomers and their (poly)lactone-modified forms, a copolyether ester elastomer composed of a dicarboxylic acid component of terephthalic acid, a diol component of 1,4-butanediol, and a long chain ether glycol of poly(tetramethylene ether) glycol may be suitably mentioned.

The polyether imide ester elastomer usable in the present invention may be produced from one or more diols, one or more dicarboxylic acids, and one or more high molecular weight polyoxyalkylenediimide diacids. The production of the polyether imide ester elastomer is described in the specification of U.S. Pat. No. 4,556,705.

The polyether imide ester elastomer usable in the present invention may be produced by a method commonly used for the production of a polyester, for example a technique of esterification and condensation polymerization, to produce a random or block copolymer. Therefore, a polyether imide ester can be characterized as a reaction product of a diol and acid.

The preferable polyether imide ester elastomer usable in the present invention can be produced from (i) one or more $C_2$ to $C_{15}$ aliphatic or alicyclic diols, (ii) one or more aliphatic, alicyclic, or aromatic dicarboxylic acids or their ester derivatives, and (iii) one or more polyoxyalkylenediimide diacids. The amount of the polyoxyalkylenediimide diacid used is generally governed by the desired properties of the obtained polyether imide ester. In general, the weight ratio of the dicarboxylic acid (ii) to the polyoxyalkylenediimide diacid (iii) is approximately 0.25 to approximately 2.0, preferably approximately 0.4 to approximately 1.4.

The diol (i) usable in the production of the polyether imide ester includes saturated and unsaturated aliphatic and alicyclic dihydroxy compounds and aromatic dihydroxy compounds. These diols preferably have low molecular weights, that is, molecular weights of approximately 250 or less.

Particularly preferable diols are saturated aliphatic diols, their mixtures, and mixtures of one or more types of saturated aliphatic diols with one or more types of unsaturated aliphatic diols (however, the diols each having 2 to 8 carbon atoms). When using two or more types of diols, at least approximately 60 mol %, more preferably at least 80 mol %, of the total amount of the diols is preferably the same diol. A particularly preferable diol is one comprising 1,4-butanediol as a main component. The most preferable diol is 1,4-butanediol alone.

The dicarboxylic acid (ii) usable for the production of the above polyether imide ester is selected from aliphatic and aromatic dicarboxylic acids and their ester derivatives. A preferable dicarboxylic acid is one having a molecular weight of lower than approximately 300 or one having 4 to 18 carbon atoms. However, a higher molecular weight dicarboxylic acid, in particular a dimer acid, also can be used.

Among the aliphatic, alicyclic, and aromatic dicarboxylic acids usable in the production of the polyether imide ester, an aromatic dicarboxylic acid, a mixture of two or more types of aromatic dicarboxylic acids, and a mixture of an aromatic dicarboxylic acid and an aliphatic and/or alicyclic dicarboxylic acid are preferable. An aromatic dicarboxylic acid alone is particularly preferable. Among these aromatic dicarboxylic acids, an aromatic dicarboxylic acid having 8 to 16 carbon atoms, in particular, a benzene dicarboxylic acid such as phthalic acid, terephthalic acid, and isophthalic acid and their dimethyl esters are suitable. Dimethyl terephthalate is best.

The polyoxyalkylenediimide diacid (iii) usable for the production of the above polyether imide ester is a high molecular weight diacid having an average molecular weight larger than approximately 700, preferably larger than approximately 900. The diacid is produced by imidization of one or more tricarboxylic acid compounds including two adjacent carboxyl groups or acid anhydride groups and further a separate carboxyl group (this separate carboxyl group must not be esterizable and preferably is not imidizable) by a high molecular weight polyoxyalkylenediamine.

In the thermoplastic elastomer composition of the present invention, the component B imparts polarity to the olefin based thermoplastic elastomer composition of the present invention and contributes to the bondability of the polyester based thermoplastic resin and polyester fiber.

As the epoxy-group containing thermoplastic resin blended in as the component C in the present invention, a copolymer rubber containing an epoxy group-containing acrylate and/or methacrylate as copolymerization components may be mentioned. The epoxy group-containing (meth)acrylate copolymer rubber is a multi copolymer rubber composed of (1) a (meth)acrylic acid alkylester and/or (meth)acrylic acid alkoxy substituted alkylester, (2) epoxy group-containing monomer, and (3) another ethylenic unsaturated monomer which can be copolymerized with (1) and (2).

Among these, an epoxy group-containing thermoplastic resin containing at least 60 to 95% by weight of a component from an ethylene monomer and 0.5 to 15% by weight of a component from glycidyl methacrylate is preferred. In particular, one containing 65 to 90% by weight of a component from an ethylene monomer and 1 to 15% by weight of a component from glycidyl methacrylate is preferable.

The thermoplastic elastomer composition of the present invention is comprised of the components A and B blended in a weight ratio of 90 to 50:10 to 50. Further, the component C is blended in an amount of 1 to 10 parts by weight with respect to 100 parts by weight of the total amount of the components A and B. Preferably, A:B is 90 to 60:10 to 40 and C is 2 to 8 parts by weight, based upon 100 parts by weight of A+B. By using this ratio, the bondability with a polyolefin based thermoplastic resin, polyester based thermoplastic resin, and polyester fiber is superior.

In the process of production of the thermoplastic elastomer composition according to the present invention, the process of production for a known thermoplastic resin composition may be used. A batch type process of production may be used or a continuous process of production using a twin-screw mixer/extruder etc. where the thermoplastic resin is continuously fed, melted, mixed, and transported while successively adding the rubber composition or vulcanizing agent etc. to produce the elastomer composition may be used. The components a and b are sufficiently mixed and dynamically vulcanized to make the component A, then the components B and C are mixed.

An example of a preferable process of production of the thermoplastic elastomer composition of the present invention will now be explained.

The machine usable for mixing the component A (components a and b) and component B and component C in the production of the thermoplastic elastomer composition is not particularly limited, but a screw extruder, kneader, Banbury mixer, twin-screw mixer/extruder, etc. may be exemplified. Among these, when considering holding a melt of the component a (thermoplastic resin) and the component b (rubber composition) in these devices, mixing the rubber phase to finely disperse in the same, adding the vulcanizing agent (cross-linking agent) of the component c, and mixing until the cross-linking of the rubber phase is finished at a temperature for accelerating the cross-linking for dynamic vulcanization, use of a twin-screw mixer/extruder is preferable. Further, two or more types of mixers may be used for successive mixing.

That is, the component A is a thermoplastic elastomer composition produced by dynamic vulcanization (Dynamic Cure or Dynamic Cross-linking) in which the vulcanization of the rubber is promoted while mixing the thermoplastic resin and rubber composition, that is, the vulcanization of the rubber is dynamically promoted. By using such a process of production, the resultant thermoplastic elastomer composition becomes one composed of a thermoplastic resin phase at least partially forming a continuous phase in which a vulcanized rubber phase at least partially forming a discontinuous phase is finely dispersed, and therefore, the thermoplastic elastomer composition exhibits similar behavior to vulcanized rubber. Further, since at least the continuous phase is a thermoplastic resin phase, processing like with a thermoplastic resin is possible at the time of shaping for each products.

Next, an example of the process of production will be explained in more detail based on the usual mixing by a twin-screw mixer/extruder.

First, pellets of the component a are charged from a first inlet of the twin-screw mixer/extruder and blended, mixed, kneaded, and heated by the twin screws.

On the other hand, the component b is mixed using a Banbury mixer or other rubber use mixer such as kneader while adding to the rubber component, in accordance with need, a reinforcing agent, antioxidant, processing aid, etc., then is formed into a sheet of a thickness of 2 to 2.5 mm by a rubber use roll etc. as a so-called "master batch" not containing a vulcanization system. The sheet is then pelletized by a rubber use pellitizer. As explained above, the component a is melted and heated by the twin-screw mixer/extruder, then the thus pelletized component b is charged from the second inlet of the twin-screw mixer/extruder to make the component b disperse in the component a.

Note that when adding the component b, use may be made at the same time of stearic acid, zinc stearate, wax, or another processing aid. In this case, the component b and the stearic acid etc. are mixed by a Banbury mixer etc., then pelletized and charged into the twin-screw mixer/extruder component.

After this, the vulcanizing agent or vulcanization aid is charged from a third inlet of the twin-screw mixer/extruder to cause vulcanization (dynamic vulcanization) of the component b while mixing.

By vulcanizing in this way, the vulcanization is performed in the state with the component b fully dispersed in the component a and further in the state with the component b of a sufficient fineness so a component A is prepared comprising the component a forming the continuous phase (i.e., matrix) in which the at least partially partially vulcanized component b is stably dispersed as the dispersed phase (i.e., domain). Such a thermoplastic elastomer composition (i.e., component A) is preferably comprised with at least part of the thermoplastic resin forming the continuous phase and at least part of the rubber composition forming the discontinuous phase and with a particle size of the vulcanized rubber composition forming the discontinuous phase of not more than 50 $\mu$m, more preferably 10 to 1 $\mu$m.

By using such a component A, it is possible to obtain desirable results in terms of the melt fluidity, rubber elasticity, etc. of the obtained thermoplastic elastomer composition of the present invention (i.e., shaped article).

The thermoplastic elastomer composition of the present invention is produced by extruding the above prepared olefin based thermoplastic resin composition (i.e., component A) into strands by a twin-screw mixer/extruder, pelletizing the same by a resin use pellitizer, then mixing the pellets with the component B and the component C in a molten state. Next, an extruder having a melt extrusion mechanism or a simplified extruder or a general resin use injection molding machine or simplified injection molding machine may be used to extrude or injection mold the same into various shapes needed for each products.

Further, to the composition of the present invention, if necessary, a reinforcing agent, softening agent, antioxidant, or other compounding agent may be added. The compounding agents may be added to the rubber component during the above mixing, but the compounding agents other than the vulcanization agent may be premixed before mixing and further may be added during the above mixing.

Note that the mixing conditions, the type and amount of the vulcanizing agent used, the vulcanization conditions (e.g., temperature etc.), etc. may be suitably determined in accordance with the formulation of the rubber composition to be added and the amount of the rubber composition blended and are not particularly limited.

As the melt mixing conditions of the component a and the component b, the mixing temperature is, for example, 150 to 350° C., in particular, 150 to 300° C. is preferable, but it is not particularly limited so long as it is at least the temperature where the olefin thermoplastic resin component melts. The shear rate at the time of mixing is 1000 to 8000 sec$^{-1}$, in particular, 1000 to 5000 sec$^{-1}$ is preferable.

The residence time of the melt mixing as a whole is 30 sec. to 10 min. The residence time (or heating time) after adding the vulcanizing agent is preferably 15 sec. to 5 min.

The shear rate is calculated by taking the product obtained by multiplication of the number of rotations of the screw around the circle drawn by the front ends of the screw for 1 sec. and dividing by the distance between the front ends. That is, the shear rate is a value obtained by dividing the speed of the front ends by the distance between the front ends.

Here, the residence time at the portion for performing the dynamic vulcanization is calculated by multiplying the filling rate with the total volume of the portion for performing the dynamic vulcanization and dividing this by the volume rate of flow.

As the melt mixing conditions of the component A, component B, and component C, the mixing temperature is, for example, 150 to 350° C., in particular, 150 to 300° C. is preferable. The shear rate at the time of mixing is 10 to 8000 $sec^{-1}$, in particular, 50 to 5000 $sec^{-1}$ is preferable.

The thermoplastic elastomer composition of the present invention is improved in the adhesion with polyester fiber and further is not impaired in the oil resistance or heat resistance properties of a dynamically vulcanized olefin thermoplastic elastomer composition. As a result, it is possible to produce a laminate using an olefin based thermoplastic elastomer composition and polyester fiber as compared with the past where it had been difficult to use the two while maintaining their superior properties. The thermoplastic elastomer composition of the present invention may be used not only as a structural layer, but also as a bonding layer.

Accordingly, the present invention can provide a thermoplastic elastomer composition able to withstand repeated deformation under a high temperature such as 120° C. and a laminate of the elastomer composition and a polyester fiber.

Further, since the thermoplastic elastomer composition of the present invention is superior in bondability with a polyolefin resin, it may be bonded with a resin comprising polyolefin resin as a main component.

In the fifth embodiment of the present invention, further, there is provided a laminate wherein at least the thermoplastic elastomer composition of the present invention is bonded by hot melting to a polyester fiber. Here, the thermoplastic elastomer composition of the present invention may be directly bonded by hot melting with the polyester fiber or may be bonded through a polyester copolymer resin etc.

As cases where the thermoplastic elastomer composition of the present invention is directly bonded by hot melting with the polyester fiber, there may be considered a laminate in which the composition of the present invention forms a structural layer and is bonded with the reinforcing layer polyester fiber without a bonding layer and a laminate in which a bonding layer composed of the composition of the present invention is interposed between a structural layer comprised of another resin or composition and a polyester fiber reinforcing layer. In the latter case, as the other resin or composition, a polyolefin thermoplastic resin, polyester thermoplastic resin, EPDM/polypropylene thermoplastic elastomer composition, etc. may be mentioned.

As an EPDM/polypropylene thermoplastic elastomer composition, the component A used for the thermoplastic elastomer composition of the present invention may be mentioned.

When the composition of the present invention is bonded with the polyester fiber layer through a bonding layer, as the bonding layer, a polyester copolymer resin, a composition composed of a mixture of a modified olefin thermoplastic resin and polyester copolymer resin, etc. may be mentioned, but a polyester based copolymer resin is preferably used. As a polyester based copolymer resin, the component B used for the thermoplastic elastomer composition of the present invention may be mentioned.

The laminate of the present invention includes one where the composition of the present invention is used as both the bonding layer and a structural layer in a single laminate, one in which the composition of the present invention is used in a plurality of structural layers or bonding layers, ones in which a repeating structure is adopted, etc.

As specific examples of the laminate, a belt, tire, shaped article, hose, etc. may be mentioned, but the invention is not limited to the above examples so long as a laminate structure is adopted.

As an example of a laminate using the thermoplastic elastomer composition of the present invention, in particular a hose may be suitably mentioned. The present invention will be explained in further detail below using, as an example, a hose, but the structure of the hose of the present invention is not limited to the following specific examples. There may be multiple layers of the outer cover and inner tube and further there may be multiple layers of the bonding layer and reinforcing layer.

Figure 2:
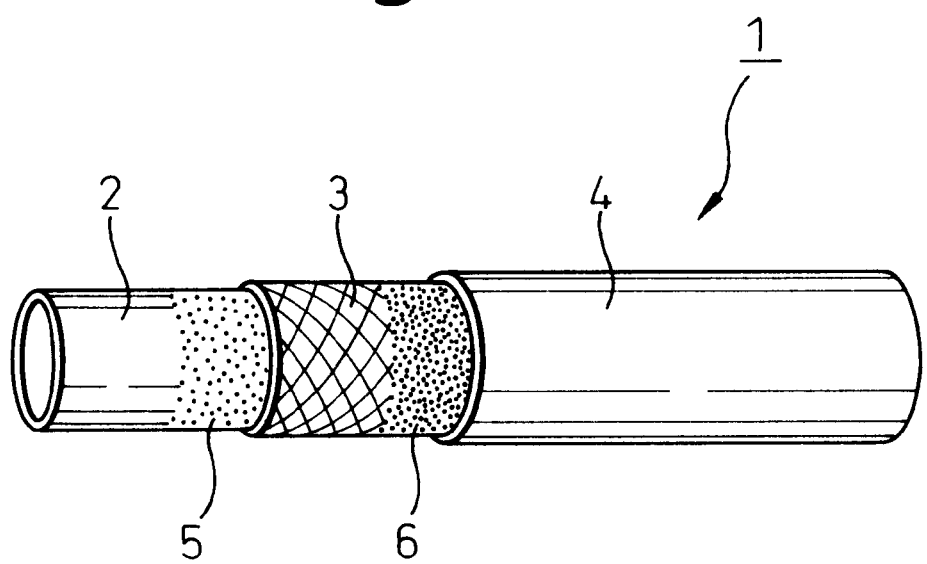
FIG. 2 is a schematic view of the hose of another embodiment according to the present invention.

Explaining an example of the hose of the present invention, it has the structure shown in FIG. 2. The hose 1 is comprised of an inner tube 2, a bonding layer 5 between the inner tube and reinforcing layer, a reinforcing layer 3, a bonding layer 6 between the reinforcing layer and outer cover, and an outer cover 4.

The composition of the present invention may be used for the inner tube 2, bonding layer 5, bonding layer 6, or outer cover 4.

For the outer cover 4, in addition to the composition of the present invention, a suitably selected composition (resin) capable of being used may be used for a general high pressure flexible hose but the outer cover 4 (when the outer cover is of a multilayer structure, the innermost layer) is preferably the thermoplastic elastomer composition of the present invention. As other compositions for constituting the outer cover 4, a polyolefin thermoplastic resin, polyester copolymer resin, EPDM/polypropylene thermoplastic elastomer composition, etc. may be suitably used. As an EPDM/polypropylene thermoplastic elastomer composition, the component A used for the thermoplastic elastomer composition of the present invention may be mentioned. As the bonding layer 6, a polyester copolymer resin, a composition composed of a mixture of a modified olefin thermoplastic resin and polyester copolymer resin, etc. may be mentioned, but a polyester copolymer resin is preferably used. As the polyester copolymer resin, the component B used for the thermoplastic elastomer composition of the present invention may be mentioned.

The hose of the present invention may be of a configuration without a bonding layer 6, but in this case the outer cover 4 (when the outer cover is of a multilayer structure, the innermost layer) is the elastomer composition of the present invention.

Further, the bonding layer 6 may be composed of the thermoplastic elastomer composition of the present invention. In this case, as the outer cover 4, one made of a polyolefin resin, polyester resin, EPDM/polypropylene thermoplastic elastomer composition, etc. may be mentioned.

The reinforcing layer constituting the hose of the present invention is preferably a layer comprised by braiding a polyester fiber or wrapping it in a spiral.

In so far as the properties of the hose of the present invention are not impaired, the inner tube may be composed of a material other than the composition of the present invention. The substance comprising the inner tube may be the thermoplastic elastomer composition of the present invention, but it is not particularly limited so long as it has the flexibility and heat resistance of an extent not impairing the properties of the hose of the present invention.

The bonding layer 5, when other than the composition of the present invention, may be suitably selected depending upon the inner tube. For example, when the inner tube (when the inner tube is multilayer, the layer contacting the bonding layer 5) is composed of a polyester copolymer resin or a thermoplastic elastomer composition containing a polyester copolymer resin, a urethane based ordinary temperature-curing type adhesive, polyester based copolymer resin, etc. may be mentioned.

In the composition of the present invention, the epoxy group-containing thermoplastic resin (i.e., component C) works as a compatibilizer, contributes to the bonding with the rubber particles dispersed in the olefin thermoplastic resin at the interface of the thermoplastic resin, improves the elongation and tear properties, and therefore enables production of a thermoplastic elastomer composition superior in both elongation and tear properties and having a high breakage resistance and, further, enables a high bonding strength even when used as a bonding layer. By using this composition of the present invention, it becomes possible to produce a hose satisfactory in the impulse resistance.

Such a hose of the present invention can be easily produced by a known process, that is, by extruding a thermoplastic elastomer composition.

The sixth aspect of the present invention is one in which a laminate is successfully obtained between a layer of a thermoplastic elastomer composition comprised of a polyolefin thermoplastic resin in which is blended an at least partially cross-linked elastomer component and a fiber reinforcing layer by using a thermoplastic adhesive resin such as a modified polyolefin resin or polyester resin. For example, the thermoplastic adhesive resin is interposed between the hose inner tube/fiber reinforcing layer, the fiber reinforcing layers, or the fiber reinforcing layer/outer cover and bonds the same by hot melting under a heat reaction. Since it is possible to obtain a strong bond between all of the above layers, it becomes possible to remarkably improve the hose durability. Further, it becomes possible to bond a thermoplastic elastomer composition composed of a difficult to bond material—a polyolefin thermoplastic resin—in which is blended an at least partially cross-linked elastomer component.

In the present invention, as the thermoplastic adhesive resin, a maleic anhydride or epoxy-modified polyolefin resin or polyester resin is used. Here, as the modified polyolefin resin, for example, polypropylene resins (PP) such as an isotactic or syndiotactic polypropylene, a random or block copolymer of polypropylene with ethylene or the like, a high density polyethylene (HDPE), low density polyethylene (LDPE), linear low density polyethylene (L-LDPE), or other polyethylene resin or ethylene-ethyl acrylate copolymer (EEA), ethylene-methyl acrylate copolymer (EMA), or other general polyolefin resin may be used.

The method of modifying these polyolefin resins by a maleic anhydride or epoxy etc. is not particularly limited and may be a conventionally known method. For example, a maleic anhydride modified polypropylene resin may be obtained using a single screw extruder or twin-screw mixer/extruder and mixing into the polypropylene 1% by weight of maleic anhydride and 0.05% by weight of peroxide to cause a grafting reaction.

Further, as the polyester resin used here, there are ones obtained by condensation polymerization of a polyhydric alcohol and a polyhydric carboxylic acid, but a polyester resin comprised mainly of terephthalic acid and 1,4-butanediol and containing another copolymerization component (for example isophthalic acid, adipic acid, sebacic acid, or other carboxylic acid or ethylene glycol or other polyhydric alcohol) is preferably used. Further, it may be a polyester block copolymer elastomer comprising such a polyester resin as a hard segment and polycaprolactam, polytetramethylene glycol, etc. as a soft segment. This may also be preferably used.

Further, as the thermoplastic adhesive resin, a blended resin of a maleic anhydride-modified polyolefin resin and/or epoxy-modified polyolefin resin with a polyester resin may be more preferably used. The weight ratio of the blended resin may be any in the range where the effect of the blended resin is manifested, but a weight ratio of the maleic anhydride-modified polyolefin resin and epoxy-modified polyolefin resin of 95/5 to 5/95 is preferable.

Further, a blend of the maleic anhydride-modified polyolefin resin and/or epoxy-modified polyolefin resin with a polyester resin sometimes requires improvement of physical properties in terms of the compatibility. In this case, a blended resin of the maleic anhydride-modified polyolefin resin and epoxy-modified polyolefin resin with a polyester resin may be preferably used in the point of improvement of the physical properties.

In particular, it is preferable that one of the maleic anhydride-modified polyolefin resin or epoxy-modified polyolefin resin be a modified resin of a polypropylene resin or polyethylene resin and that the other be a modified resin of an ethylene-acrylic acid ester copolymer in terms of compatibility, that is, one function as a so-called compatibilizer.

Further, to obtain a better bonding in the present invention, the maleic anhydride-modified polyolefin resin or epoxy-modified polyolefin resin is preferably a modified resin of a polypropylene resin having a melt index of not more than 5.0 g/10 min. determined at the conditions of 230° C., a load of 2.16 kgf, an orifice diameter of 1 mm, and 10 min. One with a melt index of 3 to 0.5 g/10 min. is more preferable.

Further, it is preferable that the maleic anhydride-modified polyolefin resin or epoxy-modified polyolefin resin be a modified resin of a polypropylene resin having a melt index of not more than 5.0 g/10 min. determined at the conditions of 190° C., a load of 2.16 kgf, an orifice diameter of 1 mm, and 10 min. One with a melt index of 3 to 0.1 g/10 min. is more preferable.

Further, to obtain better bonding in the present invention, in the maleic anhydride-modified polyolefin resin or epoxy-modified polyolefin resin, a modified resin of an ethylene-acrylic acid ester copolymer having a melt index of at least 6.0 g/10 min. determined under the conditions of 190° C., a load of 2.16 kgf, an orifice diameter of 1 mm, and 10 min. is preferable. One having a melt index in the range of 9.0 to 20.0 g/10 min. is more preferable.

Further, to obtain better bonding in the present invention, in the polyester resins, a polyester resin having a melt index of not more than 20.0 g/10 min. determined under the conditions of 190° C., a load of 2.16 kgf, an orifice diameter of 1 mm, and 10 min. is preferable. One having a melt index of not more than 15 g/10 min. is more preferable.

Further, as the thermoplastic elastomer composition composed of a polyolefin thermoplastic resin and at least partially cross-linked elastomer component used as the bonded layer in the present invention, for example, used as the hose inner tube and/or outer cover, for example, a polypropylene, polyethylene, ethylene-vinyl acetate copolymer, or other polyolefin thermoplastic resin in which is blended the following type of elastomer component at least partially cross-linked is used.

That is, as the elastomer of the elastomer component, for example a diene rubber or its hydrogenates (for example, NR, IR, epoxylated natural rubber, SBR, BR (high cis BR, low cis BR), NBR, hydrogenated NBR, hydrogenated SBR) or an olefin rubber (for example ethylenepropylene rubber (EPDM, EPM), maleic acid modified ethylenepropylene rubber (M-EPM), IIR, isobutylene and aromatic vinyl or diene based monomer copolymer, acrylic rubber (ACM), ionomer), or a halogen-containing rubber (for example, Br-IIR, Cl-IIR, bromide of an isobutylene and p-methylstyrene copolymer (Br-IPMS), CR, hydrin rubber (CHC, CHR), chlorosulfonated polyethylene (CSM), chlorinated polyethylene (CM), maleic acid modified chlorinated polyethylene (M-CM)) or other elastomer alone or in mixtures may be mentioned.

Further, the above elastomer component may have added to it, in addition to the elastomer, any other compounding agents ordinarily added to elastomers, in necessary amounts, so as to improve the fluidity of the elastomer at the time of heating, the heat resistance, physical strength, cost, etc. such as a reinforcing agent, filler, softening agent, antioxidant, and processing aid.

Further, the ratio of the thermoplastic resin component and elastomer component constituting the above thermoplastic elastomer composition of the present invention is not particularly limited, but the elastomer component is preferably 10 to 90% by weight, based upon the weight of the thermoplastic resin. If the amount of the thermoplastic resin blended is too large, the rubber elasticity of the resultant thermoplastic elastomer composition falls and the heat softening resistance drops. Conversely, if too small, the melt fluidity of the thermoplastic elastomer composition falls and shaping becomes difficult. If further smaller, the thermoplastic resin component serving as the continuous phase and the elastomer component serving as the dispersed phase will not physically works and mixing will become difficult.

Further, the elastomer component in the thermoplastic elastomer composition of the present invention is at least partially cross-linked. The cross-linking of the elastomer component may be performed by mixing the thermoplastic resin and the elastomer component not containing the cross-linking agent in a molten state in a twin-screw mixer/extruder etc. to cause the elastomer component to disperse as the dispersed phase (i.e., domain) in the thermoplastic resin forming the continuous phase (i.e., matrix) and, simultaneously, adding and mixing the cross-linking agent for cross-linking the elastomer component, that is, by dynamic cross-linking. The dynamic cross-linking is not limited to the above method. A conventional method may be used. For example, it is possible to use a sulfur based, organic peroxide based, metal oxide based, phenolic resin, quinonedioxime, or other cross-linking agent for cross-linking at a temperature of 150° C. to 300° C.

The cross-linking conditions (e.g., temperature, time, etc.) etc. may be suitably determined depending upon the composition of the elastomer component to be added and are not particularly limited. As the cross-linking agent, the above ones may be used, but specifically, as a sulfur based vulcanization agent, powdered sulfur, precipitated sulfur, high dispersion sulfur, surface treated sulfur, insoluble sulfur, dimorpholinedisulfide, alkylphenoldisulfide, etc. may be mentioned. For example, they may be used added in amounts of about 0.5 to 4 parts by weight per 100 parts by weight of the elastomer. Further, as the organic peroxide based cross-linking agent, benzoylperoxide, t-butylhydroperoxide, 2,4-dichlorobenzoylperoxide, 2,5-dimethyl-di(t-butylperoxy)hexane, 2,5-dimethylhexane-2,5-di(peroxylbenzoate), etc. may be mentioned. For example, it may be used in an amount of 1 to 15 parts by weight based upon 100 parts by weight of the elastomer. Further, as a phenol resin based cross-linking agent, a bromide of an alkylphenol resin or a mixed cross-linking system containing stannous chloride, chloroprene, or another halogen donor and an alkylphenolic resin may be mentioned. For example 1 to 20 parts by weight or so may be added.

In addition, zinc oxide (5 phr or so), magnesium oxide (4 phr or so), lyserge (10 to 20 phr or so), p-quinonedioxime, p-dibenzoylquinonedioxime, tetrachloro-p-benzoquinone, poly-p-dinitrosobenzene (2 to 10 phr or so), and methylenedianiline (0.2 to 10 phr or so) may be exemplified. Further, if necessary, a cross-linking accelerator may be added. As the accelerator, an aldehyde-ammonia based, guanidine based, thiazole based, sulfenamide based, thiuram based, dithio acid salt based, thiurea based, or other general accelerator may be added for example in 0.5 to 2 phr or so. Further, a general cross-linking acceleration aid may also be added.

Further, the various compounding agents (other than the cross-linking agent) may be added into the thermoplastic resin or elastomer during the above mixing or may be premixed before the mixing.

As the mixer used in the mixing of the thermoplastic resin and elastomer component in the present invention, the above twin-screw mixer/extruder is preferable in terms of the dynamic cross-linking, but a screw extruder, kneader, Banbury mixer, etc. may also be used for the mixing. Further, two or more types of mixers may be used for successive mixing.

As the conditions of the above mixing in the molten state, the temperature thermoplastic resin may be any above the temperature of melting. Further, the sheare rate at the time of mixing may be 1000 to 7500 sec$^{-1}$. The mixing time should be from 30 sec. to 10 min. Further, when adding a cross-linking agent, the cross-linking time after addition should be 15 sec. to 5 min. The thermoplastic elastomer composition mixed by the above method may be shaped by a usual method for thermoplastic resins, for example, injection molding or extrusion.

The fiber reinforcing layer serving as the other bonded layer in the present invention is not particularly limited. As the reinforcing fiber, nylon, vinylon, rayon, polyester, aromatic polyamide fiber, or other organic fibers are preferably used. Further, in the hose of the present invention, the fiber reinforcing layer may be formed by braiding or wrapping in a spiral. Further, the fiber reinforcing layer may be formed by cutting a fiber woven fabric into a tape and wrapping this around the tube in a spiral manner. The form is not particularly limited.

Further, the structure of the hose of the present invention is not particularly limited, but a thermoplastic elastomer composition comprised of a polyolefin based thermoplastic resin in which is blended an at least partially cross-linked elastomer component is used for at least one of the inner tube or outer cover. Further, at least one fiber reinforcing layer is disposed inbetween the inner tube and the outer cover. Further, the thermoplastic adhesive resin of the present invention may be disposed between at least the thermoplastic elastomer composition comprised of the polyolefin based thermoplastic resin in which is blended the at least partially cross-linked elastomer component and the fiber reinforcing layer. If not, the bonding between the above thermoplastic elastomer composition and fiber reinforcing layer becomes insufficient and the result is the hose durability is remarkably impaired. Further, when there are two or more fiber reinforcing layers in the hose of the present invention, arrangement of the thermoplastic adhesive resin of the present invention between the fiber reinforcing layers is more preferable from the viewpoint of the resistance to bursting pressure of the hose. Further, in the hose of the present invention, it is possible to use another thermoplastic elastomer composition or other resin at one of the inner tube or outer cover in accordance with need. In this case, for the bonding between the fiber reinforcing layer and this other thermoplastic elastomer composition or other resin layer, in addition to the thermoplastic adhesive resin of the present invention, an isocyanate based, phenol resin based, epoxy resin based, or urethane based adhesive may be used.

The hose of the present invention can for example by produced in the following way.

That is, a thermoplastic elastomer composition or in accordance with need a thermoplastic resin for the inner tube is extruded on a mandrel coated in advance with a releasing agent so as to form the inner tube. Next, a bonding layer is formed on the inner tube. When using the thermoplastic adhesive resin of the present invention, it is possible to simultaneously melt and extrude this with the inner tube so as to form the bonding layer. A fiber reinforcing layer is then formed on top of this. The fiber reinforcing layer may be formed by the above methods. When there are a plurality of fiber reinforcing layers, a bonding layer is formed if necessary between the reinforcing layers. A bonding layer is then formed on top of this and then the outer cover is formed by extrusion in the same way as the inner tube. In the case of a process forming the thermoplastic adhesive resin of the present invention between the fiber reinforcing layer and outer cover, the thermoplastic adhesive resin and the thermoplastic resin or thermoplastic elastomer composition for forming the outer cover may be simultaneously melt extruded. By then removing the mandrel after formation of the hose, the desired hose can be obtained.

While a mandrel was used in the process of production of the above hose, since the hose of the present invention does not require a vulcanization step after cross-linking the rubber such as in an ordinary rubber hose or a hose of a composite rubber/resin structure, there is no compression deformation due to the heat at the time of pressing and heating or deformation etc. due to the pressure applied at the time of heating, therefore the dimensional precision of the hose is easy to maintain. Accordingly, of course, it can be produced without using a mandrel except when strict dimensional precision is required.

The thermoplastic elastomer composition constituting the inner tube and outer cover of the hose according to the seventh embodiment of the present invention means one which is comprised of a blend of a sufficient amount of a thermoplastic copolyester elastomer to give thermoplasticity and a sufficient amount of an at least partially vulcanized acrylic rubber to give rubbery elasticity wherein the thermoplastic copolyester elastomer component at least partially forms a continuous phase (i.e., matrix phase) in which the at least partially vulcanized acrylic rubber is present in the rubber component as a discontinuous phase (i.e., dispersed phase). A thermoplastic resin may further be dispersed in the discontinuous phase (i.e., rubber phase) to form a so-called "salami" structure.

The thermoplastic copolyester elastomer serving as the first component of the the thermoplastic elastomer composition of the present invention is known as a multi block component of copolymer having a polyester and a polyether as main recurring units. In the present invention, such known thermoplastic copolyester elastomers are used. As typical examples of such thermoplastic copolyester elastomers, for example, the following may be mentioned.

The thermoplastic copolyester elastomer used in the present invention is a random and multi block component of copolyester comprised of recurring units of a polyester and polyether, recurring units of a polyester, (poly)lactone, and polyether, or recurring units of a polyester and polyimide ether and include a copolyether ester elastomer, (poly) lactone-modified copolyether ester elastomer, and copolyether imide ester elastomer.

A suitable thermoplastic copolyether ester elastomer and (poly)lactone-modified copolyether ester elastomer is produced by the conventionally employed esterification/condensation polymerization method from (i) at least one diol, (ii) at least one dicarboxylic acid, (iii) at least one long chain ether glycol, and, if necessary, (iv) at least one lactone or polylactone.

The diol (i) usable in the production of the copolyether ester elastomers and their (poly)lactone-modified forms include saturated and unsaturated aliphatic and alicyclic dihydroxy compounds and aromatic dihydroxy compounds. These diols preferably have low molecular weights, that is, molecular weights of approximately 300 or less. As specific examples of the aliphatic and alicyclic diols, ethylene glycol, propanediol, butanediol, pentanediol, 2-methylpropanediol, 2,2-dimethylpropanediol, hexanediol, decanediol, 2-octylundecanediol, 1,2-, 1,3-, and 1,4-dihydroxycyclohexane, 1,2-, 1,3-, and 1,4-cyclohexanedimethanol, butynediol, hexenediol, and other diols having 2 to 15 carbon atoms may be mentioned. Particularly preferable diols are 1,4-butanediol and a mixture of 1,4-butanediol and hexanediol or butynediol. As specific examples of the aromatic diol, resorcinol, hydroquinone, 1,5-dihydroxynaphthalene, 4,4'-dihydroxydiphenyl, bis(p-hydroxyphenyl)methane, 2,2-bis (p-hydroxyphenyl)propane, and other diols having 6 to 19 carbon atoms may be mentioned.

Particularly suitable diols are saturated aliphatic diols having 2 to 8 carbon atoms, mixtures of such saturated aliphatic diols, and mixtures of such saturated aliphatic diols with unsaturated diols. When using two or more types of diols, at least approximately 60 mol %, in particular at least 80 mol %, based on the total amount of the diols, is preferably comprised of the same diol. The most preferred diol mixture is comprised over half by 1,4-butanediol.

The dicarboxylic acid (ii) preferably used for the production of the copolyether ester elastomers and their (poly) lactone-modified form includes aliphatic, alicyclic, and/or aromatic dicarboxylic acids. These dicarboxylic acids are preferably ones with a low molecular weight, that is, a molecular weight of less than approximately 350, but ones with a high molecular weight, in particular, dimer acids, can also be used.

As typical examples of the aliphatic and alicyclic dicarboxylic acid, sebacic acid, 1,2-cyclohexane dicarboxylic acid, 1,3-cyclohexane dicarboxylic acid, 1,4-cyclohexane dicarboxylic acid, adipic acid, glutaric acid, succinic acid, oxalic acid, azelaic acid, diethyl malonic acid, allyl malonic acid, 4-cyclohexene-1,2-dicarboxylic acid, 2-ethyl suberic acid, tetramethyl succinic acid, cyclopentane dicarboxylic acid, decahydro-1,5-naphthalene dicarboxylic acid, 4,4'-bicyclohexyl dicarboxylic acid, decahydro-2,6-naphthalene dicarboxylic acid, 4,4-methylenebis(cyclohexane dicarboxylic acid), 3,4-furan dicarboxylic acid, 1,1-cyclobutane dicarboxylic acid, and their dimer acids may be mentioned. Among these, cyclohexane dicarboxylic acid, sebacic acid, glutaric acid, and adipic acid are preferable.

As typical examples of the aromatic dicarboxylic acid, terephthalic acid, phthalic acid, isophthalic acid, bis-benzoic acid, for example bis(p-carboxyphenyl)methane, oxybis (benzoic acid), ethylene-1,2-bis(p-oxybenzoic acid), and other substituted dicarboxy compounds having two benzene nucleii, 1,5-naphthalene dicarboxylic acid, 2,6-naphthalene dicarboxylic acid, 2,7-naphthalene dicarboxylic acid, phenanthroline dicarboxylic acid, anthracene dicarboxylic acid, 4,4'-sulfonyldibenzoic acid, and halo and $C_1$ to $C_{12}$ alkyl, alkoxy, and aryl substituent derivatives are included. Note that in so far as the object of the present invention is not impaired, other aromatic dicarboxylic acids in addition to these aromatic dicarboxylic acids, for example, p-($\beta$-hydroxyethoxy)benzoic acid and other hydroxyl acids may be used together.

Among the dicarboxylic acids which may be used for the production of the copolyether ester elastomers and their (poly)lactone-modified forms, an aromatic dicarboxylic acid, a mixture of two or more types of aromatic dicarboxylic acids, and a mixture of an aromatic dicarboxylic acid and an aliphatic and/or alicyclic dicarboxylic acid are preferable. An aromatic dicarboxylic acid alone is particularly preferable. Among these aromatic dicarboxylic acids, an aromatic dicarboxylic acid having 8 to 16 carbon atoms, in particular, a benzene dicarboxylic acid such as phthalic acid, terephthalic acid, and isophthalic acid and their dimethyl esters are suitable. Dimethyl terephthalate is most preferable. When using a mixture of dicarboxylic acids or their esters, at least approximately 60 mol %, in particular at least approximately 80 mol %, of the total amount of the dicarboxylic acid is preferably the same dicarboxylic acid. In particular, one in which dimethyl terephthalate comprises at least approximately 60 mol % of the dicarboxylic acid mixture is preferred.

The long chain ether glycol (iii) usable for the production of the thermoplastic copolyether ester elastomers and their (poly)lactone-modified form is preferably a poly (oxyalkylene) glycol and copoly(oxyalkylene) glycol having a molecular weight of approximately 400 to approximately 12,000. A suitable poly(oxyalkylene) unit has a molecular weight of approximately 900 to approximately 4,000 and is derived from a long chain ether glycol having a ratio of oxygen to carbon, except at its side chain, of approximately 1.8 to approximately 4.3.

As typical examples of a suitable poly(oxyalkylene) glycol, poly(ethylene ether) glycol, poly(propylene ether) glycol, poly(tetramethylene ether) glycol, ethylene oxide terminated poly(propylene ether) glycol, a random or block copolymer of ethylene oxide and propylene oxide including a mostly poly(ethylene ether) chain structure copoly (propylene ether-ethyleneether)glycol, and a random or block copolymer of tetrahydrofuran and a small amount of, for example, a second monomer such as ethylene oxide, propylene oxide or methyltetrahydrofuran (used in a ratio so that the ratio of oxygen to carbon does not exceed approximately 4.3) may be mentioned. A polyformal glycol produced by a reaction of formaldehyde with for example 1,4-butanediol, 1,5-pentanediol, or another diol is also useful. Particularly preferable poly(oxyalkylene) glycols are poly(propylene ether) glycol, poly(tetramethylene ether) glycol, and a mostly polyethylene ether) chain structure copoly(propylene ether-ethylene ether) glycol.

If necessary, one or more lactones or polylactones (iv) may be blended in these copolyether esters. This type of polylactone-modified copolyether ester elastomer is disclosed in U.S. Pat. No. 4,569,973.

As a suitable lactone (iv) used in the present invention, $\epsilon$-caprolactone is particularly preferable, but a substituted lactone substituted with a methyl group or ethyl group or lower alkyl group at the $\alpha$, $\beta$, $\gamma$, $\delta$, or $\epsilon$ position may also be used. Further, as the block unit of the copolyether ester used in the present invention, a homopolymer or a copolymer of a monomer and another copolymerizable monomer and polylactone including a hydroxy terminated polylactone can be used.

In general, a suitable copolyether ester elastomer and its (poly)lactone-modified form is one in which the amount of the (iii) long chain ether glycol component or (poly)lactone-modified form or the total amount of the (iii) long chain ether glycol component and (iv) lactone component in the copolyether ester is approximately 5 to approximately 80% by weight. A more preferable composition is one in which the amount of the (iii) long chain ether glycol component or the total amount of the (iii) component and (iv) lactone component is approximately 10 to approximately 50% by weight.

As the copolyether ester elastomer and its (poly)lactone-modified form, a copolyether ester elastomer in which the dicarboxylic acid component is terephthalic acid, the diol component is 1,4-butanediol, and the long chain ether glycol is poly(tetramethylene ether) glycol may be suitably mentioned.

The polyether imide ester elastomer used in the present invention may be produced from one or more diols, one or more dicarboxylic acids and one or more high molecular weight polyoxyalkylenediimide diacids. The production of the polyether imide ester elastomer is described in U.S. Pat. No. 4,556,705.

The polyether imide ester elastomer used in the present invention may be produced by a method commonly used for the production of a polyester, for example a technique of esterification and condensation polymerization, to produce a random or block copolymer. Therefore, a polyether imide ester can be characterized as a reaction product of a diol and acid.

The preferable polyether imide ester elastomer used in the present invention can be produced from (i) one or more $C_2$ to $C_{15}$ aliphatic or alicyclic diols, (ii) one or more aliphatic, alicyclic, or aromatic dicarboxylic acids or their ester derivatives, and (iii) one or more polyoxyalkylenediimide diacids. The amount of the polyoxyalkylenediimide diacid used is generally governed by the desired properties of the obtained polyether imide ester. In general, the weight ratio of the dicarboxylic acid (ii) to the polyoxyalkylenediimide diacid (iii) is approximately 0.25 to approximately 2.0, preferably approximately 0.4 to approximately 1.4.

The diol (i) usable in the production of the polyether imide ester includes saturated and unsaturated aliphatic and alicyclic dihydroxy compounds and aromatic dihydroxy compounds. These diols preferably have low molecular weights, that is, molecular weights of approximately 250 or less.

Particularly preferable diols are saturated aliphatic diols, their mixtures, and mixtures of one or more types of saturated aliphatic diols with one or more types of unsaturated aliphatic diols provided that the diols each have 2 to 8 carbon atoms. When using two or more diols, at least approximately 60 mol %, more preferably at least 80 mol %, of the total amount of the diols is preferably the same diol. A particularly preferable diol is one comprising 1,4-butanediol as a main component. The most preferable diol is 1,4-butanediol alone.

The dicarboxylic acid (ii) usable for the production of the above polyether imide ester is selected from aliphatic and aromatic dicarboxylic acids and their ester derivatives. A preferable dicarboxylic acid is one having a molecular weight of lower than approximately 300 or one having 4 to 18 carbon atoms. However, a higher molecular weight dicarboxylic acid, in particular a dimer acid, also can be used.

Among the aliphatic, alicyclic, and aromatic dicarboxylic acid used in the production of the polyether imide ester, a mixture of an aromatic dicarboxylic acid and two or more types of aromatic dicarboxylic acid and a mixture of an aromatic dicarboxylic acid and aliphatic and/or alicyclic dicarboxylic acid are preferable. An aromatic dicarboxylic acid alone is particularly preferable. Among these aromatic dicarboxylic acids, an aromatic dicarboxylic acid having 8 to 16 carbon atoms, in particular, a benzene dicarboxylic acid such as phthalic acid, terephthalic acid, and isophthalic acid, and their dimethyl esters are suitable. Terephthalic acid dimethyl is best.

The polyoxyalkylenediimide diacid (iii) usable for the production of the above polyether imide ester is a high molecular weight diacid having an average molecular weight larger than approximately 700, preferably larger than approximately 900. The diacid is produced by imidization of one or more types of tricarboxylic acid compounds including two adjoining carboxyl groups or acid anhydride groups and further a separate carboxyl group (this separate carboxyl group must not be esterizable and preferably is not imidizable) by a high molecular weight polyoxyalkylenediamine.

As the acrylic rubber usable as the rubber component of the thermoplastic elastomer composition of the present invention, a cross-linkable rubber having an acryl group and epoxy group as the main chain or side chain in its molecule, for example, a copolymer rubber containing an epoxy group-containing acrylate and/or methacrylate as copolymerization components may be mentioned. The epoxy group-containing (meth)acrylate copolymer rubber used in the present invention is a multi copolymer rubber composed of (1) a (meth)acrylic acid alkylester and/or (meth)acrylic acid alkoxy substituted alkylester, (2) epoxy group-containing monomer, and, if necessary, (3) another ethylenic unsaturated monomer which can be copolymerized with (1) and (2).

The (meth)acrylic acid alkylester (1) usable for the production of the epoxy group-containing (meth)acrylate copolymer rubber was explained before.

The thermoplastic elastomer composition of the present invention is composed of a blend of the thermoplastic copolyester elastomer and acrylic rubber in a ratio of 30 to 90% by weight: 70 to 10% by weight (total 100% by weight), preferably 30 to 80% by weight: 70 to 20% by weight. If the amount blended of the thermoplastic copolyester elastomer is too great, the flexibility is undesirably impaired, while if too small, the mechanical strength falls and the rubber phase becomes the matrix phase and the fluidity at extrusion etc. is impaired.

The thermoplastic elastomer composition according to the present invention preferably has blended in it, as a third component, a cross-linking agent compound having at least two of at least one of a carboxyl group and/or carboxylic acid anhydride in a molecule. As typical examples of this cross-linking agent compound, for example, the following compounds may be mentioned.

The cross-linking agent of the present invention is not particularly limited so long as it is a compound having at least two of at least one of a carboxyl group and/or carboxylic acid anhydride in a molecule. Preferably, aliphatic, alicyclic, and aromatic polycarboxylic acids, their (partial) carboxylic acid anhydrides, and, the (partial) esterified forms of these compound and (poly)alkyleneglycol are used. As a cross-linking agent, one having a molecular weight of not more than 5,000 is preferable.

As specific examples of the aliphatic polycarboxylic acid, succinic acid, glutaric acid, pimelic acid, azelaic acid, sebacic acid, dodecane dicarboxylic acid, octadecane dicarboxylic acid, dodecenyl succinic acid, and butane tetracarboxylic acid may be mentioned. As specific examples of the alicyclic polycarboxylic acid, cyclopentane dicarboxylic acid, cyclopentane tricarboxylic acid, cyclopentane tetracarboxylic acid, cyclohexane dicarboxylic acid, cyclohexane tricarboxylic acid, methylcyclohexane dicarboxylic acid, tetrahydrophthalic acid, endomethylene tetrahydrophthalic acid, and methylenedomethylene tetrahydrophthalic acid may be mentioned. As specific examples of the aromatic polycarboxylic acid, phthalic acid, isophthalic acid, terephthalic acid, trimellitic acid, trimesic acid, and pyromellitic acid may be mentioned. As specific examples of the (partial) carboxylic acid anhydride, (partial)carboxylic acid anhydrides of these polycarboxylic acids may be mentioned.

A preferable amount of blending of the cross-linking agent compound is 0.5 to 20 parts by weight, more preferably 1 to 15 parts by weight, based upon 100 parts by weight of the acrylic rubber component. By blending in this cross-linking agent compound, the acrylic rubber dispersed phase is cross-linked, the mechanical strength is improved, and the compression set resistance is enhanced.

The components of the thermoplastic elastomer composition used in the present invention are, as mentioned above, the thermoplastic copolyester elastomer and acrylic rubber. This thermoplastic copolyester elastomer composition has at least part of the rubber component constituting it cross-linked. The thermoplastic copolyester elastomer composition may be produced by using a Banbury mixer, Brabender mixer or other mixer/extruder (twin-screw mixer/extruder) etc., holding a melt of for example the thermoplastic copolyester elastomer and the acrylic rubber in these devices, adding a vulcanizing agent (cross-linking agent) while mixing and finely dispersing the rubber phase, and mixing at a temperature accelerating the cross-linking until the rubber phase is completely cross-linked.

That is, the thermoplastic elastomer composition produced in this way is a thermoplastic elastomer composition produced by dynamic vulcanization (or Dynamic Cure or Dynamic Vulcanization) in which the vulcanization of the rubber is promoted while mixing the thermoplastic resin and rubber composition, that is, the vulcanization of the rubber is dynamically promoted. By using such a process of production, the resultant thermoplastic elastomer composition becomes one comprised of a thermoplastic resin phase at least partially forming a continuous phase in which a vulcanized rubber phase at least partially forming a discontinuous phase is finely dispersed, so the thermoplastic elastomer composition exhibits similar behavior to vulcanized rubber. Further, since at least the continuous phase is a thermoplastic resin phase, processing like with a thermoplastic resin is possible at the time of shaping.

Such a thermoplastic elastomer composition is comprised of a continuous phase of at least part of the thermoplastic resin and a discontinuous phase of at least part of the rubber composition where the discontinuous phase, that is, vulcanized rubber composition, preferably has a particle size of not more than 50 $\mu$m, further, 10 to 1 $\mu$m is more preferable.

Note that the mixing conditions and the type and amount of the vulcanizing agent used and the vulcanization conditions (e.g., temperature etc.) etc. may be suitably determined in accordance with the formulation of the rubber composition added and the amount of blending of the rubber composition and are not particularly limited.

The process of production of such a thermoplastic elastomer composition of the present invention is shown below.

The thermoplastic elastomer composition of the present invention may be produced by first adding, melting, and mixing the resin and rubber composition, then adding the vulcanizing agent while mixing to dynamically vulcanize the rubber.

Further, the composition of the present invention may have added to it, if necessary, a reinforcing agent, softening agent, antioxidant, or other compounding agent. The compounding agents may be added to the rubber component during the above mixing, but it is better to premix the compounding agents other than the vulcanization agent before the above mixing. The compounding agents for the resin component may also be premixed before the above mixing and further they may be added during the above mixing.

The mixer used for the production of the thermoplastic elastomer composition of the present invention is not particularly limited, but a screw extruder, kneader, Banbury mixer, twin-screw mixer/extruder, etc. may be mentioned. Among these, considering the mixing of the resin component and rubber component and the dynamic vulcanization of the rubber component, use of a twin-screw mixer/extruder is preferable. Further, two or more types of mixers may be used for successive mixing.

As the melt mixing conditions, the mixing temperature is, for example, 180 to 350° C., in particular, 180 to 300° C. is preferable, but the temperature is not particularly limited so long as it is at least the temperature at which the thermoplastic copolyester elastomer component melts. The shear rate at the time of mixing is 1000 to 8000 sec$^{-1}$, in particular, 1000 to 5000 sec$^{-1}$ is preferable.

The residence time of the melt mixing as a whole is 30 sec. to 10 min. The residence time (or heating time) after adding the vulcanization agent is preferably 15 sec. to 5 min.

The shear rate is calculated by taking the product obtained by multiplication of the number of rotations of the screw around the circle drawn by the front ends of the screw for 1 sec. and dividing by the distance between the front ends. That is, the shear rate is a value obtained by dividing the speed of the front ends by the distance between the front ends.

Here, the residence time at the portion for performing the dynamic vulcanization is calculated by multiplying the filling rate with the total volume of the portion for performing the dynamic vulcanization and dividing this by the volume rate of flow.

Note that, when producing a thermoplastic elastomer composition by this process of production, the relationship between the viscosity and volume fraction of the thermoplastic elastomer and the acrylic rubber composition used at the time of the melt mixing is correlative. The relationship of the following formula is preferable at the time of ordinary mixing in a range of temperature of 180° C. to 350° C. and a shear rate of 1000 to 8000 s$^{-1}$:

$$\eta_2/\eta_1 < 4.0$$
$$(\eta_1/\eta_2)(\phi_2/\phi_1) < 1.0.$$

Where, $\eta_1$: Viscosity of thermoplastic copolyester elastomer at time of melt mixing $\eta_2$: Viscosity of acrylic rubber composition at time of melt mixing $\phi_1$: Volume fraction of thermoplastic copolyester elastomer $\phi_2$: Volume fraction of acrylic rubber composition Here, the viscosity at the time of melt mixing means the melt viscosity of the component at any temperature or shear rate at the time of melt mixing. The melt viscosity of the polymer material is dependent on the temperature, shear rate (s$_{-1}$), and shear stress, so the stress and shear rate of the polymer material at any temperature at the molten state able to flow through a capillary tube, in particular, the temperature region at the time of mixing, are measured and the melt viscosity $\eta$ calculated by the following formula:

$$\eta = \sigma\gamma \text{ (where, } \sigma\text{: shear stress, } \gamma\text{: shear rate)}$$

Note that the melt viscosity was measured using a capillary rheometer (Capillograph 1C) made by Toyo Seiki.

By mixing in the range of the above formula, the process of mixing is stabilized, the rubber ratio is controlled, a high rubber ratio can preferably be achieved, and a thermoplastic elastomer composition which is flexible and has a high elongation at break can be obtained.

The reinforcing layer of the hose of the present invention may use various types of fibers used for hoses in the past. Polyester fiber, which is superior in affinity with the inner and outer covers used in the present invention and is superior in terms of economy, flexibility, strength, and modulus, may particularly be selected for use.

For the bonding layer used between the reinforcing layer and outer cover in the present invention, in particular, in the present invention, a thermoplastic resin composition containing at least 50 % by weight of a thermoplastic polyester copolymer resin where the dicarboxylic acid constituting the polyester is an aromatic dicarboxylic acid and the Young's modulus at 120° C. is at least 3.0 MPa is selected for use. As such a thermoplastic polyester copolymer resin, a block-copolyether ester elastomer containing, as an aromatic dicarboxylic acid, terephthalic acid or isophthalic acid, containing as a diol 1,4-butanediol, and containing as a long chain ether glycol poly(tetramethylene ether) glycol is particularly preferable. Regarding the Young's modulus at the time of heating the thermoplastic polyester copolymer resin, one having a Young's modulus determined at a temperature of 120° C. and a stress rate of 500 mm/min. of 3.0 to 500 MPa is preferably and 5.0 to 200 MPa is more preferable. With a Young's modulus at the time of heating of less than 3.0 MPa, the strength of the bonding layer is insufficient and the hose cannot stand the pressure at the time of use. In particular, there will be problems such as breakage of the outer cover at the metal fitting parts or detachment of the metal fittings. Further, if over 500 MPa, the bonding layer will be rigid, and therefore, the hose body will also become rigid and the flexibility will be impaired. Further, if the bonding layer becomes too rigid, the tracking of deformation at the interface of bonding with the outer cover will become poor and breakage will occur near the bonding interface.

Regarding the melt viscosity of the thermoplastic polyester copolymer resin used for the bonding layer of the present invention, one where the melt viscosity measured at a temperature of 230° C. and any shear rate of a shear rate of 50 to 200 s$^{-1}$ is 1 to 1000 Pa·s is preferable. One where it is 10 to 500 Pa·s is further preferable. With a melt viscosity of less than 1 Pa·s, the extrudability of the bonding layer becomes poor and the penetration into the reinforcing layer becomes excessive leading to hardening of the reinforcing layer, and therefore, detracting from the performance of the reinforcing layer. Further, if this is over 1000 Pa·s, the extrudability of the bonding layer becomes poor and the amount of permeation into the reinforcing layer becomes excessively low, and therefore, the bonding with the reinforcing layer becomes poorer.

As the method for forming the bonding layer of the present invention, extrusion molding is preferable. As to the timing of forming the outer cover in such extrusion, the following methods may be expected:

(1) Method of simultaneous extrusion with outer cover (2) Method of extrusion of bonding layer, followed by immediate extrusion of outer cover (before temperature of bonding layer returns to ordinary temperature), and (3) Method of forming bonding layer, cooling once, then again extruding outer cover.

Formation is possible by any of these methods, but the method (2) is more preferable from the viewpoint of the balance of the bondability, dimensional stability, and productivity.

To produce the hose of the present invention, it is possible to use the general process of first using known extrusion and, for example, a thermoplastic elastomer composition composed of a thermoplastic copolyester elastomer in which a vulcanate of acrylic rubber is dispersed to produce the inner tube of the hose, coat the outer surface of the same, if necessary, with an ordinary adhesive, then wrap on it a reinforcing polyester fiber in a braid or spiral, then form a bonding layer using, for example, a thermoplastic polyester copolymer resin by extrusion, and immediately thereafter again covering this with the thermoplastic elastomer composition as an outer cover. Of course, when producing the outer cover, the bonding layer and outer cover may be formed simultaneously. Further, it is possible to extrude the bonding layer, cool the article once, then extrude the outer cover. Note that the thickness of the bonding layer is not particularly limited, but preferably is 10 to 500 μm.

In the eighth embodiment of the present invention, the step of converting the outer surface of the inner tube to a molten state, as mentioned above, may be performed before forming the outer cover so as to reinforce the bond between the two, but more reliable bonding may be achieved by placing this step immediately before the step of forming the reinforcing layer.

Further, a sufficient bonding effect can be obtained even by performing this vulcanization step immediately after forming the first reinforcing layer and before the extrusion of the bonding layer between the reinforcing layers.

Further, in the production of the above hose, a bonding layer for the inner tube composed of a thermoplastic material and the reinforcing layer is formed between the inner tube and the reinforcing layer and, before forming the outer cover, this bonding layer is heated by a heating means to at least the softening temperature of the thermoplastic material to convert the outer surface of the bonding layer to a molten state so as to reinforce the bonding between the inner tube and the reinforcing layer.

Note that the inner tube in this case need not be composed of a thermoplastic material and may be a vulcanized rubber composition or other flexible material.

By performing the step of converting the outer surface of the bonding layer to a molten state before forming the outer cover, it is possible to strongly bond the two, but in the same way as with the outer surface of the inner tube, by placing this step immediately before the step of forming the reinforcing layer, more reliable bonding is possible and, even if performing this immediately after forming the first reinforcing layer and before the extrusion of the bonding layer between the reinforcing layers, a sufficient bonding effect can be obtained.

Further, the bonding layer between the inner tube and the reinforcing layer need not be melted by using a heater. It is also sufficiently possible to extrude the thermoplastic material from the extruder at a temperature above the softening temperature to form the bonding layer and then immediately afterwards braid the reinforcing layer. In this case, no special heating step is required, which is advantageous in terms of productivity.

Next, there is a means for strengthening the bonding between the reinforcing layers. In the production of the above hose, a bonding layer composed of a thermoplastic material located between the reinforcing layers is formed between the adjacent reinforcing layers and, before forming the outer cover, a heating means is used to heat the bonding layer between the reinforcing layers to at least the softening temperature of the thermoplastic material so as to convert the outer surface of the bonding layer between the reinforcing layers to a molten state.

The step for converting the outer surface of the bonding layer between reinforcing layers to a molten state may be performed before forming the outer cover so as to reinforce the bonding between reinforcing layers, but in the same way as the outer surface of the inner tube and the bonding layer between the inner tube and the reinforcing layer, if this step is placed immediately before the step of forming the reinforcing layer provided adjacent the outer surface of the bonding layer between reinforcing layers, a more reliable bond can be obtained. Further, a sufficient bonding effect can be obtained even if this is performed just after forming the reinforcing layer (for example, the second reinforcing layer) provided adjacent the outer surface of the bonding layer between the reinforcing layers and before the extrusion of the bonding layer between the reinforcing layers.

Further, in the same way as above, the bonding layer between reinforcing layers need not be melted in particular heater by using a heater and can be sufficiently performed by using an extruder to extrude the thermoplastic material at a temperature above the softening temperature to form the bonding layer between the reinforcing layers and then braiding the reinforcing layer In this case, no special heating step is required, which is advantageous in terms of the productivity.

The heater usable in the present invention is not particularly limited. A generally used heating apparatus using a heating means such as electric heat, hot air, infrared rays, far infrared rays, near infrared rays, ultrasonic waves, high frequency waves, or electroinduction may be used, but a heating apparatus which heats through the center of an annular heater which transfers heat by contact with the outer surface of the bonding layer may be preferably exemplified.

Note that the heater usable in the present invention may additionally include a device for preheating. For the preheating means, in the same way as explained above, generally used heating means may be broadly used, but the preheating devices using hot air, infrared rays, far infrared rays, near infrared rays, etc. may be suitably exemplified.

The process of bonding the inner tube and the reinforcing layer and the process of bonding reinforcing layers in the process of production of the above hose were explained individually, but in a hose having two or more reinforcing layers, the above process of bonding the above inner tube and the reinforcing layer and the process of bonding the reinforcing layers may be performed continuously on a single manufacturing line so as to strengthen all of the interlayer bonds.

Depending, however, upon the conditions of use or the environment of use etc. of the hose, it is possible to produce a hose sufficiently improved in durability even by performing one of the bonding between the inner tube and the reinforcing layer or the bonding between the reinforcing layers by a means other than the present invention.

The thermoplastic materials usable in the hose produced by the process of the present invention are generally used thermoplastic resins and thermoplastic elastomers and the compositions thereof the same. While not particularly limited, a polyolefin resin, polyamide resin, polyester resin, or other thermoplastic resin and their compositions, a polyolefin thermoplastic elastomer, polyamide thermoplastic elastomer, polyester thermoplastic elastomer, polyurethane thermoplastic elastomer, or other thermoplastic elastomer and their compositions, and, further, a thermoplastic elastomer composition containing these thermoplastic resins and thermoplastic elastomers in which a rubber composition including a vulcanized rubber composition is dispersed in a particle state, etc. may be exemplified.

Further, the thermoplastic material usable for the inner tube, the outer cover, and the bonding layers and the combinations thereof are not limited and may be suitably selected depending upon the properties and bondability required for the individual component layers.

Further, the material usable for the inner tube, as mentioned above, is not limited to just a thermoplastic material. When the inner tube is composed of a plurality of layers or when a bonding layer is used between the inner tube and the reinforcing layer, so long as the bonding layer between the outer most layer of the inner tube or the inner tube and the reinforcing layer is a thermoplastic material, the other portion may be a vulcanized rubber composition or other flexible material.

The fiber material comprising the reinforcing layer of the hose produced by the process for producing a hose according to the present invention is a generally used reinforcing yarn made from a vinylon fiber, rayon fiber, polyester fiber, nylon fiber, aromatic polyamide fiber, etc.

The thermoplastic resin usable for the bonding layer of the hose produced by the production process of the present invention may be any thermoplastic resin and is not particularly limited so long as it has bondability with the inner tube and/or the reinforcing layer and does not cause a remarkable decline in performance due to softening, deterioration, etc. of the bonding layer at the temperature of use, but a modified olefin thermoplastic resin, thermoplastic polyester copolymer resin, etc. having a softening temperature of at least 110° C. may be preferably exemplified.

Embodiments of the present invention will now be explained with reference to the attached figures.

Figure 3:
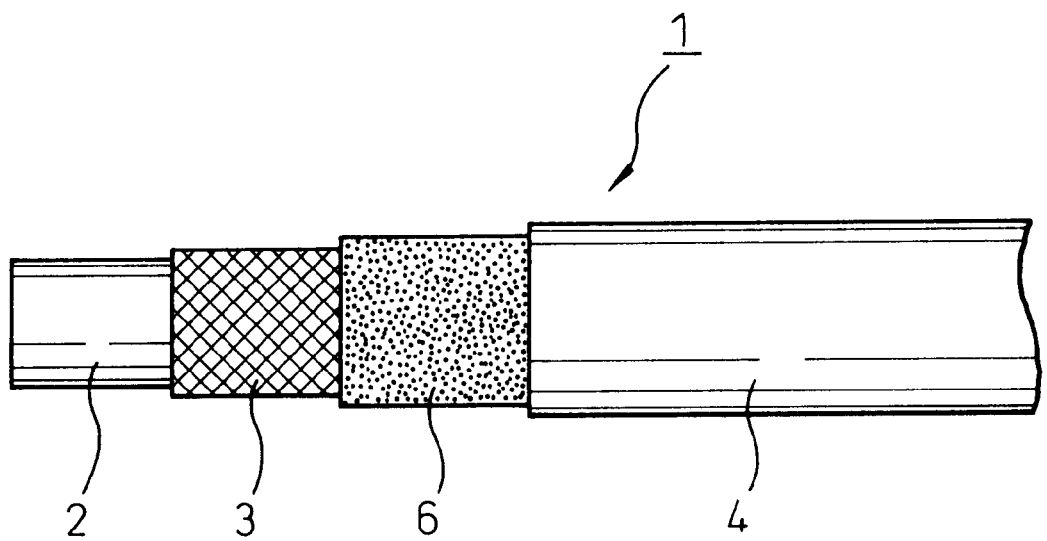
FIG. 3 is a partially cut side view of a hose of a first embodiment of the process of production according to the present invention.
Figure 4:
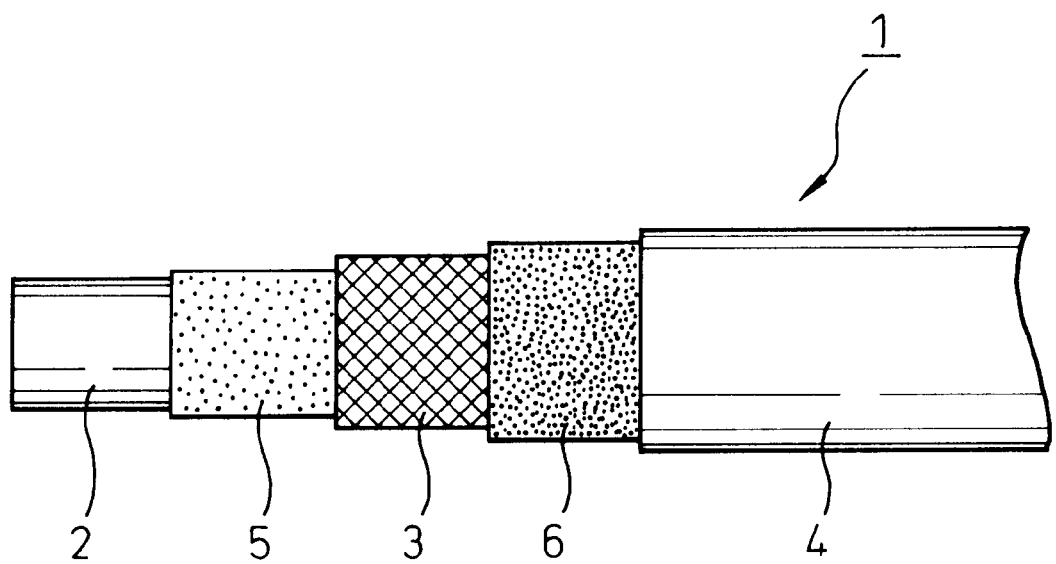
FIG. 4 is a partially cut side view of a hose of the second embodiment of the process of production according to the present invention.
Figure 5:
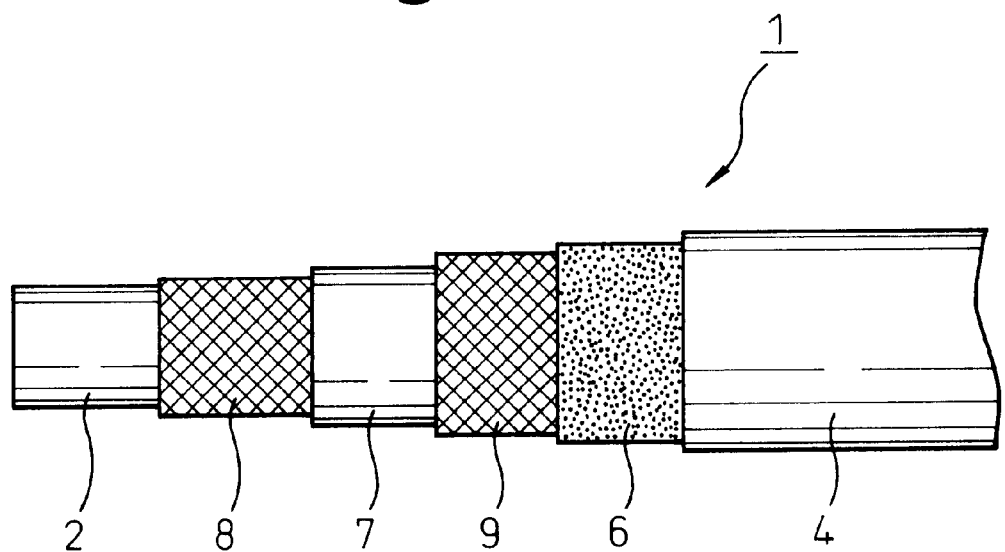
FIG. 5 is a partially cut side view of a hose of the third embodiment of the process of production according to the present invention.
Figure 6:
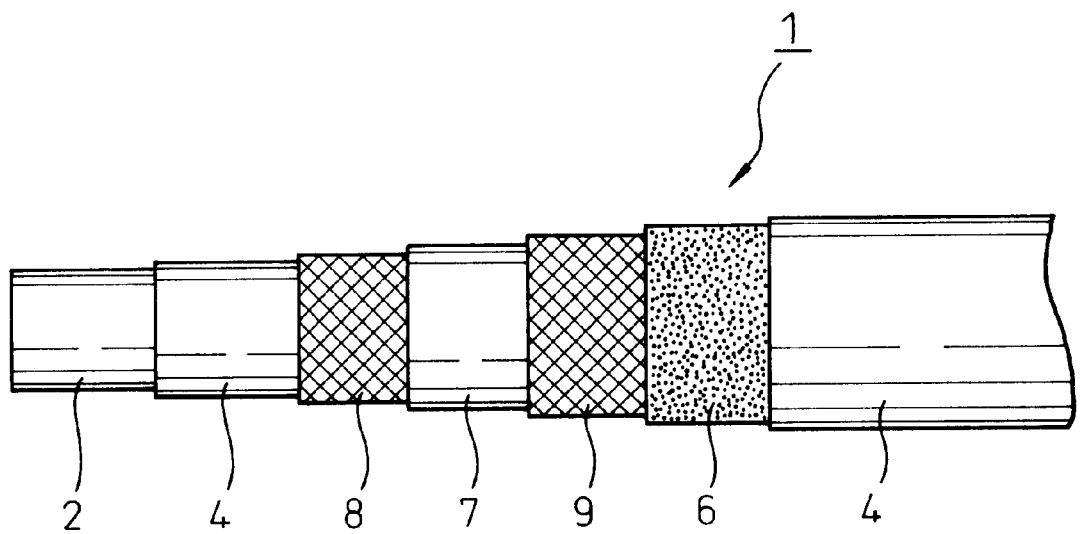
FIG. 6 is a partially cut side view of a hose of the fourth embodiment of the process of production according to the present invention.

FIG. 3, FIG. 4, FIG. 5, and FIG. 6 show embodiments of the hose produced by the production process of the present invention. FIG. 3 and FIG. 4 show embodiments of a hose having a single reinforcing layer, while FIG. 5 and FIG. 6 show embodiments of a hose having two reinforcing layers.

In the production process of the hose 1 of FIG. 3, a copolyester resin or other thermoplastic material is extruded in a tubular form from an extruder to form the inner tube 2, the inner tube 2 is passed through the center of an annular heater which contacts the outer surface of the inner tube 2 to transfer heat to the same, whereby the outer surface of the inner tube 2 is heated to the melting temperature of the thermoplastic material or more so as to convert it to a molten state.

Next, a polyester fiber or another reinforcing material is knitted by a braider to form the reinforcing layer 3, then a urethane adhesive or other ordinary temperature-curing type adhesive is coated on the outer surface of the reinforcing layer 3 by a coater to form the bonding layer 6 between the outer cover and the reinforcing layer.

Next, a thermoplastic material is extruded by an extruder in the form of a tube over the outer surface of the bonding layer 6 between the outer cover and the reinforcing layer to form the outer cover 4.

Alternatively, in the production process of the hose 1 of FIG. 4, a thermoplastic elastomer composition or other thermoplastic material is extruded in a tubular form to form the inner tube 2, then a thermoplastic material is extruded by an extruder in a tubular form over the outer surface of the inner tube 2 to form the bonding layer 5 between the inner tube and the reinforcing layer.

Next, this is, continuously or discontinuously, passed through the center of an annular heater for contacting and transferring heat to the outer surface of the bonding layer between the inner tube and the reinforcing layer and heating the bonding layer 5 between the inner tube and the reinforcing layer to at least the melting temperature of the thermoplastic material to convert it to a molten state.

Next, a polyester fiber or another reinforcing material is braided by a braider to form the reinforcing layer 3, then a urethane adhesive or other ordinary temperature-curing type adhesive is coated on the outer surface of the reinforcing layer 3 by a coating machine to form the bonding layer 6 between the outer cover and the reinforcing layer.

Next, a thermoplastic material is extruded in a tubular shape by an extruder over the outer surface of the bonding layer 6 for between the outer cover and the reinforcing layer so as to form the outer cover 4. Note that in the case of the hose of FIG. 4, even if the inner tube is a vulcanized rubber or other flexible material, the inner tube 2 and the reinforcing layer 3 are firmly bonded by the bonding layer 5 between the inner tube 2 and the reinforcing layer.

Next, in the production process of the hose 1 of FIG. 5, the copolyester resin or other thermoplastic material is extruded in a tube by an extruder to form the inner tube 2, then the inner tube is passed through the center of an annular heater which transfers heat to it by contact with the outer surface of the inner tube so as to heat the outer surface of the inner tube 2 to at least the melting temperature of the thermoplastic material and convert it to a molten state.

Next, polyester fiber or another reinforcing material is braided by a braider to form the first reinforcing layer 8, then a thermoplastic material is extruded on the outer surface of the first reinforcing layer 8 in a tubular form by an extruder to form the bonding layer between the reinforcing layers 7. Next, continuously or discontinuously, this is passed through the center of an annular heater which contacts the outer surface of the bonding layer between the reinforcing layers 7 to conduct heat and heats the bonding layer between the reinforcing layers 7 to at least the melting temperature of the thermoplastic material to convert it to a molten state.

Next, the same reinforcing material as mentioned above is braided by a braider on the outer surface of the molten state bonding layer between the reinforcing layers 7 to form the second reinforcing layer 9, then a urethane adhesive or other ordinary temperature-curing type adhesive is coated by a coater on the outer surface of the second reinforcing layer 9 to form the bonding layer 6 between the outer cover 4 and the reinforcing layer 9. Next, a thermoplastic material is extruded in a tubular form by an extruder over the outer surface of the bonding layer 6 between the outer cover 4 and the reinforcing layer 9 to form the outer cover 4.

Next, in the production process of the hose 1 of FIG. 6, the copolyester resin or other thermoplastic material of the thermoplastic elastomer composition is extruded in a tube by an extruder to form the inner tube 2, then the thermoplastic material is extruded over the outer surface of the inner tube 2 by an extruder to form the bonding layer 4 for between the inner tube 2 and the reinforcing layer.

Next, continuously or discontinuously, this is passed through the center of an annular heater which transfers heat to it by contact with the outer surface of the bonding layer between the inner tube 2 and the reinforcing layer 8 so as to heat the bonding layer 4 between the inner tube 2 and the reinforcing layer 8 to at least the melting temperature of the thermoplastic material and convert it to a molten state.

Next, polyester fiber or another reinforcing material is braided by a braider to form the first reinforcing layer 8, then a thermoplastic material is extruded on the outer surface of the first reinforcing layer 8 in a tubular form by an extruder to form the bonding layer 7 between the reinforcing layers. Next, continuously or discontinuously, this is passed through the center of an annular heater which contacts the outer surface of the bonding layer 7 between reinforcing layers to conduct heat and heat the bonding layer 7 between the reinforcing layers to at least the melting temperature of the thermoplastic material to convert it to a molten state.

Next, the same type of reinforcing material is braided by a braider over the outer surface of the molten state bonding layer 7 between the reinforcing layers to form the second reinforcing layer 9, then a urethane adhesive or other ordinary temperature curing type adhesive is coated by a coater over the outer surface of the second reinforcing layer 9 to form the bonding layer 6 for between the outer cover and reinforcing layer. Next, a thermoplastic material is extruded by an extruder in a tubular form over the outer surface of the bonding layer 6 between the outer cover and the reinforcing layer to form the outer cover 4. Note that in this case as well, like in the case of the hose 1 of FIG. 4, it is possible to use a vulcanized rubber composition or other flexible material for the inner tube.

The hoses of the above FIG. 3 to FIG. 6 may all be made using a thermoplastic material other than at the reinforcing layers, so unlike hoses made of vulcanized rubber, will cure even without a vulcanization step when the temperature of the hose falls. Therefore, it is possible for the individual steps of production of the hose to be performed continuously on a single manufacturing line. Further, even when a vulcanized rubber composition or other flexible material is used for the inner tube, it is possible to produce the hose by a single manufacturing line by the so-called "continuous vulcanization" or other manufacturing process.

As the heating means of the heater, hot air, infrared rays, far infrared rays, near infrared rays, ultrasonic waves, electroinduction, etc., may be used.

Further, the above hot melting can be performed, without the use of a heater, in the step of extruding the thermoplastic materials. That is, a similar effect can be obtained by heating the thermoplastic material in the extruder to at least the melting temperature, holding that temperature after extruding the thermoplastic material in the tubular form to form the inner tube or bonding layer, then proceeding to the next step, while maintaining that molten state.

A particularly preferable method is to raise the temperature of the bonding layer by bringing the heater into contact with the thermoplastic material. This enables the temperature of the bonding layer to be effectively raised. Further, it is possible to use these heating means at the same time, that is, to pass the tube through a heater after extrusion to hold the molten state.

A similar effect can be obtained even if performing the hot melting of the inner tube and the bonding layers after forming the reinforcing layers on the outer surfaces of the inner tube and the bonding layers.

The thermoplastic material usable for the bonding layer between the inner tube and the reinforcing layer, the bonding layer between the reinforcing layers, and the inner tube when the bonding layer between the inner tube and reinforcing layer is not used is not particularly limited. Any thermoplastic material having bondability can be used.

However, the softening temperature of the material is preferably at least 110° C. If less than 110° C., the hose will easily soften at the time of use and the durability may fall. The structure of the reinforcing layer may be either a braided structure or a spiral structure.

A conventionally used urethane adhesive or other ordinary temperature curing type of adhesive will excessively cure due to the heat, during the use thereof, causing the bonding layer to become hard, and therefore, the repeated bending or changes in pressure of the fluid will cause the fiber reinforcing layer to break and the durability to fall, but the bonding layer of the present invention is composed of a polyester resin or other thermoplastic material, which is superior in heat aging resistance and resistance to bending fatigue and will not harden during the use thereof, and therefore it is possible to provide a flexible hose superior in the durability.

Further, the bonding layer of the present invention becomes molten by heating to above the softening temperature and can come into contact with the reinforcing layer in this molten state at least once, and therefore, the bonding layer penetrates into the reinforcing Layer at this time, causing a sprouting effect and an increase in the area of contact. This causes the bond to become stronger. The bonding strength is sustained over a long period with almost no fatigue, and therefore, a hose having excellent durability is obtained.

A thermoplastic material having a softening temperature of less than 110° C., however, may soften somewhat in a high temperature environment or through excessive repeated stress, whereby the durability is impaired.

Further, since the heating of the bonding layer in the present invention is performed at least before the formation of the outer cover, the amount of heat applied to the reinforcing layers and the other parts of the hose is far smaller than with heating after formation of the outer cover. Accordingly, the heat degradation of the reinforcing layers etc. which can occur at the time of heating after formation of the outer cover does not occur in the present invention.

Further, since the heating of the bonding layer in the present invention can be performed just by passing the tube through an annular heater or other simple construction heater, the heating can be performed in a continuous manufacturing line. Therefore, compared with the case where a heater generating a large amount of heat is used, such as heating after formation of the outer cover, the production process of the present invention does not require the many steps and is superior in the productivity. Further, in a process where the bonding layer is hot melted at the same time as being formed by an extruder, no separate heating step is required, and therefore, the productivity is even greater. Note that it is more preferable to use a thermoplastic resin for the bonding layer between the reinforcing layer and the outer cover as well.

In both of the first embodiment and the second embodiment of the ninth embodiment of the present invention, the heating means was a heater which heated the surface layer of the inner tube or the adhesive resin layer to a molten state just before braiding the reinforcing yarn. The heating means may also be constituted by a preheater which preheats the surface layer of the inner tube or the adhesive resin layer and a heater which heats the surface layer of the inner tube or the adhesive resin layer to a molten state immediately before braiding the reinforcing yarn.

Further, the preheater uses a hot air recirculating preheating system which preheats by blowing hot air on to the surface layer of the inner tube or the adhesive resin layer. The heater provided at the braiding die has a mechanism which contacts the outer surface layer of the inner tube or the adhesive resin layer and moves back and forth in the axial direction of the inner tube.

Further, by using a mechanism which contacts the outer surface layer of the inner tube or the adhesive resin layer, it is possible to efficiently heat the outer surface layer of the inner tube composed of a thermoplastic resin material or the surface of the adhesive resin layer by heat conduction by the minimum amount of heat until the molten state. Further, since the minimum amount of heat is used for the heating, energy is saved and it is possible to keep minimum the effect of heat degradation etc. of the thermoplastic resin material or other material constituting the hose.

Further, by using a mechanism which moves back and forth in the axial direction of the inner tube, it is possible to adjust the position where the reinforcing yarn is wound by the braider, that is, the distance between the braiding point and the melted part of the surface, and therefore, it is possible to control the molten state of the thermoplastic resin material at the braiding point, along with the heating temperature and the braiding speed and possible to obtain the optimal braided, heating, and bonding state depending upon the type and properties of the thermoplastic resin material.

The distance between the heater and the braiding point, the heating temperature, the braiding speed, and other braiding, heating, and bonding conditions, as explained above, may be suitably set, depending upon the type and the properties of the thermoplastic resin material, the production speed, and other conditions, but the distance between the heater and braiding point is preferably not more than 50 cm, the heating temperature at least the melting temperature of the thermoplastic resin material, and the braiding speed at least 0.1 m/min.

The heating mechanism of the heater may be any which satisfies the above requirements and may be attached to the portion of the braiding die through which the inner tube passes. It may be constituted by a heating tool, constituted by a band heater attached to the outer circumference of the braiding die and attached integrally to heat the braiding die as a whole, or constituted by a heater embedded in the braiding die for heating the braiding die as a whole.

Further, it is desirable to provide a heat insulating mechanism or cooling mechanism to at least one of the outer circumference of the heating apparatus and the outer circumference of the braiding die so as to prevent the other mechanism of the braider and the reinforcing yarn before braiding from being overly heated by the heat generated from the heater.

The present invention was achieved as described above and calls for heating at least one of the outer surface layer of an inner tube, with at least the outer circumference of the inner tube composed of a thermoplastic resin material extruded from an extruder, and an adhesive resin layer, composed of a thermoplastic resin material extruded from an extruder on reinforcing yarn, until at least one of the surface layers of the surface layer of the outer circumference of the inner tube and the adhesive resin layer melts in a step before the braiding of the reinforcing yarn by a braider.

By braiding the reinforcing layer in this state, it is possible to improve the bonding performance, without the use of a conventional solvent type adhesive or infrared ray, ultrasonic wave, or other expensive apparatus, possible to reliably bond the inner tube with the reinforcing yarn or the reinforcing layers with each other, possible to produce a hose efficiently, and possible to improve the productivity of a flexible, durable hose.

The thermoplastic resin material which may be used for the hose produced by the braider of the present invention means a generally used thermoplastic resin and thermoplastic elastomer and their compositions and is not particularly limited, but a polyolefin resin, polyamide resin, polyester resin, or other thermoplastic resin and their compositions, a polyolefin thermoplastic elastomer, polyamide thermoplastic elastomer, polyester thermoplastic elastomer, polyurethane thermoplastic elastomer, or other thermoplastic elastomer and their compositions, and thermoplastic elastomer compositions composed of these thermoplastic resins and thermoplastic elastomers in which a rubber composition containing a vulcanized rubber composition dispersed in a particle state may be exemplified.

Further, the material usable for the inner tube of the hose produced by the braider of the present invention is not limited to a thermoplastic resin material. It may be any hose where at least the outer circumference of the inner tube is composed of a thermoplastic resin material.

That is, it is possible to produce an integrally bonded hose composed of an inner tube of a vulcanized rubber composition on which a thermoplastic resin material is extruded for bonding with the same by the braider of the present invention.

Further, the fiber material constituting the reinforcing layer of the hose produced by the braider of the present invention is a generally used reinforcing yarn produced by a vinylon fiber, rayon fiber, polyester fiber, nylon fiber, aromatic polyamide fiber, etc.

Figure 7:
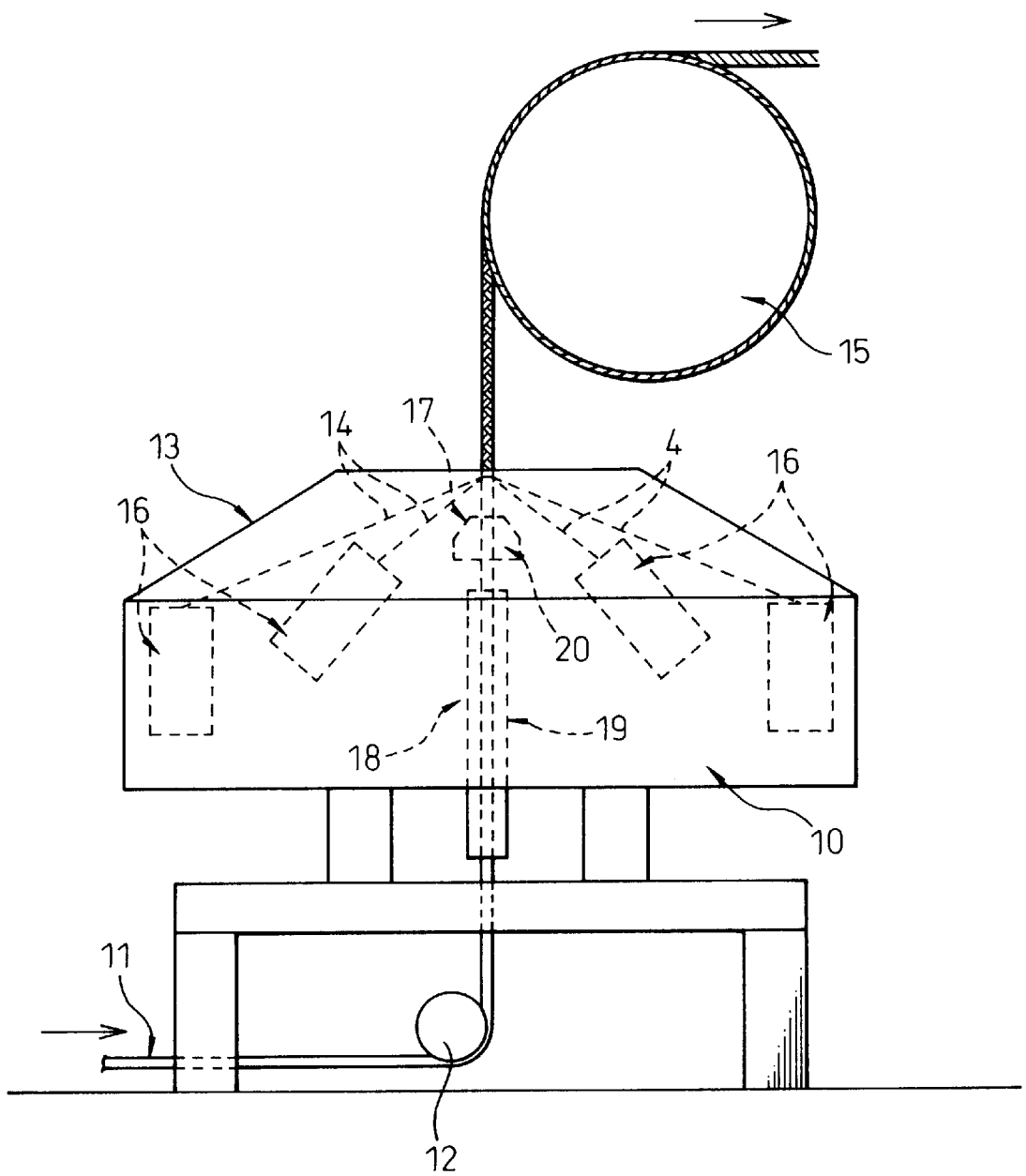
FIG. 7 is a schematic view of the configuration of a vertical braider of a hose showing an embodiment of the present invention.

Next, an explanation will be made of Examples of the present invention with reference to the attached drawings taking, as an example, the first embodiment. FIG. 7 is a view of the general configuration of a vertical braider for a hose of a first example of the present invention. A hose 11 formed up to the inner tube composed of the thermoplastic material or the adhesive resin layer extruded from the not shown extruder is fed through a guide roller 12 into the braider 13. In the braider 13, a reinforcing yarn 14 is braided, then taken up by a take-up device 5, and supplied to the next step.

In the braider 13 are provided plurality of bobbins 16 on which a reinforcing yarn 14 is wrapped and a braiding die 17 for braiding the reinforcing yarn 14 on the hose 11 formed up to the inner tube or adhesive resin layer. There is further provided a heating means 18 for continuously heating the surface layer of the hose 11 formed up to the inner tube or the adhesive resin layer in a step before braiding the reinforcing yarn 14 on the hose 11 formed up to the inner tube or adhesive resin layer.

Figure 8:
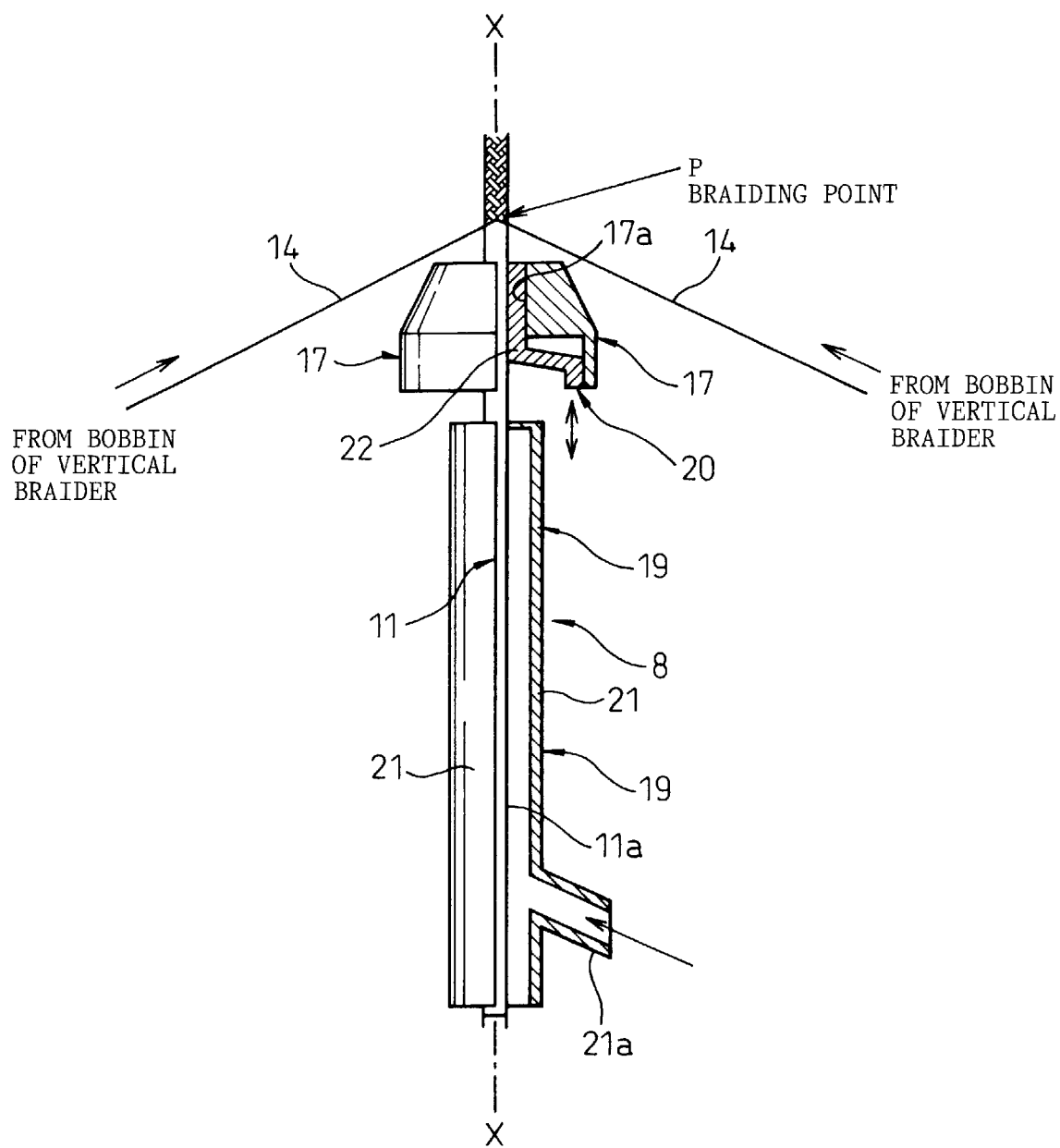
FIG. 8 is a half cross-sectional view of the heating means provided in the braider.

The heating means 18, as shown in FIG. 7 and FIG. 8, is composed by a preheating device 19 for preheating the inner tube surface layer and a heating apparatus 20 provided at the braiding die 7 for heating the inner tube surface layer to a molten state immediately before braiding the reinforcing yarn 14.

Note that it is also possible not to use the preheating device 19 for preheating the inner tube surface layer, but to use the heating apparatus 20 to directly heat the inner tube surface layer to the molten state.

The preheating device 19, as shown in FIG. 8, is composed of a tubular body 21 of a predetermined length covering the hose 11 composed of the inner tube or adhesive resin layer at the step before the heating apparatus 20. The tubular body 21 is connected at a part thereof with a hot air supplying tube 21*a* for supplying hot air from a hot air supply device (not shown). This forms a hot air recirculating preheating system which preheats by blowing hot air circulated to the surface layer of the hose 11 formed up to the inner tube or adhesive resin layer.

Note that the temperature of the hot air may be freely set depending upon the melting temperature of the thermoplastic resin constituting the hose 11 formed up to the inner tube or adhesive resin layer.

Figure 9:
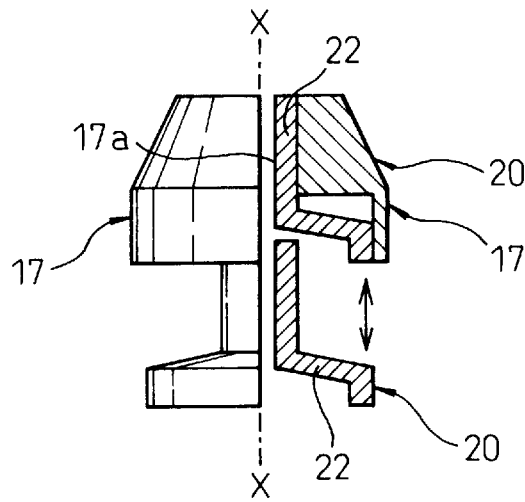
FIG. 9 is a half-cross sectional view of the first embodiment of a heating apparatus provided with a braiding die (heating apparatus alone moving in axial direction of hose).

Further, the heating apparatus 20 provided at the braiding die 17, as shown in FIG. 8 and FIG. 9, is provided with a heating tool 22, in the portion of the braiding die 17 through which the inner tube passes 17*a*, which contacts the outer surface layer 11*a* of the hose 11 formed up to the inner tube or adhesive resin layer and which moves back and forth in the axial direction (X—X direction) of the hose 11 formed up to the inner tube or adhesive resin layer.

That is, the inner diameter of the portion of the heating tool 22 which is inserted into the inner tube through portion 17*a* is formed to be the same diameter as the outer diameter dimension of the hose 11 formed up to the inner tube or adhesive resin layer. The hose 11 formed up to the inner tube or the adhesive resin layer always moves in contact with the heating tool 22.

The heating tool 22 is connected with a not shown heater by which it is heated to a certain temperature. It is formed so as to be able to move in the axial direction of the hose 1 formed up to the inner tube or the adhesive resin layer along with the movement of the braiding point P of the reinforcing yarn 14 to the hose 11 formed up to the inner tube or the adhesive resin layer.

Figure 10:
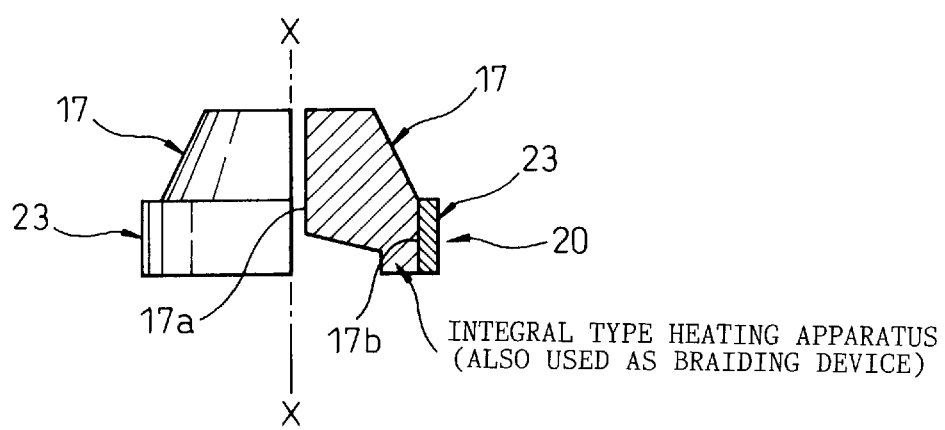
FIG. 10 is a half-cross sectional view of the second embodiment of a heating apparatus provided with a braiding die (integral braiding die type (heating by band heater)).

Further, FIG. 10 shows a second example of the heating apparatus 20 provided at the braiding die 17. The heating apparatus 20 in this example has integrally attached thereto a band heater 23 for heating the braiding die 17 as a whole, at the outer circumference surface 17*b* of the braiding die 7.

Note that the band heater 23 is connected to a heating means (not shown). Therefore, this example forms an integral type braiding die 7 provided with a heating apparatus.

Figure 11:
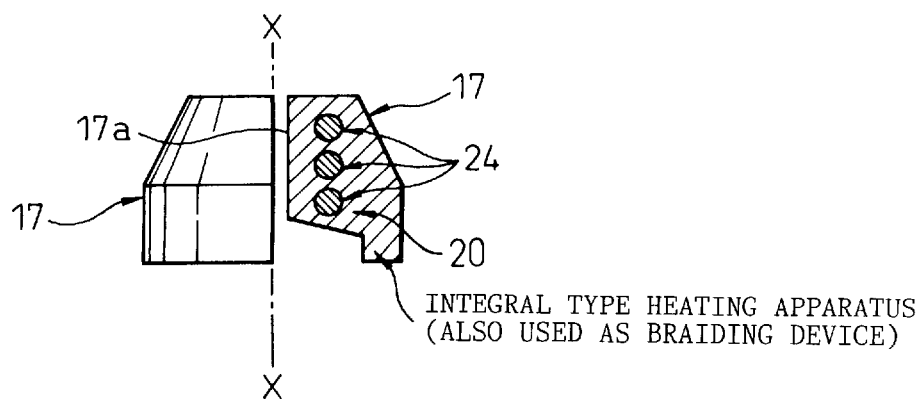
FIG. 11 is a half-cross sectional view of the third embodiment of a heating apparatus provided with a braiding die (integral braiding die type (heating by casting heater)).

Further, FIG. 11 shows a third example of the heating apparatus 20 provided at the braiding die 17. The heating apparatus 20 in this example is configured so that, when the braiding die 17 is produced from a casting, the heater 24 for heating is embedded inside the braiding die 17 integrally so as to heat the braiding die 17 as a whole.

Accordingly, in this example as well, in the same way as the above second example, the braiding die 17 is integrally provided with the heating apparatus.

As explained above, in the examples of the present invention, when braiding a reinforcing yarn 14 by a braider 13 over the outer circumference of a hose 11 formed up to an inner tube and an adhesive resin layer, with at least the outer circumference of the inner tube composed of an extruded thermoplastic resin material, just the outer surface layer 11*a* of the hose 11 formed up to the inner tube or adhesive resin layer is preheated by a preheater 19 to soften it, then the heating apparatus 20 is used to convert the softened outer surface layer 11*a* to a molten state, then immediately thereafter braiding is performed by a reinforcing yarn 14 taken up from a plurality of bobbins 16, the reinforcing yarn 14 is integrally embedded Inside the molten outer surface layer 11*a*, the braided hose 11 thus formed up to the inner tube or adhesive resin layer is taken up by a take-up device 15, then is formed integrally with an outer cover in a next outer cover forming step.

Note that it is also possible not to use the preheater 19 and to directly melt the outer surface layer 11*a* of the hose 11 formed up to the inner tube or adhesive resin layer by the heating apparatus 20, then immediately braid the reinforcing yarn 14. Further, when forming a plurality of reinforcing layers composed of reinforcing yarns 14, since intermediate layers are interposed, the intermediate layers are hot melted by a heating apparatus 20 and then the reinforcing layer 14 braided, and therefore, it is possible to form them integrally without using an adhesive etc.

As explained above, in the step before braiding the reinforcing yarn 14 by a braider 13 over the outer circumference of a hose 11 formed up to an inner tube or adhesive resin layer, with at least the outer circumference of the inner tube composed of a thermoplastic resin material extruded from an extruder, the outer circumference surface layer 11*a* of the hose 11 formed up to the inner tube or adhesive resin layer is heated to a molten state and the reinforcing layer braided therein, and therefore, it is possible to improve the bonding performance, without using a conventional solvent type adhesive or an infrared, ultrasonic wave, or other expensive piece of the equipment.

Further, this may be also applied to the case of formation of two or more reinforcing layers as in the second embodiment of the present invention. By heating the adhesive resin layer and knitting the reinforcing yarn, it is possible to reliably bond the hose 11 formed up to the inner tube or the adhesive resin layer and the reinforcing yarn 14 or between the reinforcing layers, produce the hose efficiently, and raise the productivity of a hose having flexibility and a high durability.

Note that, while the above embodiments were explained with reference to a vertical braider, a horizontal braider may also be used.

EXAMPLES

The present invention will now be further illustrated by, but is by no means limited to, the following Examples.

Examples I-1 to I-4 and Comparative Examples I-1 to I-4

Hoses composed of an inner tube, reinforcing layer, and outer cover having the configurations shown in Table I-1 (materials and thickness) and having an inner diameter of 6 mm and outer diameter of 9.5 mm were produced. Note that as the adhesive, the Tyrite 7411 moisture curing type urethane adhesive made by Lord Far East (thickness of each adhesion layer of 25 $\mu$m) was used. The formulations of the compositions used for the inner tube and the outer cover of Table 1-1 were as shown in Table I-2.

TABLE I-1

(Parts by weight)

|  | Comp. Ex. I-1 | Ex. I-1 | Ex. I-2 | Ex. I-3 | Comp. Ex. I-2 | Ex. I-4 | Comp. Ex. I-3 | Comp. Ex. I-4 |
|---|---|---|---|---|---|---|---|---|
| Inner tube | | | | | | | | |
| Material | Comp. 1 | Comp. 3-1 | Comp. 3-2 | Comp. 3-3 | Comp. 4 | Comp. 5 | Comp. 6 | Comp. 7 |
| Thickness (mm) | 1 | 1 | 1 | 1 | 1 | 1 | 1 | 1 |
| Outer cover | | | | | | | | |
| Material | Comp. 2 | Comp. 3-1 | Comp. 3-2 | Comp. 3-1 | Comp. 4 | Comp. 5 | Comp. 6 | Comp. 7 |
| Thickness (mm) | 0.5 | 0.5 | 0.5 | 0.5 | 0.5 | 0.5 | 0.5 | 0.5 |
| Reinforcing layer material | Polyester | Polyester | Polyester | Polyester | Polyester | Polyester | Polyester | Polyester |
| Vulcanization step | Necessary | None | None | None | None | None | None | None |
| Flexural rigidity (20° C.) | Good | Good | Good | Good | Good | Good | Good | Good |
| Flexural rigidity (−20° C.) | Good | Good | Good | Good | Poor | Good | Poor | Poor |
| Impulse pressure test* | Good | Good | Good | Good | Good | Good | Good | Good |

*: JIS K 6379.

TABLE I-2

(Parts by weight)

|  | Comp. 1 | Comp. 2 | Comp. 3-1 | Comp. 3-2 | Comp. 3-3 | Comp. 4 | Comp. 5 | Comp. 6 | Comp. 7 |
|---|---|---|---|---|---|---|---|---|---|
| NBR rubber composition | 210 | — | — | — | — | — | — | — | — |
| CR rubber composition | — | 182.75 | — | — | — | — | — | — | — |
| ACM1 | — | — | 30 | 50 | 70 | — | 30 | — | — |
| ACM2 | — | — | — | — | — | 30 | — | — | — |
| ACM3 | — | — | — | — | — | — | — | 30 | — |
| ACM4 | — | — | — | — | — | — | — | — | 30 |
| Antioxidant*[1] | — | — | 0.6 | 1 | 1.4 | 1 | 1 | 1 | 1 |
| Cross-linking agent*[2] | — | — | 0.48 | 0.8 | 1.12 | 0.8 | 0.8 | 0.8 | — |
| Cross-linking agent*[3] | — | — | — | — | — | — | — | — | 1.1 |
| FEF carbon black*[4] | — | — | — | — | — | — | 25 | — | — |
| Thermoplastic polyester*[5] | — | — | 70 | 50 | 30 | 70 | 70 | 70 | 70 |

*[1]: Irganox 1010 (hindered phenol antioxidant made by Ciba-Geigy Japan).
*[2]: Butane tetracarboxylic acid.
*[3]: PZ/TTFE/EC = 0.5/0.25/0.35 (Note: PZ: Zinc dimethyldithiocarbamate, TTFE: ferrous dimethyldithiocarbamate, EC: sulfonamide derivative (Vulkalent E, Bayer)).
*[4]: N550 (Seast SO, Tokai Carbon).
*[5]: Hytrel 5577 (copolyester elastomer made by Toray-Du Pont).

The formulations of the NBR rubber composition and CR-rubber composition of Table I-2 are shown in Table I-3 and Table I-4. The composition of the ACM (acrylic rubber) monomer components are shown in Table 1-5.

TABLE I-3

Formulation Composition 1 of NBR Rubber

| Composition | (Parts by weight) |
|---|---|
| NBR*[1] | 100 |
| SRF carbon black | 90 |
| Zinc oxide | 5 |
| Stearic acid | 1 |
| Antioxidant OD | 1 |
| Plasticizer DOP | 10 |
| Sulfur | 2 |
| Promoter TS 1 | 1 |

*[1]Nipol 1042 made by Nippon Zeon.

TABLE I-4

Formulation Composition 2 of CR Rubber

| Composition | (Parts by weight) |
|---|---|
| Neoprene W | 100 |
| SRF carbon black | 60 |
| Stearic acid | 1 |
| Magnesium oxide (MgO) | 4 |
| Antioxidant OD | 2 |
| Fuccol 1150N (softening agent)) | 10 |
| Zinc oxide | 5 |
| Promoter TU | 0.75 |

TABLE I-5

Monomer Composition of ACM (Parts by weight)

|  | EA | BA | MEA | GMA | VCA |
|---|---|---|---|---|---|
| ACM1 | 40 | 32 | 19 | 9 | — |
| ACM2 | 91 | — | — | 9 | — |

TABLE I-5-continued

Monomer Composition of ACM (Parts by weight)

|  | EA | BA | MEA | GMA | VCA |
|---|---|---|---|---|---|
| ACM3 | 97 | — | — | 3 | — |
| ACM4 | 98 | — | — | — | 2 |

EA: Ethyl acrylate
BA: Butyl acrylate
MEA: Methoxyethyl acrylate
GMA: Glycidyl methacrylate
VCA: Vinyl chloroacetate These hoses were allowed to stand at room temperature for one week after production, then were tested as for flexural rigidity at 20° C. and −20° C. and were aged at 100° C. for 48 hours and subjected to an impulse pressure test.

1) Flexural Rigidity Test

Flexural Rigidity of Hose

The sample hoses were bent along arcs of various radii and the flexural force (kg) measured.

More specifically, the measurement started from a bending radius of 10 times the outer diameter of the sample hose, then the bending radius was successively changed up to 3 times and the flexural force measured.

From the results of the measurement, a graph was prepared showing the relationship between the flexural force and the bending radius. From the obtained graph, the flexural force at the time of the prescribed radius (4 times) was read and made the flexural rigidity of the hose.

Hoses with an equal flexibility in use in a range of flexibility of ±20% of the flexural rigidity 2 kg of an ordinary rubber hose (Comparative Example 1) were evaluated as "good" and those with +20% or more rigidity were evaluated as "poor".

2) Impact Pressure Test: According to JIS K6379

Using, as a test oil, a mineral oil corresponding to Type 2 defined in JIS K2213 (Turbine Oil), a rectangular wave of a maximum pressure of 27.5 MPa was repeatedly applied 200,000 times at an oil temperature of 93° C. and the hose checked for bursting ("good" indicating no bursting).

Comparative Example I-1 is a hose made of a vulcanized rubber, not the thermoplastic elastomer of the present invention, and therefore, does not require a vulcanization step. Examples I-1 to I-4 of the present invention on the other hand do not require a vulcanization step, and therefore, can be dramatically reduced in manufacturing costs compared with the conventional example of Comparative Example I-1.

Further, there is the advantage that the flexural rigidity at the time of a low temperature is lower than Comparative Examples I-2 to I-4 which show hoses out of the scope of the present invention. Comparative Examples I-2 to I-4 use thermoplastic elastomers according to the present invention, and therefore, do not require a vulcanization step and therefore have the advantage of being able to be dramatically reduced in manufacturing costs, but the acrylic rubber used does not satisfy the desired conditions, and therefore, the advantage of flexibility at low temperatures cannot be obtained.

Accordingly, it is learned that hoses using the composition of the present invention can be reduced in manufacturing costs since they do not require vulcanization steps and further are superior in the flexibility at low temperatures.

Examples I-5 to I-8

Hoses composed of inner tubes, reinforcing layers, and outer covers configured as shown in Table I-6 and having an inner diameter of 9.5 mm and outer diameter of 17.5 mm were produced according to the formulations described. The results are shown in Table I-6.

TABLE I-6

|  | Ex. I-5 | Ex. I-6 | Ex. I-7 | Ex. I-8 |
|---|---|---|---|---|
| Inner tube | Comp. 9 | Comp. 9 | Comp. 11 | Comp. 11 |
| Adhesive | No. 1 | No. 1 | No. 1 | No. 1 |
| Reinforcing layer | Polyester fiber | Polyester fiber | Polyester fiber | Polyester fiber |
| Adhesive | No. 2 | No. 3 | No. 2 | No. 3 |
| Outer cover | Comp. 9 | EPDM/PP | Comp. 11 | EPDM/PP |
| Flexural rigidity (20° C.) | Good | Good | Good | Good |
| Flexural rigidity (−20° C.) | Good | Good | Good | Good |
| Impulse pressure test JIS K 6379, 93° C., 27.5 MPa | 200,000X Suspended | 200,000X Suspended | 200,000X Suspended | 200,000X Suspended |

Adhesive No. 1: Wet curing type urethane adhesive, Tyrite 7411 (made by Lord Far East).
Adhesive No. 2: Thermoplastic resin adhesive, Hytrel 2531 (made by Toray-Du Pont).
Adhesive No. 3: Thermoplastic resin adhesive, Admer QB-540 (made by Mitsu Petrochemical Industries).
EPDM/PP: Santoprene 201-64 (made by AES Japan).

The components shown in Table I-6 were as shown in Table I-7. The components used for these were as Follows:

Composition 9 and Composition 11 were made by mixing under conditions of a temperature of 250° C. and a shear rate of 2432 $s^{-1}$.

Further, the melt viscosity was measured using a capillary rheometer (Capillograph IC) made by Toyo Seiki at the measurement temperature, temperature, shear rate shown in Table I-7, an orifice diameter of 1 mm, and a capillary length of 10 mm.

That is, the compositions used for Examples I-5 to I-8 are thermoplastic elastomer compositions in the range of the present invention. Examples I-5 to I-8 are all low in flexural rigidity at low temperatures and excellent in results of the impulse pressure test.

Adhesive (no. 1)=Moisture curing type urethane adhesive: Tyrite 7411 (made by Lord Far East)
Adhesive (no. 2)=Thermoplastic resin adhesive: Hytrel 2531 (made by Toray-Du Pont)
Adhesive (no. 3)=Thermoplastic resin adhesive: Admer QB-540 (made by Mitsui Petrochemical Industries)

These hoses were allowed to stand at room temperature for one week after production, then the flexural rigidity was found at 20° C. and −20° C.

The results are shown in Table I-6.

Examples I-5 to I-8 all use the thermoplastic elastomer composition of the present invention for the inner tube and/or outer cover, and therefore, do not require a vulcanization step and are superior in flexibility at a low temperature.

Examples I-9 to I-23

Table I-7 shows examples of thermoplastic elastomer compositions other than the compositions used for Examples I-5 to I-8. From a comparison with these, the superiority of the elongation at break of a thermoplastic elastomer composition satisfying the relationship of the viscosity at the time of melt mixing and the volume fraction of the thermoplastic elastomer and acrylic rubber composition used in the present invention is clear.

TABLE I-7

| | | | Examples | | | | | | | | | |
|---|---|---|---|---|---|---|---|---|---|---|---|---|
| | | | I-8 | I-9 | I-10 | I-11 | I-12 | I-13 | I-14 | I-15 | I-16 | I-17 |
| COPE | Lomod ER3055A | | 150.00 | — | — | — | 43.00 | — | — | — | 150.00 | — |
| | Hytrel 5556 | | — | 150.00 | — | — | — | 43.00 | — | — | — | 150.00 |
| | Hytrel 5557 | | — | — | 150.00 | — | — | — | 43.00 | — | — | — |
| | Hytrel 5577 | | — | — | — | 150.00 | — | — | — | 43.00 | — | — |
| ACM rubber composition | ACM1 | | 100.00 | 100.00 | 100.00 | 100.00 | 100.00 | 100.00 | 100.00 | 100.00 | 100.00 | 100.00 |
| | FEF carbon black | | 0.00 | 0.00 | 0.00 | 0.00 | 0.00 | 0.00 | 0.00 | 0.00 | 0.00 | 0.00 |
| | Stearic acid | | 0.00 | 0.00 | 0.00 | 0.00 | 0.00 | 0.00 | 0.00 | 0.00 | 0.00 | 0.00 |
| | Antioxidant | | 0.00 | 0.00 | 0.00 | 0.00 | 0.00 | 0.00 | 0.00 | 0.00 | 0.00 | 0.00 |
| Cross-linking agent | Butane tetracarboxylic acid | | 1.60 | 1.60 | 1.60 | 1.60 | 1.60 | 1.60 | 1.60 | 1.60 | 1.60 | 1.60 |
| | Shear rate (l/s) | | 2432 | 2432 | 2432 | 2432 | 2432 | 2432 | 2432 | 2432 | 3648 | 3648 |
| COPE | Specific gravity | — | 1.19 | 1.19 | 1.19 | 1.19 | 1.19 | 1.19 | 1.19 | 1.19 | 1.19 | 1.19 |
| | Weight fraction (%) | — | 0.60 | 0.60 | 0.60 | 0.60 | 0.30 | 0.30 | 0.30 | 0.30 | 0.60 | 0.60 |
| | Volume fraction (%) | $\phi_1$ | 0.62 | 0.62 | 0.62 | 0.62 | 0.31 | 0.31 | 0.31 | 0.31 | 0.62 | 0.62 |
| 270° C. | Melt viscosity (Pa·s) | $\eta_1$ | 17.4 | 56.1 | 64.2 | 75.0 | 17.4 | 56.1 | 64.2 | 75.0 | 15.6 | 26.7 |
| 250° C. | Melt viscosity (Pa·s) | $\eta_1$ | 45.4 | 88.0 | 128.4 | 174.1 | 45.4 | 88.0 | 128.4 | 174.1 | 38.5 | 73.9 |
| 230° C. | Melt viscosity (Pa·s) | $\eta_1$ | 63.1 | 141.5 | 179.4 | 248.8 | 63.1 | 141.5 | 179.4 | 248.8 | 53.0 | 113.7 |
| ACM rubber composition | Specific gravity | — | 1.10 | 1.10 | 1.10 | 1.10 | 1.10 | 1.10 | 1.10 | 1.10 | 1.10 | 1.10 |
| | Weight fraction (%) | — | 0.40 | 0.40 | 0.40 | 0.40 | 0.69 | 0.69 | 0.69 | 0.69 | 0.40 | 0.40 |
| | Volume fraction (%) | $\phi_2$ | 0.38 | 0.38 | 0.38 | 0.38 | 0.68 | 0.68 | 0.68 | 0.68 | 0.38 | 0.38 |
| 270° C. | Melt viscosity (Pa·s) | $\eta_2$ | 230.3 | 230.3 | 230.3 | 230.3 | 230.3 | 230.3 | 230.3 | 230.3 | 157.3 | 157.3 |
| 250° C. | Melt viscosity (Pa·s) | $\eta_2$ | 255.9 | 255.9 | 255.9 | 255.9 | 255.9 | 255.9 | 255.9 | 255.9 | 174.8 | 174.8 |
| 230° C. | Melt viscosity (Pa·s) | $\eta_2$ | 319.9 | 319.9 | 319.9 | 319.9 | 319.9 | 319.9 | 319.9 | 319.9 | 218.5 | 218.5 |
| 270° C. | $\eta_2/\eta_1$ | <4.0 | 13.23 | 4.11 | 3.59 | 3.07 | 13.23 | 4.11 | 3.59 | 3.07 | 10.06 | 5.90 |
| | $(\eta_1/\eta_2)(\phi_2/\phi_1)$ | <1.0 | 0.05 | 0.15 | 0.17 | 0.20 | 0.16 | 0.52 | 0.06 | 0.70 | 0.06 | 0.10 |
| | Mixable or not | — | Yes | Yes | Yes | Yes | No | No | Yes | Yes | Yes | Yes |
| | Elongation at break (%) | — | 20 | 20 | 180 | 180 | — | — | 70 | 70 | 20 | 20 |
| 250° C. | $\eta_2/\eta_1$ | <4.0 | 5.63 | 2.91 | 1.99 | 1.47 | 5.63 | 2.91 | 1.99 | 1.47 | 4.54 | 2.36 |
| | $(\eta_1/\eta_2)(\phi_2/\phi_1)$ | <1.0 | 0.11 | 0.21 | 0.31 | 0.42 | 0.38 | 0.74 | 1.08 | 1.46 | 0.14 | 0.26 |
| | Mixable or not | — | Yes | Yes | Yes | Yes | No | Yes | No | No | Yes | Yes |
| | Elongation at break (%) | — | 30 | 200 | 200 | 200 | — | 80 | — | — | 30 | 200 |
| 230° C. | $\eta_2/\eta_1$ | <4.0 | 5.07 | 2.26 | 1.78 | 1.29 | 5.07 | 2.26 | 1.78 | 1.29 | 4.13 | 1.92 |
| | $(\eta_1/\eta_2)(\phi_2/\phi_1)$ | <1.0 | 0.12 | 0.27 | 0.35 | 0.48 | 0.42 | 0.95 | 1.21 | 1.67 | 0.15 | 0.32 |
| | Mixable or not | — | Yes | Yes | Yes | Yes | No | Yes | No | No | Yes | Yes |
| | Elongation at break (%) | — | 30 | 200 | 200 | 200 | — | 80 | — | — | 30 | 200 |

| | | | Examples | | | | | |
|---|---|---|---|---|---|---|---|---|
| | | | I-18 | I-19 | I-20 | I-21 | I-22 | I-23 |
| COPE | Lomod ER3055A | | — | — | 43.00 | — | — | — |
| | Hytrel 5556 | | — | — | — | 43.00 | — | — |
| | Hytrel 5557 | | 150.00 | — | — | — | 43.00 | — |
| | Hytrel 5577 | | — | 150.00 | — | — | — | 43.00 |
| ACM rubber composition | ACM1 | | 100.00 | 100.00 | 100.00 | 100.00 | 100.00 | 100.00 |
| | FEF carbon black | | 0.00 | 0.00 | 0.00 | 0.00 | 0.00 | 0.00 |
| | Stearic acid | | 0.00 | 0.00 | 0.00 | 0.00 | 0.00 | 0.00 |
| | Antioxidant | | 0.00 | 0.00 | 0.00 | 0.00 | 0.00 | 0.00 |
| Cross-linking agent | Butane tetracarboxylic acid | | 1.60 | 1.60 | 1.60 | 1.60 | 1.60 | 1.60 |
| | Shear rate (l/s) | | 3648 | 3648 | 3648 | 3648 | 3648 | 3648 |
| COPE | Specific gravity | — | 1.19 | 1.19 | 1.19 | 1.19 | 1.19 | 1.19 |
| | Weight fraction (%) | — | 0.60 | 0.60 | 0.30 | 0.30 | 0.30 | 0.30 |
| | Volume fraction (%) | $\phi_1$ | 0.62 | 0.62 | 0.31 | 0.31 | 0.31 | 0.31 |
| 270° C. | Melt viscosity (Pa·s) | $\eta_1$ | 47.4 | 60.9 | 15.6 | 26.7 | 47.4 | 60.9 |
| 250° C. | Melt viscosity (Pa·s) | $\eta_1$ | 103.8 | 135.9 | 38.5 | 73.9 | 103.8 | 135.9 |
| 230° C. | Melt viscosity (Pa·s) | $\eta_1$ | 140.1 | 187.4 | 53.0 | 113.7 | 140.1 | 187.4 |
| ACM rubber composition | Specific gravity | — | 1.10 | 1.10 | 1.10 | 1.10 | 1.10 | 1.10 |
| | weight fraction (%) | — | 0.40 | 0.40 | 0.69 | 0.69 | 0.69 | 0.69 |
| | Volume fraction (%) | $\phi_2$ | 0.38 | 0.38 | 0.68 | 0.68 | 0.68 | 0.68 |
| 270° C. | Melt viscosity (Pa·s) | $\eta_1$ | 157.3 | 157.3 | 157.3 | 157.3 | 157.3 | 157.3 |
| 250° C. | Melt viscosity (Pa·s) | $\eta_1$ | 174.8 | 174.8 | 174.8 | 174.8 | 174.8 | 174.8 |
| 230° C. | Melt viscosity (Pa·s) | $\eta_1$ | 218.5 | 218.5 | 218.5 | 218.5 | 218.5 | 218.5 |
| 270° C. | $\eta_2/\eta_1$ | <4.0 | 3.32 | 2.58 | 10.06 | 5.90 | 3.32 | 2.58 |
| | $(\eta_1/\eta_2)(\phi_2/\phi_1)$ | <1.0 | 0.19 | 0.24 | 0.21 | 0.36 | 0.65 | 0.83 |
| | Mixable or not | — | Yes | Yes | No | No | Yes | Yes |
| | Elongation at break (%) | — | 180 | 180 | — | — | 70 | 70 |
| 250° C. | $\eta_2/\eta_1$ | <4.0 | 1.68 | 1.29 | 4.54 | 2.36 | 1.68 | 1.29 |
| | $(\eta_1/\eta_2)(\phi_2/\phi_1)$ | <1.0 | 0.37 | 0.48 | 0.47 | 0.91 | 1.28 | 1.67 |
| | Mixable or not | — | Yes | Yes | No | Yes | No | No |
| | Elongation at break (%) | — | 200 | 200 | — | 80 | — | — |

TABLE I-7-continued

| 230° C. | | | | | | | |
|---|---|---|---|---|---|---|---|
| $\eta_2/\eta_1$ | <4.0 | 1.56 | 1.17 | 4.13 | 1.92 | 1.56 | 1.17 |
| $(\eta_1/\eta_1) (\phi_2/\phi_1)$ | <1.0 | 0.40 | 0.53 | 0.52 | 1.12 | 1.38 | 1.84 |
| Mixable or not | — | Yes | Yes | No | No | No | No |
| Elongation at break (%) | — | 200 | 200 | — | — | — | — |

COPE: Thermoplastic copolyester elastomer.
Lomod ER3055A: made by GE Plastics.
Hytrel 5556: made by Toray-Du Pont.
Hytrel 5557: made by Toray-Du Pont.
Hytrel 5577: made by Toray-Du Pont.
FEF carbon black: N550 (Seast SO, made by Tokai Carbon).
Antioxidant: Irganox 1010 (hindered phenol antioxidant made by Ciba-Geigy Japan).
Cross-linking agent: Butane tetracarboxylic acid BTC (made by Mitsui Toatsu Fine Chemical).
COPE: thermoplastic copolyester elastomer
Lomod: ER3055A (made by GI Plastics)
Hytrel 5556 (made by Toray-Du Pont)
Hytrel 5557 (made by Toray-Du Pont)
Hytrel 5577 (made by Toray-Du Pont)
FEF carbon black (N550) = Seast SO (made by Tokai Carbon)
Antioxidant = Irganox 1010: hindered phenol antioxidant made by Ciba-Geigy Japan
Pentaerythrityl-tetrakis [3-(3,5-di-tertiary-butyl-4-hydroxyphenyl)propionate]
Cross-linking agent BTC = butane tetracarboxylic acid made by Mitsui Toatsu Fine Chemical Examples II-1 to II-10 and Comparative Examples II-1 to II-4

The elastomer compositions having the formulations shown in Table II-1 were prepared by blending each component. The cross-linking agents 4 to 8 used for these formulations were prepared as follows.

Preparation of Cross-Linking Agent

Cross-Linking Agent 4

100 g of a Daicel Chemical Industry polylactone diol, Placcel 212 (molecular weight 1250, hydroxy value 90) was vacuum dried at 90° C. for 1 hour, then 23.8 g of phthalic anhydride and 0.2 g of pyridine were added and the mixture reacted at that temperature for 48 hours. The reaction system was first nonhomogeneous, but became homogeneous after the end of the reaction. The product was a wax like solid at room temperature.

Cross-Linking Agent 5

100 g of a Daicel Chemical Industry polylactone diol, Placcel 208 (molecular weight 830, hydroxy value 135) was vacuum dried at 90° C. for 1 hour, then 35.8 g of phthalic anhydride and 0.2 g of pyridine were added and the mixture reacted at that temperature for 48 hours. The reaction system was first nonhomogeneous, but became homogeneous after the end of the reaction. The product was a wax like solid at room temperature.

Cross-Linking Agent 6

100 g of a Daicel Chemical Industry polylactone diol, Placcel 212 (molecular weight 1250, hydroxy value 112) was vacuum dried at 90° C. for 1 hour, then 23.8 g of phthalic anhydride and 0.2 g of pyridine were added and the mixture reacted at that temperature for 48 hours. The reaction system was first nonhomogeneous, but became homogeneous after the end of the reaction. The product was a wax like solid at room temperature.

Cross-Linking Agent 7

100 g of a Daicel Chemical Industry polylactone diol, Placcel L212AL (molecular weight 1250, hydroxy value 90) was vacuum dried at 90° C. for 1 hour, then 23.8 g of phthalic anhydride and 0.2 g of pyridine were added and the mixture reacted at that temperature for 48 hours. The reaction system was first nonhomogeneous, but became homogeneous after the end of the reaction. The product was liquid at room temperature.

Cross-Linking Agent 8

100 g of a Daicel Chemical Industry polylactone diol, Placcel 308 (molecular weight 850, hydroxy value 195) was vacuum dried at 90° C. for 1 hour, then 52.2 g of phthalic anhydride and 0.2 g of pyridine were added and the mixture reacted at that temperature for 48 hours. The reaction system was first nonhomogeneous, but became homogeneous after the end of the reaction. The product was a wax like solid at room temperature. Note that extinction of absorption of the acid anhydride at 1850 $cm^{-1}$ was confirmed in infrared (IR) absorption analysis for the cross-linking agents 4 to 8.

The physical properties of the thus produced elastomer composition were evaluated by the following test methods. Note that the samples for measurement of the physical properties were prepared in the following manner.

Acrylic rubber and carbon black were mixed using a 1.5 liter hermetic type mixer. The cross-linking agent was mixed by a roll mill. The mixture was cross-linked by pressing at 190° C. for 50 minutes to prepare predetermined test samples for testing the physical properties. Note that the test methods were as follows:

Tensile strength and elongation

According to JIS K6301

Compression set

According to JIS K6301 (120° C.×72 hours)

The results of the evaluation are shown in Table II-1.

TABLE II-1

Formulation and Physical Properties of Elastomer Compositions

|  | Comp. Ex. II-1 | Comp. Ex. II-2 | Comp. Ex. II-3 | Comp. Ex. II-4 | Ex. II-1 | Ex. II-2 | Ex. II-3 | Ex. II-4 | Ex. II-5 | Ex. II-6 | Ex. II-7 | Ex. II-8 | Ex. II-9 | Ex. II-10 |
|---|---|---|---|---|---|---|---|---|---|---|---|---|---|---|
| Formulation (parts by weight) | | | | | | | | | | | | | | |
| Acrylate copolymer rubber[*1] | 100 | 100 | 100 | 100 | 100 | 100 | 100 | 100 | 100 | 100 | 100 | 100 | 100 | 100 |
| Carbon black[*2] | 60 | 60 | 60 | 60 | 60 | 60 | 60 | 60 | 60 | 60 | 60 | 60 | 60 | 60 |
| Cross-linking agent 1[*3] | 1.6 | 2 | — | — | — | — | — | — | — | — | — | — | — | — |
| Cross-linking agent 2[*4] | — | — | 1.9 | — | — | — | — | — | — | — | — | — | — | — |
| Cross-linking agent 3[*5] | — | — | — | 0.8 | — | — | — | — | — | — | — | — | — | — |
| Cross-linking agent 4[*6] | — | — | — | — | 5 | 10 | 15 | 20 | — | — | — | — | — | — |
| Cross-linking agent 5[*6] | — | — | — | — | — | — | — | — | 5 | 10 | 15 | — | — | — |
| Cross-linking agent 6[*6] | — | — | — | — | — | — | — | — | — | — | — | 10 | — | — |
| Cross-linking agent 7[*6] | — | — | — | — | — | — | — | — | — | — | — | — | 10 | — |
| Cross-iinking agent 8[*6] | — | — | — | — | — | — | — | — | — | — | — | — | — | 10 |
| Physical Properties | | | | | | | | | | | | | | |
| Tensile strength (MPa) | 8.5 | 9.1 | 10.6 | 11.1 | 8.5 | 11.6 | 9.0 | 9.3 | 11.0 | 10.0 | 9.6 | 11.5 | 11.2 | 11.0 |
| Elongation (%) | 47 | 43 | 65 | 64 | 143 | 173 | 133 | 130 | 227 | 143 | 143 | 177 | 178 | 167 |
| Compression set (%) | 41 | 40 | 43 | 42 | 25 | 20 | 22 | 22 | 24 | 18 | 21 | 19 | 22 | 18 |

[*1]: Ethyl acrylate and glycidyl methacrylate (GMA) copolymer (GMA content = 9.0% by weight).
[*2]: N550 (Diablack E).
[*3]: Butane tetracarboxylic acid (Mitsui Toatsu Fine Chemicals).
[*4]: Octadecamethylene dicarboxylic acid main component (Okamura Seiyu).
[*5]: Adipic acid.
[*6]: See above formulation example.

Examples II-11 to II-17 and Comparative Example II-5 to II-8

The thermoplastic elastomer compositions of the formulations shown in Table II-2 were prepared and evaluated in the same way as above. The results are shown in Table II-2. Note that the samples for measurement of the physical properties were prepared by mixing the components by a twin-screw mixing/extruder type mixer and pressing the obtained compositions at 200° C. for 5 minutes to the predetermined samples for testing the physical properties. The Young's modulus was found by the usual method from a stress-strain curve at the time of measurement of the tensile strength.

TABLE II-2

Formulation and Physical Properties of Thermoplastic Elastomers

|  | Comp. Ex. II-5 | Comp. Ex. II-6 | Comp. Ex. II-7 | Ex. II-11 | Ex. II-12 | Ex. II-13 | Ex. II-14 | Ex. II-15 | Comp. Ex. II-8 | Ex. II-16 | Ex. II-17 |
|---|---|---|---|---|---|---|---|---|---|---|---|
| Formulation (parts by weight) | | | | | | | | | | | |
| Copolyester elastomer[*1] | 60 | 60 | 60 | 60 | 60 | 60 | 60 | 60 | 70 | 70 | 70 |
| Acrylate copolymer rubber[*2] | 25 | 25 | 25 | 25 | 25 | 25 | 25 | 25 | 19 | 19 | 19 |
| Carbon black[*2] | 15 | 15 | 15 | 15 | 15 | 15 | 15 | 15 | 11 | 11 | 11 |
| Cross-linking agent 1[*2] | 0.40 | — | — | — | — | — | — | — | 0.30 | — | — |
| Cross-linking agent 2[*2] | — | 0.48 | — | — | — | — | — | — | — | — | — |
| Cross-linking agent 3[*2] | — | — | 0.20 | — | — | — | — | — | — | — | — |
| Cross-linking agent 4[*2] | — | — | — | 2.50 | — | — | — | — | — | 1.90 | — |
| Cross-linking agent 5[*2] | — | — | — | — | 2.50 | — | — | — | — | — | 1.90 |
| Cross-linking agent 6[*2] | — | — | — | — | — | 2.50 | — | — | — | — | — |
| Cross-linking agent 7[*2] | — | — | — | — | — | — | 2.50 | — | — | — | — |
| Cross-linking agent 8[*2] | — | — | — | — | — | — | — | 2.50 | — | — | — |
| Physical properties | | | | | | | | | | | |
| Young's modulus | 16.7 | 17.9 | 20.8 | 22.8 | 19.6 | 22.6 | 22.0 | 21.6 | 17.0 | 16.9 | 21.4 |
| Tensile strength (MPa) | 18.1 | 19.4 | 19.4 | 24.7 | 21.3 | 24.5 | 23.9 | 23.4 | 19.0 | 18.5 | 23.2 |
| Elongation (%) | 130 | 115 | 150 | 300 | 200 | 250 | 260 | 230 | 120 | 350 | 220 |
| Compression set (%) | 75 | 74 | 79 | 41 | 38 | 39 | 45 | 37 | 69 | 49 | 50 |

[*1]: Hytrel 5577 (made by Toray-Du Pont).
[*2]: See notes of Table II-1.

Examples III-1 to III-13 and Comparative Examples III-1 to III-11

Various types of elastomer compositions shown in the following Table III-1 were prepared as explained above using rubber compositions, thermoplastic copolyester elastomers, and compatibilizers, vulcanizing agents, and other various compounding agents.

First, the rubber and the compounding agents other than the vulcanization agent were charged into a hermetic type rubber use Banbury mixer, then formed into sheets using a rubber use roll. The sheets were then pelletized by a rubber use pelletizer.

Next, the thermoplastic copolyester elastomer, the pelletized rubber, and the compatibilizer were charged into a twin-screw mixer/extruder where they were mixed. Next, the vulcanizing agent was continuously added so as to dynamically vulcanize a rubber component dispersed as a domain in a matrix comprised of the thermoplastic copolyester elastomer and compatibilizer.

The mixing conditions were a melting temperature of 180 to 350° C., a residence time in the portion performing the dynamic vulcanization of 15 to 300 seconds, and a shear rate of 1000 to 8000 sec$^{-1}$. After the dynamic vulcanization, the composition was continuously extruded in strands from the twin-screw mixer/extruder, cooled, and cut by a cutter to lengths of about 3 mm (diameter about 2 mm) to obtain pellets of the thermoplastic elastomer composition.

The melt viscosity was measured by a capillary rheometer (Capillograph 1C) made by Toyo Seiki at a measurement temperature of 230° C., a shear rate of 2432 s$^{-1}$, an orifice diameter of 1 mm, and a capillary length of 10 mm.

Next, pellets of the thermoplastic elastomer composition were formed into sheets of a thickness of 2.0 mm by a usually used press forming machine for resin use at 230° C. for 5 minutes and a pressure of 2.9 MPa and made into test pieces of the JIS standard No. 3 dumbbell shape (JIS K6251) and tear crescent shape (JIS K6252). The obtained test pieces were measured for elongation at break at 20° C. (JIS K6251), tear strength crescent shape (JIS K6252), and Type A durometer hardness (JIS K6253) according to the JIS standards. The results are shown in the following Table III-1.

TABLE III-1

| | Evaluation items - Composition | | | | | | | |
|---|---|---|---|---|---|---|---|---|
| | Effect of addition of (c) | | | | | | | |
| | Comp. Ex. III-1 | Ex. III-1 | Ex. III-2 | Comp. Ex. III-2 | Comp. Ex. III-3 | Ex. III-3 | Ex. III-4 | Comp. Ex. III-4 |
| a. Thermoplastic copolyester elastomer: Hytrel 5556, 90 to 30 (parts by weight) | 70.0 | 70.0 | 70.0 | 70.0 | 50.0 | 50.0 | 50.0 | 50.0 |
| b. Rubber composition (parts by weight) | 30.0 | 30.0 | 30.0 | 30.0 | 50.0 | 50.0 | 50.0 | 50.0 |
| Cross-linking agent BTC (parts by weight) | 0.33 | 0.33 | 0.33 | 0.33 | 0.55 | 0.55 | 0.55 | 0.55 |
| c. Epoxy modified olefin polymer: 1 to 25 (parts by weight) | — | 5.0 | 5.0 | 5.0 | — | 5.0 | 5.0 | 5.0 |
| Composition | | | | | | | | |
| Acrylate unit (methyl acrylate) x = 10.0 to 20.0 (mol %) | — | 12.5 | 12.8 | 0.0 | — | 12.5 | 12.8 | 0.0 |
| Epoxy group unit (glycidyl methacrylate) y = 0.5 to 20.0 (mol %) | — | 1.5 | 3.2 | 2.5 | — | 1.5 | 3.2 | 2.5 |
| Olefin unit (ethylene) z = 60.0 to 95.0 (mol %) | — | 86.0 | 84.0 | 97.5 | — | 86.0 | 84.0 | 97.5 |
| Evaluation items | | | | | | | | |
| Viscosity and volume fraction | | | | | | | | |
| Temperature (°C.) | 250 | 250 | 250 | 250 | 250 | 250 | 250 | 250 |
| Shear rate (s$^{-1}$) | 2432 | 2432 | 2432 | 2432 | 2432 | 2432 | 2432 | 2432 |
| $\phi_1$ volume fraction of thermoplastic copolyester elastomer (%) | 70.2 | 70.2 | 70.2 | 70.2 | 50.2 | 50.2 | 50.2 | 50.2 |
| $\phi_2$ volume fraction of rubber composition (%) | 29.8 | 29.8 | 29.8 | 29.8 | 49.8 | 49.8 | 49.8 | 49.8 |
| $\eta_1$ melt viscosity of thermoplastic copolyester elastomer (Pa · s) | 134 | 134 | 134 | 134 | 134 | 134 | 134 | 134 |
| $\eta_2$ melt viscosity of rubber composition (Pa · s) | 320 | 320 | 320 | 320 | 320 | 320 | 320 | 320 |
| $\eta_1/\eta_2$ <4.0 | 2.39 | 2.39 | 2.39 | 2.39 | 2.39 | 2.39 | 2.39 | 2.39 |
| $(\eta_1/\eta_2)(\phi_1/\phi_2)$<1.0. | 0.18 | 0.18 | 0.18 | 0.18 | 0.42 | 0.42 | 0.42 | 0.42 |
| Evaluation | | | | | | | | |
| Elongation at break (%) | 160 | 440 | 430 | 150 | 80 | 340 | 330 | 80 |
| Tensile strength (kN/m) | 62 | 102 | 100 | 59 | 46 | 87 | 85 | 44 |
| Hardness (Type A Durometer) | 96 | 91 | 90 | 96 | 90 | 81 | 81 | 90 |

| | Evaluation items - Composition | | | | | |
|---|---|---|---|---|---|---|
| | Effect of composition (y) of (c) | | | | | |
| | Comp. Ex. III-5 | Ex. III-5 | Ex. III-6 | Ex. III-7 | Ex. III-8 | Comp. Ex. III-6 |
| a. Thermoplastic copolyester elastomer: Hytrel 5556, 90 to 30 (parts by weight) | 70.0 | 70.0 | 70.0 | 70.0 | 70.0 | 70.0 |

TABLE III-1-continued

| | | | | | | |
|---|---|---|---|---|---|---|
| b. Rubber composition (parts by weight) | 30.0 | 30.0 | 30.0 | 30.0 | 30.0 | 30.0 |
| Cross-linking agent BTC (parts by weight) | 0.33 | 0.33 | 0.33 | 0.33 | 0.33 | 0.33 |
| c. Epoxy modified olefin based polymer: 1 to 25 (parts by weight) | 5.0 | 5.0 | 5.0 | 5.0 | 5.0 | 5.0 |
| Composition | | | | | | |
| Acrylate unit (methyl acrylate) x = 10.0 to 20.0 (mol %) | 12.3 | 12.3 | 12.4 | 15.0 | 15.9 | 16.8 |
| Epoxy group unit (glycidyl methacrylate) y = 0.5 to 20.0 (mol %) | 0.2 | 0.5 | 1.0 | 15.0 | 20.0 | 25.0 |
| Olefin unit (ethylene) z = 60.0 to 95.0 (mol %) | 87.5 | 87.2 | 86.6 | 70.0 | 64.1 | 58.2 |
| Evaluation items | | | | | | |
| Viscosity and volume fraction | | | | | | |
| Temperature (°C.) | 250 | 250 | 250 | 250 | 250 | 250 |
| Shear rate (s$^{-1}$) | 2432 | 2432 | 2432 | 2432 | 2432 | 2432 |
| $\phi_1$ volume fraction of thermoplastic copolyester elastomer (%) | 70.2 | 70.2 | 70.2 | 70.2 | 70.2 | 70.2 |
| $\phi_2$ volume fraction of rubber composition (%) | 29.8 | 29.8 | 29.8 | 29.8 | 29.8 | 29.8 |
| $\eta_1$ melt viscosity of thermoplastic copolyester elastomer (Pa · s) | 134 | 134 | 134 | 134 | 134 | 134 |
| $\eta_2$ melt viscosity of rubber composition (Pa · s) | 320 | 320 | 320 | 320 | 320 | 320 |
| $\eta_1/\eta_2$ <4.0 | 2.39 | 2.39 | 2.39 | 2.39 | 2.39 | 2.39 |
| $(\eta_1/\eta_2)$<1.0 | 0.18 | 0.18 | 0.18 | 0.18 | 0.18 | 0.18 |
| Evaluation | | | | | | |
| Elongation at break (%) | 170 | 270 | 420 | 380 | 360 | -1) |
| Tensile strength (kN/m) | 67 | 89 | 101 | 86 | 83 | — |
| Hardness (Type A Durometer) | 95 | 93 | 92 | 86 | 86 | — |

Evaluation items - Composition

| | Effect of ratio of composition of (a): (b) | | | |
|---|---|---|---|---|
| | Comp. Ex. III-7 | Ex. III-9 | Ex. III-10 | Comp. Ex. III-8 |
| a. Thermoplastic copolyester elastomer: Hytrel 5556, 90 to 30 (parts by weight) | 95.0 | 90.0 | 30.0 | 25.0 |
| b. Rubber composition (parts by weight) | 5.0 | 10.0 | 70.0 | 75.0 |
| Cross-linking agent BTC (parts by weight) | 0.06 | 0.11 | 0.77 | 0.83 |
| c. Epoxy modified olefin based polymer: 1 to 25 (parts by weight) | 5.0 | 5.0 | 5.0 | 5.0 |
| Composition | | | | |
| Acrylate unit (methyl acrylate) x = 10.0 to 20.0 (mol %) | 12.5 | 12.5 | 12.5 | 12.5 |
| Epoxy group unit (glycidyl methacrylate) y = 0.5 to 20.0 (mol %) | 1.5 | 1.5 | 1.5 | 1.5 |
| Olefin unit (ethylene) z = 60.0 to 95.0 (mol %) | 86.0 | 86.0 | 86.0 | 86.0 |
| Evaluation items | | | | |
| Viscosity and volume fraction | | | | |
| Temperature (°C.) | 250 | 250 | 250 | 250 |
| Shear rate (s$^{-1}$) | 2432 | 2432 | 2432 | 2432 |
| $\phi_1$ volume fraction of thermoplastic copolyester elastomer (%) | 95.0 | 90.1 | 30.2 | 25.2 |
| $\phi_2$ volume fraction of rubber composition (%) | 5.0 | 9.9 | 69.8 | 74.8 |
| $\eta_1$ melt viscosity of thermoplastic copolyester elastomer (Pa · s) | 134 | 134 | 134 | 134 |
| $\eta_2$ melt viscosity of rubber composition (Pa · s) | 320 | 320 | 320 | 320 |
| $\eta_1/\eta_2$ <4.0 | | 2.39 | 2.39 | 2.39 | 2.39 |
| $(\eta_1/\eta_2)(\phi_1/\phi_2)$<1.0. | | 0.02 | 0.05 | 0.97 | 1.25 |
| Evaluation | | | | |
| Elongation at break (%) | | 620 | 580 | 240 | -2) |
| Tensile strength (kN/m) | | 118 | 115 | 68 | — |
| Hardness (Type A Durometer) | | 99 | 96 | 70 | — |

Evaluation items - Composition

| | Effect of addition of (c) | | | | | |
|---|---|---|---|---|---|---|
| | Comp. Ex. III-9 | Comp. Ex. III-10 | Ex. III-11 | Ex. III-12 | Ex. III-13 | Comp. Ex. III-11 |
| a. Thermoplastic copolyester elastomer: Hytrel 5556, 90 to 30 (parts by weight) | 60.0 | 60.0 | 60.0 | 60.0 | 60.0 | 60.0 |
| b. Rubber composition (parts by weight) | 40.0 | 40.0 | 40.0 | 40.0 | 40.0 | 40.0 |
| Cross-linking agent BTC (parts by weight) | 0.44 | 0.44 | 0.44 | 0.44 | 0.44 | 0.44 |
| c. Epoxy modified olefin based polymer: 1 to 25 (parts by weight) | | | | | | |

TABLE III-1-continued

| Composition | — | 0.5 | 2.0 | 15.0 | 25.0 | 30.0 |
|---|---|---|---|---|---|---|
| Acrylate unit (methyl acrylate) x = 10.0 to 20.0 (mol %) | — | 12.5 | 12.5 | 12.5 | 12.5 | 12.5 |
| Epoxy group unit (glycidyl methacrylate) y = 0.5 to 20.0 (mol %) | — | 1.5 | 1.5 | 1.5 | 1.5 | 1.5 |
| Olefin unit (ethylene) z = 60.0 to 95.0 (mol %) | — | 86.0 | 86.0 | 86.0 | 86.0 | 86.0 |
| Evaluation items | | | | | | |
| Viscosity and volume fraction | | | | | | |
| Temperature (°C.) | 250 | 250 | 250 | 250 | 250 | 250 |
| Shear rate ($s^{-1}$) | 2432 | 2432 | 2432 | 2432 | 2432 | 2432 |
| $\phi_1$ volume fraction of thermoplastic copolyester elastomer (%) | 60.2 | 60.2 | 60.2 | 60.2 | 60.2 | 60.2 |
| $\phi_2$ volume fraction of rubber composition (%) | 39.8 | 39.8 | 39.8 | 39.8 | 39.8 | 39.8 |
| $\eta_1$ melt viscosity of thermoplastic copolyester elastomer (Pa · s) | 134 | 134 | 134 | 134 | 134 | 134 |
| $\eta_2$ melt viscosity of rubber composition (Pa · s) | 320 | 320 | 320 | 320 | 320 | 320 |
| $\eta_1/\eta_2 < 4.0$ | 2.39 | 2.39 | 2.39 | 2.39 | 2.39 | 2.39 |
| $(\eta_1/\eta_2)(\phi_1/\phi_2) < 1.0$. | 0.28 | 0.28 | 0.28 | 0.28 | 0.28 | 0.28 |
| Evaluation | | | | | | |
| Elongation at break (%) | 120 | 130 | 280 | 440 | 440 | -1) |
| Tensile strength (kN/m) | 53 | 54 | 70 | 99 | 98 | — |
| Hardness (Type A Durometer) | 93 | 93 | 88 | 84 | 84 | — |

The notes for Table III-1 are as follows:
1) Mixing was not possible due to occurrence of hardened masses of the compatibilizer.
2) Mixing was not possible due to reversal of phase.

The notes for Table III-1 are as follows:
1) Mixing was not possible due to occurrence of hardened masses of the compatibilizer.
2) Mixing was not possible due to reversal of phase.
*Formulation of Rubber Composition (b) (Parts by weight)

| ACM | 100 |
|---|---|
| Stearic acid | 2 |
| FEF grade carbon black | 40 |
| Antioxidant Irganox 1010 | 3.3 |

The compounding agents of the rubber composition were as shown below:

| ACM: | EA (ethyl acrylate) | 40% by weight |
|---|---|---|
| | BA (butyl acrylate) | 32% by weight |
| | MEA (methoxyethyl acrylate) | 19% by weight |
| | GMA (glycidyl methacrylate) | 9% by weight |

FEF: FEF grade carbon black; Seast SO made by Tokai Carbon
Antioxidant
Irganox 1010: Pentaerythrityl-tetrakis [3-(3,5-di-tertiary-butyl-4-hydroxyphenyl)propionate], hindered phenol antioxidant made by Ciba-Geigy Japan
The rest of the compositions were as follows:
Thermoplastic copolyester elastomer
  Hytrel 5556: Copolyester elastomer made by Du Pont
Cross-linking agent
  BTC: Butane tetracarboxylic acid made by Mitsui Toatsu Fine Chemical Examples III-1 to III-4 and Comparative Examples III-1 to III-4

These explain the effect of blending the epoxy-modified olefin polymer (c) comprised of the components of the present invention, that is, the acrylate unit A(x), epoxy group unit B(y), and olefin unit C(z). Comparative Examples III-1 and III-3 are thermoplastic elastomer compositions not including (c), while Comparative Examples III-2 and III-4 use compounds not including an acrylate unit, which is the essential component of (c) of the present invention. As compared with these Comparative Examples, Examples III-1 to III-4 in which were blended the epoxy-modified olefin based polymer (c) comprised of the essential components of the present invention, that is, the acrylate unit A(x), epoxy group unit B(y), and olefin unit C(z) each had a high elongation at break and tensile strength and further were lower in hardness. That is, it was learned that they were superior in breakage resistance and flexibility.

Examples III-5 to III-8 and Comparative Examples III-5 to III-6

These explain the range of composition of the epoxy group unit B(y) of the epoxy-modified olefin polymer (c) comprised of the acrylate unit A(x), epoxy group unit B(y), and olefin unit C(z) of the components of the present invention. Comparative Example III-5 has a molar percentage y less than 0.005 and a small amount of y so is out of the scope of the present invention. Comparative Example III-6 conversely has a molar percentage y more than 0.200 and a large amount of y so also is out of the scope of the present invention. Comparative Example III-5 has too little of y, so the imparting of compatibility, the effect of blending in (c), is not sufficiently achieved. Compared with Comparative Example III-1, there was almost no improvement of the elongation at break and tear strength or reduction of the hardness. Comparative Example III-6 had too much of y, so the reactivity of (c) became excessive, self-curing due to the heat of the epoxy groups proceeded excessively during the mixing, and the desired thermoplastic elastomer composition was not obtained. Compared with the comparative examples, Examples III-5 to III-8 with amounts of y in the range of the present invention all could be mixed and were compatibized, the effect of blending of (c), so the thermoplastic elastomer compositions were also superior in the physical properties of bursting resistance and flexibility.

Examples III-9 to III-10 and Comparative Examples III-7 to III-8

These explain the range of the amount of blending of (a) in 100 parts by weight of the sum of the weight of the thermoplastic copolyester elastomer (a) and the weight of the rubber composition (not including the vulcanization agent) (b) containing an acryl group and epoxy group. Comparative Example III-7 has an amount of (a) of over 90 parts by weight or a larger amount of blending of (a) so is out of the range of the present invention. Comparative Example III-8 conversely has an amount of (a) of less than 30 parts by weight or a smaller amount of blending of (a) and therefore is also out of the range of the present invention. In both cases (c) is blended in the range of the present invention. Comparative Example III-7 has too much of (a) blended, so is high in hardness and inferior in flexibility. Comparative Example III-8 has too little amount of (a) blended, so (a) does not form a matrix phase, phase inversion is caused, and the mixing of the thermoplastic elastomer composition becomes impossible. Further, these results can be confirmed from the fact that the conditions of the mixability, that is, the relationship of the melt viscosity at the time of melt mixing and the volume fraction, is not satisfied. Compared with the Comparative Examples, Examples III-9 to III-10, which are in the range of the present invention, are all mixable. The properties of the thermoplastic elastomer composition, that is, the bursting resistance and flexibility, are also superior.

Examples III-11 to III-13 and Comparative Examples III-9 to III-1

These explain the range of blending of (c) in 100 parts by weight of the sum of the weight of (a) and the weight of (b). Comparative Example III-9 shows the case where (c) is not blended, Comparative Example III-10 the case where the amount of (c) blended is less than 1 part by weight, that is, the amount of blending of (c) is small and out of the range of the present invention, and Comparative Example III-11 is conversely the case where the amount of (c) blended is more than 25 parts by weight, that is, the amount of (c) blended is large and out of the range of the present invention. Compared with Comparative Example III-9, since Comparative Example III-10 has too little an amount of blending of (c), the effects of (c) are not obtained and the improvement of the elongation at break and tear strength and the reduction of the hardness are insufficient. Further, since Comparative Example III-11 has too much of an amount of blending of (c), the amount of the epoxy groups, which are essential components of (c), becomes excessive and the self-curing due to the heat of the epoxy groups during mixing proceeds excessively so the desired thermoplastic elastomer composition could not be obtained. As opposed to the comparative examples, Examples III-11 to III-13, where the amount of blending of (c) is in the range of the present invention, all could be mixed. The properties of the thermoplastic elastomer compositions as well, that is, the bursting resistance and flexibility, were superior, it was learned.

Examples III-14 to III-26 and Comparative Examples III-12 to III-14

The compositions of Table III-1 were used and processed in the following way to prepare the various hoses shown in Table III-2 which were then evaluated as to their impulse durability.

1) Extrusion of Inner Tube

The inner tube material shown in Table III-2 was used and extruded from a resin extruder into a hollow shape of an inner diameter of 9.5 mm and a thickness of 1.0 mm to form the inner tube.

2) Braiding of Reinforcing Layer

An ordinary temperature curing type urethane based adhesive (Tyrite 7411, made by Lord Far East) was coated on this, then a reinforcing fiber layer was formed by a braider using a polyester fiber.

3) Extrusion of Outer Cover

An ordinary temperature curing type urethane based adhesive (Tyrite 7411, made by Lord Far East) was coated on this, then an outer cover material shown in Table III-2 was used and extruded from a resin extruder to a thickness of 1.0 mm to form the outer cover.

4) Evaluation of Impulse Durability (High Temperature Impulse Pressure Test)

The test conditions were a temperature of 120° C. and a pressure of 20.6 MPa based on Reinforcing layer SAE J188 Type 1. The target impulse durability was at least 400,000×. The test was not continued after 400,000×.

The results are shown in the following Table III-2. The state of bursting for the burst hoses are also shown.

TABLE III-2

| Hose configuration | Comp. Ex. III-12 | Ex. III-14 | Ex. III-15 | Ex. III-16 |
| --- | --- | --- | --- | --- |
| Inner tube material *COPE/rubber composition/compatibilizer | Comp. Ex. III-1 70/30/0 | Ex. III-1 70/30/5 | Comp. Ex. III-1 70/30/0 | Ex. III-1 70/30/5 |
| Outer cover material *COPE/rubber composition/compatibilizer | Comp. Ex. III-3 50/50/0 | Comp. Ex. III-3 50/50/0 | Ex. III-3 50/50/5 | Ex. III-3 50/50/5 |
| Impulse durability (120° C., 20.6 MPa) | 50,000X Hose burst | 400,000X Suspended | 400,000X Suspended | 400,000X Suspended |
| Hose configuration | Comp. Ex. III-13 | Ex. III-17 | Ex. III-18 | Ex. III-19 |
| Inner tube material *COPE/rubber composition/compatibilizer | Comp. Ex. III-3 50/50/0 | Ex. III-3 50/50/5 | Comp. Ex. III-3 50/50/0 | Ex. III-3 50/50/5 |
| Outer cover material *COPE/rubber composition/compatibilizer | Comp. Ex. III-1 70/30/0 | Comp. Ex. III-1 70/30/0 | Ex. III-1 70/30/5 | Ex. III-1 70/30/5 |
| Impulse durability (120° C., 20.6 MPa) | 50,000X Hose burst | 400,000X Suspended | 400,000X Suspended | 400,000X Suspended |
| Hose configuration | Comp. Ex. III-14 | Ex. III-20 | Ex. III-21 | Ex. III-22 |
| Inner tube material *COPE/rubber composition/compatibilizer | Comp. Ex. III-3 50/50/0 | Comp. Ex. III-3 50/50/0 | Ex. III-13 50/50/5 | Ex. III-3 50/50/5 |
| Outer cover material | Comp. Ex. III-3 | Ex. III-3 50/50/5 | Comp. Ex. III-3 | Ex. III-3 50/50/5 |

TABLE III-2-continued

| | | | | |
|---|---|---|---|---|
| *COPE/rubber composition/compatibilizer | 50/50/0 | | 50/50/0 | |
| Impulse durability (120° C., 20.6 MPa) | 10,000X Hose burst | 400,000X Suspended | 400,000X Suspended | 400,000X Suspended |
| Hose configuration | Ex. III-23 | Ex. III-24 | Ex. III-25 | Ex. III-26 |
| Inner tube material *COPE/rubber composition/compatibilizer | Ex. III-1 70/70/5 | Ex. III-1 70/70/5 | Ex. III-3 50/50/5 | Ex. III-3 50/50/5 |
| Outer cover material *COPE/rubber composition/compatibilizer | ** EPDM/PP | *** EPDM/PP | ** EPDM/PP | *** EPDM/PP |
| Impulse durability (120° C., 20.6 MPa) | 400,000X Suspended | 400,000X Suspended | 400,000X Suspended | 400,000X Suspended |

**: SANTOPRENE 201-64 made by AES.
***: SANTOPRENE 201-80 mae by AES.

Note that the asterisks in the Tables indicate the following:
COPE . . . amount of blending of thermoplastic copolyester elastomer (parts by weight)
Rubber composition . . . amount of blending of rubber composition
Compatibilizer. . . epoxy-modified olefin polymer (parts by weight)

Comparative Examples III-2 to III-14 all did not use the thermoplastic elastomer compositions of the present invention for the inner tube material and outer cover material, so due to bursting of the material used, the hoses all burst at an early stage and the targets were not satisfied. Compared with the comparative examples, Examples III-14 to III-22 all were hoses using the thermoplastic elastomer compositions of the present invention for the inner tube material and/or outer cover material and the target 400,000× was reached without bursting. Further, Examples III-23 to III-26 used the thermoplastic elastomer composition of the present invention for the inner tube material and used an EPDM/PP based thermoplastic elastomer composition for the outer cover material, but the target 400,000× was reached without bursting of the hoses of the examples. Further, all of the examples used thermoplastic elastomer compositions low in hardness and superior in flexibility for the inner tube material and the outer cover material, so were superior in flexibility of the hoses.

Reference Examples IV-1, Examples IV-1 to IV-14, and Comparative Examples IV-1 to IV-3

The thermoplastic elastomer compositions of the formulations (parts by weight) shown in Table IV-1 were produced using the timings of addition of silicone shown in Table IV-1. The abrasion resistance, resistance to heat softening, and flexibility (hardness) of the obtained compositions were measured as explained below. The results are shown in Table IV-1.

TABLE IV-1

| | Ref. Ex. IV-1 | Comp. Ex. IV-1 | Ex. IV-1 | Ex. IV-2 | Ex. IV-3 | Ex. IV-4 | Ex. IV-5 |
|---|---|---|---|---|---|---|---|
| Formulation | | | | | | | |
| Ether polyurethane Thermoplastic elastomer*1 | 100 | — | — | — | — | — | — |
| Silicone (A) | | | | | | | |
| Polydimethylsiloxane | | 0 | 0.5 | 1 | 3 | 5 | 10 |
| MMA modified polydimethylsiloxane*2 | | — | — | — | — | — | — |
| EVA modified polydimethylsiloxane*3 | | — | — | — | — | — | — |
| PE modified polydimethylsiloxane*4 | | — | — | — | — | — | — |
| Thermoplastic resin (B) - | | | | | | | |
| Polyester block copolymer thermoplastic elastomer*5 | | 60 | 60 | 60 | 60 | 60 | 60 |
| Compatibilizer - EMA-GMA*7 | | 3 | 3 | 3 | 3 | 3 | 3 |
| Rubber composition (C) | | | | | | | |
| Rubber composition (1) | | 40 | 40 | 40 | 40 | 40 | 40 |
| Acrylic rubber*8 | | 100 | 100 | 100 | 100 | 100 | 100 |
| Carbon black (FEF grade)*9 | | 40 | 40 | 40 | 40 | 40 | 40 |
| Stearic acid | | 3 | 3 | 3 | 3 | 3 | 3 |
| Antioxidant: Hindered phenol based*10 | | 3 | 3 | 3 | 3 | 3 | 3 |
| Vulcanization agent (D) - Butane tetracarboxylic acid*11 | | 0.44 | 0.44 | 0.44 | 0.44 | 0.44 | 0.44 |
| Production process | | | | | | | |
| Timing of addition of silicone | | | | | | | |
| Simultaneous: Added when mixing components B and C | | — | Simul. | Simul. | Simul. | Simul. | Simul. |

TABLE IV-1-continued

|  |  |  |  |  |  |  |
|---|---|---|---|---|---|---|
| Later: Added later to thermoplastic elastomer composition | — | — | — | — | — | — |
| Properties of composition |  |  |  |  |  |  |
| Abrasion resistance - Pico abrasion index (index when reference example = 100) | 100 | 100 | 47 | 39 | 30 | 25 | 25 |
| Heat softening resistance - Young's modulus at 120° C. (MPa) | 3 | 26 | 26 | 26 | 26 | 26 | 25 |
| Flexibility - Hardness (Type A durometer) | 92 | 88 | 88 | 88 | 88 | 88 | 88 |
| Hose performance |  |  |  |  |  |  |  |
| Abrasion resistance - Abrasion resistance test (10,000X) | 0.7 | 0.7 | 1.5 | 1.8 | 2.3 | 2.8 | 2.8 |
| Heat softening resistance - High temperature bursting test (120° C.) (bursting pressure (MPa)) | 38 | 55 | 55 | 55 | 55 | 55 | 55 |
| Flexibility - Flexural rigidity (N; 4D) | 40 | 32 | 32 | 31 | 31 | 31 | 31 |

|  | Comp. Ex. IV-2 | Ex. IV-6 | Ex. IV-7 | Ex. IV-8 | Ex. IV-9 | Ex. IV-10 | Ex. IV-11 |
|---|---|---|---|---|---|---|---|
| Formulation |  |  |  |  |  |  |  |
| Ether polyurethane Thermoplastic elastomer*1 | — | — | — | — | — | — | — |
| Silicone (A) |  |  |  |  |  |  |  |
| Polydimethylsiloxane | 15 | — | — | — | — | — | — |
| MMA modified polydimethylsiloxane*2 | — | 5 | 5 | 3 | — | — | — |
| EVA modified polydimethylsiloxane*3 | — | — | — | — | 5 | 5 | 3 |
| PE modified polymethylsiloxane*4 | — | — | — | — | — | — | — |
| Thermoplastic resin (B) - Polyester block copolymer thermoplastic elastomer*5 | 60 | 60 | 60 | 60 | 60 | 60 | 60 |
| Compatibilizer - EMA-GMA*7 | 3 | 3 | 3 | 3 | 3 | 3 | 3 |
| Rubber composition (C) |  |  |  |  |  |  |  |
| Rubber composition (1) | 40 | 40 | 40 | 40 | 40 | 40 | 40 |
| Acrylic rubber*8 | 100 | 100 | 100 | 100 | 100 | 100 | 100 |
| Carbon black (FEF grade)*9 | 40 | 40 | 40 | 40 | 40 | 40 | 40 |
| Stearic acid | 3 | 3 | 3 | 3 | 3 | 3 | 3 |
| Antioxidant: Hindered phenol based*10 | 3 | 3 | 3 | 3 | 3 | 3 | 3 |
| Vulcanization agent (D) - Butane tetracarboxylic acid*11 | 0.44 | 0.44 | 0.44 | 0.44 | 0.44 | 0.44 | 0.44 |
| Production process |  |  |  |  |  |  |  |
| Timing of addition of silicone Simultaneous: Added when mixing components B and C | Simul. | Simul. | Later | Later | Simul. | Later | Later |
| Later: Added later to thermoplastic elastomer composition | — | — |  |  |  |  |  |
| Properties of composition |  |  |  |  |  |  |  |
| Abrasion resistance - Pico abrasion index (index when reference example = 100) | 25 | 27 | 25 | 27 | 27 | 25 | 27 |
| Heat softening resistance - Young's modulus at 120° C. (MPa) | 24 | 26 | 26 | 26 | 26 | 26 | 26 |
| Flexibility - Hardness (Type A durometer) | 88 | 88 | 88 | 88 | 88 | 88 | 88 |
| Hose performance |  |  |  |  |  |  |  |
| Abrasion resistance - Abrasion resistance test (10,000X) | 2.8 | 2.6 | 2.8 | 2.6 | 2.6 | 2.8 | 2.6 |
| Heat softening resistance - High temperature bursting test (120° C.) (bursting pressure | 55 | 55 | 55 | 55 | 55 | 55 | 55 |

TABLE IV-1-continued

| | | | | | | | |
|---|---|---|---|---|---|---|---|
| (MPa)) Flexibility - Flexural rigidity (N; 4D) | 30 | 32 | 32 | 32 | 32 | 32 | 32 |

Table IV-I Notes
*[1]: Esten 58212: made by Kyowa Hakko Kogyo
*[2]: SP-100: Made by Dow Corning Asia
*[3]: SP-110: Made by Dow Corning Asia
*[4]: SP-300: Made by Dow Corning Asia
*[5]: Hytrel 5556: made by Toray-Du Pont
*[7]: E (ethylene) = 67% by weight, MA (methyl acrylate) = 30% by weight, GMA (glycidyl methacrylate) = 3% by weight
*[8]: EA (ethyl acrylate) = 40% by weight, BA (butyl acrylate) = 32% by weight, MEA (methoxyethyl acrylate) = 19% by weight, GMA (glycidyl methacrylate) = 9% by weight
*[9]: Seast SO: made by Tokai Carbon
*[10]: Irganox 1010: made by Ciba-Geigy Japan
*[11]: made by Mitsui Toatsu Fine Chemical (Preparation of test pieces)

Pellets of the thermoplastic elastomer composition were formed by a usually used resin use press molder to sheets of a thickness 2.0 mm at 230° C. for 5 minutes at a pressure of 2.9 MPa.

Measurement Method a) Abrasion Resistance=Pico Abrasion Test

A Pico abrasion test described in JIS (JIS K 6264) was performed.

The predetermined test piece was prepared by pressing. The obtained test piece was used for a test at a load of 44N (4.49 kgf), a rotational speed of 60 rpm, and a number of rotations of 20 forward and 20 backward repeated two times each for a total of 80.

The obtained volume of abrasion was indicated as an index against the abrasion volume of the reference example as 100.

b) Resistance to Softening Under Heat=120° C. Young's Modulus

A test piece of a JIS No. 3 dumbbell shape (JIS K 6251) was prepared by punching. The obtained test piece was measured for the Young's modulus (MPa) at 120° C. based on the JIS standard.

c) Flexibility=Hardness

A test piece of a JIS No. 3 dumbbell shape (JIS K 6251) was prepared by punching. The obtained test piece was measured for the Type A Durometer hardness (JIS K 6253) according to the JIS standard.

Hoses of an inner diameter of 9.5 mm and an outer diameter of 17.5 mm comprised of the thermoplastic elastomer compositions obtained in the Examples as the outer cover and the following inner tube, adhesive resin layer, and reinforcing layer were prepared by an ordinary method:

| Inner Tube: Thermoplastic Elastomer Composition | |
|---|---|
| | (parts by weight) |
| Thermoplastic copolyester elastomer Hytrel 5556 (made by Toray-Du Pont) | 144.3 |
| EMA-GMA Composition | 14.43 |
| E (ethylene) = 67% by weight | |
| MA (methyl acrylate) = 30% by weight | |
| GMA (glycidyl methacrylate) = 3% by weight | |
| Acrylic rubber Composition | 100.00 |
| EA (ethyl acrylate) = 40% by weight | |
| BA (butyl acrylate) = 32% by weight | |
| MEA (methoxyethyl acrylate) = 19% by weight | |
| GMA (glycidyl methacrylate) = 9% by weight | |
| FEF grade carbon black (Seast SO made by Tokai Carbon) | 40.00 |
| Antioxidant - Irganox 1010 (Made by Ciba-Geigy Japan) | 3.33 |
| Cross-linking agent - butane tetracarboxylic acid (made by Mitsui Toatsu Fine Chemical) | 1.60 |
| Reinforcing layer: polyester fiber | |
| Bonding layer: Bonding layer between inner tube/reinforcing layer = wet curing type urethane adhesive Tyrite 7411 (made by Lord Far East) Bonding layer between reinforcing layer/outer cover = thermoplastic polyester copolymer | |
| Resin composition | |
| Thermoplastic copolyester elastomer Block copolymer composition | 50 parts by weight |
| Terephthalic acid = 30 mol % | |
| Isophthalic acid = 12 mol % | |
| 1,4-butanediol = 38 mol % | |
| Polytetramethylene glycol = 20 mol % | |
| Thermoplastic polyurethane elastomer Esten 58212 (made by Kyowa Hakko Kogyo) | 50 parts by weight |

The compositions of Table III-1 were used and processed in the following way to prepare the various hoses shown in Table III-2 which were then evaluated as to their impulse durability.

1) Extrusion of Inner Tube

The inner tube material was used and extruded from a resin extruder into a hollow shape of an inner diameter of 9.5 mm and a thickness of 1.0 mm to form the inner tube.

2) Braiding of Reinforcing Layer

An ordinary temperature curing type urethane based adhesive was coated on this, then a reinforcing fiber layer was formed by a braider using a polyester fiber.

3) Formation of Bonding Layer

A wet curing type urethane based adhesive shown in Table IV-1 was coated over this or a thermoplastic polyester copolymer resin shown in Table IV-1 was extruded from a resin extruder to form the bonding layer.

4) Extrusion of Outer Cover

An outer cover material shown in Table IV-1 was used and extruded from a resin extruder to a thickness of 1.0 mm to form the outer cover.

The performance (abrasion resistance, resistance to softening under heat, and flexibility) of the hoses obtained in this way were measured as follows. The results are shown in Table IV-1.

Methods of Measurement a) Abrasion Resistance=Abrasion Resistance Test

Figure 12:
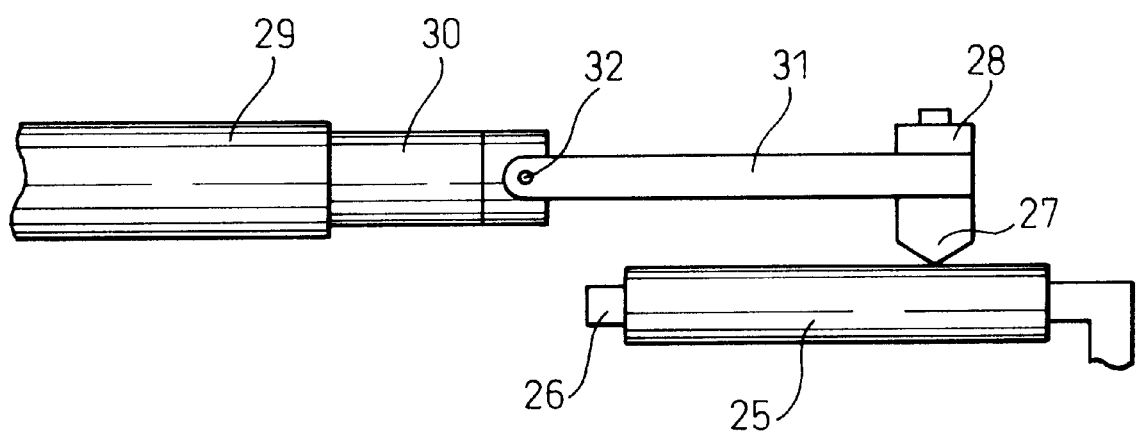
FIG. 12 is a schematic view of the test equipment used for the abrasion test of the hose according to the present invention.

The abrasion resistance was measured by rubbing the surface of the outer cover of the hose by reciprocating motion of the corner portion 27 of the tester shown in FIG. 12 so as to abrade the outer cover and determining the number of reciprocating movements (in units of 10,000×) of the corner portion 27 until the reinforcing layer was exposed.

In this test, the tested hose 25 was passed through the axial center 26 and affixed, the corner portion 27 was brought into contact with the surface of the outer cover of the tested hose 25 by pushing down by a weight 28, the corner portion 27 was moved back and forth by the cylinder 29 and the piston 30 through the arm 31, and the arm 31 was held rotatably to the piston 30 by the pin 32. The corner portion 27 formed an angle of 90° and had a front end of an arc shape with a radius of 0.4 mm. The corner portion 27 pressed against the surface of the outer cover of the tested hose 25 by a force of 14.7N (1.50 kgf).

b) Resistance to Softening Under Heat=High Temperature Bursting Test (120° C.)

Predetermined metal fittings were attached to the two ends of the hose and the hots was tested for bursting at high temperatures in the following manner.

The pressure resistance test (bursting test) described in the JIS standard (JIS K 6349) was performed at a temperature of 120° C.

The pressure until bursting was measured and evaluated as the bursting pressure (MPa).

c) Flexibility=Flexural Rigidity

The sample hoses were bent along arcs of various radii and the bending force (N) measured.

More specifically, the measurement started from a bending radius of 10 times the outer diameter of the sample hose, then the bending radius was successively changed up to 3 times and the bending force (N) measured.

From the results of the measurement, a graph was prepared showing the relationship between the bending force and the bending radius. From the obtained graph, the flexural force at the time of the prescribed radius (4 times) was read and made the flexural rigidity (N) of the hose.

These are examples showing the dependency on the amount of addition of the component (A) silicone and explain the effect of addition of silicone.

Reference Example IV-1 is a conventional plastic hose which uses an ether based polyurethane thermoplastic elastomer for the outer cover. It explains the effect of the present invention based on the abrasion resistance of the hose.

Comparative Example IV-1 is a hose of a thermoplastic elastomer composition not containing the component (A) silicone of the present invention and has an abrasion similar to the Reference Example, that is, a poor abrasion resistance. The thermoplastic elastomer composition, however, has a low hardness at ordinary temperature and a superior Young's modulus at 120° C. compared with an ether based polyurethane thermoplastic elastomer, and therefore has a low flexural rigidity at ordinary temperature and flexibility and has a high bursting pressure in a high temperature bursting test and is superior in resistance to heat softening.

Examples IV-1 to IV-5 are thermoplastic elastomer compositions and hoses in which polydimethylsiloxane is blended as the component (A) silicone of the present invention. In the production of the thermoplastic elastomer composition, the component (A) was added at the time of mixing of the components (B) and (C).

As shown in Example IV-1, with blending of 0.5 part by weight of silicone, the abrasion resistance is improved about two fold. The effect of improvement of the abrasion resistance by the blending of the component (A) is therefore learned. Further, in comparison with Comparative Example IV-1, the hardness at ordinary temperature and the Young's modulus at 120° C. are similar while the flexibility and resistance to heat softening are equal to or superior to Comparative Example IV-l.

Further, as shown in Examples IV-2 to IV-5, if the amount of the silicone blended is increased, the abrasion resistance is further improved, while there is almost no change in the flexibility or resistance to heat softening which both remain excellent.

Comparative Example IV-2 is a thermoplastic elastomer composition and hose in which 15 parts by weight of the component (A) silicone is added. It is excellent in all of the abrasion resistance, flexibility, and resistance to heat softening, but compared with Example IV-5, no improvement is observed in the abrasion resistance. That is, when over 10 parts by weight of the component (A) are added, there is no longer any effect of improvement. Considering economy, it is learned that blending not more than 10 parts by weight is suitable.

These thermoplastic elastomer compositions and hoses have blended in them as the silicone of the component (A) MMA (methyl methacrylate) modified polydimethyl siloxane. The thermoplastic elastomer composition is obtained by the method of adding the component (A) at the time of mixing the components (B) and (C) (Example IV-6) and the method of producing a thermoplastic elastomer composition not including the component (A) and then adding it at the time of extrusion (Examples IV-7 and IV-8). The MMA modified polydimethyl siloxane can be pelletized, so can be fed without fouling the hopper etc. at the time of later addition by a single-screw extruder etc., so can be more preferably used.

Example IV-6 shows similar properties compared with Examples IV-1 to IV-s. It is learned that even if MMA modified polydimethyl siloxane is used as the component (A), the effect of improvement of the abrasion resistance similar to that of polydimethyl siloxane, flexibility, and resistance to heat softening can be obtained.

Further, in Examples IV-7 and IV-8 where the component (A) was added later, it was learned that a similar effect of improvement of the abrasion resistance could be obtained with a smaller amount of blending compared with Example IV-6. This is believed to be because, compared with the method of addition of the component (A) at the time of mixing the components (B) and (C), the component (A) is concentrated at the phase of the component (B) forming the matrix phase and, as a result, the state is formed where the concentration of the component (A) at the abrasion surface is high. Accordingly, it is learned that as the method of addition of the component (A), the method of producing a thermoplastic elastomer composition not containing the component (A) and then later blending the component (A) to form the thermoplastic elastomer composition of the present invention is a more preferable method.

These thermoplastic elastomer compositions and hoses have blended in them as the silicone of the component (A) EVA (ethylvinyl acetate) modified polydimethyl siloxane. The thermoplastic elastomer composition is obtained by the method of adding the component (A) at the time of mixing the components (B) and (C) (Example IV-9) and the method of producing a thermoplastic elastomer composition not including the component (A) and then adding it at the time of extrusion (Examples IV-10 and IV-11). The EVA modified polydimethyl siloxane can be pelletized, and therefore, can be fed without fouling the hopper etc. at the time of later addition by a single-screw ex-ruder etc., and therefore, can be more preferably used.

Example IV-9 shows similar properties compared with Examples IV-1 to IV-5. It is learned that even if EVA modified polydimethyl siloxane is used as the component (A), the effect of improvement of the abrasion resistance similar to that of polydimethyl siloxane, flexibility, and resistance to heat softening can be obtained.

Further, in the same way as Examples !V-6 and IV-8, Examples IV-10 and IV-11 showed a similar effect of improvement of the abrasion with a smaller amount of blending compared with Example IV-9. Accordingly, it is learned that as the method of addition of the component (A), the method of producing a thermoplastic elastomer composition not containing the component (A) and then later blending the component (A) to form the thermoplastic elastomer composition of the present invention is a more preferable method.

Examples V-1 to V-8 and Comparative Examples V-1 to V-6

Various types of thermoplastic elastomer compositions shown in the following Table V-1 were prepared as explained below using the following component a (olefin based thermoplastic resin), unvulcanized component b (rubber composition), and compounding agents comprised of the component B, component C, and vulcanization system.

First, the compounding agents constituting the component b other than the vulcanization agent were charged into a hermetic type rubber use Banbury mixer where they were mixed. Next, the mixture was formed into rubber sheets of a thickness of 2.5 mm using a rubber use roll to prepare a master batch. The sheets of the master batch were then pelletized by a rubber use pelletizer to prepare pellets of the component b.

Next, the component a and the pelletized component b were charged into a twin-screw mixer/extruder where they were mixed. Next, the vulcanization agent was continuously added so as to dynamically vulcanize a rubber component dispersed as a domain in a matrix comprised of the polyester and compatibilizer. The mixing conditions were a melting temperature of 160 to 200° C., a residence time in the portion performing the dynamic vulcanization of 30 to 90 seconds, and a shear rate of 1000 to 4000 sec$^{-1}$. After the dynamic vulcanization, the composition was continuously extruded in strands from the twin-screw mixer/extruder, cooled by water, and cut by a cutter to lengths of about 3 mm (diameter about 2 mm) to obtain pellets of the thermoplastic elastomer composition (component A). Further, the pelletized component A and the components B and C were melt mixed at a mixing temperature of 200 to 280° C. and a shear rate of 50 to 200 sec$^{-1}$ to obtain pellets of the composition of the present invention in the same way as above.

Next, pellets of the thermoplastic elastomer composition were formed into sheets of a thickness of 2 mm by a usually used resin use press forming machine at 200° C. for 5 minutes and a pressure of 2.9 MPa and made into test pieces of the JIS standard No. 3 dumbbell shape (JIS K6251) and tear crescent shape (JIS K6252). The obtained test pieces were first evaluated as to hot melt adhesiveness at 120° C. Next, they were measured for tensile strength at room temperature and elongation at break according to JIS K6251 and tear strength crescent shape according to JIS K6252. Further, they were measured for elongation at break at 120° C. as an indicator of high temperature physical properties and measured for elongation at break after being allowed to stand at 120° C. for 336 hours as an indicator of resistance to heat aging. The results are shown in Table V-1.

(Hose)

The compositions of Table V-1 were processed in the following way Lo prepare hoses which were then evaluated as to impulse durability in the bottom part of Table V-1.

1) Extrusion of Inner Tube

A resin extruder was used to extrude the inner tube material by a sizing die to form a hollow shape of an inside diameter of 9.5 mm and a thickness of 1.0 mm to form the inner tube. As the resin for the inner tube, the ACM/COPE composition shown in Table 2 was used.

2) Formation of Adhesion Layer

As the adhesive, a urethane based ordinary temperature-curing type adhesive (Tyrite 7411: Made by Lord Far East) diluted 10-fold by MEK was used.

The adhesive was coated on the outer surface of the inner tube and allowed to naturally dry.

3) Braiding of Reinforcing Layer

A polyester fiber reinforcing layer material was braided on top of this by a braider to give a two-layer braided structure and form the reinforcing fiber layer.

4) Formation of Adhesion Layer

For hoses with adhesion layers, use was made of Hytrel 2531 (made by Toray-Du Pont) as the polyester based copolymer resin adhesion Layer or the compositions of the examples. The resins (compositions) were extruded on the inner tubes by a cross-head resin extruder to a thickness of 0.1 mm.

5) Extrusion of Outer Cover

A cross head resin extruder was used to extrude the elastomer compositions described in Table V-1 or an EPDM/PP composition (component A) as on outer cover material at an outer diameter of 17.5 mm to form the outer cover.

<Evaluation of Impulse Durability>

The following three types of hoses were prepared for each of the compositions and were subjected to 1,000,000× durability tests at a temperature of 120° C. and a pressure of 20.6 MPa according to Reinforcing layer SAE J188 Type 1.

1) Hoses using a polyester copolymer resin as the adhesion layer for an outer cover comprised of the compositions of the examples and the reinforcing layers.

2) Hoses directly adhere by hot melting the outer cover comprised of the compositions of the examples and the reinforcing layers.

3) Hoses using an EPDM/PP composition corresponding to the component A for the outer cover and interposing adhesion layers composed of the compositions of the Examples between them and the reinforcing layers.

The number of times at which bursting occurred and the state of the bursting were recorded for hoses which bursting at less than 1,000,000×. Hoses which failed to bursting even over 1,000,000× were not tested further.

TABLE V-1

|  | Examples | | | | Comparative examples | | | | Examples | |
| --- | --- | --- | --- | --- | --- | --- | --- | --- | --- | --- |
|  | V-1 | V-2 | V-3 | V-4 | V-1 | V-2 | V-3 | V-4 | V-5 | V-6 |
| Composition | | | | | | | | | | |
| Component A - *EPDM/PP composition | 60 | 50 | 70 | 90 | 100 | 60 | 40 | 95 | 60 | 60 |
| Component B | | | | | | | | | | |
| COPE resin (1) | 40 | 50 | 30 | 10 | — | 40 | 60 | 5 | 40 | 40 |
| COPE resin (2) | | | | | | | | | — | — |
| Component C | | | | | | | | | | |
| EMA-GMA<br>E [1]: 67% by weight<br>GMA [2]: 3% by weight<br>MA [3]: 30% by weight | 5 | 5 | 5 | 5 | — | — | 5 | 5 | — | — |
| E-GMA<br>E [1]: 88% by weight<br>GMA [2]: 12% by weight | | | | | | | | | 5 | 1 |
| Adhesiveness** with COPE resin (3) (120° C.) | Good | Good | Good | Good | Poor | Good | Good | Poor | Good | Good |
| Adhesiveness** with polyester fiber (120° C.) | Good | Good | Good | Good | Poor | Good | Good | Poor | Good | Good |
| Adhesiveness** with EPDM/PP (120° C.) | Good | Good | Good | Good | Good | Good | Poor | Good | Good | Good |
| Ordinary properties | Good | Good | Good | Good | Good | Good | Poor | Good | Good | Good |
| Tensile strength (MPa): at least 4.0 | 4.7 | 4.3 | 4.1 | 5.6 | 5.8 | 4.8 | 3.5 | 6.3 | 4.7 | 4.6 |
| Elongation at break (%): at least 200 | 250 | 220 | 250 | 380 | 410 | 320 | 200 | 420 | 250 | 320 |
| Tear strength, crescent shaped (kN/m): at least 20 | 28 | 30 | 25 | 27 | 20 | 29 | 32 | 41 | 28 | 26 |
| High temperature properties (120° C.) | Good | Good | Good | Good | Good | Good | Poor | Poor | Good | Good |
| Elongation at break (%): at least 100 | 300 | 200 | 320 | 350 | 340 | 120 | 90 | 60 | 300 | 150 |
| Heat aging resistance (120° C. × 336 h) | Good | Good | Good | Good | Good | Poor | Good | Good | Good | Good |
| Elongation at break (%): at least 100 | 220 | 170 | 200 | 300 | 360 | 80 | 130 | 220 | 230 | 180 |
| Hose properties | | | | | | | | | | |
| (1) Adhesion layer used | | | | | | | | | | |
| Impulse durability (120° C.) | Good | Good | Good | Good | Poor | Poor | Poor | Poor | Good | Good |
| Durability (10,000X): 1,000,000 | >1000 | >1000 | >1000 | >1000 | 0 | 30 | 20 | 0 | >100 | >100 |
| Bursting state***: Suspended | | | | | Fitting | Hose | Hose | Fitting | | |
| (2) Reinforcing layers directly adhered | | | | | | | | | | |
| Impulse durability (120° C.) | Good | Good | Good | Good | Poor | Poor | Poor | Poor | Good | Good |
| Durability (10,000X): 1,000,000 | >100 | >100 | >100 | >100 | 20 | 50 | 40 | 20 | >100 | >100 |
| Bursting state***: Suspended | | | | | Hose | Hose | Hose | Hose | | |
| (3) Used as adhesion layer | | | | | | | | | | |
| Impulse durability (120° C.) | Good | Good | Good | Good | Poor | Poor | Poor | Poor | Good | Good |
| Durability (10,000X): 1,000,000 | >100 | >100 | >100 | >100 | 20 | 60 | 0 | 20 | >100 | >100 |
| Bursting state ***: Suspended | | | | | Hose | Hose | Fitting | Hose | | |

|  | Examples | | Comp. Ex. | |
| --- | --- | --- | --- | --- |
|  | V-7 | V-8 | V-5 | V-6 |
| Composition | | | | |
| Component A - *EPDM/PP composition | 60 | 60 | 60 | 60 |
| Component B | | | | |
| COPE resin (1) | 40 | — | 40 | 40 |
| COPE resin (2) | — | 40 | — | — |
| Component C | | | | |
| EMA- GMA<br>E [1]: 67% by weight<br>GMA [2]: 3% by weight<br>MA [3]: 30% by weight | — | 5 | — | — |
| E-GMA<br>E [1]: 88% by weight<br>GMA [2]: 12% by weight | 10 | — | 0.5 | 15 |
| Adhesiveness** with COPE resin (3) (120° C.) | Good | Good | Good | Good |
| Adhesiveness** with polyester fiber (120° C.) | Good | Good | Good | Good |
| Adhesiveness** with EPDM/PP (120° C.) | Good | Good | Good | Good |
| Ordinary properties | Good | Good | Good | Good |
| Tensile strength (MPa): at least 4.0 | 4.5 | 5.1 | 4.6 | 6.1 |
| Elongation at break (%): at least 200 | 270 | 250 | 330 | 230 |

TABLE V-1-continued

| | | | | | |
|---|---|---|---|---|---|
| | Tear strength, crescent shaped (kN/m): at least 20 | 31 | 32 | 30 | 41 |
| | High temperature properties (120° C.) | Good | Good | Good | Poor |
| | Elongation at break (%): at least 100 | 120 | 300 | 140 | 80 |
| | Heat aging resistance (120° C. × 336 h) | Good | Good | Poor | Good |
| | Elongation at break (%): at least 100 | 240 | 260 | 80 | 260 |
| | Hose properties | | | | |
| | (1) Adhesion layer used | | | | |
| | Impulse durability (120° C.) | Good | Good | Poor | Poor |
| | Durability (10,000X): 1,000,000 | >100 | >100 | 30 | 15 |
| | Bursting state***: Suspended | | | Hose | Hose |
| | (2) Reinforcing layers directly adhered | | | | |
| | Impulse durability (120° C.) | Good | Good | Poor | Poor |
| | Durability (10,000X): 1,000,000 | >100 | >100 | 30 | 15 |
| | Bursting state***: Suspended | | | Hose | Hose |
| | (3) Used as adhesion layer | | | | |
| | Impulse durability (120° C.) | Good | Good | Poor | Poor |
| | Durability (10,000X): 1,000,000 | >100 | >100 | 60 | 40 |
| | Bursting state ***: Suspended | | | Hose | Hose |

*EPDM/PP composition is Santoprene 201–64.
1) E: methylene.
2) GMA: Glycidyl methacrylate.
3) MA: methyl acrylate.
**: Evaluation of hot adhesion is "good" for 0.3 kgf/25 mm or more and "poor" for less than 0.3 kgf/25 mm.
***: "Fitting" means metal fitting detached, while "hose" means hose burst.

TABLE V-2

| Composition | Brand name and manufacturer | Inner tube material ACM/COPE composition |
|---|---|---|
| COPE | (Hytrel 5556, made by Toray-Du Pont) | 334.40 |
| ACM | EA (ethylene acryate: 40% by weight) | 100.00 |
| | BA (butyl acrylate: 32% by weight) | |
| | MEA (methoxyethyl acrylate: 19% by weight) | |
| | GMA (glycidyl methacrylate: 9% by weight) | |
| FEF grade carbon black | (Seast SO, made by Tokai Carbon) | 40.00 |
| Antioxidant | (Irganox 1010, made by Ciba-Geigy Japan) | 3.00 |
| Cross-linking agent | (BTC, made by Mitsui Toatsu Fine Chemicals) | 1.60 |
| EMA-GMA | E (ethylene: 67% by weight) | 33.44 |
| | MA (methyl acrylate: 30% by weight) | |
| | GMA (glycidyl methacrylate: 3% by weight) | |

The components in Table V-1 were as follows:

EPDM/PP composition: Santoprene 201-64 (made by AES Japan)

COPE resin (component B) (1): Vylon GM-990 (copolyester made by Toyobo)

COPE resin (component B) (2): Hytrel 2551 (copolyester made by Toray-Du Pont)

COPE resin (component B) (3): Hytrel 2531 (copolyester made by Toray-Du Pont)

| EMA-GMA (component C) | |
|---|---|
| E (ethylene): | 67% by weight |
| GMA (glycidyl methacrylate): | 3% by weight |
| MA (methyl acrylate): | 30% by weight |
| E-GMA (component C) | |
| E (ethylene): | 88% by weight |
| GMA (glycidyl methacrylate): | 12% by weight |

From the results of the evaluation, Comparative Example V-1 in which the components B and C were not added was inferior in the adhesiveness with a polyester fiber and was not satisfactory either in the properties sought for a hose. Comparative Example V-2 did not have the component C added, and therefore, the components A and B were not compatible and therefore phase separation occurred and a sufficient strength could not be obtained. Comparative Example V-3 had too much of the component B, therefore was inferior in high temperature properties. Comparative Example V-4 had too little of the component B, so was inferior in the adhesiveness of the COPE resin (3) and the polyester fiber. Comparative Example V-5 had too little of the component C, and therefore, phase separation ended up occurring like with Comparative Example V-2. Comparative Example V-6 had too much of the component C, and therefore, was inferior in high temperature properties.

On the other hand, all of Examples V-1 to V-8 falling under the scope of the present invention were excellent in adhesiveness with polyester fiber and resistance to heat aging and had sufficient durability even in the laminated hose properties. Further, in the adhesion of the thermoplastic elastomer composition of the present invention and the polyester fiber, a sufficient bonding strength could be obtained in all cases even without interposition of a polyester copolymer resin layer and sufficient durability was shown as a laminate.

Further, sufficient adhesiveness and resistance to heat aging were shown even in the case of using the thermoplastic elastomer composition of the present invention as an adhesive layer.

Examples VI-1 to VI-22 and Comparative Example VI-1

1. Preparation of Thermoplastic Adhesive Resin

Thermoplastic adhesive resin no. 1 to 22 with different melt indexes, shown in Table VI-1, were obtained by ordinary methods. For the modification of the resins, use was made of maleic anhydride or epoxy compounds (glycidyl methacrylate).

Adhesive resin nos. 1 to 3 were polypropylene modified by maleic anhydride. Adhesive resin no. 4 to 6 were high density polyethylene modified by maleic anhydride. Adhesive resin nos. 7 to 9 were linear low density polyethylene modified by maleic anhydride. Adhesive resin nos. 10 to 12 were low density polyethylene modified by maleic anhydride. Adhesive resin nos. 13 to 15 were ethylene-ethyl acrylate copolymers modified by maleic anhydride. Adhesive resin nos. 16 to 18 were ethylene-ethyl acrylate copolymers modified by epoxy. Adhesive resin nos. 19 to 22 were copolymer polyester resins, while adhesive resin no. 22 was a block copolymer polyester resin.

The adhesion strength between a polyester fiber fabric (warp 1000d, weft 1000d, density 50×50/5 cm flat weave) and a thermoplastic elastomer composition (a thermoplastic elastomer composition composed of a polyolefin thermoplastic resin, that is, polypropylene PP, in which was dispersed as a dispersed phase an elastomer component, that is, EPDM rubber, in a cross-linked state, wherein the weight ratio of the PP/EPDM rubber composition was 45/55, PP was RB121D made by Tokuyama, and EPDM was EPT4070 made by Mitsui Petrochemical Industries) was measured for the above obtained thermoplastic adhesive resin nos. 1 to 22 as shown in Table VI-1. The EPDM rubber composition was comprised of 100 parts by weight of EPDM, 60 parts by weight of HAF carbon black, 20 parts by weight of paraffinic oil, 5 parts by weight of zinc oxide, and 1 part by weight of stearic acid. Further, as the dynamic vulcanization system at the time of twin-screw mixing the PP and EPDM composition, 0.5 part by weight of sulfur, 1 part by weight of a vulcanization accelerator BZ (zinc di-n-butyldithiocarbamate), 0.5 part by weight of a vulcanization accelerator TRA (dipentamethylene thiuram tetrasulfide), 0.5 part by weight of a vulcanization accelerator TT (tetramethylthiuram disulfide), and 1 part by weight of a vulcanization accelerator CZ (N-cyclohexyl-2-benzothiazyl sulfenamide) were added with respect to 100 parts by weight of the copolymer to cause dynamic vulcanization and prepare the thermoplastic elastomer composition. For the adhesion test pieces, a thermoplastic adhesive resin sheet was gripped between a polyester fabric and sheets of the thermoplastic elastomer composition, pressed at 230° C. for 2 minutes at 10 kgf/cm$^2$, cooled to room temperature, then cut into short strips of 25 mm length. The peeling adhesion strength was measured using these as peeling test pieces. The results are shown in Table VI-1.

TABLE VI-1

Results of Test of Adhesion by Thermoplastic Adhesive Resin

Adhered object: EPDM/PP and polyester fiber

| | Adhesive resin | | | Melt index[1] | | Adhesion strength (N/25 mm) | |
|---|---|---|---|---|---|---|---|
| | | | | Measure. | | measure. temp. | |
| Adhesive resin no. | Adhesive resin | Functional group | | temp. | (g/10 min) | 25° C. | 100° C. |
| Comp. Ex VI-1 | Tyrite 7411 | — | — | — | — | 5 | 1 |
| Ex. VI-1 | 1 | Modified PP | Maleic anhydride | 230° C. | 1.1 | 25 | 30 |
| Ex. VI-2 | 2 | Modified PP | Maleic anhydride | 230° C. | 2.8 | 25 | 20 |
| Ex. VI-3 | 3 | Modified PP | Maleic anhydride | 230° C. | 5.7 | 15 | 9 |
| Ex. VI-4 | 4 | Modified HDPE | Maleic anhydride | 190° C. | 0.2 | 20 | 18 |
| Ex. VI-5 | 5 | Modified HDPE | Maleic anhydride | 190° C. | 0.9 | 18 | 15 |
| Ex. VI-6 | 6 | Modified HDPE | Maleic anhydride | 190° C. | 5.5 | 13 | 7 |
| Ex. VI-7 | 7 | Modified L-LDPE | Maleic anhydride | 190° C. | 0.2 | 73 | 38 |
| Ex. VI-8 | 8 | Modified L-LDPE | Maleic anhydride | 190° C. | 0.9 | 50 | 13 |
| Ex. VI-9 | 9 | Modified L-LDPE | Maleic anhydride | 190° C. | 5.5 | 15 | 9 |
| Ex. VI-10 | 10 | Modified LDPE | Maleic anhydride | 190° C. | 0.2 | 43 | 25 |
| Ex. VI-11 | 11 | Modified LDPE | Maleic anhydride | 190° C. | 1.5 | 68 | 18 |
| Ex. VI-12 | 12 | Modified LDPE | Maleic anhydride | 190° C. | 6.0 | 15 | 9 |
| Ex. VI-13 | 13 | Modified EEA | Maleic anhydride | 190° C. | 5.0 | 13 | 6 |
| Ex. VI-14 | 14 | Modified EEA | Maleic anhydride | 190° C. | 9.0 | 30 | 18 |
| Ex. VI-15 | 15 | Modified EEA | Maleic anhydride | 190° C. | 15.0 | 33 | 28 |
| Ex. VI-16 | 16 | Modified EEA | Epoxy | 190° C. | 5.0 | 38 | 7 |
| Ex. VI-17 | 17 | Modified EEA | Epoxy | 190° C. | 9.0 | 13 | 13 |
| Ex. VI-18 | 18 | Modified EEA | Epoxy | 190° C. | 12.0 | 15 | 23 |
| Ex. VI-19 | 19 | Copoly. polyester | — | 190° C. | 3.0 | 18 | 15 |
| Ex. VI-20 | 20 | Copoly. polyester | — | 190° C. | 15.0 | 15 | 13 |
| Ex. VI-21 | 21 | Copoly. polyester | — | 190° C. | 30.0 | 10 | 5 |
| Ex. VI-22 | 22 | (Block) copoly. polyester | — | 190° C. | 1.2 | 20 | 17 |

[1]: 2.16 kgf load, orifice: ϕ1 mm, 10 min.

TABLE VI-2

Results of Adhesion Test of Thermoplastic Adhesive Resin

|  | Ad. resin no. | Ad. resin 1 Ad. resin no. | Ad. resin 2 Ad. resin no. | Compatibilizer | Blend ratio Ad. resin 1/ Ad. resin 2 | Compatibilizer Am't added (% by weight) | Adhered object: EPDM/PP Polyester fiber Adhesion strength (N/25 mm) Measurement temp. | |
|---|---|---|---|---|---|---|---|---|
|  |  |  |  |  |  |  | 25° C. | 100° C. |
| Ex. VI-23 | 23 | 1 | 19 | None | 95/5 | — | 29 | 9 |
| Ex. VI-24 | 24 | 1 | 19 | None | 90/10 | — | 34 | 15 |
| Ex. VI-25 | 25 | 1 | 19 | None | 70/30 | — | 41 | 30 |
| Ex. VI-26 | 26 | 1 | 19 | None | 50/50 | — | 42 | 30 |
| Ex. VI-27 | 27 | 1 | 19 | None | 10/90 | — | 43 | 15 |
| Ex. VI-28 | 28 | 1 | 19 | None | 5/95 | — | 44 | 9 |
| Ex. VI-29 | 29 | 1 | 19 | Epoxy modified EMA | 90/10 | 10 | 39 | 20 |
| Ex. VI-30 | 30 | 1 | 19 | Epoxy modified EMA | 70/30 | 10 | 46 | 40 |
| Ex. VI-31 | 31 | 1 | 19 | Epoxy modified EMA | 50/50 | 10 | 47 | 40 |
| Ex. VI-32 | 32 | 1 | 19 | Epoxy modified EMA | 10/90 | 10 | 48 | 20 |
| Ex. VI-33 | 33 | 1 | 22 | Epoxy modified EMA | 90/10 | 10 | 47 | 25 |
| Ex. VI-34 | 34 | 1 | 22 | Epoxy modified EMA | 70/30 | 10 | 54 | 45 |
| Ex. VI-35 | 35 | 1 | 22 | Epoxy modified EMA | 50/50 | 10 | 55 | 45 |
| Ex. VI-36 | 36 | 1 | 22 | Epoxy modified EMA | 10/90 | 10 | 56 | 25 |

As a Comparative Example, use was made of a commercially available adhesive, that is, a wet curing type urethane based adhesive (Tyrite 7411 made by Lord Far East). In this case, the adhesive was coated on both of the polyester fiber fabric and the thermoplastic elastomer material sheet, the two adhered together and allowed to wet cure for one week, then the result used for the test. The peeling adhesion strength was measured in the same way as in the examples using these test pieces. The results are shown in Table VI-1. Further, a peeling adhesion test was performed at room temperature (25° C.) and 100° C.

From the results of Table VI-1, it was learned that with a known adhesive of the Comparative Example, that is, a urethane adhesive, there is easy breaking of the adhesive at the interface at the thermoplastic elastomer side and almost no adhesion strength is obtained.

On the other hand, it was learned that when the thermoplastic adhesive resin of the present invention was used, the adhesion strength is clearly improved compared with the conventional urethane adhesive.

Further, it was learned that in the thermoplastic adhesive resins of the present invention, modified resins of a polypropylene resin (Examples VI-1 to VI-3) with a melt index, measured under measurement conditions of 230° C., a load of 2.16 kgf, an orifice diameter of 1 mm, and 10 minutes, of not more than 5.0 g/10 min. were more preferable as they had a high adhesion strength at high temperature conditions of 100° C. Further, it was learned that in the thermoplastic adhesive resins of the present invention, modified resins of a polyethylene resin (Examples VI-4 to VI-12) with a melt index, measured under measurement conditions of 190° C., a load of 2.16 kgf, an orifice diameter of 1 mm, and 10 minutes, of not more than 5.0 g/10 min. were more preferable as they had a high adhesion strength at high temperature conditions of 100° C. Further, it was learned from Examples VI-13 to VI-18 that in modified resins of an ethylene-acrylic acid ester copolymer, a melt index, measured under the conditions of 190° C., a load of 2.16 kgf, an orifice diameter of 1 mm, and 10 minutes, of at least 6.0 g/10 min. gives a more preferable bond. Further, it was learned from Examples VI-19 to VI-22 that in a polyester resin, a melt index, measured under the conditions of 190° C., a load of 2.16 kgf, an orifice diameter of 1 mm, and 10 minutes, of not more than 20.0 g/10 min. gives a more preferable bond.

Examples VI-23 to VI-36

Further, as shown in Table VI-2, the above obtained thermoplastic adhesive resin nos. 1, 19, and 22 and a compatibilizer consisting of epoxy modified ethylene-methyl acrylate (EMS) were used to confirm the effects of blends of modified polyolefin based resins and polyester based resins.

In the same way as in the examples, the adhesion strength of polyester fiber fabrics and thermoplastic elastomer compositions (PP/EPDM based thermoplastic elastomer composition) was measured.

For the adhesion test pieces, a thermoplastic adhesive resin sheet was gripped between a polyester fabric and sheets of the thermoplastic elastomer composition, pressed at 230° C. for 2 minutes at 10 kgf/cm$^2$, cooled to room temperature, then cut into short strips of 25 mm length. The peeling adhesion strength was measured using these as peeling test pieces. The results are shown in Table VI-2. Further, a peeling adhesion test was performed at room temperature (25° C.) and 100° C. in the same way as the examples.

It was learned that when using a blended adhesive resin of the thermoplastic adhesive resin of the present invention, that is, a modified olefin based resin, and a polyester based resin, the adhesion strength at 100° C. is superior.

Example VI-37 to VI-85, Comparative Example VI-2 to VI-3, and Reference Example VI-1

Using the thermoplastic adhesive resins 1 to 36 of Table VI-1 and Table VI-2, hoses of the structure shown in Table VI-2 were produced. The obtained hoses were tested for bursting pressure and durability. The hoses were prepared in the same way as above by a structure of an inner tube of a thermoplastic elastomer composition comprised of a copolyester thermoplastic resin (COPE) in which was dispersed a partially cross-linked acrylic rubber (ACM) as a dispersed phase (COPE consisting of Hytrel made by Toray, ACM consisting of AR997 made by Nippon Zeon, weigh ratio of 70/30), a reinforcing layer of a polyester fiber (1500 d/4) braided into two layers, and an outer cover of a thermoplastic elastomer composition composed of a polyolefin based thermoplastic resin of the present invention, that is, propylene, in which is blended an elastomer component, that is, EPDM rubber, in a partially cross-linked state as a dispersed phase (PP/EPDM composition weight ratio of 45/55, PP consisting of PB 121D made by Tokuyama, and EPDM consisting of EPT4070 made by Mitsui Petrochemical Industries). The results of the tests on the hoses are also shown in Table VI-3.

Further, an ordinary commercially available adhesive, that is, a wet curing type urethane adhesive (made by Lord Far East, brand name Tyrite 7411) was used in Comparative Example VI-2 between the inner tube and the outer cover and in Comparative Example VI-3 between each of the inner tube, fiber reinforcing layer, and outer cover. The results are also shown in Table VI-3.

Further, as Reference Example VI-1, an ordinarily used general plastic hose was simultaneously produced and tested.

TABLE VI-3

|  |  | Ref. Ex. VI-1 | Comp. Ex. VI-2 | Comp. Ex. VI-3 | Ex. VI-37 | Ex. VI-38 | Ex. VI-39 | Ex. VI-40 |
|---|---|---|---|---|---|---|---|---|
| Inner tube |  | COPE (Hytrel 5577) | ACM/COPE comp. | ACM/COPE comp. | ACM/COPE comp. | ACM/COPE comp. | ACM/COPE comp. | ACM/COPE comp. |
| Adhesion layer | Adhesive No. | Urethane adhesive (Tyrite 7411) | Urethane adhesive (Tyrite 7411) | Urethane adhesive (Tyrite 7411) | Urethane adhesive (Tyrite 7411) | Urethane adhesive (Tyrite 7411) | Urethane adhesive (Tyrite 7411) | No. 1 |
|  | Adhesive resin |  |  |  |  |  |  | Modified PP |
|  | Functional group |  |  |  |  |  |  | Anh. maleic acid |
|  | Melt index (g/10 min) |  |  |  |  |  |  | 1.1 |
|  | Measure. temp. (° C.) |  |  |  |  |  |  | 230 |
| Rein. layer |  | Polyester fiber | Polyester fiber | Polyester fiber | Polyester fiber | Polyester fiber | Polyester fiber | Polyester fiber |
| Adhesion layer | Adhesive No. | None | None | Urethane adhesive (Tyrite 7411) | None | None | No. 1 | No. 1 |
|  | Adhesive resin | — | — | — | — | — | Modified PP | Modified PP |
|  | Functional group |  |  |  |  |  | Anh. maleic acid | Anh. maleic acid |
|  | Melt index (g/10 min) |  |  |  |  |  | 1.1 | 1.1 |
|  | Measure. temp. (° C.) |  |  |  |  |  | 230 | 230 |
| Rein. layer |  | Polyester fiber | Polyester fiber | Polyester fiber | Polyester fiber | Polyester fiber | Polyester fiber | Polyester fiber |
| Adhesion layer | Adhesive No. | Urethane adhesive (Tyrite 7411) | Urethane adhesive (Tyrite 7411) | Urethane adhesive (Tyrite 7411) | No. 1 | No. 1 | No. 1 | No. 1 |
|  | Adhesive resin |  |  |  | Modified PP | Modified PP | Modified PP | Modified PP |
|  | Functional group |  |  |  | Anh. maleic acid | Anh. maleic acid | Anh. maleic acid | Anh. maleic acid |
|  | Melt index (g/10 min) |  |  |  | 1.1 | 2.8 | 1.1 | 1.1 |
|  | Measure. temp. (° C). | — | — | — | 230 | 230 | 230 | 230 |
|  | Adhesive resin (2nd comp.) |  |  |  | — | — | — | — |
|  | Functional group |  |  |  |  |  |  |  |
|  | Melt index (g/10 min) |  |  |  |  |  |  |  |
|  | Measure. temp. (° C.) | — | — | — |  |  |  |  |
|  | Compatibilizer | — | — | — | — | — | — | — |
|  | Blend ratio |  |  |  | — | — | — | — |
| Outer cover |  | TPU (Esten 58212) | EPDM/PP comp. | EPDM/PP comp. | EPDM/PP comp. | EPDM/PP comp. | EPDM/PP comp. | EPDM/PP comp. |
| Hose performance | Bursting pressure (kgf/cm$^2$) 100° C. | 700 | 620 | 540 | 900 | 880 | 950 | 980 |
|  | Durability test (10,000×), 120° C., 210 kgf/cm$^2$ | 40 Burst | 21 Burst | 11 Burst | 100 No abnormality | 100 No abnormality | 100 No abnormality | 100 No abnormality |

|  |  | Ex. VI-41 | Ex. VI-42 | Ex. VI-43 | Ex. VI-44 | Ex. VI-45 | Ex. VI-46 | Ex. VI-47 |
|---|---|---|---|---|---|---|---|---|
| Inner tube |  | ACM/COPE comp. | ACM/COPE comp. | ACM/COPE comp. | ACM/COPE comp. | ACM/COPE comp. | ACM/COPE comp. | ACM/COPE comp. |

TABLE VI-3-continued

| | | | | | | | | |
|---|---|---|---|---|---|---|---|---|
| Adhesion layer | Adhesive No. | Urethane adhesive (Tyrite 7411) | Urethane adhesive (Tyrite 7411) | Urethane adhesive (Tyrite 7411) | Urethane adhesive (Tyrite 7411) | No. 4 | Urethane adhesive (Tyrite 7411) | Urethane adhesive (Tyrite 7411) |
| | Adhesive resin | — | — | — | — | Modified HDPE | — | — |
| | Functional group | | | | | Anh. maleic group | | |
| | Melt index (g/10 min) | | | | | 0.2 | | |
| | Measure. temp. (° C.) | | | | | 190 | | |
| Rein. layer Adhesion layer | Adhesive No. | Polyester fiber None | Polyester fiber None | Polyester fiber None | Polyester fiber No. 4 | Polyester fiber No. 4 | Polyester fiber None | Polyester fiber None |
| | Adhesive resin | — | — | — | Modified HDPE | Modified HDPE | — | — |
| | Functional group | | | | Anh. maleic acid | Anh. maleic acid | | |
| | Melt index (g/10 min) | | | | 0.2 | 0.2 | | |
| | Measure. temp. (° C.) | | | | 190 | 190 | | |
| Rein. layer Adhesion layer | Adhesive No. | Polyester fiber No. 3 | Polyester fiber No. 4 | Polyester fiber No. 5 | Polyester fiber No. 4 | Polyester fiber No. 4 | Polyester fiber No. 6 | Polyester fiber No. 7 |
| | Adhesive resin | Modified PP | Modified HDPE | Modified HDPE | Modified HDPE | Modified HDPE | Modified HDPE | Modified L-LDPE |
| | Functional group | Anh. maleic acid | Anh. maleic acid | Anh. maleic acid | Anh. maleic acid | Anh. maleic acid | Anh. maleic acid | Anh. maleic acid |
| | Melt index (g/10 min) | 5.7 | 0.2 | 0.2 | 0.2 | 0.2 | 5.5 | 0.2 |
| | Measure. temp. (° C.). | 230 | 190 | 190 | 190 | 190 | 190 | 190 |
| | Adhesive resin (2nd comp.) | — | — | — | — | — | — | — |
| | Functional group | | | | | | | |
| | Melt index (g/10 min) | | | | | | | |
| | Measure. temp. (° C.) | — | — | — | — | — | — | — |
| | Compatibilizer Blend ratio | — | — | — | — | — | — | — |
| Outer cover | | EPDM/PP comp. | EPDM/PP comp. | EPDM/PP comp. | EPDM/PP comp. | EPDM/PP comp. | EPDM/PP comp. | EPDM/PP comp. |
| Hose performance | Bursting pressure (kgf/cm²) 100° C. | 820 | 890 | 860 | 910 | 950 | 810 | 890 |
| | Durability test (10,000×), 120° C., 210 kgf/cm² | 75 Burst | 100 No abnormality | 100 No abnormality | 100 No abnormality | 100 No abnormality | 64 Burst | 100 No abnormality |

| | | Ex. VI-48 | Ex. VI-49 | Ex. VI-50 | Ex. VI-51 | Ex. VI-52 | Ex. VI-53 | Ex. VI-54 |
|---|---|---|---|---|---|---|---|---|
| Inner tube | | ACM/COPE comp. | ACM/COPE comp. | ACM/COPE comp. | ACM/COPE comp. | ACM/COPE comp. | ACM/COPE comp. | ACM/COPE comp. |
| Adhesion layer | Adhesive No. | Urethane adhesive (Tyrite 7411) | Urethane adhesive (Tyrite 7411) | No. 7 | Urethane adhesive (Tyrite 7411) | Urethane adhesive (Tyrite 7411) | Urethane adhesive (Tyrite 7411) | Urethane adhesive (Tyrite 7411) |
| | Adhesive resin | | | Modified L-LDPE | | | | |
| | Functional group | | | Anh. maleic acid | | | | |
| | Melt index (g/10 min) | | | 0.2 | | | | |
| | Measure. temp. (° C.) | | | 190 | | | | |
| Rein. layer Adhesion layer | Adhesive No. | Polyester fiber None | Polyester fiber No. 7 | Polyester fiber No. 7 | Polyester fiber None | Polyester fiber None | Polyester fiber None | Polyester fiber No. 10 |
| | Adhesive resin | — | Modified L-LDPE | Modified L-LDPE | — | — | — | Modified LDPE |
| | Functional group | | Anh. maleic acid | Anh. maleic acid | | | | Anh. maleic acid |
| | Melt index (g/10 min) | | 0.2 | 0.2 | | | | 0.2 |
| | Measure. temp. (° C.) | | 190 | 190 | | | | 190 |
| Rein. layer | | Polyester fiber | Polyester fiber | Polyester fiber | Polyester fiber | Polyester fiber | Polyester fiber | Polyester fiber |

TABLE VI-3-continued

| | | | | | | | | |
|---|---|---|---|---|---|---|---|---|
| Adhesion layer | Adhesive No. | No. 8 | No. 7 | No. 7 | No. 9 | No. 10 | No. 11 | No. 10 |
| | Adhesive resin | Modified L-LDPE | Modified L-LDPE | Modified L-LDPE | Modified L-LDPE | Modified LDPE | Modified LDPE | Modified LDPE |
| | Functional group | Anh. maleic acid | Anh. maleic acid | Anh. maleic acid | Anh. maleic acid | Anh. maleic acid | Anh. maleic acid | Anh. maleic acid |
| | Melt index (g/10 min) | 0.9 | 0.2 | 0.2 | 5.5 | 0.2 | 1.5 | 0.2 |
| | Measure. temp. (° C.) | 190 | 190 | 190 | 190 | 190 | 190 | 190 |
| | Adhesive resin (2nd comp.) | — | — | — | — | — | — | — |
| | Functional group | | | | | | | |
| | Melt index (g/10 min) | | | | | | | |
| | Measure. temp. (° C.) | — | — | — | — | — | — | — |
| | Compatibilizer Blend ratio | — | — | — | — | — | — | — |
| Outer cover | | EPDM/PP comp. | EPDM/PP comp. | EPDM/PP comp. | EPDM/PP comp. | EPDM/PP comp. | EPDM/PP comp. | EPDM/PP comp. |
| Hose performance | Bursting pressure (kgf/cm$^2$) 100° C. | 870 | 920 | 930 | 790 | 880 | 860 | 920 |
| | Durability test (10,000×), 120° C., 210 kgf/cm$^2$ | 100 No abnormality | 100 No abnormality | 100 No abnormality | 68 Burst | 100 No abnormality | 100 No abnormality | 100 No abnormality |

| | | Ex. VI-55 | Ex. VI-56 | Ex. VI-57 | Ex. VI-58 | Ex. VI-59 | Ex. VI-60 | Ex. VI-61 |
|---|---|---|---|---|---|---|---|---|
| Inner tube | | ACM/COPE comp. | ACM/COPE comp. | ACM/COPE comp. | ACM/COPE comp. | ACM/COPE comp. | ACM/COPE comp. | ACM/COPE comp. |
| Adhesion layer | Adhesive No. | No. 10 | Urethane adhesive (Tyrite 7411) | Urethane adhesive (Tyrite 7411) | Urethane adhesive (Tyrite 7411) | Urethane adhesive (Tyrite 7411) | No. 15 | Urethane adhesive (Tyrite 7411) |
| | Adhesive resin | Modified LDPE | — | — | — | — | Modified EEA | — |
| | Functional group | Anh. maleic acid | | | | | Anh. maleic acid | |
| | Melt index (g/10 min) | 0.2 | | | | 15.0 | 15.0 | |
| | Measure. temp. (° C.) | 190 | | | | 190 | 190 | |
| Rein. layer Adhesion layer | Adhesive No. | Polyester fiber No. 10 | Polyester fiber None | Polyester fiber None | Polyester fiber None | Polyester fiber No. 15 | Polyester fiber No. 15 | Polyester fiber None |
| | Adhesive resin | Modified LDPE | — | — | — | Modified EEA | Modified EEA | — |
| | Functional group | Anh. maleic acid | | | | Anh. maleic acid | Anh. maleic acid | |
| | Melt index (g/10 min) | 0.2 | | | | 15.0 | 15.0 | |
| | Measure. temp. (° C.) | 190 | | | | 190 | 190 | |
| Rein. layer Adhesion layer | Adhesive No. | Polyester fiber No. 10 | Polyester fiber No. 12 | Polyester fiber No. 15 | Polyester fiber No. 14 | Polyester fiber No. 15 | Polyester fiber No. 15 | Polyester fiber No. 13 |
| | Adhesive resin | Modified LDPE | Modified LDPE | Modified EEA | Modified EEA | Modified EEA | Modified EEA | Modified EEA |
| | Functional group | Anh. maleic acid | Anh. maleic acid | Anh. maleic acid | Anh. maleic acid | Anh. maleic acid | Anh. maleic acid | Anh. maleic acid |
| | Melt index (g/10 min) | 0.2 | 6.0 | 15.0 | 9.0 | 15.0 | 15.0 | 5.0 |
| | Measure. temp. (° C.) | 190 | 190 | 190 | 190 | 190 | 190 | 190 |
| | Adhesive resin (2nd comp.) | — | — | — | — | — | — | — |
| | Functional group | | | | | | | |
| | Melt index (g/10 min) | | | | | | | |
| | Measure. temp. (° C.) | | | | | | | |
| | Compatibilizer Blend ratio | — | — | — | — | — | — | — |
| Outer cover | | EPDM/PP comp. | EPDM/PP comp. | EPDM/PP comp. | EPDM/PP comp. | EPDM/PP comp. | EPDM/PP comp. | EPDM/PP comp. |
| Hose performance | Bursting pressure (kgf/ | 930 | 780 | 880 | 860 | 920 | 930 | 740 |

TABLE VI-3-continued

|  |  |  |  |  |  |  |  |
|---|---|---|---|---|---|---|---|
| Bursting pressure (kgf/cm²) 100° C. Durability test (10,000×), 120° C., 210 kgf/cm² | 100 No abnormality | 62 Burst | 100 No abnormality | 100 No abnormality | 100 No abnormality | 100 No abnormality | 57 Burst |

|  |  | Ex. VI-62 | Ex. VI-63 | Ex. VI-64 | Ex. VI-65 | Ex. VI-66 | Ex. VI-67 | Ex. VI-68 |
|---|---|---|---|---|---|---|---|---|
| Inner tube |  | ACM/COPE comp. | ACM/COPE comp. | ACM/COPE comp. | ACM/COPE comp. | ACM/COPE comp. | ACM/COPE comp. | ACM/COPE comp. |
| Adhesion layer | Adhesive No. | Urethane adhesive (Tyrite 7411) | Urethane adhesive (Tyrite 7411) | Urethane adhesive (Tyrite 7411) | No. 18 | Urethane adhesive (Tyrite 7411) | Urethane adhesive (Tyrite 7411) | Urethane adhesive (Tyrite 7411) |
|  | Adhesive resin |  |  |  | Modified EEA |  |  |  |
|  | Functional group |  |  |  | Epoxy |  |  |  |
|  | Melt index (g/10 min) |  |  |  | 12.0 |  |  |  |
|  | Measure. temp. (° C.) |  |  |  | 190 |  |  |  |
| Rein. layer Adhesion layer | Adhesive No. | Polyester fiber None | Polyester fiber None | Polyester fiber No. 18 | Polyester fiber No. 18 | Polyester fiber None | Polyester fiber None | Polyester fiber None |
|  | Adhesive resin | — | — | Modified EEA | Modified EEA | — | — | — |
|  | Functional group |  |  | Epoxy | Epoxy |  |  |  |
|  | Melt index (g/10 min) |  |  | 12.0 | 12.0 |  |  |  |
|  | Measure. temp. (° C.) |  |  | 190 | 190 |  |  |  |
| Rein. layer Adhesion layer | Adhesive No. | Polyester fiber No. 18 | Polyester fiber No. 17 | Polyester fiber No. 18 | Polyester fiber No. 18 | Polyester fiber No. 16 | Polyester fiber No. 19 | Polyester fiber No. 20 |
|  | Adhesive resin | Modified EEA | Modified EEA | Modified EEA | Modified EEA | Modified EEA | Copolymer polyester | Copolymer polyester |
|  | Functional group | Epoxy | Epoxy | Epoxy | Epoxy | Epoxy | — | — |
|  | Melt index (g/10 min) | 12.0 | 9.0 | 12.0 | 12.0 | 5.0 | 3.0 | 15.0 |
|  | Measure. temp. (° C). | 190 | 190 | 190 | 190 | 190 | 190 | 190 |
|  | Adhesive resin (2nd comp.) | — | — | — | — | — | — | — |
|  | Functional group |  |  |  |  |  |  |  |
|  | Melt index (g/10 min) |  |  |  |  |  |  |  |
|  | Measure. temp. (° C.) | — | — | — | — | — | — | — |
|  | Compatibilizer Blend ratio | — | — | — | — | — | — | — |
| Outer cover |  | EPDM/PP comp. | EPDM/PP comp. | EPDM/PP comp. | EPDM/PP comp. | EPDM/PP comp. | EPDM/PP comp. | EPDM/PP comp. |
| Hose performance | Bursting pressure (kgf/cm²) 100° C. | 870 | 850 | 890 | 910 | 710 | 850 | 840 |
|  | Durability test (10,000×), 120° C., 210 kgf/cm² | 100 No abnormality | 100 No abnormality | 100 No abnormality | 100 No abnormality | 52 Burst | 100 No abnormality | 100 No abnormality |

|  |  | Ex. VI-69 | Ex. VI-70 | Ex. VI-71 | Ex. VI-72 | Ex. VI-73 | Ex. VI-74 | Ex. VI-75 |
|---|---|---|---|---|---|---|---|---|
| Inner tube |  | ACM/COPE comp. | ACM/COPE comp. | ACM/COPE comp. | ACM/COPE comp. | ACM/COPE comp. | ACM/COPE comp. | ACM/COPE comp. |
| Adhesion layer | Adhesive No. | Urethane adhesive (Tyrite 7411) | No. 19 | Urethane adhesive (Tyrite 7411) | Urethane adhesive (Tyrite 7411) | Urethane adhesive (Tyrite 7411) | Urethane adhesive (Tyrite 7411) | Urethane adhesive (Tyrite 7411) |
|  | Adhesive resin |  | Copolymer polyester |  |  |  |  |  |
|  | Functional group |  | — |  |  |  |  |  |
|  | Melt index (g/10 min) |  | 3.0 |  |  |  |  |  |
|  | Measure. temp. (° C.) |  | 190 |  |  |  |  |  |

TABLE VI-3-continued

| | | | | | | | | |
|---|---|---|---|---|---|---|---|---|
| Rein. layer Adhesion layer | Adhesive No. | Polyester fiber No. 19 | Polyester fiber No. 19 | Polyester fiber None | Polyester fiber None | Polyester fiber None | Polyester fiber None | Polyester fiber None |
| | Adhesive resin | Copolymer polyester | Copolymer polyester | — | — | — | — | — |
| | Functional group | — | — | | | | | |
| | Melt index (g/10 min) | 3.0 | 3.0 | | | | | |
| | Measure. temp. (° C.) | 190 | 190 | | | | | |
| Rein. layer Adhesion layer | Adhesive No. | Polyester fiber No. 19 | Polyester fiber No. 19 | Polyester fiber No. 21 | Polyester fiber No. 23 | Polyester fiber No. 24 | Polyester fiber No. 25 | Polyester fiber No. 26 |
| | Adhesive resin | Copolymer polyester | Copolymer polyester | Copolymer polyester | Modified PP | Modified PP | Modified PP | Modified PP |
| | Functional group | — | — | — | Anh. maleic acid | Anh. maleic acid | Anh. maleic acid | Anh. maleic acid |
| | Melt index (g/10 min) | 3.0 | 3.0 | 30.0 | 1.1 | 1.1 | 1.1 | 1.1 |
| | Measure. temp. (° C.) | 190 | 190 | 190 | 230 | 230 | 230 | 230 |
| | Adhesive resin (2nd comp.) | — | — | — | Copolymer polyester | Copolymer polyester | Copolymer polyester | Copolymer polyester |
| | Functional group | | | | 3.0 | 3.0 | 3.0 | 3.0 |
| | Melt index (g/10 min) | | | | 190 | 190 | 190 | 190 |
| | Measure. temp. (° C.) | | | | — | — | — | — |
| | Compatibilizer Blend ratio | — | — | — | 95/5 | 90/10 | 70/30 | 50/50 |
| Outer cover | | EPDM/PP comp. | EPDM/PP comp. | EPDM/PP comp. | EPDM/PP comp. | EPDM/PP comp. | EPDM/PP comp. | EPDM/PP comp. |
| Hose performance | Bursting pressure (kgf/cm$^2$) 100° C. | 890 | 910 | 710 | 990 | 1010 | 1080 | 1100 |
| | Durability test (10,000×), 120° C., 210 kgf/cm$^2$ | 100 No abnormality | 100 No abnormality | 50 Burst | 100 No abnormality | 100 No abnormality | 100 No abnormality | 100 No abnormality |

| | | Ex. VI-76 | Ex. VI-77 | Ex. VI-78 | Ex. VI-79 | Ex. VI-80 | Ex. VI-81 |
|---|---|---|---|---|---|---|---|
| Inner tube | | ACM/COPE comp. | ACM/COPE comp. | ACM/COPE comp. | ACM/COPE comp. | ACM/COPE comp. | ACM/COPE comp. |
| Adhesion layer | Adhesive No. | Urethane adhesive (Tyrite 7411) | Urethane adhesive (Tyrite 7411) | Urethane adhesive (Tyrite 7411) | Urethane adhesive (Tyrite 7411) | Urethane adhesive (Tyrite 7411) | Urethane adhesive (Tyrite 7411) |
| | Adhesive resin | — | | | | | |
| | Functional group | | | | | | |
| | Melt index (g/10 min) | | | | | | |
| | Measure. temp. (° C.) | | | | | | |
| Resin. layer Adhesion layer | Adhesive No. | Polyester fiber None | Polyester fiber None | Polyester fiber None | Polyester fiber None | Polyester fiber None | Polyester fiber None |
| | Adhesive resin | — | — | — | — | — | — |
| | Functional group | | | | | | |
| | Melt index (g/10 min) | | | | | | |
| | Measure. temp. (° C.) | | | | | | |
| Resin. layer Adhesion layer | Adhesive No. | Polyester fiber No. 27 | Polyester fiber No. 28 | Polyester fiber No. 29 | Polyester fiber No. 30 | Polyester fiber No. 31 | Polyester fiber No. 32 |
| | Adhesive resin | Modified PP | Modified PP | Modified PP | Modified PP | Modified PP | Modified PP |
| | Functional group | Anh. maleic acid | Anh. maleic acid | Anh. maleic acid | Anh. maleic acid | Anh. maleic acid | Anh. maleic acid |
| | Melt index (g/10 min) | 1.1 | 1.1 | 1.1 | 1.1 | 1.1 | 1.1 |
| | Measure. temp. (° C.) | 230 | 230 | 230 | 230 | 230 | 230 |
| | Adhesive resin (2nd comp.) | Copolymer polyester | Copolymer polyester | Copolymer polyester | Copolymer polyester | Copolymer polyester | Copolymer polyester |
| | Functional group | 3.0 | 3.0 | 3.0 | 3.0 | 3.0 | 3.0 |
| | Melt index (g/10 min) | 190 | 190 | 190 | 190 | 190 | 190 |
| | Measure. temp. (° C.) | — | — | Epoxy mod. EMA | Epoxy mod. EMA | Epoxy mod. EMA | Epoxy mod. EMA |
| | Compatibilizer | 10/90 | 5/95 | 90/10 | 70/30 | 50/50 | 10/90 |

TABLE VI-3-continued

| | Blend ratio | EPDM/PP comp. | EPDM/PP comp. | EPDM/PP comp. | EPDM/PP comp. | EPDM/PP comp. | EPDM/PP comp. |
|---|---|---|---|---|---|---|---|
| Outer cover Hose performance | Bursting pressure (kgf/cm²) | 1050 | 1020 | 1040 | 1120 | 1150 | 1100 |
| | Durability test (10,000×), 120° C., 210 kgf/cm² | 100 No abnormality | 100 No abnormality | 100 No abnormality | 100 No abnormality | 100 No abnormality | 100 No abnormality |

| | | Ex. VI-82 | Ex. VI-83 | Ex. VI-84 | Ex. VI-85 |
|---|---|---|---|---|---|
| Inner tube | | ACM/COPE comp. | ACM/COPE comp. | ACM/COPE comp. | ACM/COPE comp. |
| Adhesion layer | Adhesive No. | Urethane adhesive (Tyrite 7411) | Urethane adhesive (Tyrite 7411) | Urethane adhesive (Tyrite 7411) | Urethane adhesive (Tyrite 7411) |
| | Adhesive resin | — | — | — | — |
| | Functional group | | | | |
| | Melt index (g/10 min) | | | | |
| | Measure. temp. (° C.) | | | | |
| Rein. layer | | Polyester fiber | Polyester fiber | Polyester fiber | Polyester fiber |
| Adhesion layer | Adhesive No. | None | None | None | None |
| | Adhesive resin | — | — | — | — |
| | Functional group | | | | |
| | Melt index (g/10 min) | | | | |
| | Measure. temp. (° C.) | | | | |
| Rein. layer | | Polyester fiber | Polyester fiber | Polyester fiber | Polyester fiber |
| Adhesion layer | Adhesive No. | No. 33 | No. 34 | No. 35 | No. 36 |
| | Adhesive resin | Modified PP | Modified PP | Modified PP | Modified PP |
| | Functional group | Anh. maleic acid | Anh. maleic acid | Anh. maleic acid | Anh. maleic acid |
| | Melt index (g/10 min) | 1.1 | 1.1 | 1.1 | 1.1 |
| | Measure. temp. (° C.) | 230 | 230 | 230 | 230 |
| | | Block | Block | Block | Block |
| | Adhesive resin (2nd comp.) | Copolymer polyester | Copolymer polyester | Copolymer polyester | Copolymer polyester |
| | | — | — | — | — |
| | Functional group | 1.2 | 1.2 | 1.2 | 1.2 |
| | Melt index (g/10 min) | 190 | 190 | 190 | 190 |
| | Measure. temp. (° C.) | Epoxy mod. EMA | Epoxy mod. EMA | Epoxy mod. EMA | Epoxy mod. EMA |
| | Compatibilizer | 90/10 | 70/30 | 50/50 | 10/90 |
| | Blend ratio | | | | |
| Outer cover | | EPDM/PP comp. | EPDM/PP comp. | EPDM/PP comp. | EPDM/PP comp. |
| Hose performance | Bursting pressure (kgf/cm²) | 1060 | 1150 | 1200 | 1140 |
| | Durability test (10,000×), 120° C., 210 kgf/cm² | 100 No abnormality | 100 No abnormality | 100 No abnormality | 100 No abnormality |

The bursting test of the hoses was performed based on the pressure resistance test (bursting test) of JIS K 6349 measured at 100° C. The durability test was performed based on SAE J 188 Type 1. The oil used was automatic transmission use oil. Repeated impulse pressure, 1,000,000×, was given at a temperature of 120° C. and a pressure of 210 kgf/cm . After this, the state of attachment of the metal fittings to the hoses and the state of bursting of the hoses themselves were checked. Hoses which burst before 1,000,000× were evaluated as having durabilities according to the number of repeated impulses withstood before bursting.

From Table VI-3, it is learned that Comparative Example VI-2 is inferior in adhesiveness between the outer cover and fiber reinforcing layer, and therefore, is inferior in hose bursting pressure and durability compared with general plastic hoses. On the other hand, all of the examples of the present invention clearly showed performances superior to Comparative Example VI-2 and Comparative Example VI-3 in both hose bursting pressure and durability. Further, from Examples VI-37 to VI-41, it was learned that, in the thermoplastic adhesive resins of the present invention, modified resins of modified resins of a polypropylene resin with a melt index, measured under the conditions of 230° C., a load of 2.16 kgf, an orifice diameter of 1 mm, and 10 minutes, of not more than 5.0 g/10 min. were more preferable in terms of the durability of the hoses. Further, it was learned from Examples VI-42 to VI-56 that in the thermoplastic adhesive resins of the present invention, modified resins of a polyethylene resin with a melt index, measured under the conditions of 190° C., a load of 2.16 kgf, an orifice diameter of 1 mm, and 10 minutes, of not more than 5.0 g/10 min. were more preferable in terms of the durability of the hoses. Further, it was learned from Examples VI-57 to VI-66 that in modified resins of an ethylene-acrylic acid ester copolymer, a melt index, measured under the conditions of 190° C., a load of 2.16 kgf, an orifice diameter of 1 mm, and 10 minutes, of at least 6.0 g/10 min. gives a more preferable hose durability.

Further, it was learned from the results of Examples VI-67 to VI-71 that in a polyester resin, a melt index, measured under the conditions of 190° C., a load of 2.16 kgf, an orifice diameter of 1 mm, and 10 minutes, of not more than 20.0 g/10 min. gives a more preferable hose durability.

Further, when there are two fiber reinforcing layers, it was learned from Comparative Example VI-3 that when interposing a urethane adhesive between the reinforcing layers, fatigue of the fibers derived from penetration and hardening of the adhesive in the fiber reinforcing layers causes deterioration of both of the bursting pressure and durability of the hose, while interposition of the thermoplastic adhesive resin of the present invention between the reinforcing layers raises the bursting pressure of the hose further. This is clear from a comparison of Example VI-37 and Example VI-39, Example VI-42 and Example VI-44, Example VI-47 and Example VI-49, Example VI-52 and Example VI-54, Example VI-57 and Example VI-59, Example VI-62 and Example VI-64, and Example VI-67 and Example VI-69.

Further, using a thermoplastic adhesive resin of the present invention instead of the urethane based adhesive at the inner tube side further increases the bursting pressure of the hose as is clear from a comparison of Example VI-39 and Example VI-40, Example VI-44 and Example VI-45, Example VI-49 and Example VI-50, Example VI-54 and Example VI-55, Example VI-59 and Example VI-60, Example VI-64 and Example VI-65, and Example VI-69 and Example VI-70.

Further, Examples VI-72 to VI-85 are hoses where an adhesive resin consisting of a blend of the modified polyolefin based resin and polyester resin of the present invention is interposed between the outer cover and the fiber reinforcing layer. From the results of Examples VI-72 to VI-77, it is learned that a hose having a ratio of the maleic anhydride modified PP and copolymer copolyester resin in the range of 95/5 to 5/95 is superior in both bursting pressure and durability. Examples VI-78 to VI-81 use an adhesive resin in which an epoxy modified EMA is added as a compatibilizer, so the bursting pressure of the hoses is further improved, it was learned. Examples VI-82 to VI-85 use block copolymer copolyester resin as the polyester resin and an adhesive resin in which epoxy modified EMA is added as a compatibilizer, so it is learned are further improved in bursting pressure of the hoses.

Comparative Example VII-1 to VII-8 and
Comparative Examples VII-l to VII-5

Hoss of an inner tube, adhesion layer, reinforcing layer, adhesion layer, and outer cover of the structure (materials and thicknesses) shown in Table VII-1, an inner diameter of 9.5 mm, and an outer diameter of 17.5 were prepared.

1) Extrusion of Inner Tube

The inner tube material shown in Table VII-1 was used and extruded from a resin extruder into a hollow shape of an inner diameter of 9.5 mm and a thickness of 1.0 mm to form the inner tube.

2) Braiding of Reinforcing Layer

A wet curing type urethane based adhesive was coated on this, then a reinforcing fiber layer was formed by a braider using a polyester fiber.

3) Formation of Adhesion Layer

A wet curing type urethane adhesive shown in Table VII-1 was coated on this or a thermoplastic elastomer copolymer resin shown in Table VII-1 was extruder from a resin extruder to form an adhesion layer.

4) Extrusion of Outer Cover

An outer cover material shown in Table VII-1 was used and extruded from a resin extruder to a thickness of 1.0 mm to form the outer cover.

Note that as the adhesion layer between the inner tube/ reinforcing layer, a Tyrite 7411 wet curing type urethane adhesive made by Lord Far East was used. For the adhesion layer between the reinforcing layer/outer cover layer, urethane adhesives (Comparative Example VII-1) and thermoplastic polyester copolymer resins (Comparative Examples VII-2 to VII-5 and Examples VII-1 to VII-8) of the compositions shown in Table VII-1 were used. The formations of the compositions used for the inner tubes and outer covers in Table VII-1 were as shown in Table VII-2. These were produced as follows:

First, the acrylic rubber and the compounding agents other than the vulcanization agent were charged into a hermetic type rubber use Banbury mixer, then formed into sheets using a rubber use roll. The sheets were then pelletized by a rubber use pelletizer.

Next, the thermoplastic copolyester elastomer, the pelletized rubber, and the compatibilizer were charged into a twin-screw mixer/extruder where they were mixed. Next, the vulcanization agent was continuously added so as to dynamically vulcanize a rubber component dispersed as a domain in a matrix composed of the thermoplastic copolyester elastomer and compatibilizer.

The mixing conditions were a melting temperature of 180 to 350° C., a residence time in the portion performing the dynamic vulcanization of 15 to 300 seconds, and a shear rate of 1000 to 8000 sec$^{-1}$. After the dynamic vulcanization, the composition was continuously extruded in strands from the twin-screw mixer/extruder, cooled, and cut by a cutter to lengths of about 3 mm (diameter about 2 mm) to obtain pellets of the thermoplastic elastomer composition.

The physical properties of the adhesion layers shown in Table VII-1 (hardness, Young's modulus, and melt viscosity) were measured by preparing the following test pieces and testing these by the following methods:

(Preparation of Test Pieces)

Pellets of the thermoplastic elastomer composition were formed into sheets of a thickness of 2.0 mm by a usually used resin-use press former at 230° C., 5 minutes, and a pressure of 2.9 MPa.

(Measurement Methods)

Test pieces of a JIS standard No. 3 dumbbell shape (JIS K 6251) were prepared by punching. The obtained test pieces were measured for the Young's modulus at 120° C. and Type D Durometer hardness (Shore D: JIS K 6253) according to the JIS standards.

Further, the melt viscosity was measured by a capillary rheometer (Capillograph IC) made by Toyo Seiki at a measurement temperature of 230° C., a shear rate of 122 s$^{-1}$, an orifice diameter of 1 mm, and a capillary length of 10 mm.

Metal fittings were attached to the two ends of the hoses after they were produced and were subjected to impulse durability tests in the following way for the predetermined times shown in Table VII-1.

Impulse Test and Evaluation

The test was performed based on SAE J 188 Type 1. 600,000 impulses were given using automatic transmission use oil (Idemitsu), 120° C., and a pressure of 27.5 MPa, then detachment of the metal fittings and hose bursting were checked for. The evaluation criteria was made 400,000×. Hoses with no abnormalities above this were judged as having passed.

The results are shown in Table VII-1.

TABLE VII-1

|  | Comp. Ex. VII-1 | Comp. Ex. VII-2 | Comp. Ex. VII-3 | Ex. VII-1 | Ex. VII-2 | Ex. VII-3 | Ex. VII-4 |
| --- | --- | --- | --- | --- | --- | --- | --- |
| Inner tube (1.0 mm thick) | ACM/COPE comp. 1 | ACM/COPE comp. 1 | ACM/COPE comp. 1 | ACM/COPE comp. 1 | ACM/COPE comp. 1 | ACM/COPE comp. 1 | ACM/COPE comp. 1 |
| Adhesive layer (coated by coater) | Urethane adhesive | Urethane adhesive | Urethane adhesive | Urethane adhesive | Urethane adhesive | Urethane adhesive | Urethane adhesive |
| Reinforcing layer | Polyester fiber | Polyester fiber | Polyester fiber | Polyester fiber | Polyester fiber | Polyester fiber | Polyester fiber |
| Adhesion layer (0.1 mm thick) | Urethane adhesive |  |  |  |  |  |  |
| Form of copolymer (random/block) |  | Random | Random | Random | Block | Block | Block |
| COPE content (% by weight) | 0 | 100 | 100 | 100 | 100 | 100 | 100 |
| Other components | Urethane | — | — | — | — | — | — |
| Am't of polyester in COPE (mol %) | 0 | 100 | 100 | 58 | 30 | 35 | 54 |
| Aromatic dicarboxylic acid |  |  |  |  |  |  |  |
| Terephthalic acid | — | 35 | 33 | 23 | 15 | 20 | 29 |
| Isophthalic acid | — | 5 | 5 | 5 | — | — | — |
| Aliphatic dicarboxylic acid |  |  |  |  |  |  |  |
| Adipic acid | — | 10 | 12 | — | — | — | — |
| Sebacic acid | — | — | — | — | — | — | — |
| Diol |  |  |  |  |  |  |  |
| 1,4-butanediol | — | 35 | 50 | 30 | 15 | 15 | 25 |
| Ethylene glycol | — | 15 | — | — | — | — | — |
| Diethylene glycol | — | — | — | 22 | — | — | — |
| Long chain ether glycol |  |  |  |  |  |  |  |
| Polytetramethyene glycol | — | — | — | 20 | 70 | 65 | 46 |
| Hardness (Shore D) 120° C. × 70 h | 70 | 58 | 60 | 53 | 32 | 42 | 56 |
| Young's modulus (MPa) 120° C. | — | 0.5 | 1.5 | 3.0 | 9.0 | 35.0 | 39.0 |
| Melt viscosity (Pa · s) 230° C., 122 s$^{-1}$ | — | 55 | 42 | 80 | 11 | 400 | 600 |
| Outer cover (1.0 mm thick) | ACM/COPE comp. 2 | ACM/COPE comp. 2 | ACM/COPE comp. 2 | ACM/COPE comp. 2 | ACM/COPE comp. 2 | ACM/COPE comp. 2 | ACM/COPE comp. 2 |
| Process of production |  |  |  |  |  |  |  |
| Time after forming adhesion layer to extruding outer cover (h) | 24 | 0 | 0 | 0 | 0 | 0 | 0 |
| Extrusion method | 2× extrusion | Cont. extrusion | Cont. extrusion | Cont. extrusion | Cont. extrusion | Cont. extrusion | Cont. extrusion |
| Time after extruding outer cover to evaluation (h) | 24 to 48 | 8 to 24 | 8 to 24 | 8 to 24 | 8 to 24 | 8 to 24 | 8 to 24 |
| Evaluation - Impulse durability (10,000×), target 400,000×, 120° C., 27.5 Mpa | 37 Hose burst | 4 Fittings detach | 12 Fittings detach | 42 Fittings detach | 51 Fittings detach | 53 Fittings detach | 53 Fittings detach |

|  | Ex. VII-5 | Ex. VII-6 | Ex. VII-7 | Ex. VII-8 | Comp. Ex. VII-4 | Comp. Ex. VII-5 |
| --- | --- | --- | --- | --- | --- | --- |
| Inner tube (1.0 mm thick) | ACM/COPE comp. 1 | ACM/COPE comp. 1 | ACM/COPE comp. 1 | ACM/COPE comp. 1 | ACM/COPE comp. 1 | ACM/COPE comp. 1 |
| Adhesive layer (coated by coater) | Urethane adhesive | Urethane adhesive | Urethane adhesive | Urethane adhesive | Urethane adhesive | Urethane adhesive |
| Reinforcing layer | Polyester fiber | Polyester fiber | Polyester fiber | Polyester fiber | Polyester fiber | Polyester fiber |
| Adhesion layer (0.1 mm thick) |  |  |  |  |  |  |
| Form of copolymer (random/block) | Block | Block | Block | Block | Block | Block |
| COPE content (% by weight) | 100 | 100 | 100 | 50 | 40 | 30 |
| Other components | — | — | — | TPU blend | TPU blend | TPU blend |
| Am't of polyester in COPE (mol %) | 52 | 59 | 80 | 80 | 80 | 80 |
| Aromatic dicarboxylic acid |  |  |  |  |  |  |
| Terephthalic acid | 28 | 31 | 30 | 30 | 30 | 30 |
| Isophthalic acid | — | — | 12 | 12 | 12 | 12 |
| Aliphatic dicarboxylic acid |  |  |  |  |  |  |
| Adipic acid | — | — | — | — | — | — |
| Sebacic acid | — | — | — | — | — | — |
| Diol |  |  |  |  |  |  |
| 1,4-butanediol | 24 | 28 | 38 | 38 | 38 | 38 |
| Ethylene glycol | — | — | — | — | — | — |
| Diethylene glycol | — | — | — | — | — | — |

TABLE VII-1-continued

| Long chain ether glycol | | | | | | |
|---|---|---|---|---|---|---|
| Polytetramethyene glycol | 48 | 41 | 20 | 20 | 20 | 20 |
| Hardness (Shore D) 120° C. × 70 h | 48 | 58 | 61 | 45 | 38 | 30 |
| Young's modulus (MPa) 120° C. | 14.5 | 47.0 | 52.0 | 5.2 | 3.1 | 2.5 |
| Melt viscosity (Pa · s) 230° C. 122 $s^{-1}$ | 300 | 250 | 79 | 11 | 10 | 8 |
| Outer cover (1.0 mm thick) | ACM/COPE comp. 2 | ACM/COPE comp. 2 | ACM/COPE comp. 2 | ACM/COPE comp. 2 | ACM/COPE comp. 2 | ACM/COPE comp. 2 |
| Process of production | | | | | | |
| Time after forming adhesion layer to extruding outer cover (h) | 0 | 0 | 0 | 0 | 0 | 0 |
| Extrusion method | Cont. extrusion | Cont. extrusion | Cont. extrusion | Cont. extrusion | Cont. extrusion | Cont. extrusion |
| Time after extruding outer cover to evaluation (h) | 8 to 24 | 8 to 24 | 8 to 24 | 8 to 24 | 8 to 24 | 8 to 24 |
| Evaluation - Impulse durability (10,000×), target 400,000×, 120° C., 27.5 Mpa | 60 Suspended | 60 Suspended | 60 Suspended | 60 Suspended | 38 Fittings detach | 27 Fittings detach |

TABLE VII-2

| Component | Brand name and manufacturer | Inner tube ACM/COPE composition 1 | Outer cover ACM/COPE composition 2 |
|---|---|---|---|
| COPE | (Hytrel 5556, made by Toray-Du Pont) | 334.40 | 144.30 |
| ACM | EA (ethylene acrylate: 40% by weight) BA (butyl acrylate: 32% by weight) MEA (methoxyethyl acrylate: 19% by weight) | 100.00 | 100.00 |
| FEF grade carbon black | GMA (glycidyl methacrylate: 9% by weight) | 40.00 | 40.00 |
| Antioxidant | (Seast SO, made by Tokai Carbon) | 3.33 | 3.33 |
| Cross-linking agent | (Irganox 1010, made by Ciba-Geigy Japan) | 1.60 | 1.60 |
| EMA-GMA | (BTC, made by Mitsui Toatsu Fine Chemicals) E (ethylene: 67% by weight) MA (methyl acrylate: 30% by weight) GMA (glycidyl methacrylate: 3% by weight) | 33.44 | 14.33 |

From the results, the following may be understood.

Comparative Example VII-1

Comparative Example VII-1 is a hose using a conventionally used urethane ordinary temperature curing adhesive. The hose burst due to heat curing at 120° C. The targeted 400,000× durability was not reached and the desired performance was not obtained.

Comparative Examples VII-2 to VII-3 and Examples VII-1 to VII-7

Comparative Example VII-2 to VII-3 are hoses using a thermoplastic polyester copolymer resin as an adhesion layer. Since they include an aliphatic dicarboxylic acid for the dicarboxylic acid constituting the polyester and have a Young's modulus at 120° C. of less than 3.0 MPa, they are inferior in the resistance to softening under heat of the adhesion layer, early detachment of the metal fittings occurs, and the desired performance cannot be obtained.

Example VII-1 to VII-7 are Examples of hoses where the dicarboxylic acid constituting the polyester is an aromatic dicarboxylic acid and a thermoplastic polyester based copolymer resin having a Young's modulus at 120° C. of at least 3.0 MPa is used as the adhesion layer. The desired durability is achieved and the desired performance is satisfied.

From a comparison of the comparative examples and the Examples, it is learned that when the dicarboxylic acid constituting the polyester is an aromatic dicarboxylic acid and the Young's modulus at 120° C. is at least 3.0 MPa, the desired hose durability can be obtained. Further, the melt viscosity at 230° C. and 122 $s^{-1}$ were all under 1000 Pa·s and the effect of permeation into the reinforcing layers was obtained.

Examples VII-8 and Comparatives Example VII-4 to VII-5

Example VII-8 and Comparative Example VII-4 to VII-5 are all blends of a thermoplastic urethane elastomer in the thermoplastic polyester copolymer resin of Example VII-7 and show that an increase in the amount of the thermoplastic urethane elastomer blended is accompanied with a fall in the Young's modulus at 120° C. In Comparative Example VII-4, however, despite the fact that the Young's modulus at 120° C. is more than 3.0 MPa, since the content of the thermoplastic polyester based copolymer resin is less than 50% by weight, the adhesion strength is insufficient, the target durability is not achieved, the metal fittings detach, and the desired performance cannot be obtained. As opposed to this, it was learned, according to Example VII-8, that the desired performance can be satisfied if the content of the thermoplastic polyester copolymer resin, even in the same type of system, is 50% by weight or more.

Further, the melt viscosity at 230° C. and 122 $s^{-1}$ was in each case under 1000 Pa·s and an effect of permeation in to the reinforcing layer was obtained.

In the Examples, Examples VII-5 to VII-8 are more preferable Examples. That is, ones where the Young's modulus at 120° C. is at least 3.0 MPa, the thermoplastic polyester copolymer resin is contained in an amount of at least 50% by weight, and, further, the thermoplastic polyester based copolymer resin contains at least 40 mol % of recurring units of a polyester comprising an aromatic dicarboxylic acid and a diol (in Example VII-2 to VII-3, less than 40 mol %).

Further, Example VII-1 and Example VII-4 respectively show more preferable ranges of the Young's modulus and melt viscosity. That is, in Example VII-1, the Young's modulus at 120° C. is less than 5.0 MPa, while in Example VII-4, the melt viscosity at 230° C. and 122 s is over 500 Pa·s.

The hoses of the present invention (Example VII-1 to Example VII-30) and conventional hoses (Comparative Example VII-1 to Comparative Example VII-17) were prepared and tested for durability. The configuration of the hoses produced, the materials of their different components, the methods of adhesion, and the results of evaluation of a durability test are shown in the following Table VII-1 to Table VII-7.

The hoses of Example VII-1 to VII-12 and Comparative Example VII-1 to VII-2 shown in Table VII-1 and Table VII-2 have one reinforcing layer and evaluate the adhesion of the inner tube and reinforcing layer. Further, the hoses of Example VII-13 to VII-30 and Comparative Example VII-3 to VII-17 shown in Table VII-3 to Table VII-7 have two reinforcing layers and evaluate the adhesion between reinforcing layers.

Note that, Example VII-27 to VII-30 simultaneously evaluate the adhesion of the inner tube and the reinforcing layer and the adhesion between reinforcing layers.

The production process of the hoses of the Examples and Comparative Examples was as follows:

The inner tube was formed by an extruder to an inner diameter of 9.5 mm and a thickness of 1.0 mm. The adhesion layer between the inner tube and the reinforcing layer was coated on the outer surface of the inner tube and naturally dried in the case of an ordinary temperature curing type urethane based adhesive and was extruded on the inner tube in a tubular shape of a thickness of 0.1 mm by a cross head resin extruder in the case of a thermoplastic material.

The reinforcing layer was braided by a braider. The adhesion layer between reinforcing layers was coated on the outer surface of the reinforcing layer and naturally dried in the case of an ordinary temperature curing type urethane based adhesive and was extruded on the reinforcing layer in a tubular shape of a thickness of 0.1 mm by a cross head extruder in the case of a thermoplastic material.

The adhesion layer between the outer cover and reinforcing layer was coated on the outer surface of the reinforcing layer and naturally dried in the case of an ordinary temperature curing type urethane adhesive and was extruded on the inner tube in a tubular shape of a thickness of 0.1 mm by a cross head resin extruder in the case of a thermoplastic material. The outer cover was extruded by a cross head resin extruder over the adhesion layer between the outer cover and reinforcing layer to a tubular shape of an outer diameter of 17.5 mm.

The methods of heating of the adhesion layers shown in the table were as follows: "Heating by an oven after formation of the outer cover" means heating the adhesion layer to over the melting temperature, and therefore, the hose having the outer cover formed on it is placed in an oven and heated to the predetermined time for the predetermined temperature.

"Direct heating of the inner tube just before braiding" means heating and melting by a heater before forming the reinforcing layer on the outer surface of the inner tube. "Heating just before braiding" means heating and melting the adhesion layer by a heater before braiding the reinforcing layer on the adhesion layer. "Melt extrusion" means heating the adhesion layer by extruding the thermoplastic material at least at the softening temperature and then immediately thereafter braiding the reinforcing layer.

The durability test was a so-called impulse durability test based on SAE J188 Type I performed at a temperature of 120° C., a pressure of 27.5 MPa, and 400,000 impulses.

The meanings of the abbreviations of the materials shown in the Table were as follows:

COPE is a thermoplastic copolyester elastomer used for the inner tube material. Hytrel 5557 made by Toray-Du Pont was used.

ACM/COPE (1) is a thermoplastic elastomer composition used for the inner tube material composed of a thermoplastic copolyester elastomer in which a vulcanized rubber composition of an acrylic rubber (ACM) composition is finely dispersed. (Formulation Table ACM/COPE (1))

NBR/PP (1) and NBR/PP (2) are thermoplastic elastomer compositions used for the inner tube material comprised of the polypropylene thermoplastic resin in which a vulcanized rubber composition of an acrylonitrile butadiene copolymer rubber (NBR) is finely dispersed.

For NBR/PP (1), GEOLAST 703-40 made by AES Japan was used.

For NBR/PP (2), NBR/PP (1) in which 20% by weight of Admer QB-540 made by Mitsui Petrochemical Industries was blended was used.

COPE (1), COPE (2), and COPE (3) are thermoplastic copolyester elastomers used for the adhesion layers. COPE (1) is Hytrel 2551 made by Toray-Du Pont, COPE (2) is Vylon GM-900 made by Toyobo, and COPE (3) is Vylon GM-400 made by Toyobo.

The modified olefin is a modified polyolefin resin used for the adhesion layer. Admer QB-540 made by Mitsui Petrochemical Industries is used.

TPU is a thermoplastic urethane elastomer used for the outer cover material. Esten 58212 made by Kyowa Hakko Kogyo was used.

ACM/COPE (2) is a thermoplastic elastomer composition for the outer cover material comprised of the thermoplastic copolyester elastomer used in which a vulcanized rubber composition of an acrylic rubber (ACM) composition is finely dispersed (Formulation Table ACM/COPE (2))

EPDM/PP (1) and EPDM/PP (2) are thermoplastic elastomer compositions used for the outer cover material comprised of the polypropylene thermoplastic resin in which a vulcanized rubber composition of an ethylene-propylene-diene copolymer rubber (EPDM) composition is finely dispersed.

EPDM/PP (1) is SANTOPRENE 201-64 made by AES Japan.

EPDM/PP (2) is EPDM/PP (1) in which 20% by weight of Admer QB-540 made by Mitsui Petrochemical Industries is blended.

The urethane adhesive used was Tyrite 7411 of Lord Far East.

| (Formulation Table) | |
|---|---|
| | (Parts by weight) |
| ACM/COPE (1) | |
| COPE, Hytrel 5556, Toray-Du Pont | 334.40 |
| ACM1 | 100.00 |
| EA (ethyl acrylate) = 40% by weight | |
| BA (butylacrylate) = 32% by weight | |
| MEA (methoxyethyl acrylate) = 19% by weight | |
| GMA (glycidyl methacrylate) = 9% by weight | |
| FEF grade carbon black, Seast SO, Tokai Carbon | 40.00 |
| Antioxidant - Irganox 1010, Ciba-Geigy | 3.00 |

-continued (Formulation Table)

| | (Parts by weight) |
|---|---|
| Cross-linking agent, butane tetracarboxylic acid, Mitsui Toatsu Fine Chemical | 1.60 |
| EMA-GMA | 33.44 |
| E (ethylene) = 67% by weight | |
| MA (methyl acrylate) = 30% by weight | |
| GMA (glycidyl methacrylate) = 3% by weight | |

-continued (Formulation Table)

| | (Parts by weight) |
|---|---|
| ACM/COPE (2) | |
| COPE, Hytrel 5556, Toray-Du Pont | 144.30 |
| ACM1 | 100.00 |
| FEF grade carbon black, Seast SO, Tokai Carbon | 40.00 |
| Antioxidant, Irganox 1010, Ciba-Geigy | 3.00 |
| Cross-linking agent, butane tetracarboxylic acid, Mitsui Toatsu Fine Chemical | 1.60 |
| EMA-GMA | 14.43 |

TABLE VIII-1

Process for Adhesion Inner Tube/Reinforcing Layer

| | Comparative examples | | Effect of process of heating of adhesion layer between inner tube/ reinforcing layer immediately before braiding | | | |
|---|---|---|---|---|---|---|
| | Comp. Ex. VIII-1 | Comp. Ex. VIII-62 | Ex. VIII-1 | Ex. VIII-2 | Ex. VIII-3 | Ex. VIII-4 |
| <Config. of hose> Drawing | FIG. 4 | FIG. 4 | FIG. 4 | FIG. 4 | FIG. 4 | FIG. 4 |
| Inner tube | COPE | COPE | COPE | ACM/COPE (1) | ACM/COPE (1) | NBR/PP (1) |
| Reinforcing layer | Polyester fiber | Polyester fiber | Polyester fiber | Polyester fiber | Polyester fiber | Nylon fiber |
| Outer cover | TPU | TPU | TPU | ACM/COPE (2) | EPDM/PP (1) | EPDM/PP (1) |
| Adhesion layer between inner tube/reinforcing layer | Urethane adhesive, ordinary temp. curing type | COPE (1) | COPE (1) | COPE (1) | COPE (1) | Modified olefin |
| (Melting temp.) | — | 164° C. | 164° C. | 164° C. | 164° C. | 143° C. |
| Adhesion layer between inner tube/reinforcing layer | Urethane adhesive, ordinary temp. curing type | Urethane adhesive, ordinary temp. curing type | Urethane adhesive, ordinary temp. curing type | COPE (1) | Modified olefin | Modified olefin |
| (Melting temp.) | — | — | — | 164° C. | 143° C. | 143° C. |
| <Heating method> Inner tube/reinforcing layer | No heating | Heating in oven after forming outer cover | Heating immediately before braiding | Heating immediately before braiding | Heating immediately before braiding | Heating immediately before braiding |
| (Heating temp.) | — | 210° C. | 230° C. | 230° C. | 230° C. | 180° C. |
| (Heating time) | — | 30 min. | 1.2 sec. | 1.2 sec. | 1.2 sec. | 1.2 sec. |
| Outer cover/reinforcing layer | No heating (melt extrusion of outer cover) | Heating in oven after forming outer cover | No heating (melt extrusion of outer cover) | No heating (melt extrusion of outer cover) | No heating (melt extrusion of outer cover) | No heating (melt extrusion of outer cover) |
| (Heating temp.) | | 210° C. | | | | |
| (Heating time) | | 30 min. | | | | |
| Durability | 290,000× Hose burst | 80,000× Hose burst | 400,000× No abnormality | 400,000× No abnormality | 400,000× No abnormality | 400,000× No abnormality |

TABLE VIII-2

Process for Adhesion Inner Tube/Reinforcing Layer

| | Effect of direct heat cleaning of outer surface of inner tube immediately before braiding | | | | Effect of process of melt extrusion of adhesion layer between inner tube/reinforcing layer immediately before braiding | | | |
|---|---|---|---|---|---|---|---|---|
| | Ex. VIII-5 | Ex. VIII-6 | Ex. VIII-7 | Ex. VIII-8 | Ex. VIII-9 | Ex. VIII-10 | Ex. VIII-11 | Ex. VIII-12 |
| <Config. of hose> Drawing | FIG. 3 | FIG. 3 | FIG. 3 | FIG. 3 | FIG. 3 | FIG. 3 | FIG. 3 | FIG. 3 |
| Inner tube | COPE | ACM/COPE (1) | ACM/COPE (1) | NBR/PP (2) | COPE | ACM/COPE (1) | ACM/COPE (1) | NBR/PP (1) |
| Reinforcing layer | Polyester fiber | Polyester fiber | Polyester fiber | Nylon fiber | Polyester fiber | Polyester fiber | Polyester fiber | Nylon fiber |
| Outer cover | TPU | ACM/COPE (2) | EPDM/PP (1) | EPDM/PP (1) | TPU | ACM/COPE (2) | EPDM/PP (1) | EPDM/PP (1) |

TABLE VIII-2-continued

Process for Adhesion Inner Tube/Reinforcing Layer

| | Effect of direct heat cleaning of outer surface of inner tube immediately before braiding | | | | Effect of process of melt extrusion of adhesion layer between inner tube/reinforcing layer immediately before braiding | | | |
|---|---|---|---|---|---|---|---|---|
| | Ex. VIII-5 | Ex. VIII-6 | Ex. VIII-7 | Ex. VIII-8 | Ex. VIII-9 | Ex. VIII-10 | Ex. VIII-11 | Ex. VIII-12 |
| Adhesion layer between inner tube/reinforcing layer (Melting temp.) | None | None | None | None | COPE (1) 164° C. | COPE (1) 164° C. | COPE (1) 164° C. | Modified olefin 143° C. |
| Adhesion layer between inner tube/reinforcing layer (Melting temp.) | Urethane adhesive, ordinary temp. curing type — | COPE (1) 164° C. | Modified olefin 143° C. | Modified olefin 143° C. | Urethane adhesive, ordinary temp. curing type — | COPE (1) 164° C. | Modified olefin 143° C. | Modified olefin 143° C. |
| <Heating method> Inner tube/reinforcing layer (Heating temp.) (Heating time) | Direct heating of inner tube immediately before braiding 230° C. 1.2 sec. | Direct heating of inner tube immediately before braiding 230° C. 1.2 sec. | Direct heating of inner tube immediately before braiding 230° C. 1.2 sec. | Direct heating of inner tube immediately before braiding 180° C. 1.2 sec. | Melt extrusion 230° C. | Melt extrusion 230° C. | Melt extrusion 230° C. | Melt extrusion 250° C. |
| Outer cover/reinforcing layer (Heating temp.) (Heating time) | No heating (melt extrusion of outer cover) | No heating (melt extrusion of outer cover) | No heating (melt extrusion of outer cover) | No heating (melt extrusion of outer cover) | No heating (melt extrusion of outer cover) | No heating (melt extrusion of outer cover) | No heating (melt extrusion of outer cover) | No heating (melt extrusion of outer cover) |
| Durability | 400,000× No abnormality | 400,000× No abnormality | 400,000× No abnormality | 400,000× No abnormality | 400,000× No abnormality | 400,000× No abnormality | 400,000× No abnormality | 400,000× No abnormality |

TABLE VIII-3

Process for Adhesion Reinforcing Layers (Comparative Examples)

| | Comparative examples - Nonheating process (no adhesion layer between reinforcing layers) | | | | Comparative examples - Nonheating process (adhesive used between reinforcing layers) | | | |
|---|---|---|---|---|---|---|---|---|
| | Comp. Ex. VIII-3 | Comp. Ex. VIII-4 | Comp. Ex. VIII-5 | Comp. Ex. VIII-6 | Comp. Ex. VIII-7 | Comp. Ex. VIII-8 | Comp. Ex. VIII-9 | Comp. Ex. VIII-10 |
| <Config. of hose> Drawing Inner tube | COPE | ACM/COPE (1) | ACM/COPE (1) | NBR/PP (2) | COPE | ACM/COPE (1) | ACM/COPE (1) | NBR/PP (2) |
| 1st reinforcing layer | Polyester fiber | Polyester fiber | Polyester fiber | Nylon fiber | Polyester fiber | Polyester fiber | Polyester fiber | Nylon fiber |
| 2nd reinforcing layer | Polyester fiber | Polyester fiber | Polyester fiber | Nylon fiber | Polyester fiber | Polyester fiber | Polyester fiber | Nylon fiber |
| Outer cover | TPU | ACM/COPE (2) | EPDM/PP (1) | EPDM/PP (2) | TPU | ACM/COPE (2) | EPDM/PP (1) | EPDM/PP (2) |
| Adhesion layer between inner tube/reinforcing layer (Melting temp.) | Urethane adhesive, ordinary temp. curing type — | Urethane adhesive, ordinary temp. curing type — | Urethane adhesive, ordinary temp. curing type — | Urethane adhesive, ordinary temp. curing type — | Urethane adhesive, ordinary temp. curing type — | Urethane adhesive, ordinary temp. curing type — | Urethane adhesive, ordinary temp. curing type — | Urethane adhesive, ordinary temp. curing type — |
| Adhesion layer between reinforcing layers (Melting temp.) | None | None | None | None | Urethane adhesive, ordinary temp. curing type — | Urethane adhesive, ordinary temp. curing type — | Urethane adhesive, ordinary temp. curing type — | Urethane adhesive, ordinary temp. curing type — |
| Adhesion layer between outer cover/reinforc- | Urethane adhesive, ordinary temp. | Urethane adhesive, ordinary temp. | Urethane adhesive, ordinary temp. | Urethane adhesive, ordinary temp. | Urethane adhesive, ordinary temp. | Urethane adhesive, ordinary temp. | Urethane adhesive, ordinary temp. | Urethane adhesive, ordinary temp. |

TABLE VIII-3-continued

Process for Adhesion Reinforcing Layers (Comparative Examples)

| | Comparative examples - Nonheating process (no adhesion layer between reinforcing layers) | | | | Comparative examples - Nonheating process (adhesive used between reinforcing layers) | | | |
|---|---|---|---|---|---|---|---|---|
| | Comp. Ex. VIII-3 | Comp. Ex. VIII-4 | Comp. Ex. VIII-5 | Comp. Ex. VIII-6 | Comp. Ex. VIII-7 | Comp. Ex. VIII-8 | Comp. Ex. VIII-9 | Comp. Ex. VIII-10 |
| ing layer (Melting temp.) | curing type — | curing type — | curing type — | curing type — | curing type — | curing type — | curing type — | curing type — |
| <Heating method> Inner tube/reinforcing layer (Heating temp.) (Heating time) | No heating | No heating | No heating | No heating | No heating | No heating | No heating | No heating |
| Reinforcing layer/reinforcing layer (Heating temp.) (Heating time) | No heating | No heating | No heating | No heating | No heating | No heating | No heating | No heating |
| Outer cover/reinforcing layer (Heating temp.) (Heating time) | No heating (melt extrusion of outer cover) | No heating (melt extrusion of outer cover) | No heating (melt extrusion of outer cover) | No heating (melt extrusion of outer cover) | No heating (melt extrusion of outer cover) | No heating (melt extrusion of outer cover) | No heating (melt extrusion of outer cover) | No heating (melt extrusion of outer cover) |
| Durability | 290,000× Hose burst | 210,000× Hose burst | 180,000× Hose burst | 60,000× Hose burst | 230,000× Hose burst | 150,000× Hose burst | 120,000× Hose burst | 80,000× Hose burst |

TABLE VIII-4

Process for Adhesive Reinforcing Layers (Comparative Examples)

Comparative examples - Heating process after forming outer cover (thermoplastic material used between reinforcing layers)

| | Comp. Ex. VIII-11 | Comp. Ex. VIII-12 | Comp. Ex. VIII-13 | Comp. Ex. VIII-14 | Comp. Ex. VIII-15 | Comp. Ex. VIII-16 | Comp. Ex. VIII-17 |
|---|---|---|---|---|---|---|---|
| <Config. of hose> Drawing | | | | | | | |
| Inner tube | COPE | COPE | ACM/COPE (1) | ACM/COPE (1) | ACM/COPE (1) | ACM/COPE (1) | NBR/PP (2) |
| 1st reinforcing layer | Polyester fiber | Polyester fiber | Polyester fiber | Polyester fiber | Polyester fiber | Polyester fiber | Nylon fiber |
| 2nd reinforcing layer | Polyester fiber | Polyester fiber | Polyester fiber | Polyester fiber | Polyester fiber | Polyester fiber | Nylon fiber |
| Outer cover | TPU | TPU | ACM/CODE (2) | ACM/CODE (2) | EDPM/PP (2) | EDPM/PP (2) | EDPM/PP (2) |
| Adhesion layer between inner tube/reinforcing layer (Melting temp.) | Urethane adhesive, ordinary temp. curing type — | Urethane adhesive, ordinary temp. curing type — | Urethane adhesive, ordinary temp. curing type — | Urethane adhesive, ordinary temp. curing type — | Urethane adhesive, ordinary temp. curing type — | Urethane adhesive, ordinary temp. curing type — | Urethane adhesive, ordinary temp. curing type — |
| Adhesion layer between reinforcing layers (Melting temp.) | COPE (3) 120° C. | COPE (2) 145° C. | COPE (3) 120° C. | COPE (2) 145° C. | COPE (3) 120° C. | COPE (2) 145° C. | Modified olefin 143° C. |
| Adhesion layer between outer cover/reinforcing layer (Melting temp.) | Urethane adhesive, ordinary temp. curing type — | Urethane adhesive, ordinary temp. curing type — | Urethane adhesive, ordinary temp. curing type — | Urethane adhesive, ordinary temp. curing type — | Urethane adhesive, ordinary temp. curing type — | Urethane adhesive, ordinary temp. curing type — | Urethane adhesive, ordinary temp. curing type — |
| <Heating method> Inner tube/reinforcing layer | Heating in oven after forming outer cover | Heating in oven after forming outer cover | Heating in oven after forming outer cover | Heating in oven after forming outer cover | Heating in oven after forming outer cover | Heating in oven after forming outer cover | Heating in oven after forming outer cover |
| (Heating temp.) (Heating time) | 120° C. 30 min. | 150° C. 30 min. | 120° C. 30 min. | 150° C. 30 min. | 120° C. 30 min. | 150° C. 30 min. | 180° C. 30 min. |
| Reinforcing layer/reinforcing layer | Heating in oven after forming outer cover | Heating in oven after forming outer cover | Heating in oven after forming outer cover | Heating in oven after forming outer cover | Heating in oven after forming outer cover | Heating in oven after forming outer cover | Heating in oven after forming outer cover |
| (Heating temp.) (Heating time) | 120° C. 30 min. | 150° C. 30 min. | 120° C. 30 min. | 150° C. 30 min. | 120° C. 30 min. | 150° C. 30 min. | 180° C. 30 min. |

TABLE VIII-4-continued

Process for Adhesive Reinforcing Layers (Comparative Examples)

Comparative examples - Heating process after forming outer cover (thermoplastic material used between reinforcing layers)

| | Comp. Ex. VIII-11 | Comp. Ex. VIII-12 | Comp. Ex. VIII-13 | Comp. Ex. VIII-14 | Comp. Ex. VIII-15 | Comp. Ex. VIII-16 | Comp. Ex. VIII-17 |
|---|---|---|---|---|---|---|---|
| Outer cover/ reinforcing layer | Heating in oven after forming outer cover | Heating in oven after forming outer cover | Heating in oven after forming outer cover | Heating in oven after forming outer cover | Heating in oven after forming outer cover | Heating in oven after forming outer cover | Heating in oven after forming outer cover |
| (Heating temp.) | 120° C. | 150° C. | 120° C. | 150° C. | 120° C. | 150° C. | 180° C. |
| (Heating time) | 30 min. | 30 min. | 30 min. | 30 min. | 30 min. | 30 min. | 30 min. |
| Durability | 350,000× Hose burst | 320,000× Hose burst | 310,000× Hose burst | 270,000× Hose burst | 260,000× Hose burst | 230,000× Hose burst | 90,000× Hose burst |

TABLE VIII-5

Process for Adhesion Reinforcing Layers

Effect of heating process of adhesion layer between reinforcing layers immediately before braiding

| | Ex. VIII-13 | Ex. VIII-14 | Ex. VIII-15 | Ex. VIII-16 | Ex. VIII-17 | Ex. VIII-18 | Ex. VIII-19 | Ex. VIII-20 | Ex. VIII-21 | Ex. VIII-22 |
|---|---|---|---|---|---|---|---|---|---|---|
| <Config. of hose> Drawing | FIG. 6 | FIG. 6 | FIG. 6 | FIG. 6 | FIG. 6 | FIG. 6 | FIG. 6 | FIG. 6 | FIG. 6 | FIG. 6 |
| Inner tube | COPE | COPE | COPE | ACM/COPE (1) | ACM/COPE (1) | ACM/COPE (1) | ACM/COPE (1) | ACM/COPE (1) | ACM/COPE (1) | NBR/PP (2) |
| 1st rein. layer | Polyester fiber | Polyester fiber | Polyester fiber | Polyester fiber | Polyester fiber | Polyester fiber | Reinforced wire | Polyester fiber | Polyester fiber | Nylon fiber |
| 2nd rein. layer | Polyester fiber | Polyester fiber | Polyester fiber | Polyester fiber | Polyester fiber | Polyester fiber | Reinforced wire | Polyester fiber | Polyester fiber | Nylon fiber |
| Outer cover | TPU | TPU | TPU | ACM/COPE (2) | ACM/COPE (2) | ACM/COPE (2) | EDPM/PP (2) | EDPM/PP (2) | EDPM/PP (2) | EDPM/PP (2) |
| Adhesion layer between inner tube/rein. layer | Urethane adhesive, ordinary temp. curing type | Urethane adhesive, ordinary temp. curing type | Urethane adhesive, ordinary temp. curing type | Urethane adhesive, ordinary temp. curing type | Urethane adhesive, ordinary temp. curing type | Urethane adhesive, ordinary temp. curing type | Urethane adhesive, ordinary temp. curing type | Urethane adhesive, ordinary temp. curing type | Urethane adhesive, ordinary temp. curing type | Urethane adhesive, ordinary temp. curing type |
| (Melting temp.) | — | — | — | — | — | — | — | — | — | — |
| Adhesion layer bet. rein. layers | COPE (2) | COPE (3) | COPE (1) | COPE (2) | COPE (3) | COPE (1) | COPE (2) | COPE (3) | COPE (1) | Modified olefin |
| (Melting temp.) | 120° C. | 145° C. | 164° C. | 120° C. | 145° C. | 164° C. | 120° C. | 145° C. | 164° C. | 143° C. |
| Adhesion layer between outer cover/rein. layer | Urethane adhesive, ordinary temp. curing type | Urethane adhesive, ordinary temp. curing type | Urethane adhesive, ordinary temp. curing type | Urethane adhesive, ordinary temp. curing type | Urethane adhesive, ordinary temp. curing type | Urethane adhesive, ordinary temp. curing type | Urethane adhesive, ordinary temp. curing type | Urethane adhesive, ordinary temp. curing type | Urethane adhesive, ordinary temp. curing type | Urethane adhesive, ordinary temp. curing type |
| (Melting temp.) | — | — | — | — | — | — | — | — | — | — |
| <Heat method> Inner tube/rein. layer (Heating temp.) (Heating time) | No heating | No heating | No heating | No heating | No heating | No heating | No heating | No heating | No heating | No heating |
| Rein. layer/rein. layer | Heating just before braid | Heating just before braid | Heating just before braid | Heating just before braid | Heating just before braid | Heating just before braid | Heating just before braid | Heating just before braid | Heating just before braid | Heating just before braid |
| (Heating temp.) | 120° C. | 150° C. | 230° C. | 120° C. | 150° C. | 230° C. | 120° C. | 150° C. | 230° C. | 180° C. |
| (Heating time) | 1.2 sec. | 1.2 sec. | 1.2 sec. | 1.2 sec. | 1.2 sec. | 1.2 sec. | 1.2 sec. | 1.2 sec. | 1.2 sec. | 1.2 sec. |
| Outer cover/rein. layer | No heating (melt extrusion of outer cover) | No heating (melt extrusion of outer cover) | No heating (melt extrusion of outer cover) | No heating (melt extrusion of outer cover) | No heating (melt extrusion of outer cover) | No heating (melt extrusion of outer cover) | No heating (melt extrusion of outer cover) | No heating (melt extrusion of outer cover) | No heating (melt extrusion of outer | No heating (melt extrusion of outer |

TABLE VIII-5-continued

Process for Adhesion Reinforcing Layers

Effect of heating process of adhesion layer between reinforcing layers immediately before braiding

|  | Ex. VIII-13 | Ex. VIII-14 | Ex. VIII-15 | Ex. VIII-16 | Ex. VIII-17 | Ex. VIII-18 | Ex. VIII-19 | Ex. VIII-20 | Ex. VIII-21 | Ex. VIII-22 |
|---|---|---|---|---|---|---|---|---|---|---|
| (Heating temp.) | | | | | | | | | cover) | cover) |
| (Heating time) | | | | | | | | | | |
| Durability | 400,000× No abnormal. | 400,000× No abnormal. | 400,000× No abnormal. | 400,000× No abnormal. | 400,000× No abnormal. | 400,000× No abnormal. | 400,000× No abnormal. | 400,000× No abnormal. | 400,000× No abnormal. | 400,000× No abnormal. |

TABLE VIII-6

Method of Adhesion Reinforcing Layers

Method of direct adhesion by melt extrusion of adhesion layer between reinforcing layers

|  | Ex. VIII-23 | Ex. VIII-24 | Ex. VIII-25 | Ex. VIII-26 |
|---|---|---|---|---|
| <Config. of hose> Drawing | FIG. 6 | FIG. 6 | FIG. 6 | FIG. 6 |
| Inner tube | COPE | ACM/COPE (1) | ACM/COPE (1) | NBR/PP (2) |
| 1st reinforcing layer | Polyester fiber | Polyester fiber | Polyester fiber | Nylon fiber |
| 2nd reinforcing layer | Polyester fiber | Polyester fiber | Polyester fiber | Nylon fiber |
| Outer cover | TPU | ACM/COPE (2) | EPDM/PP (2) | EPDM/PP (2) |
| Adhesion layer between inner tube/reinforcing layer | Urethane adhesive, ordinary temp. curing type | Urethane adhesive, ordinary temp. curing type | Urethane adhesive, ordinary temp. curing type | Urethane adhesive, ordinary temp. curing type |
| (Melting temp.) | — | — | — | — |
| Adhesion layer between reinforcing layers | COPE (1) | COPE (1) | COPE (1) | Modified olefin |
| (Melting temp.) | 164° C. | 164° C. | 164° C. | 143° C. |
| Adhesion layer between outer cover/reinforcing layer | Urethane adhesive, ordinary temp. curing type | Urethane adhesive, ordinary temp. curing type | Urethane adhesive, ordinary temp. curing type | Urethane adhesive, ordinary temp. curing type |
| (Softening temp.) | — | — | — | — |
| <Heating method> Inner tube/reinforcing layer (Heating temp.) (Heating time) | No heating | No heating | No heating | No heating |
| Reinforcing layer/reinforcing layer | Melt extrusion | Melt extrusion | Melt extrusion | Melt extrusion |
| (Heating temp.) | 230° C. | 230° C. | 230° C. | 180° C. |
| (Heating time) | 1.2 sec. | 1.2 sec. | 1.2 sec. | 1.2 sec. |
| Outer cover/reinforcing layer | No heating (melt extrusion of outer cover) | No heating (melt extrusion of outer cover) | No heating (melt extrusion of outer cover) | No heating (melt extrusion of outer cover) |
| (Heating temp.) (Heating time) | | | | |
| Durability | 400,000× No abnormality | 400,000× No abnormality | 400,000× No abnormality | 400,000× No abnormality |

TABLE VIII-7

Adhesion Methods - Method of Adhesion Inner Tube/Reinforcing Layer + Method of Adhesion Reinforcing Layers Method of direct adhesion by melt extrusion of adhesion layer between reinforcing layers

|  | Ex. VIII-27 | Ex. VIII-28 | Ex. VIII-29 | Ex. VIII-30 |
|---|---|---|---|---|
| <Config. of hose> Drawing | FIG. 6 | FIG. 6 | FIG. 6 | FIG. 6 |
| Inner tube | COPE | ACM/COPE (1) | ACM/COPE (1) | NBR/PP (1) |
| 1st reinforcing layer | Polyester fiber | Polyester fiber | Polyester fiber | Nylon fiber |
| 2nd reinforcing layer | Polyester fiber | Polyester fiber | Polyester fiber | Nylon fiber |
| Outer cover | TPU | ACM/COPE (2) | EPDM/PP (1) | EPDM/PP (1) |
| Adhesion layer between inner tube/reinforcing layer | COPE (1) | COPE (1) | COPE (1) | Modified olefin |
| (Melting temp.) | 164° C. | 164° C. | 164° C. | 143° C. |
| Adhesion layer between reinforcing layers | COPE (1) | COPE (1) | COPE (1) | Modified olefin |
| (Melting temp.) | 164° C. | 164° C. | 164° C. | 143° C. |

TABLE VIII-7-continued

Adhesion Methods - Method of Adhesion Inner Tube/
Reinforcing Layer + Method of Adhesion Reinforcing Layers Method of direct adhesion by melt extrusion of
adhesion layer between reinforcing layers

| | Ex. VIII-27 | Ex. VIII-28 | Ex. VIII-29 | Ex. VIII-30 |
|---|---|---|---|---|
| Adhesion layer between outer cover/reinforcing layer (Softening temp.) | COPE (1) 164° C. | COPE (1) 164° C. | Modified olefin 143° C. | Modified olefin 143° C. |
| <Heating method> Inner tube/reinforcing layer | Heating just before braiding | Heating just before braiding | Heating just before braiding | Heating just before braiding |
| (Heating temp.) | 230° C. | 230° C. | 230° C. | 180° C. |
| (Heating time) | 1.2 sec. | 1.2 sec. | 1.2 sec. | 1.2 sec. |
| Reinforcing layer/reinforcing layer | Melt extrusion | Melt extrusion | Melt extrusion | Melt extrusion |
| Heating temp.) | 230° C. | 230° C. | 230° C. | 230° C. |
| Heating time) | 1.2 sec. | 1.2 sec. | 1.2 sec. | 1.2 sec. |
| Outer cover/reinforcing layer (Heating temp.) (Heating time) | No heating (melt extrusion of outer cover) | No heating (melt extrusion of outer cover) | No heating (melt extrusion of outer cover) | No heating (melt extrusion of outer cover) |
| Durability | 400,000× No abnormality | 400,000× No abnormality | 400,000× No abnormality | 400,000× No abnormality |

(Method of Adhesion Inner Tube and
Reinforcing Layer)

Examples VIII-1 to VIII-12 and Comparative
Examples VIII-1 to VIII-2

Next, the effect of the process of production of the present invention in the adhesion of an inner tube and reinforcing layer will be explained. Comparative Example VIII-1 uses an ordinary temperature curing type urethane based adhesive for the adhesion layer between the inner tube and the reinforcing layer, so the adhesion layer hardens during use and cuts the fibers of the reinforcing layer, so is inferior in durability. Further, Comparative Example VIII-2 uses a thermoplastic material for the adhesion layer between the inner tube and reinforcing layer, but heats the hose in an oven after formation of the outer cover, so excessive heat is applied to the fibers of the reinforcing layer and the fibers degraded under the heat, resulting in inferior durability.

Examples VIII-1 to VIII-4 heat the adhesion layer comprised of the thermoplastic material extruded on the inner tube and located between the inner tube and reinforcing layer to at least the melting temperature and braid the reinforcing layer when the surface to which the fibers to be braided will contact is in a molten state.

Examples VIII-5 to VIII-8 heat the inner tube directly to at least the melting temperature immediately before knitting the reinforcing layer and braid the reinforcing layer when the surface to which the fibers to be braided will contact is in a molten state.

Examples VIII-9 to VIII-12 melt extrude on to the inner tube adhesion layers composed of a thermoplastic material for adhesion the inner tube and reinforcing layer and braid the reinforcing layer when the surface where the fibers to be braided will contact is in a molten state.

The hoses of these Examples, regardless of the hose structure (inner tube and outer cover materials and reinforcing fiber materials), have a strong adhesion between the inner tube and reinforcing layer, are free from heat curing of the adhesion layer, and do not subject the reinforcing layers to excessive heat, so are superior in durability.

(Method of Adhesion Reinforcing Layers)

Examples VIII-13 to VIII-30 and Comparative
Examples VIII-3 to VIII-17

Next, the effect of the production process of the present invention in the adhesion of the reinforcing layers will be explained.

Comparative Examples VIII-3 to VIII-6 do not provide adhesion layers between the reinforcing layers and do not apply heat treatment, so there is no adhesion between reinforcing layers, the hoses break early, and the durability is inferior.

Comparative Examples VIII-7 to VIII-10 use an ordinary temperature curing type urethane adhesive for the adhesion layer between the reinforcing layers and do not apply heat treatment, so the adhesion layers harden during and cut the fibers of the reinforcing layer, so are inferior in durability.

Comparative Examples VIII-11 to VIII-17 use a thermoplastic material for the adhesion layer between the reinforcing layers, but heat the hoses in an oven after formation of the outer cover, and therefore excessive heat is applied to the fibers of the reinforcing layer and the fibers degraded under the heat, resulting in inferior durability.

Examples VIII-13 to VIII-22 heat the adhesion layer for the reinforcing layers, composed of the thermoplastic material extruded on the first reinforcing layer, to at least the melting temperature and braid the second reinforcing layer when the surface to which the fibers to be braided will contact is in a molten state.

Examples VIII-23 to VIII-26 melt extrude on to the first reinforcing layer adhesion layers composed of a thermoplastic material for adhesion the reinforcing layers and braid the second reinforcing layer when the surface where the fibers to be braided will contact is in a molten state.

The hoses of these Examples, regardless of the hose structure (inner tube and outer cover materials and reinforcing fiber materials), have a strong adhesion between the reinforcing layers, are free from heat curing of the adhesion layer, and do not subject the reinforcing layers to excessive heat, so are superior in durability.

(Method of Adhesion Inner Tube and Reinforcing
Layers and Reinforcing Layers)

Examples VIII-27 to VIII-30

Next, the effect of the process of production of the present invention in the adhesion of the inner tube and reinforcing layer and the reinforcing layers will be explained.

Examples VIII-27 to VIII-30 heat the adhesion layer between the inner tube and reinforcing layer, comprised of a thermoplastic material extruded on to the inner tube, to at least the melting temperature and braid the first reinforcing layer when the surface to which the fibers to be braided will contact is in a molten state and, further, heat the adhesion layer between reinforcing layers, extruded on the first reinforcing layer, to at least the melting temperature and braid the second reinforcing layer when the surface to which the fibers to be braided will contact is in a molten state.

Note that in these Examples, a thermoplastic resin is used for the adhesion layer between the reinforcing layer and the outer cover as well. This is more preferable.

The hoses of these Examples, regardless of the hose structure (inner tube and outer cover materials and reinforcing fiber materials), have a strong adhesion between the inner tube and reinforcing layer and between the reinforcing layers, are free from heat curing of the adhesion layer, and do not subject the reinforcing layers to excessive heat, so are superior in durability.

Next, examples of the production of a hose of a ninth embodiment of the present invention will be given to explain specifically the Examples of use and effects of the braider of the present invention. The invention is not however limited to these Examples.

(1) Structure of Inner Tube

Using a thermoplastic polyester elastomer (Hytrel 5557, made by Toray-Du Pont, melting point 208° C.) for the inner layer of the inner tube and a thermoplastic polyester elastomer (Hytrel 2551, made by Toray-Du Pont, melting point 164° C.) for the outer layer of the inner tube and using a resin extruder and two-layer extruding head, an inner tube with an inner diameter of 9.5 mm, a thickness of the inner layer of the inner tube of 1.0 mm, and a thickness of the outer layer of the inner tube of 0.1 mm was extruded in a hollow shape.

(2) Braiding of First Reinforcing Layer

Using the braider shown in FIG. 7, FIG. 8, and FIG. 9, the outer circumference of the inner tube was heated to a molten state then a reinforcing layer comprised of polyester fiber was braided on the inner tube to thereby both form the reinforcing layer and bond the inner tube and reinforcing layer.

The braiding conditions were as follows:

The preheating device was a hot air recirculating type. The temperature of the hot air was adjusted to 120° C. The temperature of the outer surface of the inner tube of the hose at the outlet of the preheating device was 100° C.

The distance between the heating tool attached to the braiding die and the hose inner tube was 20 mm and the distance from the outlet of the heating tool to the braiding point was 10 mm.

The heating tool attached to the braiding die was adjusted to a temperature of 200° C. and the braiding speed was made 1.0 m/min The temperature of the outer surface of the inner tube of the hose at the outlet of the heating tool was 180° C. The molten state of the outer surface of the hose inner tube was visually confirmed. (Melting point of thermoplastic material was 164° C.)

Note that the time of passage through the preheating device was 42 seconds, the time of passage through the heating tool was 1.2 seconds, and the time until braiding after leaving the heating tool was 0.6 second.

(3) Formation of Adhesive Resin Layer

An adhesive resin layer was formed using a thermoplastic polyester elastomer (Hytrel 2551, made by Toray-Du Pont, melting point 164° C.) and a resin extruder and cross head to a thickness of 0.1 mm.

(4) Braiding of Second Reinforcing Layer

Using the same braider and braiding conditions as the braiding of the first reinforcing layer, the outer circumference of the adhesive resin layer was heated to the molten state and a reinforcing layer composed of polyester fiber was braided on the adhesive resin layer to thereby both form the reinforcing layer and bond the first reinforcing layer and the second reinforcing layer through the adhesive resin layer.

(5) Formation of Outer Cover

Using a thermoplastic polyester elastomer (Hytrel 2551, made by Toray-Du Pont, melting point 164° C.) for the inner layer of the outer cover and a thermoplastic polyester elastomer (Hytrel 4777, made by Toray-Du Pont, melting point 200° C.) for the outer layer of the outer cover and using a twin-screw resin extruder and cross head, the inner layer of the outer cover and the outer layer of the outer cover were consecutively extruded to form an outer cover with a thickness of the an inner tube inner layer of the outer cover of 0.1 mm, and a thickness of the outer layer of the outer cover of 1.0 mm.

(6) Evaluation of Hose

The dimensional stability of the hoses produced by the above steps (1) to (5) was evaluated by measuring the inner diameters. The durability of the hoses was evaluated by a high temperature impulse pressure test.

Note that the high temperature impulse pressure test was performed according to SAE J188 Type 1 at a temperature of 120° C., a pressure of 27.5 MPa, and a target durability of 200,000 impulses.

The dimensional stability was excellent with an inner diameter of 9.3 mm or inside the prescribed dimensions.

The hose durability was excellent with the hose not breaking up to the target durability and no abnormalities being observed even with later confirmation.

(7) Comparative Examples

As Comparative Examples of the Examples, a hose was produced by a configuration the same as the Examples except for using a urethane based ordinary temperature wet curing type adhesive (Tyrite 7411, made by Lord Far East) instead of the adhesive resin and using a braider with no heating apparatus (Comparative Example IX-1) and a hose was produced by a configuration the same as the examples but using a braider with no heating apparatus and heating the hose after formation of the outer cover in an oven of 200° C. for 30 minutes for adhesion by hot melting (Comparative Example IX-2). These were evaluated in the same way as the above (6).

Comparative Example IX-1 was a conventional hose. It was excellent in dimensional stability and hose durability, but since it used an adhesive had problems in evaporation of the solvent and the aging period.

Comparative Example IX-2 was poor in dimensional stability and had an inner diameter of 8.2 mm, i.e., suffered from extreme changes in the inner diameter making it substandard. Further, the hose durability was poor. Due to heat degradation of the constituent material, the hose bursting at 50,000 impulses.

From the results of evaluation of these hoses, the superiority in the production of the hose due to the use of the braider of the present invention and the superiority of a hose produced became clear.

INDUSTRIAL APPLICABILITY

As explained above, according to the present invention, by using a thermoplastic elastomer composition containing a thermoplastic copolyester elastomer and an acrylic rubber as the hose inner tube and/or outer cover, it is possible to obtain a hose superior in oil resistance, flexibility, and cold resistance which does not require a processing (vulcanization) step. According to the second embodiment of the present invention, by blending a specific terminal carboxyl group modified polycaprolactone into the elastomer composition or thermoplastic elastomer composition, it is possible to obtain an elastomer material which is improved in elongation or compression set resistance, is superior in oil resistance, flexibility, and cold resistance, and is useful as various types of sealing agents, hoses, etc. According to the third embodiment of the present invention, compatibilizer it is possible to obtain a hose superior in oil resistance, flexibility, cold resistance, and heat resistance and further superior in heat curing resistance and heat aging resistance and exhibiting a high durability. Accordingly, the hose of the present invention is particularly useful as a hose for a high pressure fluid etc.

According to the present invention, further, it is possible to obtain an olefin thermoplastic elastomer composition having a never before existing excellent adhesiveness with a polyester fiber, in particular an adhesiveness capable of withstanding stress due to repeated deformation under a high temperature of 120° C., and a hose or other laminate using such an elastomer composition.

According to the present invention, further, a desired high adhesion strength is obtained and the hose durability is improved by using the thermoplastic adhesive resin for either of the hose inner tube/fiber reinforcing layer, fiber reinforcing layer/fiber reinforcing layer, and fiber reinforcing layer/outer cover. Further, since a heat reaction can be used, it is possible to adhere a thermoplastic elastomer composition comprised of a difficult to adhere material like a polyolefin based thermoplastic resin in which an at least partially cross-linked elastomer component is blended.

According to the present invention, further, by using a composition composed of a thermoplastic copolyester elastomer and an acrylic rubber for the inner tube and outer cover, using a polyester fiber for the reinforcing layer, and using a thermoplastic resin composition containing at least 50% by weight of a thermoplastic polyester copolymer resin with a dicarboxylic acid constituting the polyester of an aromatic dicarboxylic acid and a Young's modulus at 120° C. of at least 3.0 MPa as the adhesion layer between the reinforcing layer and outer cover, it is possible to obtain a hose superior in oil resistance, flexibility, and cold and heat resistance and further, superior in resistance to heat curing and resistance to heat aging and therefore having a high durability. Accordingly, the hose of the present invention is particularly useful as a high pressure fluid use hose.

According to the process of production of the eighth embodiment of the present invention, since the adhesion layer becomes molten in state due to heating to at least the softening temperature and since the adhesion layer and inner tube contact each other in the molten state, a strong adhesion between layers is obtained, the thermoplastic material constituting the adhesion layer will not harden even with long term use, and the hose will be superior in resistance to heat aging and fatigue resistance, so it is possible to produce a flexible hose superior in durability.

Further, since the heating of the adhesion layer and inner tube is performed before the formation of the outer cover, there is little heat applied to the parts such as the reinforcing layer and there is no heat degradation of the parts such as the reinforcing layer due to heating in the manufacturing process.

Further, in the production process of this inventions the heating of the adhesion layer and inner tube is performed simultaneously with the shaping by a simple heater or the extruder for forming the adhesion layer and inner tube, and therefore it is possible to perform heating continuously in the manufacturing line and possible to provide a production process with a high productivity.

Further, since no adhesive containing a solvent is used, the environmental problem caused by a solvent does not arise.

According to the ninth embodiment of the present invention, since the braiding die of the braider is provided with a heating means for continuously heating the surface layer of the inner tube at a step before braiding the reinforcing yarn on the inner tube, the following effects are exhibited.

a) it becomes possible to improve the adhesion performance without using a conventional solvent based adhesive or an expensive facility using infrared light, ultrasonic waves, etc. and as a result the problems in safety and health and in the environment can be solved and, further, a high quality hose can be produced so there is little effect such as the heat degradation of the constituent materials.

b) it becomes possible to produce a flexible, high durability hose by a similar number of production steps as in the past and to improve the productivity.

c) it becomes possible to make the production process continuous, to reduce the work in process, and contribute to the shortening of the lead time.

d) it becomes possible to deal inexpensively and simply with the diversification of types of braiders.

What is claimed is:

1. A thermoplastic elastomer composition comprising (i) 30 to 90% by weight of at least one thermoplastic copolyester elastomer and (ii) 10 to 70% by weight of a rubber component comprising at least one acrylic rubber having an acryl group and an epoxy group, provided that the total weight of the components (i) and (ii) are 100% by weight.

2. A thermoplastic elastomer composition as claimed in claim 1, wherein the composition contains at least 25% by weight of an acrylic rubber composed of acrylic acid and an alkyl ester having 3 to 18 carbon atoms in the alkyl portion thereof.

3. A thermoplastic elastomer composition as claimed in claim 1 or 2 further comprising a compound having at least two groups, as a carboxyl group, selected from the group consisting of carboxyl groups and carboxylic anhydride groups as a cross-linking agent.

4. A thermoplastic elastomer composition as claimed in claim 1 or 2, wherein the rubber component is cross-linked and is dispersed as a dispersed phase in a matrix phase of the thermoplastic copolyester elastomer.

5. A thermoplastic elastomer composition comprising a matrix of at least one thermoplastic copolyester elastomer and vulcanized rubber particles of at least one acrylic rubber having an acryl group and an epoxy group dispersed in the matrix, wherein the viscosity $\eta_1$ and volume fraction $\phi_1$ at the time of melt mixing of the thermoplastic copolyester elastomer and the viscosity $\eta_2$ and volume fraction $\phi_2$ at the time of melt mixing of the acrylic rubber in the unvulcanized state in the absence of a vulcanizing agent, at the range of a temperature of 180 to 350° C. and a shear rate of 1000 to 8000 s$^{-1}$, satisfy the following formulas:

$0.25 \leq \phi_1 \leq 0.90$ $0.10 \leq \leq \phi_2 \leq 0.75$ $\phi_1 + \phi_2 \leq 1.0$ $\eta_2/\eta_1 < 4.0$ $(\eta_1/\eta_2)(\phi_2/\phi_1) < 1.0$.

6. A process for producing a thermoplastic elastomer composition comprising a structure of a matrix of a thermoplastic copolyester elastomer and vulcanized rubber particles of at least one acrylic rubber having an acryl group and an epoxy group dispersed in the matrix comprising the steps of:

mixing and dispersing the thermoplastic copolyester elastomer and the acrylic rubber in the unvulcanized state in the absence of a vulcanizing agent at a temperature of at least the melting temperature of the thermoplastic copolyester elastomer; then performing dynamic heat treatment following the mixing in the presence of a vulcanizing agent so as to produce the thermoplastic elastomer of the above structure, wherein the viscosity $\eta_1$ and volume fraction $\phi_1$ at the time of melt mixing of the thermoplastic copolymer elastomer and the viscosity $\eta_2$ and volume fraction $\phi_2$ at the time of melt mixing of the acrylic rubber, satisfy the following formulas at a temperature and a shear rate where they satisfy the formulas:

$0.25 \leq \phi_1 \leq 0.90$ $0.10 \leq \leq \phi_2 \leq 0.75$ $\phi_1 + \phi_2 \leq 1.0$ $\eta_2/\eta_1 < 4.0$ $(\eta_1/\eta_2)(\phi_2/\phi_1) < 1.0$.

7. A hose comprising at least an inner tube, a reinforcing layer, and an outer cover, wherein the inner tube and/or outer cover is composed of a thermoplastic elastomer composition according to claim 1 or 5.

8. An elastomer composition comprising at least one acrylic rubber having an acryl group and an epoxy group and 5 to 30 parts by weight, based upon 100 parts by weight of the copolymer rubber of a polycaprolactone having a carboxyl group at the terminal thereof.

9. A elastomer composition comprising (i) 30 to 90% by weight of a thermoplastic resin component composed of at least one thermoplastic copolyester elastomer, (ii) 10 to 70% by weight of a rubber component composed of at least one acrylic rubber having at least one acryl group and epoxy group, and (iii) 5 to 30 parts by weight, based upon 100 parts by weight of the rubber component, of a polycaprolactone having a carboxyl group at the terminal thereof as a cross-linking agent, wherein the rubber component forms a dispersed phase and the thermoplastic resin component forms a continuous phase.

10. A thermoplastic elastomer composition comprising a thermoplastic elastomer composition composed of at least (i) a polyester thermoplastic resin and (ii) a vulcanized rubber composition of an acrylic rubber having an acryl group and an epoxy group dispersed therein, wherein (iii) an epoxy-modified olefin polymer having the formula (I):

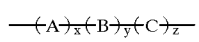
(I)

wherein, A represents an acrylate unit, B represents an epoxy group unit, and C represents an olefin unit, x, y, and z are the molar percentages in the epoxy-modified olefin polymer provided that x+y+z is 1, the acrylate unit A(x), epoxy group unit B(y), and olefin unit C(z) being essential components and said epoxy group unit B being contained in a molar percentage y of 0.005 to 0.200, and the component (i) being 90 to 30 parts by weight and the component (iii) being 1 to 25 parts by weight, when the sum of the weights of the components (i) and (ii) is 100 parts by weight.

11. A hose comprising at least an inner tube, reinforcing layer, and outer cover wherein the thermoplastic elastomer composition according to claim 9 or 10 is used for at least one of the inner tube and outer cover.

12. A thermoplastic elastomer composition superior in abrasion resistance comprising a rubber composition of (A) at least one silicone selected from the group consisting of organosiloxanes and their modified forms, (B) a copolyester thermoplastic resin, (C) at least one acrylic rubber having an acrylyl group and an epoxy group, and (D) a vulcanizing agent for the rubber composition, wherein vulcanized rubber particles of said rubber composition are finely dispersed in the thermoplastic resin.

13. A thermoplastic elastomer composition as claimed in claim 12, wherein the amount of the silicone (A) is 0.1 to 10 parts by weight, based upon 100 parts by weight of the total weight of the thermoplastic resin (B) and the rubber composition (C).

14. A thermoplastic elastomer composition as claimed in claim 12 or 13, wherein the ratio (B):(C) of the amounts of the thermoplastic resin (B) and the rubber composition (C) is 30 to 90:70 to 10 by weight ratio.

15. A process for producing a thermoplastic elastomer composition according to claim 12 or 13, comprising the steps of:

blending the thermoplastic copolyester elastomer (B), a rubber composition (C), and a vulcanizing agent (D) to produce a thermoplastic elastomer composition composed of all the components other than silicone; then blending the resultant composition with the silicone (A).

16. A hose comprising at least an inner tube, a reinforcing layer, and an outer cover, wherein said thermoplastic elastomer composition according to claim 12 or 13 is used for the outer cover.

17. A thermoplastic elastomer composition superior in adhesiveness with an olefin thermoplastic resin, a polyester thermoplastic resin and a polyester fiber containing the following components A, B, and C:

Component A: an olefin thermoplastic elastomer composition composed of an olefin thermoplastic resin (a), as a matrix, wherein particles of a vulcanized ethylene-propylene-diene copolymer (EPDM) rubber composition (b) is finely dispersed therein and containing 85 to 20% by weight of the olefin based thermoplastic resin and 15 to 80% by weight of the vulcanized EPDM rubber composition, Component B: a polyester copolymer resin Component C: an epoxy group-containing thermoplastic resin in a ratio of 90 to 50 parts by weight of the component A, 10 to 50 parts by weight of the component B, and 1 to 10 parts by weight, based upon 100 parts by weight of the total amount of the components A and B, of the component C.

18. A thermoplastic elastomer as claimed in claim 17, wherein said epoxy group-containing thermoplastic resin contains 60 to 95% by weight of at least a component from an ethylene monomer and 0.5 to 15% by weight of at least a component from glycidyl methacrylate.

19. A laminate comprising a thermoplastic elastomer according to claim 17 and a polyester fiber melt bonded with each other.

20. A laminate comprising a thermoplastic elastomer according to claim 17 melt bonded, via a polyester copolymer resin, to a polyester fiber.

21. A hose comprising an outer cover contacted with a polyester fiber reinforcing layer, wherein at least the innermost layer of the outer cover is composed of a thermoplastic elastomer according to claim 17.

22. A hose comprising a polyester fiber reinforcing layer bonded through a bonding layer to an outer cover, wherein the bonding layer is composed of a polyester copolymer resin and at least the innermost layer of the outer cover is composed of the thermoplastic elastomer according to claim 17.

23. A hose comprising at least a polyester fiber reinforcing layer bonded through a bonding layer to an outer cover, wherein the bonding layer is a thermoplastic elastomer composition according to claim 17 and at least the innermost layer of the outer cover is composed of a thermoplastic elastomer composition comprising an olefin thermoplastic resin, as a matrix, and the particles of a vulcanized EPDM rubber composition, as a domain, finely dispersed in the matrix.

24. A laminate comprising a layer of a thermoplastic elastomer composition comprising a polyolefin thermoplastic resin and an at least partially cross-linked elastomer component and a fiber reinforcing layer between which layers is interposed at least one thermoplastic adhesive resin, which layers and resin are integrally bonded together by hot melting, wherein said thermoplastic adhesive resin is a blend of at least one resin selected from the group consisting of maleic anhydride-modified polyolefin resins and epoxy-modified polyolefin resins and a polyester resin, and wherein the weight ratio of the maleic anhydride-modified polyolefin resin and epoxy-modified polyolefin resin to the polyester resin is 95:5 to 5:95.

25. A hose comprising an inner tube layer, an outer cover layer, and at least one fiber reinforcing layer, wherein at least one of the inner tube layer and the outer cover layer is composed of a thermoplastic elastomer composition comprising a polyolefin thermoplastic resin and an at least partially cross-linked elastomer component, and at least one thermoplastic adhesive resin interposed between said at least one of the inner tube layer and the outer cover layer composed of said thermoplastic elastomer composition and the fiber reinforcing layer, which layers and resin are integrally bonded together by hot melting, wherein said thermoplastic adhesive resin is a blend of at least one resin selected from the group consisting of maleic anhydride-modified polyolefin resins and epoxy-modified polyolefin resins and a polyester resin, and wherein the weight ratio of the maleic anhydride-modified polyolefin resin and epoxy-modified polyolefin resin to the polyester resin is 95:5 to 5:95.

26. A hose as claimed in claim 25, having a plurality of fiber reinforcing layers, wherein the fiber reinforcing layers, between which is interposed at least one thermoplastic adhesive resin, are integrally bonded together by hot melting, wherein said thermoplastic adhesive resin interposed between said fiber reinforcing layers is a blend of at least one resin selected from the group consisting of maleic anhydride-modified polyolefin resins and epoxy-modified polyolefin resins and a polyester resin, and wherein the weight ratio of the maleic anhydride-modified polyolefin resin and epoxy-modified polyolefin resin to the polyester resin is 95:5 to 5:95.

27. A hose comprising an inner tube layer, an outer cover layer, and a plurality of fiber reinforcing layers, wherein at least one of the inner tube layer and the outer cover layer is composed of a thermoplastic elastomer composition comprising a polyolefin thermoplastic resin and an at least partially cross-linked elastomer component, and wherein at least one thermoplastic adhesive resin, composed of a blend of at least one resin selected from the group consisting of maleic anhydride-modified polyolefin resins and epoxy-modified polyolefin resins and a polyester resin, wherein the weight ratio of the maleic anhydride-modified polyolefin resin and epoxy-modified polyolefin resin to the polyester resin is 95:5 to 5:95, is interposed between said at least one of the inner tube layer and the outer cover layer composed of said thermoplastic elastomer composition and one of said fiber reinforcing layers, which layers and resin are integrally bonded together by hot melting, and wherein the fiber reinforcing layers, between which is interposed at least one thermoplastic adhesive resin selected from the group consisting of maleic anhydride-modified polyolefin resins, epoxy-modified polyolefin resins and polyester resins, are integrally bonded together by hot melting.

28. A laminate as claimed in claim 24, wherein said maleic anhydride-modified polyolefin resin or epoxy-modified polyolefin resin is a modified resin of a polypropylene resin having a melt index of not more than 5.0 g/10 min. determined under the conditions of 230° C., a load of 2.16 kgf, an orifice diameter of 1 mm and 10 minutes.

29. A laminate as claimed in claim 24, wherein said maleic anhydride-modified polyolefin resin or epoxy-modified polyolefin resin is a modified resin of a polyethylene resin having a melt index of not more than 5.0 g/10 min. determined under the conditions of 190° C., a load of 2.16 kgf, an orifice diameter of 1 mm and 10 minutes.

30. A laminate as claimed in claim 24, wherein said maleic anhydride-modified polyolefin resin or epoxy-modified polyolefin resin is a modified resin of an ethylene-acrylic ester copolymer having a melt index of not more than 6.0 g/10 min. determined under the conditions of 190° C., a load of 2.16 kgf, an orifice diameter of 1 mm and 10 minutes.

31. A laminate as claimed in claim 24, wherein said polyester resin is a polyester resin having a melt index of not more than 20.0 g/10 min. determined under the conditions of 190° C., a load of 2.16 kgf, an orifice diameter of 1 mm and 10 minutes.

32. A hose as claimed in claim 25 or 26, wherein said maleic anhydride-modified polyolefin resin or epoxy-modified polyolefin resin is a modified resin of a polypropylene resin having a melt index of not more than 5.0 g/10 min. determined under the conditions of 230° C., a load of 2.16 kgf, an orifice diameter of 1 mm, and 10 minutes.

33. A hose as claimed in claim 25 or 26, wherein said maleic anhydride-modified polyolefin resin or epoxy-modified polyolefin resin is a modified resin of a polyethylene resin having a melt index of not more than 5.0 g/10 min. determined under the conditions of 190° C., a load of 2.16 kgf, an orifice diameter of 1 mm, and 10 minutes.

34. A hose as claimed in claim 25 or 26, wherein said maleic anhydride-modified polyolefin resin or epoxy-modified polyolefin resin is a modified resin of an ethylene-acrylic acid ester based copolymer having a melt index of not more than 6.0 g/10 min. determined under the conditions of 190° C., a load of 2.16 kgf, an orifice diameter of 1 mm, and 10 minutes.

35. A hose as claimed in claim 25 or 26, wherein said polyester resin is a polyester based resin having a melt index of not more than 20.0 g/10 min. determined under the conditions of 190° C., a load of 2.16 kgf, an orifice diameter of 1 mm, and 10 min.

36. A hose comprising at least an inner tube, reinforcing layer, and outer cover, wherein said inner tube has a structure of a thermoplastic elastomer composition comprising a matrix of 30 to 90% by weight of a thermoplastic copolyester elastomer and, dispersed therein, 70 to 10% by weight of vulcanized rubber particles of an acrylic rubber having an acryl group and epoxy group, said reinforcing layer is comprised of a polyester fiber, and said outer cover has a structure of a thermoplastic elastomer comprising a matrix of 30 to 90% by weight of a thermoplastic copolyester elastomer and, dispersed therein, 70 to 10% by weight of vulcanized rubber particles of an acrylic rubber having an acryl group and epoxy group, and a bonding layer disposed at least between the reinforcing layer and the outer cover, wherein said bonding layer is a thermoplastic resin composition containing at least 50% by weight of a thermoplastic polyester copolymer resin composed of, as the dicarboxylic acid constituting the polyester, an aromatic dicarboxylic acid and the Young's modulus at 120° C. is at least 3.0 MPa.

37. A hose as claimed in claim 36, wherein the thermoplastic polyester copolymer resin in the bonding layer has a melt viscosity, at a temperature of 230° C. and a shear rate of 50 to 200 $s^{-1}$, of not more than 1000 Pa·s.

38. A hose as claimed in claim 36 or 37, wherein the thermoplastic polyester copolymer resin of the bonding layer is a thermoplastic block copolyester elastomer composed of recurring units of a polyester and polyether, or recurring units of a polyester and polyimide ether, and containing at least 40 mol % of said recurring units of polyester.

* * * * *